United States Patent [19]

Schwartz et al.

[11] Patent Number: 5,047,918

[45] Date of Patent: Sep. 10, 1991

[54] FILE MANAGEMENT SYSTEM

[75] Inventors: Mayer D. Schwartz; Norman M. Delisle, both of Portland, Oreg.

[73] Assignee: Tektronix, Inc., Beaverton, Oreg.

[21] Appl. No.: 289,395

[22] Filed: Dec. 19, 1988

Related U.S. Application Data

[63] Continuation of Ser. No. 815,430, Dec. 31, 1985, abandoned.

[51] Int. Cl.[5] ............................................. G06F 1/00
[52] U.S. Cl. ................................ 364/200; 364/282.1; 364/282.3; 364/283.1; 364/286
[58] Field of Search ... 364/200 MS File, 900 MS File

[56] References Cited

U.S. PATENT DOCUMENTS

| | | | |
|---|---|---|---|
| 4,156,909 | 5/1977 | Barlton et al. | 364/200 |
| 4,318,184 | 3/1982 | Millett et al. | 364/900 |
| 4,447,875 | 5/1984 | Bolton et al. | 364/200 |
| 4,468,728 | 8/1984 | Wang | 364/200 |
| 4,468,732 | 8/1984 | Raver | 364/300 |
| 4,502,118 | 2/1985 | Hagenmaier, Jr. et al. | 364/200 |
| 4,506,326 | 3/1985 | Shaw et al. | 364/300 |
| 4,555,759 | 11/1985 | McCaskill et al. | 364/300 |
| 4,558,413 | 12/1985 | Schmidt et al. | 364/200 |
| 4,611,272 | 9/1986 | Lomet | 364/200 |
| 4,613,946 | 9/1986 | Forman | 364/518 |
| 4,627,019 | 12/1986 | Ng | 364/900 |
| 4,631,673 | 12/1986 | Haas et al. | 364/300 |
| 4,642,758 | 2/1987 | Teng | 364/200 |
| 4,644,464 | 2/1987 | Logsdon et al. | 364/200 |
| 4,663,736 | 5/1987 | Furusawa et al. | 364/900 |
| 4,688,195 | 8/1987 | Thompson et al. | 364/300 |
| 4,769,772 | 9/1988 | Dwyer | 364/300 |

OTHER PUBLICATIONS

Simpson, Alan, *Advanced Techniques in dBase II*, Sybex, 1985, chapters 2, 20 and 21.
Ira P. Goldstein & Daniel G. Bobrow, "A Layered Approach to Software Design", Xerox Parc. Tech. Report, CSL-80-5, Dec. 80.
Liba Svobodova, "File Servers for Network-Based Distributed Systems", ACM Computing Surveys, vol. 16, No. 4, 12/84, pp. 353-397.

*Primary Examiner*—Terrell W. Fears
*Assistant Examiner*—Rebecca L. Rudolph
*Attorney, Agent, or Firm*—Dellett, Smith-Hilband Bedell Firm

[57] ABSTRACT

A file management system comprises a computerized data storage and retrieval utility for integrating data files produced by independent data processing operations by linking the data files according to user-definable relationships. The machine assigns user-definable attributes to the data files and their links and searches for groups of files and links having selected attributes. The machine also maintains an archive of versions of data files and their links referenced according to their creation time. The machine includes provisions for transmitting commands to a computer operating system when selected files are accessed or modified to invoke execution of user created programs.

4 Claims, 4 Drawing Sheets

5,047,918

FILE MANAGEMENT SYSTEM

This is a continuation of application Ser. No. 815,430 filed Dec. 31, 1985 and now abandoned.

BACKGROUND OF THE INVENTION

The present invention relates to computerized data storage and retrieval systems and in particular to a system for linking separate data files according to user-definable relationships.

Typically one of the most difficult aspects of large engineering or similar projects is record keeping. For instance in the design and construction of a nuclear plant, massive numbers of documents are generated, including preliminary studies, drawings, specifications, letters, reports and the like. These documents must be stored in a logical fashion so that they can be retrieved when needed. When the number of such documents becomes very large it is often difficult to find them once they are stored, particularly when only the nature of a document to be retrieved, and not a name or a reference number under which it is filed, is known:

In addition to problems associated with storing and retrieving documents, there are also considerations associated with the "ripple" effect that changing one project document may have on other project documents. For instance if a design drawing is changed, other drawings of a specification which relate to the drawing might also have to be altered. For a very complete project it is not easy to determine the other documents affected. Also it is often important to keep records of document changes, including not only prior versions of a document but in addition records as to why a document was changed and who changed it.

The use of computerized data base systems is well known. Data base systems permit documents to be characterized according to various attributes of the document such as "author", "document type", "subject matter", etc. For instance, to characterize a specification for a pump written by Smith, a user may assign character strings "Smith", "specification", and "pump" as the values of author, document type and subject matter attributes. Such data base systems typically include search routines for locating documents identified by assigned attribute values matching a list of selected attribute values provided by a user, thereby enabling a user to easily locate all documents sharing a common set of attributes such as all pump specifications written by Smith.

More recently, the advent of rapid access bulk data storage devices and multiple computer networks has permitted computer systems to actually create and electronically store the documents as files in a bulk storage device in addition to keeping track of documents. To be effective for use in storing and retrieving documents associated with a large project, such file management systems should be capable not only of locating groups of files containing documents having common attributes, but also of finding groups of files which are related to a given file in some definable way. For instance, once a user has located a particular file containing Smith's pump specification, he may then wish to locate other files which contain reviewer's comments regarding the pump specification or which may contain pump drawings related to the pump specification. There is continuing activity in the area of computerized data storage and retrieval systems pertaining to "hypertext" systems which enable users to establish "links" between file pairs indicating that two files are related in some way. (The article "Reading and Writing the Electronic Book", by Nicole Yankelovich and Norman Meyrowitz, pages 15-30 in the October, 1985 issue of *Computer*, published by the Institute of Electrical and Electronic Engineers, is a good summary of prior art relating to systems of this type and is incorporated herein by reference.) A "link" can be visualized as a pointer from a first file to a second file indicating the second file is related to the first file. A link is implemented as a stored record containing data identifying the linked first and second files and containing link attribute data defining the nature of the relationship between the two files. For instance, when the first file is a specification and the second file is a comment regarding the specification, a link record may be created which identifies the first and second files and which contains link attribute data indicating that the relationship between the files is one of "comment". A separate link record is provided for every pair of linked files. If three comments have been written about a particular specification and stored in separate files, three links records may be created, each indicating a "comment" relationship between the specification file and a corresponding one of the comment files. Link records may be grouped according to the files they link so that once a particular file is identified, such as the specification file, all other files, such as the comment files, to which the particular file is linked, can be quickly determined by reviewing only the link records associated with the particular file.

Files and links between files both may have assigned attributes characterizing the nature of the file or link, but the concept of a file attribute, as known in the art, differs somewhat from the concept of a link attribute. Although separate files may be related by file attributes, the relationship between such files is one of commonality and is non-directed in that the relationship does not involve a pointing from one file to another file. For instance, all files created by Smith are related by virtue of having a common author and this common feature of each such file may be denoted by using "Smith" as the value of an "author" file attribute for each file. In contrast, links describe relationships between pairs of files in a directed fashion, in the sense that a link leads a user "from" a first document "to" another document for a particular reason, the link attribute being descriptive of that reason. Thus the relationship indicated by a link attribute is not one of commonality but is rather one of "connectivity". For instance, the relationship between a first file containing a drawing and a second file containing a comment about the drawing cannot be easily described in terms of what both files have in common (i.e., by a file attribute) since the files differ: one file is a "drawing" and the other file is a "comment". But if the concept of "comment" is used to describe a link between the two files, rather than to describe the nature of one of the files, the relationship between the files is clearly specified.

Even though a file may be thought of as containing a "comment", and therefore may be assigned a file attribute value "comment", it is not particularly useful to do so since users are typically not interested in finding the group of all files which contain comments. Instead, users are usually more interested in finding files containing comments about a particular user-identified file. It is therefore much more useful to establish a link between two files where the link has a "comment" attribute.

Links give a collection of files structure by connecting file pairs to form a "web" or a "graph" wherein each file may be thought of as a "node" interconnected to other nodes by links. Some systems of the prior art are adapted to display a representation of the graph enabling a user to visualize how sets of files are interrelated in much the same way that a map depicts how towns are interconnected by roads or rivers. Thus, for instance, when a user decides to change one file ("node"), he may quickly determine all of the other files which might be affected by the change by inspecting other nodes which are linked to the node to be changed.

However, if the number of files associated with a project is large, the graphs become complex, difficult to display and difficult for a user to utilize. Therefore systems typically enable a user to reduce the size of a graph to be displayed by specifying to the system the attributes of various files of interest. The system then displays a "subgraph" which contains only nodes characterized by the special attributes. For instance when a user is only interested in files relating to pumps, the system displays the nodes representing pump-related files along with their interconnecting links, thereby reducing the number of files the user might have to inspect in order to find a particular file of interest.

While prior art systems help a user to organize and retrieve stored data, these systems still leave certain record keeping problems unresolved. One problem relates to the difficulty of preselecting the types of file or link attributes which may be most advantageous. In order for a system to be useful, the attributes and their values which a user can use to describe files and links must provide an appropriate basis for searches to be performed by the system. However, only a limited number of attributes is usually contemplated.

Hypertext systems also would be more useful if they included provisions for maintaining comprehensive records of how project documentation changes with time. Some computerized data storage systems store old versions of a document but for large projects documents often undergo so many revisions that it becomes impractical or impossible to store every version of every document. It would also be desirable to maintain a history of changes to file and link attributes. For instance a file attribute may indicate the name of a person responsible for approving changes to that document, and when another person assumes that responsibility the corresponding attribute value must be changed. But in doing so the identity of the person previously responsible for approving changes is lost unless some means can be provided for maintaining the information. An ideal system would be able to recreate the entire graph of a system as it existed at any previous time, including the contents of files at the time, the file attributes assigned to the files, the links between the files existing at the time and the link attributes existing at the time. This feature would be very useful in determining the cause of problems that arise in the course of a project but implementation thereof is generally impractical in prior art systems.

Another problem associated with the use of multi-user systems occurs when two people independently attempt to change the same file at the same time. A conflict arises as to which new version should be considered the latest version. Some systems prevent the conflict by blocking access to a file by more than one person at a time, but this approach inefficiently utilizes multiple user capability, particularly when one user wants only to read the file rather than change it.

Finally, it would be desirable to provide a data storage and retrieval system capable of notifying a user when another user attempts to access or change a file, a link, or other features of a graph. Such capability would facilitate informing interested parties when a file or other aspect of a graph has been, or is about to be, changed.

SUMMARY OF THE INVENTION

According to one aspect of the present invention, a data file management machine enables a user to characterize stored data files ("nodes") according to user-definable "file attributes". (Hereinafter the terms "file" and "node" will be used interchangeably.) Each file attribute is a variable having a user-defined name such as "author", or "subject matter", and a user may assign a value to the file attribute for each file. The values that may be assigned to a file attribute may comfiles prise user-defined character strings, such as "Smith" or "pump specification", or may be an integer. The machine stores data representing file attributes and their values in a set of "node records", each node record comprising a collection of data associated with a file.

Since the file attributes are user-definable, the user can establish a new attribute whenever he recognizes a new distinguishing feature about a file. For instance, new text files may be created which are written in different languages than previously stored files, and a user may wish to classify the new files according to the language in which they are written. The present invention enables the user to establish a new file attribute named with the character string "language". He may then assign the character string "French" as the value of the language attribute for every file written in French and he may assign the character string "English" as the value of language attribute for every file written in English. Thus unlike data management systems of the prior art, the present invention enables a user to establish a new file attribute whenever the need arises and the user is not limited to selecting from among a fixed number of predefined attributes.

The data file management machine of the present invention further enables a user to establish "links" between related file pairs. A "link" is a user-defined relationship between two files, the link being evidenced by a stored "link record", a collection of data including references to the two files being linked and including data describing "link attributes" and their assigned values. A "link attribute" is a variable comprising a user-defined character string as a name. The user can also assign an attribute value to the variable to characterize a relationship between two files. This attribute value may also be a user-defined character string or may be an integer. As an example of the utilization of links, when a first file contains a drawing for a pump, a second file contains a specification for the pump shown in the drawing, and a third file contains comments regarding the drawing, a user may define two links, a first linking the first and second files and a second linking the first and third files. Each link may be characterized by a link attribute which the user may, for instance, name "reference". For the link relating the drawing file to the specification file, the user may assign a value to the "reference" link attribute which the user calls "specification". For the link relating the drawing file to the designer comments file, the user may assign the character string "comment" as the value of the "reference" link attribute. The machine of the present invention creates the appropriate link records based on the user's input regarding the files to be linked and the names and values of the link attributes.

The present invention enables a user to define not only the values of file and link attributes but also to create new links between files based on new, user-defined link attributes. In systems of the prior art which permit the use of file and link attributes, the number and names of file and link attributes are fixed and the user can only change values of limited file and link attributes already associated with particular files and links. The user cannot undertake to establish new file or link attributes.

The machine of the present invention is also adapted to locate all files and links characterized by user selected combinations of file and link attribute values. The machine finds the appropriate files and links by searching through the node and link records. The ability of a user to define new link and file attributes provides the user with more flexible control over file and link selection than is possible when the number and nature of assignable file and link attributes are predetermined and fixed.

According to another aspect of the invention, the machine is adapted to perform a "traversal" search whereby a user provides the machine with the identification of a first node along with a predicate for the files and a predicate for the links which describe the set of attributes and their values which are desired. The machine then identifies all nodes connected to the first node through intermediate nodes and links, wherein the intermediate nodes and links are all characterized by the selected node or link attribute values. This traversal search is useful when links are employed to indicate a progression of files, as for instance when each section of a specification is separately stored and wherein links having "next section" attributes connect each successive section. Thus a user need only identify the first section, and provide the machine with a "specification" file attribute value and a "next section" link attribute value. The machine will then find every section of the specification and identify them to the user in the order they occur.

Hypertext systems of the prior art perform "query" searches wherein the user provides a list of selected file and link attribute values but does not provide a starting node. The system then identifies all files characterized by the selected file attribute values and all links characterized by the selected link attribute values which interconnect the identified files. However, the traversal search of the present invention always identifies the files in the proper order whereas the query search returns files in arbitrary order. Moreover, for a query search to be adequately selective, the file attributes must usually be more precisely defined than for the traversal search. For instance, if more than one specification is stored in the system, additional file attribute values may be necessary to distinguish between files associated with different specifications. Otherwise the query search would return all specification files and not just the desired specification file. A traversal search can be much faster than the query search because in a query search every node record and every link record is inspected whereas in a traversal search only those node and link records are inspected which are encountered in the course of the search by passing through ("traversing") intermediate nodes and links having the selected attribute values.

According to still another aspect of the invention, the machine is adapted to transmit user-definable character strings ("demons") to a computer operating system within which the machine functions. A demon is transmitted on occurrence of any one of a set of events affecting a graph, such as a user request to modify a file, delete a link, or change a file or link attribute value. The demon character strings can be chosen so that the operating system identifies them as commands, such as commands to run a program. Demons are useful, for instance, to initiate a user-provided program which sends a message over an electronic mail system to a person responsible for approving changes to a file. The machine of the present invention can be instructed to transmit the demon whenever someone attempts to modify the contents of the file, thereby initiating a warning message to the responsible person.

According to a further aspect of the invention, the machine identifies a node according to the time (the "version time") the node was created. When the machine modifies a node in response to user input, the version time identifying the node is updated to the current time. When a user attempts to change the contents of a node, the user indicates the version time of the node he wishes to change, and if the version time indicated by the user is not the current version time for the node, then the machine knows that the user's changes are based on an outdated version of the node. That is, the contents of the node have been changed since the last time the user acquired them. In such case the machine prevents the user from modifying the node and notifies the user of the problem. This aspect of the invention prevents conflicts which can arise when more than one user independently access and attempt to modify a node at the same time.

According to a still further aspect of the invention, the machine is adapted to determine the states of files, links, attribute values and demons as they existed at any previous time. Whenever a user changes the contents of a file, thereby creating a new "version" of the file, the machine creates and stores a "version history" record containing a set of instructions for converting the new version back to the previous version that it replaced. The entire previous file is not stored. The new version of the file is identified by the version time, adjusted to indicate the time at which the new version was created. The version history record for the previous version is also identified by a version time indicating the time that the previous version of the file was created. When a user wishes to inspect the contents of a file as it existed at a particular time, the user indicates the particular time to the machine and the machine can determine from the version time identifiers which version of the file was the current version as of the particular time and can reconstruct that version using the version histories. The machine also assigns version times to each link, indicating when the link was created, thereby enabling the machine to determine which links existed at a given time. The machine further maintains time referenced records of previously assigned values of file and link attributes and of demons as they previously existed.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DRAWINGS

DETAILED DESCRIPTION

Figure 1:
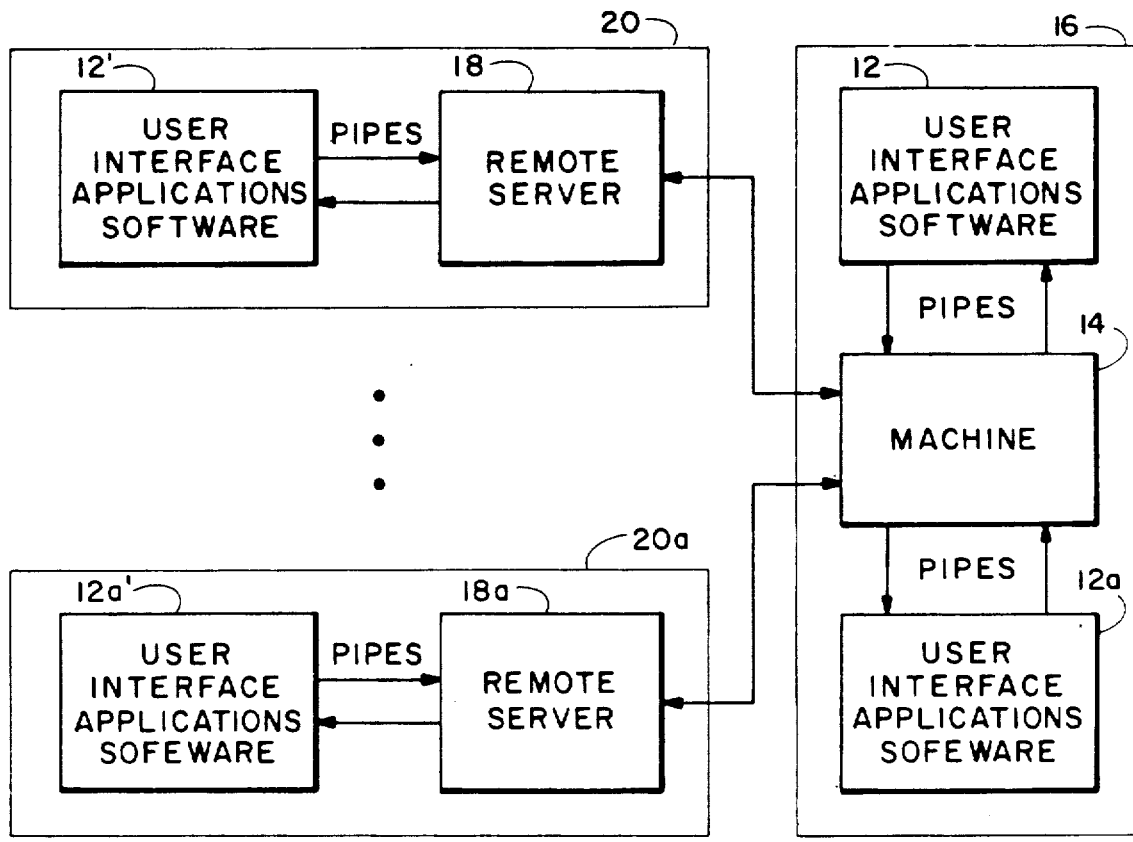
FIG. 1 is a block diagram of an information management system utilizing the present invention.

Referring to FIG. 1, there is depicted in block diagram form an information management system 10 adapted to perform selected data processing operations for multiple users. The system includes a software-based data file management machine 14 according to the present invention adapted to provide a data storage and retrieval utility that supports denotation of relationships between data within separate data files produced by system users. In the preferred embodiment of the present invention, system 10 is adapted to operate within the multiple user UNIX operating system environment. (The UNIX operating system was developed by the American Telephone and Telegraph Company and is described in the book *Using the UNIX System*, by Richard Gauthier, published in 1981 by the Reston Publishing Company.) Each user creates and modifies data files by means of user interface applications software running as separate UNIX processes. In the example of FIG. 1, two users may concurrently utilize separate applications software 12 and 12a running on the same computer 16 as the machine 14, accessing the machine through UNIX pipes. (A UNIX pipe is an open file accessible by two processes such as machine 14 and application software 12 or 12a.) Two other users may utilize applications software 12' and 12a' running on remote computers 20 and 20a which access the machine 14 through remote servers 18 and 18a. Computers 16, 20 and 20a suitably comprise Digital Equipment Corporation VAX model computers or other computers capable of operating within the UNIX operating system environment.

User applications software 12 (and 12a) (hereinafter also called "user") may carry out any of a variety of data processing functions and may by way of example comprise word processors, computer-aided design and other graphics systems, and data base systems each of the type producing sequences of data to be stored in files. The data sequences from the user are transmitted to machine 14 which, working through the UNIX operating system, is responsible for, controlling the storage of the data sequences as files in bulk storage media such as a disk.

The data file management machine 14 enables a user to characterize stored data files ("nodes") according to user-definable "file attributes". A file attribute is a variable having a user-defined name such as "author", or "subject matter", and may be assigned a user-defined value characterizing each file. The file attribute values may be user-defined character strings such as "Smith" or "pump specification" or may be user-selected integers. The user is not limited to selecting from among a fixed number of predefined file attributes in order to characterize files but can establish new file attributes and new file attribute values whenever the need arises. For instance, when a user decides to classify files according to the number of bytes of data in the file, the user may establish a new file attribute which the user chooses to name with the character string "length" and may assign an integer representing the document length as the value of the "length" attribute for each file. After the user provides machine 14 with data indicating which file is to be assigned an attribute, and the name and value of the attribute, the machine stores data indicating the file attribute and its value is a "node record " associated with the file. A node record associated with each node contains data indicating all of the file attributes and their values which have been defined by the user and assigned to the file.

The machine 14 also permits a user to establish "links" between selected pairs of related files. A "link" is a user-defined relationship between two files, the link being evidenced by data in a stored "link record". A link record is a file containing data identifying two files being linked and describing various "link attributes" and their assigned "link attribute values". A "link attribute" is a parameter having a user-definable name such as "reference" to which the user can assign a link attribute value characterizing the relationship between the identified pair of files. The attribute value is also user-defined and can be either a character string or a number. For instance, a first file may contain a drawing for a pump, a second file may contain a specification for the same pump, and a third file may contain comments regarding the drawing. The user may establish two links, one between the first and second files and another between the first and third files. Each link may be characterized by a link attribute, which the user may name "reference", the value of which more precisely describes one of a set of relationships that may exist between a file and all other files which refer to that file. For the link relating the drawing to the specification, the user may assign a value to the "reference" link attribute which he calls "specification". For the link relating the drawing to the designer comments, the user may assign the character string "comment" as the value of the reference link attribute. The machine 14 then establishes the appropriate link records including a first link record identifying the first and second files and containing data indicating "reference" as an attribute of the link and "specification" as the value of the attribute, and a second link record identifying the first and third files and containing data indicating "reference" as an attribute of the link and "comment" as the value of the attribute. It is important to note that in characterizing a link, the user is not limited to selection from among a limited set of predetermined link attributes but can define any number of new link attributes and new link attribute values whenever the need arises.

Thus the present invention enables a user not only to define new values of file and link attributes but also to create new file and link attributes. In systems of the prior art which permit the use of file and link attributes, the number and names of file and link attributes are fixed and the user can only change the values of file and link attributes associated with particular files and links; he cannot define new file or link attributes.

The use of appropriately selected link and file attributes enables a user to quickly locate files of interest when the user cannot precisely identify which files he wants to locate but does know certain characteristics of the files. The machine 14 is adapted to provide a user with a list of all files and links characterized by user-selected combinations of file and link attribute values. The machine finds the appropriate file and links by searching through the node and link records which contain the file and link attribute information. Therefore the ability of a user to define and assign new attributes to file and links when he determines that a newly recognized file or link characteristic may provide a useful search basis gives the user more control over file searches than is possible when the number and nature of assignable file and link attributes are fixed and predetermined.

The machine 14 is adapted to perform two different kinds of searches, one called a "traversal" search and the other called "query" search. To initiate a "traversal" search user provides the machine with the identification of a first node along with a predicate for the files and a predicate for the links which describe the set of attributes and their values Which are desired. The machine then searches all of the link records associated with links connecting the first node to other nodes in order to locate a set of second nodes connected to the first node by links characterized by the selected attribute values. Next the machine searches the node records of each of the second nodes to locate a subset of the second nodes wherein each node of the subset is characterized by the selected file attributes. The machine then searches through the link records associated with links connected to the second node subset to find a set of third nodes connected to the second node subset by links characterized by the selected link attribute values. The process continues until the machine identifies all nodes connected to the first node through a series of intermediate links and nodes wherein the intermediate node and links are all characterized by the selected node or link attribute values. Thus in a traversal search, the machine 14 "traverses" a graph starting with an initial node and following only those links which have the selected link attributes and passing through only those nodes having the selected file attributes, and the machine identifies to the user the nodes and links traversed in this fashion.

This traversal search is particularly useful When links indicate an Ordered progression of files, as for instance when each section of a specification is stored as a separate file and links having "next section" attribute values are provided to relate each successive section. Thus a user need only identify the first section of the specification and provide the machine with a "specification" file attribute value and a "next section" link attribute value. The machine will find every section of the specification and identify them to the user in the order encountered. Since the search is performed by traversing ordered links, the order in which specification sections are encountered matches the order in which the sections occur in the specification.

The machine 14 is also adapted to perform "query" searches. For a query search, the user provides file and link predicates which describe the provide a starting node. The system then searches all of the node and link records to identify all of. the files characterized by the selected file attribute values and all of the links characterized by the selected link attribute values which interconnect the identified files. One difference in result between the traversal search and the query search is that the traversal search always identifies the files in the proper order whereas the query search returns the files in arbitrary order. For a query search to be adequately selective, the file attributes must be more precisely defined than for the traversal search. In the example of the specification, if more than one specification is stored in the system, additional file attribute values must be utilized to distinguish between files associated with different specifications. This is not required for the traversal method. The traversal method can be much faster than the query method because in the query method every node record is inspected whereas in the traversal method only node records encountered during the traversal are inspected. Nonetheless, the query search is useful particularly when the user cannot identify a starting node for a traversal search.

When the user produces a new sequence of data to be filed, the user transmits the data to machine 14 and machine 14 produces UNIX commands necessary to cause the UNIX operating system to store the data in a disk or other bulk storage device as a UNIX data file. The machine 14 identifies each data file (node) by two parameters: "NodeIndex", a unique code associated with the node, and "Time", a number determined according to the date and time that the node was created. These parameters are returned to the user at the time the file is stored. Subsequently. when a user seeks to access the contents of an existing node. the user may transmit a request to machine 14 to access ("check out") the node, identifying the node by its NodeIndex and Time parameters. The machine 14 then transmits a copy of the node contents to the user. The user may modify the contents and transmit these contents back to the machine 14 for storage. When the machine changes the contents of a file. it updates the Time Parameter to reflect the time of the change rather than the time the node was initially created. The use of the Time parameter permits machine 14 to identify and resolve conflicts arising when different users attempt to modify the contents of the same node. In changing or modifying the contents of a node, the first user. when requesting machine 14 to store ("check in") the new node contents in place of the current node contents, identifies the node by supplying the Node Index and Time parameters, and if the supplied Time parameter value does not equal the Time parameter value corresponding to the current contents (current version) of the node, then machine 14 aborts the storage of the first user's version because the incorrect Time parameter supplied by the first user indicates that a second user has modified the node since the first user checked it out.

The machine 14 permits a user to declare a node to be either a "file" or an "archive" type node. The contents of an existing node are written over when a user checks in a modified version of the node contents and in a "file" type node the previous version of the node is lost. However in the case of an "archive[ node, the machine 14 stores a set of instructions (a "version history") which. when followed, converts the latest version of the node to the previous version. Version histories are created and stored each time an archive node is changed and these version histories enable the machine 14 to recreate all previous versions of an archive file.

The machine 14 also identifies each link according to a LinkIndex parameter and a Time parameter. The LinkIndex parameter is a unique code identifying the link and the Time parameter is a number indicating the time that the link was created (the "version time"). A user may direct the machine to delete a link from a "graph", and if the link connects only "file"type nodes for which version histories are not maintained, the machine will respond by destroying the link record describing the link to be deleted. However if the link connects an "archive" type node, the machine 14 will not destroy the link record. Instead, the machine 14 stores an additional Time parameter in the record indicating the time that the link was deleted. Thus the machine can determine when the link "existed" from the creation and deletion Time parameters stored in the link record.

The machine also maintains records of previously assigned values of file and link attributes as they existed at any given time. These records, in conjunction with the time referenced link records and the node version histories, enable machine 14 to determine the state of files, links, and attribute values as they existed at any previous time. In fact, if every node is declared an archive type node, then the machine 14 can completely reconstruct a "graph" as it existed at any previous time.

When the user requests the machine 14 to perform a query or a traversal search, as previously described, the user may provide the machine with a specified prior time and the machine will base the query or traversal search on the graph as it existed at the user-specified time. Thus the machine 14 is not only adapted to reconstruct a graph as it previously existed, it is also adapted to perform user-directed query and traversal searches based on previous states of the graph, thereby making it easy for a user to locate previous versions of files.

The machine 14 of the present invention is also adapted to transmit user definable character strings, "demons", to the UNIX operating system when a graph or selected files or links within a graph are created, accessed, modified or destroyed. Demons typically are used to command the UNIX operating system to execute programs, and a demon invoked program might, for instance, maintain a list of all users accessing a node or might send a message through an electronic mail system to the author of a file whenever the file is accessed.

Figure 2:
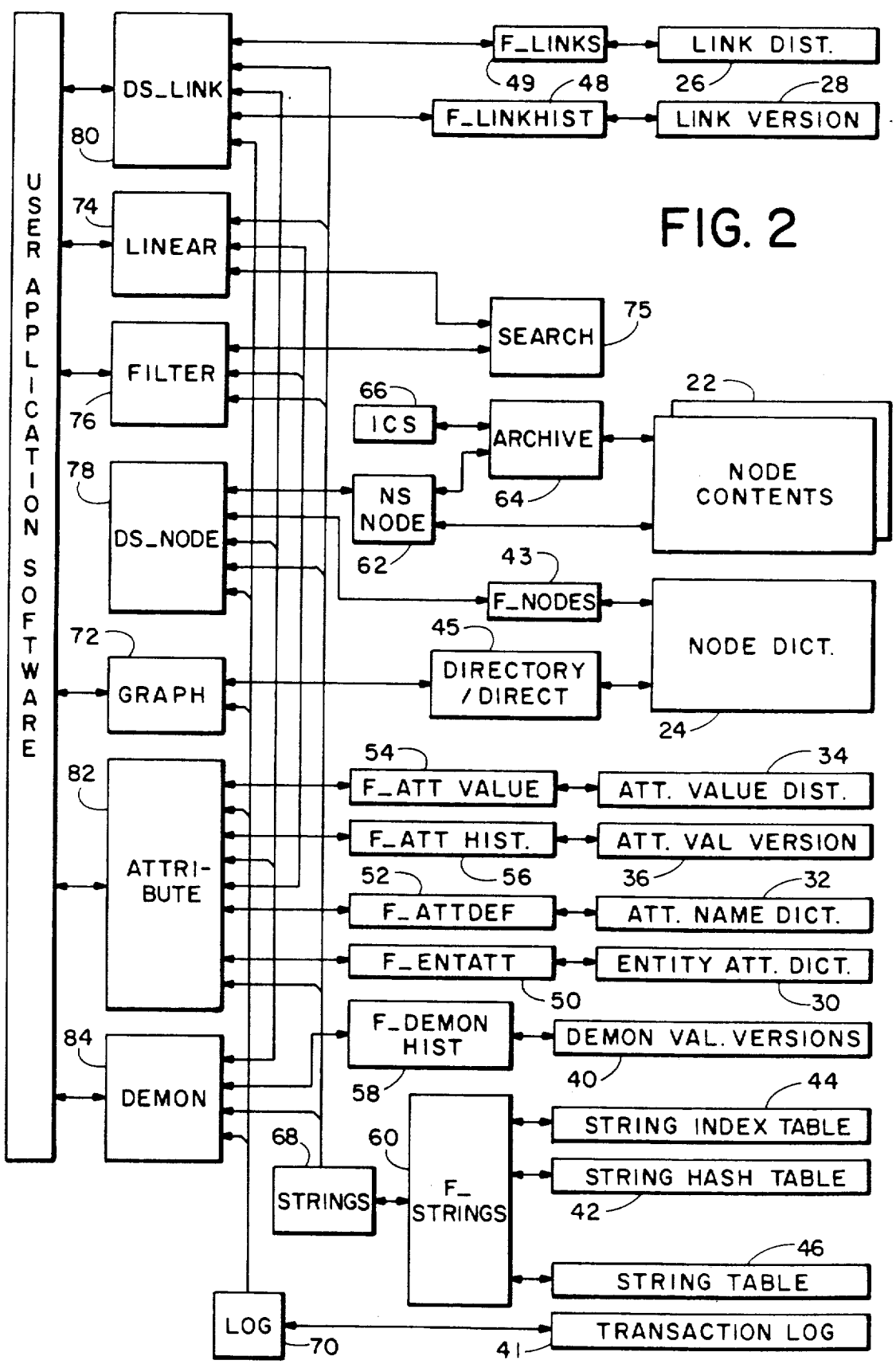
FIG. 2 is a block diagram of computer software according to the present invention.

A listing of C language programs for implementing the machine 14 according to the present invention is included in Appendix I to this specification. FIG. 2 is a block diagram of the software of Appendix I wherein each block represents a program listed in Appendix I or one of several data files maintained by the programs. With reference to FIG. 2, the machine 14 maintains one node contents file 22 for each node along with a number of other files for storing information about the nodes and the links that 5 interconnect them.

A node dictionary 24 is a file containing a set of entries ("node records") each entry containing a record of information about a node. There is one such node dictionary 24 entry for every node. Each node dictionary 24 entry comprises the following parameters:

lastUpdateTime:
  The value of this parameter indicates the version time for the next most recent version of the node corresponding to this entry. In the preferred embodiment of the invention, version times are indicated by the number of seconds elapsed since an arbitrary starting moment.
creationTime:
  This parameter indicates the version time of the node described by this entry.
deletionTime:
  If the node is "deleted" from the graph, and the node is an archive node, this parameter is assigned a value indicating the time the node was deleted.
status:
  This parameter indicates whether the node is an archive type node.
pathPrefix:
  This parameter enables the UNIX operating system to determine the storage location of the node.
creator, deletor:
  These parameters identify the users creating and deleting the node.
firstOutLink:
  This parameter is a pointer to an entry in a link dictionary 26 which is a file for storing the previously mentioned link records. The firstOutLink parameter points to the link dictionary 26 entry (i.e., the link record) describing a first of a set of all "out links" pointing from this node to other nodes in a graph.
firstInLink:
  This parameter is a pointer to another entry in the link dictionary 26 describing a first of a set of all "in links" pointing to this node from any other node in the graph.
attributes:
  This is a set of attribute/value parameter pairs pointing to entries in an attribute name dictionary 32 and an attribute values dictionary 34 of FIG. 2. Each attribute name dictionary 32 entry indicates the name of a particular attribute and each attribute values dictionary 34 entry indicates a particular node or link attribute value. One attribute parameter pair is included in each node dictionary 24 entry for each attribute characterizing the node.
eventActions:
  This is an array of parameters and associated values. Each parameter indicates whether a demon string is to be invoked in response to a particular action with respect to the node (i.e., access, modify, destroy, etc.) Each value is a string index for a demon character string to be invoked and also contains a pointer to an entry in a demon value versions file 40 where a string index of a previous version of a demon string is stored, if any. The demon value version file entries relating to successive versions of the same demon are all linked to form a linked list which may be traversed to find any previous version of a demon value.

Link dictionary 26 of FIG. 2 contains a set of entries each comprising a link record storing information about a corresponding link. Each link dictionary 26 entry includes the following parameters:
fromNode:
  This is a node Index parameter which points to the node dictionary 24 entry for the current version of a "from node" from which the link points.
toNode:
  This is another node Index parameter pointing to the node dictionary 24 entry for the current version of a "to node" to which the link points.
fromVersionTime:
  This is a version time parameter identifying the particular version of the "from node" that the link connects.

toVersionTime: 'This is a version time parameter identifying the particular version of the "to node" that the link connects.

deletionTime:
 This is a version time parameter indicating the time the link was deleted from the graph, if the link was deleted. If the link has not been deleted the deletionTime parameter is assigned a maximal non-zero integer.

deletor:
 This parameter identifies the user deleting the link from the graph.

attributes:
 This is a set of parameter pairs pointing to entries in the attribute values dictionary 34 and the attribute name dictionary 32. One attributes parameter pair is included in each link dictionary 26 entry for each attribute characterizing the link. The attribute values dictionary 34 entries indicate the values of attributes associated with the link and the attribute name dictionary 32 entries indicate the names of the attributes associated with the link.

currentVersion:
 This parameter points to an entry in a link version file 28 of FIG. 2 containing parameters indicating "link point positions" within the sequences of data stored in the "from node" and in the "to node" related by the link. A "link point position" refers to a particular bit of data in a node to which or from which the link points.

previousVersion, prevIndex:
 These parameters point to a second entry in the link version file 28 describing a previous version of the link.

nextOutlink: 'This parameter points to another entry in the link dictionary 26 associated with another link directed from the same "from node" as this link (i.e., the link associated with the present link dictionary entry). The nextOutlink parameters in each link dictionary 26 entry interconnect all of the link dictionary entries describing links directed from any particular node to form a linked list of "out link" entries. The firstOutLink parameter within the node dictionary 24 entry describing each node points to the first link dictionary 26 entry of the linked list of "out link" entries and all other out links can be determined by traversing the out link list.

nextInlink:
 This parameter points to another entry in the link dictionary 26 associated with a link directed to the same node as this link (i.e. the link associated with the present link dictionary entry). The nextInLink parameters in each link dictionary 26 entry interconnect all of the link dictionary entries describing links directed to any particular node to form a linked "in link" list of entries. The firstInLink parameter within the node dictionary 24 entry describing a particular node points to the first link dictionary 26 entry of the linked list of out link entries. Thus a linked "in link" list of link dictionary entries is also provided for every node. The "in links" for each node can be determined by traversing the associated "in link" list.

The attribute value dictionary 34 of FIG. 2 contains an entry for each attribute value for each node or link. Each entry includes the following parameters:

entity:
 This is a pointer (NodeIndex or LinkIndex) to the node dictionary 24 or link dictionary 26 entry to which the attribute value referenced by the attribute value dictionary 34 entry is assigned.

currentValue:
 The value of a link or node attribute may be changed from time to time and a version history of each attribute value is maintained for archive nodes and links connecting archive nodes. Attribute values are also assigned a version time to identify different versions of the same attribute. The currentValue parameter is a pointer to an entry in an attribute value version file 36 containing a record of the version time associated with the current value of the attribute and also containing an integer value or a string index parameter representing the character string name of the current attribute value. A character string represented by a string index parameter is determined by accessing a string table 46 of FIG. 2.

previous, prevIndex:
 The attribute value version file 36 also contains entries describing previous versions of the attribute value and these entries in the attribute value versions file form a linked list which may be traversed to ascertain any previous version of a node or link attribute value. The previous and prevIndex parameters are utilized to locate the first entry of the linked list.

The attribute name dictionary 32 of FIG. 2 contains an entry for each attribute name and includes string index parameters representing the character strings which name the attribute. An entity attributes dictionary 30 of FIG. 2 is provided to store excess attribute parameter pairs which cannot be stored in the node dictionary 24 or link dictionary 26 entries relating to various nodes and links due to fixed sized records. Each node dictionary 24 or link dictionary 26 entry which is filled with attribute parameter pairs includes a pointer to an entry in the entity attributes dictionary 30 where an additional attribute parameter pair is stored. Entries in the entity attribute dictionary relating to the same node are also linked to form a linked list which may be traversed to determine all attribute value pairs for the node or link not otherwise stored in the node or link dictionary entry for the node or link.

Character strings are used for attribute names, attribute values, UNIX system directory prefixes, demons and user names. All strings are referenced by a string index parameter and each string is assigned a unique string index parameter value. The string index table 44, along with a string hash table 42 and a string table 46 of FIG. 2, are provided to convert from character strings to string index parameter values and vice versa. The string hash table 42 implements a character string hashing technique providing a pointer to an entry in the string index table 40 where a string index number relating to a hashed character string is stored. The string table 46 is utilized to convert a string index number to a corresponding character string.

Figure 3:
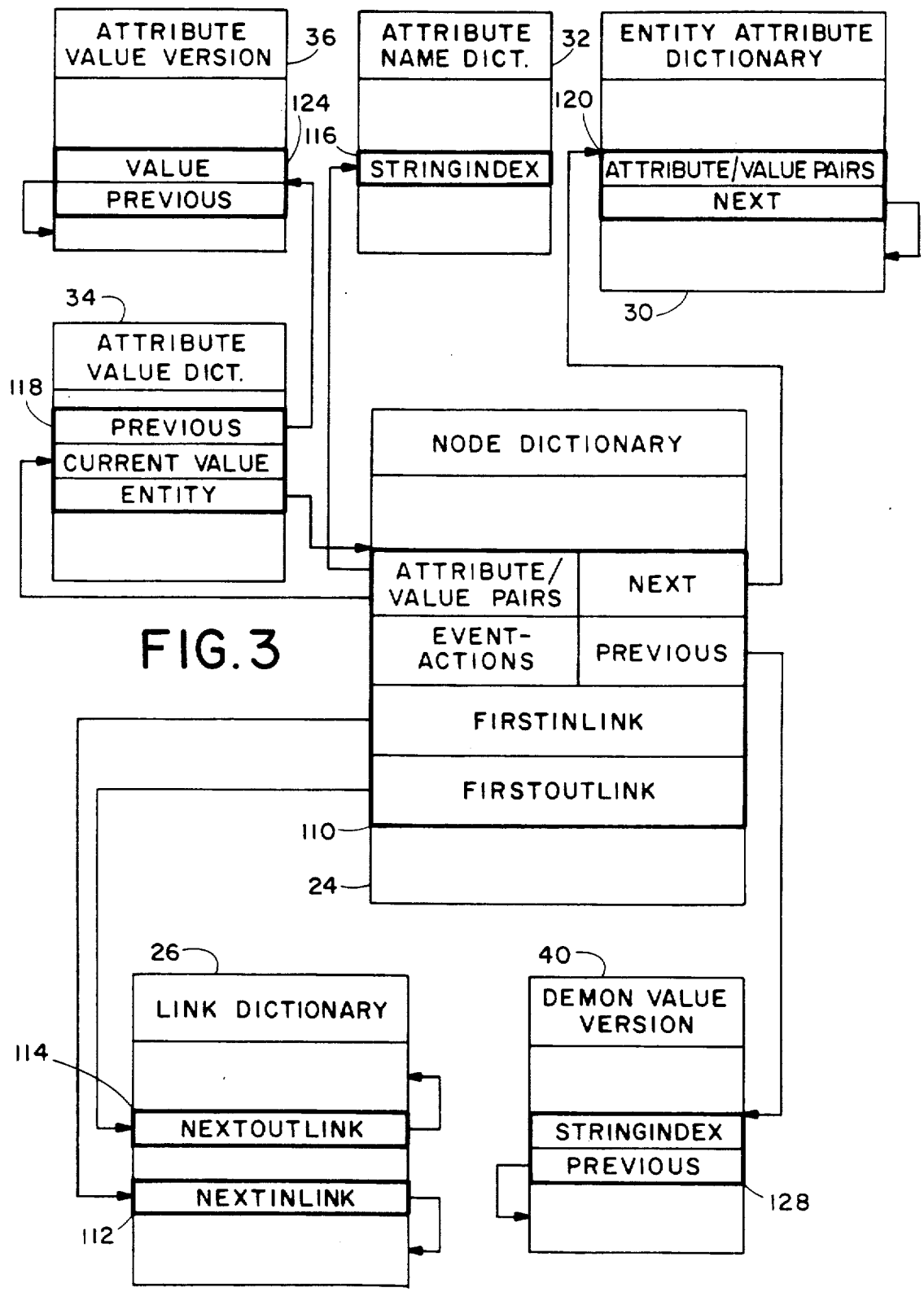
FIG. 3 is a diagram depicting relationships between selected data files maintained by the software of FIG. 2.

The relationships between the node dictionary 24 and various other files of FIG. 2 are illustrated in FIG. 3. A selected portion of the parameters contained in one entry 110 of node dictionary 24 is shown including the firstInLink parameter which points to an entry 112 in the link dictionary 26. Entry 112 describes the first link of the "in link" list of all links pointing to the node described by entry 110 and contains the nextInLink pointer to the next link dictionary entry of the in link list. Similarly the firstOutLink parameter of the node dictionary entry 110 points to an entry 114 in the link dictionary 26 comprising the first entry of the linked list of "out link" entries describing all links pointing from the node described by entry 110. Entry 114 includes the nextOutLink parameter which points to the next link dictionary 26 entry on the out link list.

One attribute parameter pair (labeled "attribute" and "value") of the node dictionary 24 entry 110 is illustrated in FIG. 3. The attribute portion of the pair points to an entry 116 of the attribute name dictionary 32 which contains the stringIndex parameter associated with the name of the attribute. The value portion of the pair points to an entry 118 of the attribute value dictionary 34. As discussed hereinabove, when a node is assigned more attribute parameter pairs than can be stored in the node dictionary 24 entry for the node, the excess attribute parameter pairs are stored in the entity attribute dictionary 30. In the example of FIG. 3, a "next" pointer in node dictionary entry 110 points to an entry 120 of the entity attribute dictionary containing a next group of attribute pairs. Entry 120 also includes a "next" pointer to another attribute dictionary entry containing an additional group of attribute pairs associated with the node described by node dictionary entry 110.

The attribute value dictionary 34 entry 118 referenced by the value pointer in node dictionary entry 110 includes the currentValue parameter containing the integer value or the stringIndex number related to the attribute value name. Entry 118 further includes the "previous" pointer to an entry 124 containing an attribute value referencing a previous version of the attribute value and includes another "previous" pointer linking an additional attribute value version file 36 entry associated with an earlier version of the attribute value. The attribute value dictionary entry 118 also contains the entity parameter which points back to the node dictionary entry 110.

The attribute value dictionary 34 in conjunction with the attribute value version file 36 permit the machine 14 to determine every node having an attribute of a selected value, to change the nature of an attribute value, and to determine previous versions of each attribute value. For instance, an "ownership" attribute might be created for each node to indicate the name of a person responsible for approving changes to data in the node. If Smith is responsible for changes to a set of nodes, then the "ownership" attribute for each node in the set may be assigned a value of "Smith". Assuming that the node corresponding to entry 110 is one node of the set, then "Smith" is the current value stored in entry 118 of attribute value dictionary file 34. If ownership responsibility for the set is transferred to Jones, then it is necessary to change the attribute value for all nodes in the set. A new attribute value version file 36 record similar to record 124 is created to store the old value "Smith". The "previous" pointer in this record is adjusted to point to record 124. The currentValue parameter in record 118 is changed to "Jones" and the "previous" pointer in record 118 is changed to point to the new record in the attribute value version file 36 containing the "Smith" value.

The node dictionary 24 entry 110 illustrated in FIG. 3 includes a set of eventAction parameters each containing the stringIndex parameter referencing the demon character string to be produced in response to a selected node event. Entry 110 also includes a "previous" pointer associated with each eventAction parameter pointing to an entry 128 of the demon value version file 40 which contains the string index of an earlier version of the demon along with another "previous" pointer linking an additional demon file 40 entry associated with a still earlier version of the demon.

Figure 4:
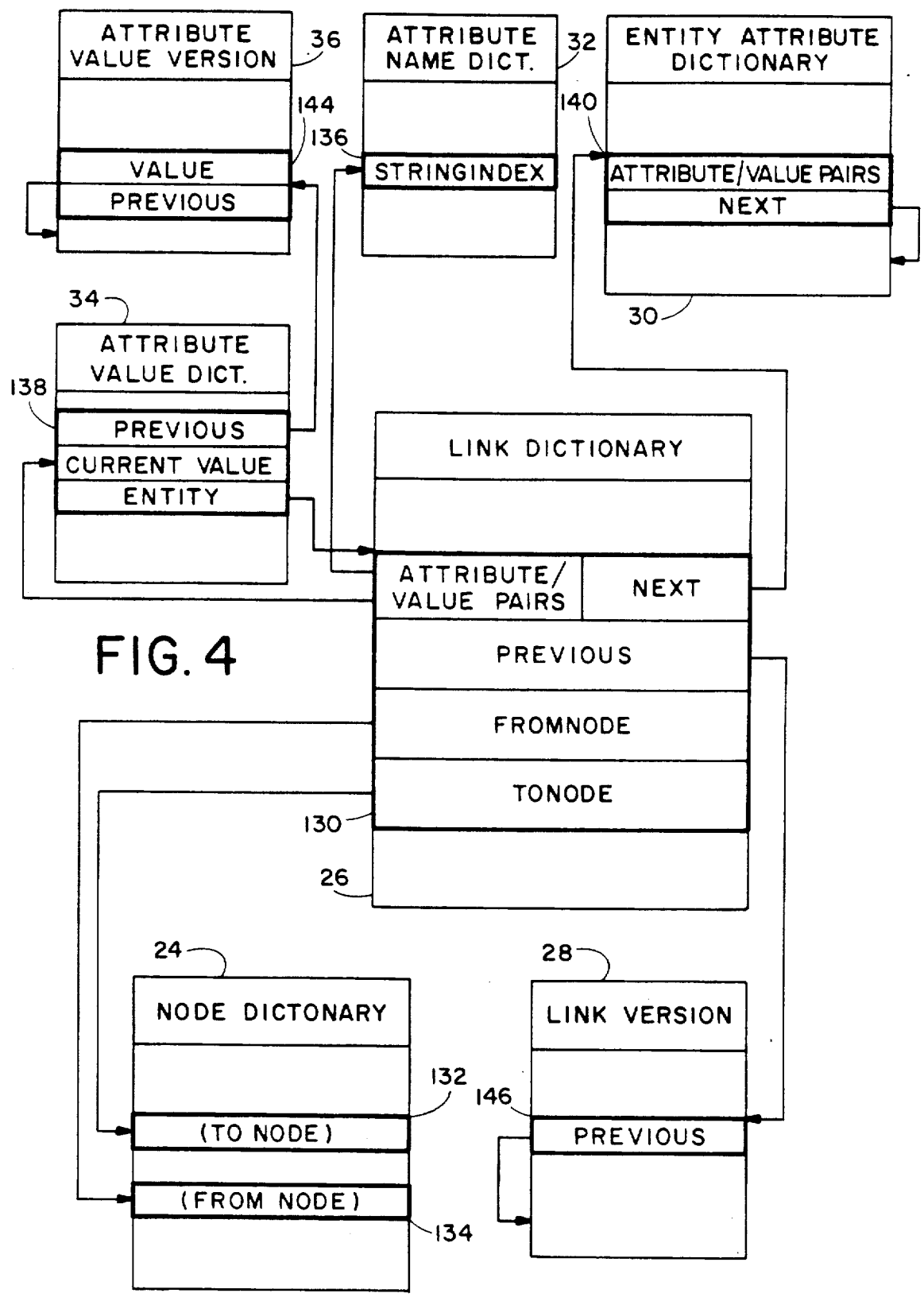
FIG. 4 is a diagram depicting additional relationships between selected data files maintained by the software of FIG. 2.

Relationships between the link dictionary 26 and various other files are illustrated in FIG. 4. A selected portion of the parameters for one entry 130 of link dictionary 26 is shown including the toNode parameter which points to an entry 132 in the node dictionary 24 which describes the "to node" associated with the link. The fromNode parameter of entry 130 points to an entry 134 in the node dictionary 24 which describes the "from node" associated with the link. One link attribute parameter pair of the link dictionary 26 entry 130 is illustrated. An attribute portion of the pair points to an entry 136 of the attribute name dictionary 32 containing the stringIndex parameter associated with the name of the link attribute. The value portion of the pair points to an entry 138 of the attribute value dictionary 34. A next pointer in entry 130 points to an entry 140 of the entity attribute dictionary 30 containing a next group of attribute pairs. Entry 140 also includes another next pointer to another entity attribute dictionary 30 entry containing an additional group of attribute parameter pairs associated with the link described by link dictionary entry 130.

The attribute value dictionary 34 entry 138 includes the currentValue parameter containing the integer value or the stringIndex of the link attribute value name. Entry 138 further includes the previous pointer to an entry 144 containing an attribute value referencing a previous version of the link attribute value. Entry 144 contains another previous pointer linking an additional attribute value version file 36 entry associated with a still earlier version of the link attribute value. The attribute value dictionary entry 138 contains the entity parameter which points back to the node dictionary entry 130.

The link dictionary 26 entry 130 of FIG. 4 is further provided with a previous pointer to an entry 146 of link version file 28 which contains information about a previous version of the link. Entry 146 contains a previous parameter pointing to an entry of the link version file 28 containing information regarding a still earlier version of the link.

A transaction log file 41 of FIG. 2 is provided to store information regarding changes made to the files of FIG. 2 when the machine is carrying out an operation requested by a user. The transaction log enables the machine 14 to "undo" any changes made to the other files of FIG. 2 if for any reason a requested operation is improperly terminated. Once an operation is successfully completed, the information stored in the transaction log is discarded.

Appendix I contains software listings of programs according to the present invention for controlling various data files depicted in FIG. 2. Referring to FIG. 2 and Appendix I, an f_nodes program 43 buffers input and output access to the node dictionary 24, a program f_links 49 buffers input and output access to the link dictionary file 26 and the program f_linkHist 48 buffers access to the link version file 28. An f_entAtt program 50, an f_attDef program 52, an f_attValue program 54 and an f_attHist program 56 buffer access to the entity attribute dictionary 30, the attribute name dictionary 32, the attribute value dictionary 34 and the attribute value version file 36, respectively. Similarly, the program f_demonHist (block 58) buffers input and output access for the demon value versions file 40, while the f_strings program 60 buffers access to the string hash table 42, the string index table 44 and the string table 46. A pair of programs 45 (directory and direct) define the data structures used to represent a directory and implement the operating of a directory.

Appendix I also contains listings of programs for contents files 22 of FIG. 2. Each node contents file 22 contains the current version of a data file and also contains the version history data indicating the changes required to the current version in order to produce prior versions of an archive file. An ns_node program 62 controls changes to the current version data stored in the node contents files 22 while an archive program 64 controls the input and output of version history data stored in the node contents files. A lcs program 66 produces the version history data to be stored in the node contents files by comparing a new version of a file provided by a user with the most recently stored version.

Appendix I further contains a listing for a "strings" program which utilizes the string tables via the f_. strings program 60 to find and return a string index relating to a given input character string. The strings program also creates new index numbers for new character strings. A "log" program 70 in Appendix I controls input and output to the transaction log file 41 and implements the recovery mechanism for improper terminations of a graph access by a user. The log program 70 also synchronizes multi-user access to a graph.

Appendix I also contains listings for a set of programs according to the present invention for implementing various operations requested by users. The operations are defined according to the following notation:

$$\text{operand}_1 \times \text{operand}_2 \times \ldots \times \text{operand}_n \rightarrow$$

$$\text{result}_0 \times \text{result}_1 \times \ldots \times \text{result}_m$$

wherein n is greater than or equal to 1 and m is greater than or equal to 0. Each operand$_i$ and result has a "domain" of values. Additionally, $Y^n$ means $Y \times Y \times \ldots Y$ with n Y's, and $Y^*$ means $Y^m$ for some m greater than or equal to 0. The domains of the operands and results (i.e., the values that each operand or result may be assigned) are as follows:

| Operand or Result: | domain: |
|---|---|
| Attribute: | an attribute name (a character string) |
| AttributeIndex: | unique identification for an attribute name (a number) |
| Boolean: | true/false indicator |
| Contents: | the data in a node |
| Context: | a unique identification for a currently accessed graph |
| Demon: | a demon value |
| Difference: | a deletion, insertion or replacement instruction |
| Directory: | a valid UNIX file directory name |
| Event: | an event which invokes a demon string |
| Explanation: | explanatory text |
| LinkIndex: | an identification for a link |
| Machine: | an identification for an individual computer in a computer network |
| NodeIndex: | an identification for a node |
| Position: | a number representing the posi- |

| Operand or Result: | domain: |
|---|---|
| | -continued |
| | tion of a selected piece of data in a node |
| Predicate: | a Boolean formula in terms of attributes and their values |
| ProjectId: | a unique identification for a graph |
| Protections: | one of a plurality of file protection modes |
| Time: | a non-negative integer representation of a given data and time |
| Value: | an attribute value |

Referring again to FIG. 2, a graph program listed in Appendix I implements the following operations affecting the directory:
CreateGraph:

Directory × Protections→ProjectId

The operation CreateGraph creates a new "empty" graph in a specified UNIX directory (Directory) using a specified UNIX file protection mode (Protections). A graph is initially "empty" in the sense that it does not contain any nodes. The CreateGraph operation returns to the user invoking the operation a ProjectId parameter comprising a unique identification for the graph. The user thereafter must specify the ProjectId and Directory parameters whenever opening the new graph in order to identify the graph to be opened.
DestroyGraph:

ProjectId × Directory→ —

The operation DestroyGraph destroys an existing graph located in Directory. The ProjectId must have the same value as returned by the CreateGraph operation that created the graph in the first place. The destruction of a graph includes the destruction of all files of FIG. 2 relating to the graph.
OpenGraph:

ProjectId × Machine × Directory→Context

A user invokes the OpenGraph operation to access (open) an existing graph located in a specified directory (Directory) for a storage device maintained by a selected computer (Machine) of a multiple computer system. The value of the ProjectId parameter must be the same as returned by the CreateGraph operation that created the graph. "Context" is a unique identifier for the graph and is used when invoking other operations once the graph is open. The value of Context is arbitrary but is different for each concurrently opened graph.
AddNode:

Context × Boolean→NodeIndex × Time

Once a user has opened a graph the user may add a new node. First the user adds an empty node by invoking the AddNode operation to create a new empty node in the graph identified by Context. If Boolean is true, then a version history is maintained for the node, i.e., the node is maintained as an archive node. If Boolean is false, the node is considered to be a file node and version histories are not maintained. Once the node is created, AddNode

UNITED STATES PATENT OFFICE
PTO – BOYERS, PA DUTY STATION

---

MISSING PAGE TEMPORARY NOTICE

PATENT NUMBER __5047918__ FOR THE ISSUE DATE OF __10/10/1991__ HAS BEEN SCANNED/LOADED, BUT CONTAINS A MISSING PAGE TEMPORARY NOTICE. UPON RECEIPT OF THE MISSING PAGE(S), THE ENTIRE DOCUMENT WILL BE RESCANNED. IF YOU HAVE ANY QUESTIONS, PLEASE CONTACT THE DATA MAINTENANCE BRANCH/OFFICE OF SYSTEMS NETWORK MANAGEMENT ON (703) 306-3116 OR BY E-MAIL AT DMB_Group@uspto.gov THIS NOTICE IS FOR THE MISSING PAGE CONTAINING:

__Text Col 19/20__

(Co Corrects)

DATA CONVERSION OPERATION
BOYERS, PA to AttributeIndex$_1^m$ and the link attributes being selected according to AttributeIndex$_2^n$. In performing the LinearizeGraph operation the linear program obtains attribute values for the nodes and links by invoking an attribute program 82 also listed in Appendix I (discussed hereinbelow) and utilizes a "search" program 75, listed in Appendix I, to evaluate the attributes of the node and links to determine if Predicate$_1$ or Predicate$_2$ is satisfied.

A "filter" program 76 of FIG. 2 (listed in Appendix I) carries out the following operation:
GetGraphQuery:

$$\text{Context} \times \text{Time} \times \text{Predicate}_1 \times \text{Predicate}_2 \times \text{AttributeIndex}_1^n \rightarrow (\text{NodeIndex} \times \text{Value}^m)^* \times (\text{LinkIndex} \times \text{Value}^n)^*$$

This operation performs the previously described query search. The GetGraphQuery operation returns a sub-graph of the graph given by Context as it existed at time Time. The sub-graph includes all nodes satisfying Predicate$_1$ and all links satisfying Predicate$_2$ connecting these sub-graph nodes. Predicate$_1$ and Predicate$_2$ follow the grammar described hereinabove for the predicates associated with the LinearizeGraph operation. The sub-graph returned by the GetGraphQuery operation comprises a set of NodeIndex and LinkIndex values identifying the nodes of the graph satisfying Predicate$_1$ and any interconnecting links satisfying Predicate$_2$. The operation also returns the values (Value*) of selected attributes associated with the nodes and links of the sub-graph, the node attributes being selected according to AttributeIndex$_1^m$ and the link attributes being selected according to AttributeIndex$_2^n$. In performing this operation, the filter program 76 also makes use of the attribute program 82 and the search program 75.

A "ds_node" program 78, listed in Appendix I, carries out the following operations affecting nodes:
OpenNode:

$$\text{Context} \times \text{NodeIndex} \times \text{Time}_1 \times \text{AttributeIndex}_1^m \times \text{AttributeIndex}_2^n \rightarrow \text{Contents} \times \text{Value}^m \times \text{Time}_2 \times (\text{LinkPt} \times \text{Value}^*)^*$$

If Time$_1$ is zero, the OpenNode operation returns the contents (Contents) and current version time (Time$_2$) of an existing node identified by NodeIndex and of the graph identified by Context. If Time$_1$ is non-zero then OpenNode returns the latest version of the contents of the node as of Time$_1$ and the version time (Time$_2$) of the returned contents. The operation also returns the values (Value*) of the node attributes of the existing node identified by AttributeIndex$_1^m$, the LinkPt identification of each link connected to the node, and the values of the link attributes identified by AttributeIndex$_2^n$. The OpenNode node operation accesses the current version of the node in a node contents file 22 by calling the ns_node program 62.
ModifyNode:

$$\text{Context} \times \text{NodeIndex} \times \text{Time} \times \text{Contents} \times (\text{LinkIndex} \times \text{Position})^* \rightarrow -$$

The ModifyNode operation is invoked to store a new version (Contents) of an existing node of the graph Context identified by NodeIndex and Time. The value of Time must be equal to the current version of the node. Otherwise the ModifyNode operation returns a conflict indication to the user and does not store the new node version. The operation ModifyNode also repositions the starting or ending point (Position) in the node of each existing link identified by LinkIndex. The ds_node program 78 uses the ns_node program 62 to store the new node contents. The ns_node program in turn makes use of the archive program 64 and the lcs program 66 to create a new version history when the node being modified is an archive node. The ds node program 78 also calls the f_nodes program 43 to modify entries in the node dictionary 24 to reflect the indicated changes in link points.
GetNodeTimeStamp:

$$\text{Context} \times \text{NodeIndex} \rightarrow \text{Time}$$

The GetNodeTimeStamp operation returns the current version time for the node of the graph Context identified by NodeIndex. The current version time is stored in the node dictionary file 24.
ConvertFileToArchive:

$$\text{Context} \times \text{NodeIndex} \rightarrow -$$

As discussed hereinabove, when a node is created by the addNode operation it may be designated as a file node, wherein only the current version of the node is maintained, or as an archive node, wherein version histories of the node are maintained. The ConvertFileToArchive operation is invoked to convert a node (identified by NodeIndex and Context) originally designated as a file node to an archive node so that a complete version history will be maintained for the nod thereafter.
ChangeNodeProtections:

$$\text{Context} \times \text{NodeIndex} \times \text{Protections} \rightarrow -$$

The ChangeNodeProtections operation sets the file protection mode for the file storing the contents of a node identified by NodeIndex and Context to the mode indicated by Protections.
GetNodeVersions:

$$\text{Context} \times \text{NodeIndex} \rightarrow \text{Version}_1 - \text{Version}_2^*$$

The GetNodeVersions operation returns the version history for the node identified by NodeIndex and Context including "major versions" identified by Version$_1$ +and "minor versions" identified by Version$_2$*. A "Version" is defined as follows:

$$\text{Version} = \text{Time} \times \text{Explanation}$$

where Time identifies the version and Explanation is text explaining the nature of the version (i.e., whether it is a major or minor version). Major versions are updates to the contents of the node while minor versions are other changes relating to the node, such as relating to adding a link or changing an attribute value, but which do not change the contents of the node. The ds_node program 78 utilizes the f_nodes program 43 to acquire version history data from the node dictionary.
GetNodeDifferences:

$$\text{Context} \times \text{NodeIndex} \times \text{Time}_1 \times \text{Time}_2 \rightarrow \text{Difference}^*$$

The GetNodeDifferences operation returns the "difference" between the Time$_1$ and Time$_2$ versions of the node identified by NodeIndex and Context, i.e., a set of addition, deletion and insertion directions for changing the Time₁ version to the Time₂ version. The ds_node program uses the ns_node program 62, the archive program 64, and the lcs program 66 to acquire the version histories from the node contents files 22.

A "ds_link" program 80, listed in Appendix I, carries out the following operations relating to links:
GetToNode:

Context × LinkIndex × Time₁→NodeIndex × Time₂

The GetToNode operation returns the identification NodeIndex and version time (Time₂) of a destination node of the Time₁ version of a link identified by LinkIndex of a graph identified by Context. The ds_link program 80 makes use of the f_links program 49 and the f_linkHist program 48 to obtain the LinkIndex numbers from the link dictionary 26 and the link version file 28.
GetFromNode:

Context × LinkIndex × Time₁→NodeIndex × Time₂

The GetFromNode operation returns the identification NodeIndex and version time (Time₂) of a source node of a link identified by LinkIndex and Context and a version time (Time₁).

An "attribute" program 82 carries out the following operations:
GetAttributes:
Context × Time→(Attribute→AttributeIndex)*

The GetAttributes operation returns all of the attributes (Attribute) and their associated AttributeIndexes that existed at a given time (Time) for the graph identified by Context. It will be recalled that Context is a unique identifier for the graph established as a result of the openGraph operation discussed hereinabove. In order to acquire AttributeIndex numbers associated with nodes and links, the attribute program 82 invokes the f_attDef program 52 which acquires the AttributeIndex numbers from the attribute name dictionary 32. The attribute program 82 calls the strings program 68 to determine the attribute name (Attribute) associated with each AttributeIndex number.
GetAttributeValues:

Context × AttributeIndex × Time→Value*

The GetAttributeValues operation returns a list of the values (Value*) which have been assigned to a selected attribute identified by AttributeIndex for a graph identified by Context at a given time. The attribute program 82 employs the f_attValue program 54 and the f_attHist program 56 to locate attribute value string index data stored in the attribute value version file 36 and uses the strings program 68 to convert the attribute value string index data to the character strings representing the attribute values associated with the selected AttributeIndex.
GetAttributeIndex:

Context × Attribute→AttributeIndex

The GetAttributeIndex operation of the attribute program makes use of the strings program 68 to return a unique string index identification (AttributeIndex) for an attribute name associated with the graph Context. If the attribute is new, the operation assigns a new attribute index value to it.

SetNodeAttributeValue:

Context × NodeIndex × AttributeIndex × Value→ —

The SetNodeAttributeValue assigns a new value to an attribute (indicated by AttributeIndex) of the current version of a node identified by NodeIndex and Context and assigns a value (Value) to the attribute. If the node identified by NodeIndex is an archive node, then a new version of the attribute value is created.
GetNodeAttributeValue:
Context × NodeIndex × AttributeIndex × Time→Value The GetNodeAttributeValue operation returns a value (Value) for an attribute identified by AttributeIndex at a given time (Time) for a given node identified by NodeIndex and Context using the f_nodes program 43 to access the node dictionary 24.
DeleteNodeAttribute:

Context × NodeIndex × AttributeIndex→ —

The DeleteNodeAttribute operation deletes the attribute identified by AttributeIndex for the node identified by NodeIndex and Context using the f_nodes program 43 to modify the node dictionary 24.
GetNodeAttributes:

Context × NodeIndex × Time→(Attribute × AttributeIndex × Value)*

The GetNodeAttributes operation returns all of the attribute names (Attribute), their corresponding string index identifiers (AttributeIndex), and their values (Value*) as of a selected time (Time) for a selected node (NodeIndex) of the graph Context. The AttributeIndex is obtained from the node dictionary 24 through the f_nodes program 43 and ValueIndex parameters for the attributes are obtained from the attribute value dictionary 34 through the f_attValue program 54. The ValueIndex and AttributeIndex numbers thus acquired are converted into character strings (Attribute and Value) by calls to the strings programs 68.
SetLinkAttributeValue:

Context × LinkIndex × AttributeIndex × Value → —

The SetLinkAttributeValue operation sets the value (Value) of a selected attribute (AttributeIndex) of a link (LinkIndex) of the graph Context by adding an attribute/value pointer pair to the link dictionary 26. To do so, the attribute program calls the ds_link program 80 which accesses the link dictionary 26 through the f_links program 49. If the link is attached to an archive type node (i.e., if version histories of the node are to be maintained) a new version of the attribute value is created in the attribute value dictionary 34 accessed through the f_attValue program 54.
GetLinkAttributeValue:

Context × LinkIndex × AttributeIndex × Time→Value

The GetLinkAttributeValue operation returns the value (Value) of an attribute identified by AttributeIndex for a selected version (Time) of a link identified by LinkIndex of the graph identified by Context. The value pointer associated with the attribute is obtained from the link dictionary 26 by a call to the ds_link program 80 and the value of the attribute is then obtained from the attribute value dictionary 34 by a call to the f_attValue program 54.
DeleteLinkAttribute:

Context × LinkIndex × AttributeIndex→ —

The DeleteLinkAttribute operation deletes from the link dictionary 26 the attribute indicated by Attribute Index for the link of the graph Context referenced by LinkIndex.
GetLinkAttributes:

Context × LinkIndex × Time→(Attribute × AttributeIndex × Value)*

The GetLinkAttributes operation returns the attribute name, (Attribute), the string index for the attribute (AttributeIndex), and the value (Value) of each attribute for a link of the graph Context identified by LinkIndex at a selected time. In performing this operation the attribute program 82 makes calls to the ds_link program 80 to acquire the string index numbers from the link dictionary 26 or link version file 28, and makes calls to the f_attValue program 54 and the f_attHist program 56 to acquire ValueIndex numbers referencing the attribute values. The strings program 68 is also utilized to return the attribute and value character strings referenced by the string index numbers A "demon" program 84, listed in Appendix I, carries out the following demon operations:
SetGraphDemonValue:

Context × Event × Demon→ —

The SetGraphDemonValue operation creates a demon string to be invoked whenever a graph operation defined by Event is performed with respect to a graph identified by Context. The graph operations which may be identified as Events for purposes of invoking a demon string include OpenGraph, AddNode, DeleteNode, AddLink, CopyLink, and DeleteLink. In carrying out this operation the demon program 84 calls the ds_links program 80 and the ds_node program 78 to modify entries in the link dictionary 26 and the node dictionary 24 and calls the f_demonHist program 58 to create the appropriate entries in the demon dictionary 38 and the demon value versions file 40. The demon program also utilizes the strings program 68 to store the demon character string in the string table 46 and to create a string index for the demon in the string index table 44.
GetGraphDemons:

Context × Time→(Event × Demon)*

The GetGraphDemons operation returns all of the events (Event) for a version of a graph identified by Context and Time, which invoke a demon string and also returns the demon string invoked.
SetNodeDemon:

Context × NodeIndex × Event × Demon→ —

The SetNodeDemon operation creates a demon string (Demon) to be invoked whenever an operation defined by Event is performed with respect to a node of the graph Context identified by NodeIndex. The operations which may be identified as an Event for purposes of invoking a demon string include OpenNode and ModifyNode discussed hereinabove.
GetNodeDemons:

Context × NodeIndex × Time→(Event × Demon)*

The GetNodeDemons operation returns all of the events (Event) affecting a version of a node of graph Context identified by NodeIndex and Time, which invoke a demon string. The GetNodeDemons operation also returns the demon strings (Demon) invoked.

Thus the data file management machine of the present invention is adapted to deal effectively with the problem of locating files of interest in a large computerized data storage system. The above described operations permit the machine to organize data files into graphs comprising file nodes interconnected by links wherein both the nodes and the links may be assigned user-definable attributes. Node attributes may be assigned to describe the nature of the contents of each node and link attributes may be assigned to describe the nature of relationships between nodes. The GetGraphQuery and LinearizeGraph operations make use of the assigned node and link attributes to retrieve subgraphs containing only those nodes and links characterized by user selected sets of attribute values. The subgraphs make it easier for a user to locate a particular file having particular attribute values (i.e., subject matter, author, etc.) without knowing the file name, by excluding from the subgraph irrelevant files which do not share the same attribute values from the subgraph, thereby reducing the number of files the user must peruse to find a particular file. The subgraphs also make it easier for a user to locate files which are related to a selected file in some particular way by eliminating nodes linked to the selected file by links which do not have selected link attribute values. The combination of node and link attribute assignment and search capability of the machine allows highly selective user definition of nodes and links to be included in a subgraph, enabling a user to more easily locate and determine the nature of data files and their interrelationships than is possible when only node attributes or only link attributes may be assigned.

The above described operations not only enable the data file management machine of the present invention to document changes to data files (nodes) but also to document changes in the relationships (links) between files. The machine maintains node version histories permitting the reconstruction of the contents of previous versions of archive nodes as well as link version histories describing the links connecting previous versions of archive nodes. The machine is also adapted to maintain attribute histories documenting changes to attribute values associated with archive nodes and their interconnecting links. Version histories for demon strings associated with archive nodes are additionally maintained. If, for instance, all nodes of a graph are archive nodes then records of every significant change to the graph are maintained and the state of the graph at any previous time can be substantially reconstructed.

· The user definable demon character strings, produced by the data file management machine of the present invention when selected graph and node operations are invoked, enable a user to easily adapt the present invention to initiate execution of (or provide input to) any program accessible to a computer operating system receiving the demons. This feature of the invention provides a simple means for integrating the operation of the data file management machine with other programs running on the computer system.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

APPENDIX I

FILE MANAGEMENT SYSTEM SOFTWARE

Copyright © 1985, Tektronix, Inc.
All rights reserved.

```c
#include <sys/file.h>
#include <sys/types.h>
#include <sys/stat.h>
#include <stdio.h>
#include <netdb.h>
#include <ctype.h>
#include "directory.h"
#include "machine.h"
#include "errors.h"
#include "log.h"

#define TRUE        1
#define FALSE       0
#define INT_SIZE    sizeof(int)
#define DELETION    1
#define REPLACEMENT 2
#define INSERTION   3
define ADDITION    4 typedef struct piece {
        int     len;    /* number of chars in piece */
        char    *inx;           /* address of first char in piece */
        struct piece *next, *prev;
        } PIECE_NODE, *PIECE_PTR;
#define PIECE_SIZE      sizeof(PIECE_NODE)
static PIECE_PTR        ph;     /* head of linked list of pieces */ typedef struct segment {
        char    *addr;          /* address of this memory segment */
        struct segment *next;
        } SEGMENT_NODE, *SEGMENT_PTR;
#define SEGMENT_SIZE    sizeof(SEGMENT_NODE)
static SEGMENT_PTR      sh;     /* head of linked list of segments */
static SEGMENT_PTR      st;     /* tail of linked list of segments */ define NIL     0 extern int      found_line();

static int      zero = 0;
static char     deletion = DELETION;
static char     replacement = REPLACEMENT;
static char     insertion = INSERTION;
static char     addition = ADDITION;

static int      scan_state;
#define S_init          1
#define S_id            2
#define S_number        3
define S_whiteSpace    4 scan_word(i)
        char    *i;
{
        char    b;

b       = *(i+1);       /* look ahead one character */
        if (scan_state == S_init) {
                if (isalpha(b)) scan_state = S_id;
                else if (isdigit(b)) scan_state = S_number;
                else if (isspace(b)) scan_state = S_whiteSpace;
                return(TRUE);
        }
        else if (scan_state == S_id) {
                if (!(isalnum(b) || b == '_')) {
                        if (isspace(b)) scan_state = S_whiteSpace;
                        else scan_state = S_init;
                        return(TRUE);
                }
        }
        else if (scan_state == S_whiteSpace) {
                if (!isspace(b)) {
                        if (isalpha(b)) scan_state = S_id;
                        else if (isdigit(b)) scan_state = S_number;
                        else scan_state = S_init;
                        return(TRUE);
                }
        }
        else /* scan_state == S_number */ {
                if (!isdigit(b)) {
```

```
                              if (isspace(b)) scan_state = S_whiteSpace;
                              else scan_state = S_init;
                              return(TRUE);
                              }
                    }
          return(FALSE);
} init_scan(f)
          char    *f;
{
          if (isalpha(*f)) scan_state = S_id;
          else if (isdigit(*f)) scan_state = S_number;
          else if (isspace(*f)) scan_state = S_whiteSpace;
          else scan_state = S_init;
} word_difference(bufId,starta,fa,ea,fb,eb,numChanges)
          int     bufId;
          unsigned char   *starta, *fa, *ea, *fb, *eb;
          int     *numChanges;
/************************************************************************
*                                                                       *
*     Calculates that portion of a change set to replace the charac-    *
*     ters at [fa..ea] to the characters at [fb..eb] when individual    *
*     words are considered.                                             *
*     Returns 0 if successful, otherwise returns a negative error       *
*     code.                                                             *
*                                                                       *
************************************************************************/
{
          int     result;
          int     ia, ib; /* number of words in fa..ea, fb..eb respectively */
          unsigned char   *cp;
          unsigned char   **swa, **swb;
          int     *ha, *hb;
          int     max_words;
          short int       *cwi, *cwj;

int     m, scw;
          int     nexti, nextj, i, j;
          int     len;

ia      = 1;
          init_scan(*fa);
          for (cp = fa; cp < ea; cp++)
                    if (scan_word(cp)) ia++;
          if (scan_word(ea-1)) ia--;
          if ((swa = (unsigned char **) malloc((ia+1)<<2)) == 0) {
                    return(-1);
          }
          if ((ha = (int *) malloc((ia+1)<<2)) == 0) {
                    free(swa);
                    return(-1);
          } ib      = 1;
          init_scan(*fb);
          for (cp = fb; cp < eb; cp++)
                    if (scan_word(cp)) ib++;
          if (scan_word(eb-1)) ib--;
          if ((swb = (unsigned char **) malloc((ib+1)<<2)) == 0) {
                    free(swa);     free(ha);
                    return(-1);
          }
          if ((hb = (int *) malloc((ib+1)<<2)) == 0) {
                    free(swa);     free(ha);
                    free(swb);
                    return(-1);
          } if (!initialize_hash_table(ea-fa + eb-fb)) {
                    free(swa);     free(ha);
                    free(swb);     free(hb);
                    return(-1);
          }
          init_scan(*fa);
          find_chunks(fa,ea,ha,swa,scan_word);
          init_scan(*fb);
          find_chunks(fb,eb,hb,swb,scan_word);
          free_hash_table();
```

```
        max_words       = (ia > ib) ? ia : ib;
        if ((cwi = (short int *) malloc((max_words+1)<<1)) == 0) {
                free(swa);      free(ha);
                free(swb);      free(hb);
                return(-1);
                }
        if ((cwj = (short int *) malloc((max_words+1)<<1)) == 0) {
                free(swa);      free(ha);
                free(swb);      free(hb);
                free(cwi);
                return(-1);
                }
        scw     = lcs(ha,hb,ia,ib,cwi,cwj,max_words);
        nexti   = 0;
        nextj   = 0;
        for (m = scw; m < max_words; m++) {
                i = cwi[m];     j = cwj[m];
                if (nextj != j) {
                        (*numChanges)++;
                        if (nexti != i) {
                                appendBytes(&replacement,bufId,1);
                                appendInt(swa[nexti]-starta,bufId);
                                appendInt(swa[i]-starta-1,bufId);
                                }
                        else /* nexti = i */ {
                                if (i == ia+1)
                                        appendBytes(&addition,bufId,1);
                                else {
                                        appendBytes(&insertion,bufId,1);
                                        appendInt(swa[nexti]-starta,bufId);
                                        }
                                }
                                        }
                        len     = swb[j]-swb[nextj];
                        appendInt(len,bufId);
                        appendBytes(swb[nextj],bufId,len);
                        }
                else if (nexti != i) {
                        (*numChanges)++;
                        appendBytes(&deletion,bufId,1);
                        appendInt(swa[nexti]-starta,bufId);
                        appendInt(swa[i]-starta-1,bufId);
                        }
                nexti   = i + 1;
                nextj   = j + 1;
                }
        result = 0;

end_word_difference:
        free(swa);      free(ha);
        free(swb);      free(hb);
        free(cwi);      free(cwj);
        return(result);

}
compute_differences(Data,oldData,DataSize,oldDataSize,bufId,numChanges,dcWords)
        unsigned char   *Data, *oldData;
        unsigned int    DataSize, oldDataSize;
        int     bufId;  /* index of buffered array */
        int     *numChanges;
                /* number of deletions, insertions, replacements and additions */
        int     dcWords;        /* true => differences based on words */
/****************************************************************************
*                                                                           *
*       Calculate the <change-set> to go from Data to oldData according     *
*  to the grammar given in the specification document, putting the          *
*  result in the buffered array given by index bufId.                       *
*       Returns 0 if successful, otherwise returns a negative error         *
*  code.                                                                    *
*                                                                           *
****************************************************************************/
{
        int     max_lines;
        int     result;
        int     nexti, nextj;
        int     i, j, k, m, n;
        int     len, rem;
        int     i_a;    /* number of lines in Data */
        int     i_b;    /* number of lines in oldData */
        int     nl;
        unsigned char   *cp;
        char    **sa;   /* starting locations of lines in Data */
```

```
        char        **sb;      /* starting locations of lines in oldData */
        short int   *ci;       /* matching line numbers in Data */
        short int   *cj;       /* matching line numbers in oldData */
        short int   sc;        /* the number of such lines */
        int         *ha, *hb;

#if DEBUGTRACE > 1
        fprintf(trace,"compute_differences\n");
#endif
        if (DataSize == 0) {
                i_a    = 0;
                sa = NIL;         ha = NIL;
                }
        else {
                i_a    = 1;
                for (cp = Data; cp < &Data[DataSize]; cp++)
                        if (found_line(cp)) i_a++;
                if (found_line(&Data[DataSize-1])) i_a--;
                if ((sa = (char **) malloc((i_a+1)<<2)) == 0) {
                        setError(E_too_many_lines, "", 0);
                        return(-E_too_many_lines);
                        }
                if ((ha = (int *) malloc((i_a+1)<<2)) == 0) {
                        free(sa);
                        setError(E_too_many_lines, "", 0);
                        return(-E_too_many_lines);
                        }
                } if (oldDataSize == 0) {
                i_b    = 0;
                sb = NIL;         hb = NIL;
                }
        else {
                i_b    = 1;
                for (cp = oldData; cp < &oldData[oldDataSize]; cp++)
                        if (found_line(cp)) i_b++;
                if (found_line(&oldData[oldDataSize-1])) i_b--;
                if ((sb = (char **) malloc((i_b+1)<<2)) == 0) {
                        if (sa != NIL) {free(sa);       free(ha);}
                        setError(E_too_many_lines, "", 0);
                        return(-E_too_many_lines);
                        }
                if ((hb = (int *) malloc((i_b+1)<<2)) == 0) {
                        if (sa != NIL) {free(sa);       free(ha);}
                        free(sb);
                        setError(E_too_many_lines, "", 0);
                        return(-E_too_many_lines);
                        }
                } if (i_a > 32768 || i_b > 32768) {
                if (sa != NIL) {free(sa);       free(ha);}
                if (sb != NIL) {free(sb);       free(hb);}
                setError(E_too_many_lines, "", 0);
                return(-E_too_many_lines);
                } if (!initialize_hash_table(DataSize + oldDataSize)) {
                if (sa != NIL) {free(sa);       free(ha);}
                if (sb != NIL) {free(sb);       free(hb);}
                setError(E_too_many_lines, "", 0);
                return(-E_too_many_lines);
                } find_chunks(Data,&Data[DataSize],ha,sa,found_line);
        find_chunks(oldData,&oldData[oldDataSize],hb,sb,found_line);
        free_hash_table();

max_lines    = (i_a > i_b) ? i_a : i_b;
        if ((ci = (short int *) malloc((max_lines+1)<<1)) == 0) {
                if (sa != NIL) {free(sa);       free(ha);}
                if (sb != NIL) {free(sb);       free(hb);}
                setError(E_too_many_lines, "", 0);
                return(-E_too_many_lines);
                }
        if ((cj = (short int *) malloc((max_lines+1)<<1)) == 0) {
                if (sa != NIL) {free(sa);       free(ha);}
                if (sb != NIL) {free(sb);       free(hb);}
                free(ci);
                setError(E_too_many_lines, "", 0);
                return(-E_too_many_lines);
                }
```

```
        sc       = lcs(ha,hb,i_a,i_b,ci,cj,max_lines);
        if (sc < 0) {
                result   = -E_file_too_large;
                goto end_compute_differences;
        }

*numChanges    = 0;
        nexti = nextj  = 0;
        for (m=sc; m < max_lines+1; m++) {
                i = ci[m];       j = cj[m];
                if (nextj != j) {
                        if (nexti != i) {
                                if (doWords)
                                        word_difference(bufId,Data,sa[nexti],sa[i],
                                                sb[nextj],sb[j],numChanges);
                                else {
                                        (*numChanges)++;
                                        appendBytes(&replacement,bufId,1);
                                        appendInt(sa[nexti]-sa[0],bufId);
                                        appendInt(sa[i]-sa[0]-1,bufId);
                                        len     = sb[j]-sb[nextj];
                                        appendInt(len,bufId);
                                        appendBytes(sb[nextj],bufId,len);
                                }
                        }
                        else /* nexti = i */ {
                                (*numChanges)++;
                                if (i == i_a+1)
                                        appendBytes(&addition,bufId,1);
                                else {
                                        appendBytes(&insertion,bufId,1);
                                        appendInt(sa[nexti]-sa[0],bufId);
                                }
                                len = sb[j]-sb[nextj];
                                appendInt(len,bufId);
                                appendBytes(sb[nextj],bufId,len);
                        }
                }
                else if (nexti != i) {
                        (*numChanges)++;
                        appendBytes(&deletion,bufId,1);
                        appendInt(sa[nexti]-sa[0],bufId);
                        appendInt(sa[i]-sa[0]-1,bufId);
                }
                nexti   = i + 1;
                nextj   = j + 1;
        }
        appendBytes(&zero,bufId,1);
        result = 0;
end_compute_differences:
        if (sa != NIL) {free(sa); free(ha);}
        if (sb != NIL) {free(sb); free(hb);}
        free(ci);       free(cj);
        if (result < 0)
                setError(-result, "", 0);
        return(result);
} check_in_archive(versionTime,userId,archiveName,data,dataSize)
        int     versionTime;
        int     userId;
        char    *archiveName;
        unsigned char   *data;
        int     dataSize;
/***********************************************************************
*                                                                      *
*       Uses data as the latest contents and writes out the new        *
*  archive in the same file as the old one -- archiveName.             *
*       Returns 0 if successful, otherwise returns a negative error    *
*  code.                                                               *
*                                                                      *
***********************************************************************/
{
        int     oldArchive;     /* file descriptor for old archive */
        unsigned char   *oldData;
        int     oldDataSize;            /* number of bytes in oldData */
        char    tempName[100];  /* name for temporary file */
        int     newArchive;     /* file descriptor for new archive */
        int     bufId;
        int     result;
        int     time, uid;
        int     i;
```

```
        char    t;
        int     pos, size;
        struct stat     statBuf;
        char    *buf;
        int     numChanges;

#if DEBUGTRACE > 0
        fprintf(trace,"check_in_archive(%d,%s,%d,%d)\n",
                versionTime,archiveName,&data,dataSize);
#endif
/************************************************************************
 *      Create a temporary file to hold the old archive file while the   *
 *      new archive file is being written into the archive file; write the *
 *      the current version time.                                        *
 ************************************************************************/
        strcpy(tempName, archiveName);
        strcat(tempName, "XXXXXX");
        mktemp(tempName);
        logPendingTransaction(L_CREATETEMP,0,tempName,strlen(tempName) + 1);
#ifdef mag
        newArchive      = open(tempName,O_CREAT|O_TRUNC|O_WRONLY,defaults.mask);
#else
        newArchive      = creat(tempName,defaults.mask);
#endif
        if (newArchive < 0) {
                unlink(tempName);
                setError(E_check_in_open_newArchive, archiveName, 0);
                return(-E_check_in_open_newArchive);
        }
#ifdef mag
        oldArchive      = open(archiveName,O_RDONLY,0);
#else
        oldArchive      = open(archiveName,0);
#endif
        if (oldArchive < 0) {
                close(newArchive);
                unlink(tempName);
                setError(E_check_in_open_temp, tempName, 0);
                return(-E_check_in_open_temp);
        }
        if (write(newArchive,&versionTime,INT_SIZE) != INT_SIZE) {
                result  = -E_check_in_write;
                goto end_check_in_archive;
        }
        if (write(newArchive,&userId,INT_SIZE) != INT_SIZE) {
                result  = -E_check_in_write;
                goto end_check_in_archive;
        }

/************************************************************************
 *      Read oldArchive, extract its <file> into oldData, and its        *
 *      <size> into oldDataSize.  At the same time copy the modification *
 *      times, user id's and creation time into the newArchive.          *
 ************************************************************************/
        if (read(oldArchive,&time,INT_SIZE) != INT_SIZE) {
                result  = -E_check_in_read;
                goto end_check_in_archive;
        }
        if (write(newArchive,&time,INT_SIZE) != INT_SIZE) {
                result  = -E_check_in_write;
                goto end_check_in_archive;
        }
        while (time != 0) {
                if (read(oldArchive,&uid,INT_SIZE) != INT_SIZE) {
                        result  = -E_check_in_read;
                        goto end_check_in_archive;
                }
                if (write(newArchive,&uid,INT_SIZE) != INT_SIZE) {
                        result  = -E_check_in_write;
                        goto end_check_in_archive;
                }
                if (read(oldArchive,&time,INT_SIZE) != INT_SIZE) {
                        result  = -E_check_in_read;
                        goto end_check_in_archive;
                }
                if (write(newArchive,&time,INT_SIZE) != INT_SIZE) {
                        result  = -E_check_in_write;
                        goto end_check_in_archive;
                }
        }
        if (read(oldArchive,&oldDataSize,INT_SIZE) != INT_SIZE) {
                result  = -E_check_in_read;
                goto end_check_in_archive;
```

```c
                if ((oldData = (unsigned char *) malloc(oldDataSize)) == 0) {
                        result = -E_check_in_read;
                        goto end_check_in_archive;
                }
                if (read(oldArchive,oldData,oldDataSize) != oldDataSize) {
                        free(oldData);
                        result = -E_check_in_read;
                        goto end_check_in_archive;
                }

/**********************************************************************
*       Write the newArchive with the computed change set if any.     *
**********************************************************************/
                if (write(newArchive,&dataSize,INT_SIZE) != INT_SIZE) {
                        free(oldData);
                        result = -E_check_in_write;
                        goto end_check_in_archive;
                }
                if (write(newArchive,data,dataSize) != dataSize) {
                        free(oldData);
                        result = -E_check_in_write;
                        goto end_check_in_archive;
                }
                if (write(newArchive,&zero,INT_SIZE) != INT_SIZE) {
                        free(oldData);
                        result = -E_check_in_write;
                        goto end_check_in_archive;
                } bufId  = makeBuffer();
                result = compute_differences(
                        data,oldData,dataSize,oldDataSize,bufId,&numChanges,FALSE);
                free(oldData);
                writeBufDisposing(bufId,newArchive);
                if (result < 0)
                        goto end_check_in_archive;

pos    = lseek(oldArchive,0,1);
                fstat(oldArchive,&statBuf);
                size   = statBuf.st_size;
                result = -E_check_in_read;
                if ((buf = (char *) malloc(size-pos)) == 0)
                        goto end_check_in_archive;
                if (read(oldArchive,buf,size-pos) != (size-pos)) {
                        free(buf);
                        goto end_check_in_archive;
                }
                if (write(newArchive,buf,size-pos) != (size-pos)) {
                        free(buf);
                        result = -E_check_in_write;
                        goto end_check_in_archive;
                }
                free(buf);
                result = 0;

end_check_in_archive:
        if (result < 0) /* not successful */ {
                setError(-result, "", 0);
        }
        else    {
                fsync(oldArchive); /* make sure it reaches the disk */
#ifdef mag
                rename(tempName,archiveName);
#else
                unlink(archiveName);
                link(tempName,archiveName);
#endif
        }
        close(newArchive);      close(oldArchive);
        unlink(tempName);
        return(result);
}
```

```
    static PIECE_PTR split(k)
            int     k;
/****************************************************************
 *                                                              *
 *      Post condition: a new piece starts at character position k. *
 *      Returns a pointer to the piece beginning at position k. *
 *      If can not allocate a new piece then -1 returned.       *
 *                                                              *
 ****************************************************************/
{
        PIECE_PTR       p, q;
        int     i, d;

#if DEBUGTRACE > 1
        fprintf(trace,"split(%d)\n",k);
#endif
        if (k == 0) return(ph);
        else /* k > 0 */ {
                p       = ph;
                i       = p->len;
                while (i < k) {
                        /* p->next starts at position i */
                        p       = p->next;
                        i       = i + p->len;
                }
                /* i >= k and p->next starts at location i */
                if (k == i) return(p->next);
                else {
                        if ((q = (PIECE_PTR) malloc(PIECE_SIZE)) == 0)
                                return((PIECE_PTR) -1);
                        q->next = p->next;
                        if (q->next != NIL)
                                q->next->prev   = q;
                        p->next = q;
                        q->prev = p;
                        d       = i - k;
                        q->len  = d;
                        p->len  = p->len - d;
                        q->inx  = p->inx + p->len;
                        return(q);
                }
        }
}
static apply_changes(archive,DataSize)
        int     archive;        /* file descriptor */
        int     *DataSize;
/****************************************************************
 *                                                              *
 *      Precondition: archive is at the beginning of a <change-set>. *
 *      Returns zero if no problems encountered otherwise returns a *
 * negative error indicator.                                    *
 *                                                              *
 ****************************************************************/
{
        char    b;
        int     d, offset;
        int     index, index1, index2;
        int     len;
        PIECE_PTR       p, q, r, old_p;
        SEGMENT_PTR     new_s;

#if DEBUGTRACE > 1
        fprintf(trace,"apply_changes\n");
#endif
        if (read(archive,&b,1) != 1)
                return(-E_check_out_apply);
        offset  = 0;
        while (b != 0) {
                if (b <= 2) /* deletion or replacement */ {
                        if (read(archive,&index1,INT_SIZE) != INT_SIZE)
                                return(-E_check_out_apply);
                        index1  = ntohl(index1);
                        if (read(archive,&index2,INT_SIZE) != INT_SIZE)
                                return(-E_check_out_apply);
                        index2  = ntohl(index2);
                        if ((old_p = p = split(index1 + offset)) == ((PIECE_PTR) -1))
                                return(-E_check_out_space);
                        p       = p->prev;
                        if ((q = split(index2 + 1 + offset)) == ((PIECE_PTR) -1))
                                return(-E_check_out_space);
                        if (p == NIL)
```

```
                        ph         = q;
                else /* p not NIL */
                        p->next = q;
                if (q != NIL)
                        q->prev = p;
                d       = index2 - index1 + 1;
                free(old_p);
                *DataSize       = *DataSize - d;
                offset          = offset - d;
                }
        if (b > 1) /* insert some characters */ {
                if (b == REPLACEMENT)
                        index   = index1 + offset + d;
                else if (b == INSERTION) {
                        if (read(archive,&index,INT_SIZE) != INT_SIZE)
                                return(-E_check_out_apply);
                        index   = ntohl(index) + offset;
                        }
                else /* b == ADDITION */
                        index   = *DataSize + offset;
                if (read(archive,&len,INT_SIZE) != INT_SIZE)
                        return(-E_check_out_apply);
                len     = ntohl(len);
                if ((new_s = (SEGMENT_PTR) malloc(SEGMENT_SIZE)) == 0)
                        return(-E_check_out_space);
                new_s->next     = NIL;
                st->next        = new_s;
                st              = new_s;
                if ((new_s->addr = (char *) malloc(len)) == 0)
                        return(-E_check_out_space);
                if (read(archive,new_s->addr,len) != len)
                        return(-E_check_out_apply);
                /* insert a new piece */
                if ((p = split(index)) == ((PIECE_PTR) -1))
                        return(-E_check_out_space);
                if ((q = (PIECE_PTR) malloc(PIECE_SIZE)) == 0)
                        return(-E_check_out_space);
                q->len = len;
                q->inx = new_s->addr;
                q->next = p;
                if (p == ph) {
                        ph              = q;
                        q->prev = NIL;
                        if (p != q && p != NIL) p->prev = q;
                        }
                else if (p == NIL) /* ph != NIL */ {
                        r               = ph;
                        while (r != NIL) {
                                p       = r;
                                r       = p->next;
                                }
                        /* p->next = NIL */
                        q->prev = p;
                        p->next = q;
                        }
                else {
                        q->prev = p->prev;
                        q->prev->next   = q;
                        p->prev = q;
                        }
                *DataSize       = *DataSize + len;
                offset          = offset + len;
                }
        if (read(archive,&b,1) != 1)
                return(-E_check_out_apply);
        }
        return(0);
} check_out_archive(atTime,versionNumber,archiveName,Data,DataSize)
        int     atTime;
        int     versionNumber;
        char    *archiveName;
        unsigned char   **Data;
        int     *DataSize;
```

```
/*****************************************************************
 *                                                                *
 *    Check out version of archiveName and returns its address in *
 *    Data.      If successful returns 0, otherwise returns a negative *
 *    error code. Places the size of the checked out archive in DataSize *
 *    if successful.                                              *
 *                                                                *
 *****************************************************************/
{
        int       archive;       /* file descriptor for archive */
        int       result;
        int       versionTime;
        int       userId;
        int       i, j;
        char      *b;
        PIECE_PTR      old_ph;
        SEGMENT_PTR    old_sh;
        unsigned int   n;        /* number of versions to recreate */
        unsigned int   nv;       /* total number of version */ if DEBUGTRACE > 0
        fprintf(trace,"check_out_archive(%d,%d,%s)\n",atTime,versionNumber,archiveName);
#endif
#ifdef mag
        archive = open(archiveName,O_RDONLY,0);
#else
        archive = open(archiveName,0);
#endif
        result = 0;
        if (archive < 0) {
                setError(E_check_out_open, archiveName, 0);
                return(-E_check_out_open);
        }
        n = nv = 0;
        if (read(archive,&versionTime,INT_SIZE) != INT_SIZE) {
                result = -E_check_out_read;
                goto end_check_out_archive;
        }
        while (versionTime != 0) {
                if (read(archive,&userId,INT_SIZE) != INT_SIZE) {
                        result = -E_check_out_read;
                        goto end_check_out_archive;
                }
                nv++;
                if (atTime < versionTime) n++;
                if (read(archive,&versionTime,INT_SIZE) != INT_SIZE) {
                        result = -E_check_out_read;
                        goto end_check_out_archive;
                }
        }
        if ((n == nv && versionNumber == 0) || versionNumber > nv)
                /* archive not yet created at atTime */
                *DataSize         = 0;
        else {
/*****************************************************************
 *    Read the current version of the archive into a segment.    *
 *****************************************************************/
                if (read(archive,DataSize,INT_SIZE) != INT_SIZE) {
                        result = -E_check_out_read;
                        goto end_check_out_archive;
                }
                if ((st = sh = (SEGMENT_PTR) malloc(SEGMENT_SIZE)) == 0) {
                        result = -E_check_out_space;
                        goto end_check_out_archive;
                }
                sh->next     = NIL;
                if ((sh->addr = (char *) malloc(*DataSize)) == 0) {
                        free(sh);
                        result = -E_check_out_space;
                        goto end_check_out_archive;
                }
                if (read(archive,sh->addr,*DataSize) != *DataSize) {
                        free(sh->addr); free(sh);
                        result = -E_check_out_read;
                        goto end_check_out_archive;
                }
                if ((ph = (PIECE_PTR) malloc(PIECE_SIZE)) == 0) {
                        free(sh->addr); free(sh);
                        result = -E_check_out_read;
                        goto end_check_out_archive;
                }
```

```
                    ph->len   = *DataSize;
                    ph->inx   = sh->addr;
                    ph->prev  = ph->next = NIL;

/****************************************************************
 *      Apply the necessary change sets.                         *
 ****************************************************************/
                    if (versionNumber > 0)
                            n      = versionNumber - 1;
                    else if (versionNumber < 0)
                            n      = nv + versionNumber;
                    for (i=0; i<n; i++) /* apply changes */ {
                            if (read(archive,&zero,INT_SIZE) != INT_SIZE) {
                                    result = -E_check_out_read;
                                    goto check_out_free;
                            }
                            if (zero != 0) {
                                    result = -E_check_out_internal;
                                    goto check_out_free;
                            }
                            result = apply_changes(archive,DataSize);
                            if (result < 0) goto check_out_free;
                    }
                    if ((*Data = (unsigned char *) malloc(*DataSize)) == 0) {
                            result = -E_check_out_space;
                            goto check_out_free;
                    }
                    i       = 0;
                    old_ph  = ph;
                    while (ph != NIL) {
                            for (b = ph->inx; b < (ph->inx + ph->len); b++)
                                    (*Data)[i++]   = *b;
                            ph      = ph->next;
                    }
                    ph      = old_ph;
            check_out_free:
                    while (ph != NIL) {
                            old_ph  = ph;
                            ph      = ph->next;
                            free(old_ph);
                    }
                    while (sh != NIL) {
                            free(sh->addr);
                            old_sh  = sh;
                            sh      = sh->next;
                            free(old_sh);
                    }
            }
end_check_out_archive:
        close(archive);
        if (result < 0) setError(-result, "", 0);
        return(result);
} get_versions(archiveName, buf, bufSize)
        char    *archiveName;
        int     buf[], *bufSize;
/****************************************************************
 *                                                              *
 *      Adds all the modification times and creation time, in buf, *
 *      alternatively with userIds; bufSize is initially the size of *
 *      buf; upon return it is (the number of version times) * 2. *
 *      Returns 0 if successful, otherwise returns a negative error *
 *      code.                                                   *
 *                                                              *
 ****************************************************************/
{
        int     archive;        /* file descriptor for new archive */
        unsigned int    versionTime, userId, maxBufSize;
        int     result, count;

#if DEBUGTRACE > 0
        fprintf(trace,"get_versions(%s)\n",archiveName);
#endif
#ifdef mag
        archive = open(archiveName,O_RDONLY,0);
#else
        archive = open(archiveName,0);
#endif
```

```
        if (archive < 0) {
                setError(E_get_open, archiveName, 0);
                return(-E_get_open);
                }
        maxBufSize   = *bufSize;
        count    = 0;
        if (read(archive,&versionTime,INT_SIZE) != INT_SIZE) {
                result = -E_get_read;
                goto end_get_versions;
                }
        if (read(archive,&userId,INT_SIZE) != INT_SIZE) {
                result = -E_get_read;
                goto end_get_versions;
                }
        while ((versionTime != 0) && (count < maxBufSize)) {
                buf[count++] = versionTime;
                buf[count++] = userId;
                if (read(archive,&versionTime,INT_SIZE) != INT_SIZE) {
                        result = -E_get_read;
                        goto end_get_versions;
                        }
                if (read(archive,&userId,INT_SIZE) != INT_SIZE) {
                        result = -E_get_read;
                        goto end_get_versions;
                        }
                }
        result = 0;

end_get_versions:
        *bufSize = count;
        close(archive);
        if (result < 0) setError(-result, "", 0);
        return(result);
} create_archive(versionTime,userId,archiveName)
        int     versionTime;
        int     userId;
        char    *archiveName;
/**********************************************************************
 *                                                                    *
 *     Create a new new archive with name archiveName and creation    *
 *     time versionTime.                                              *
 *     Returns 0 if successful, otherwise returns a negative error    *
 *     code.                                                          *
 *                                                                    *
 **********************************************************************/
{
        int     archive;        /* file descriptor for new archive */
        int     result;

#if DEBUGTRACE > 0
        fprintf(trace,"create_archive(%d,%s)\n",versionTime,archiveName);
#endif
#ifdef mag
        archive = open(archiveName,O_CREAT|O_TRUNC|O_WRONLY,defaults.mask);
#else
        archive = creat(archiveName,defaults.mask);
#endif
        if (archive < 0) {
                setError(E_create_open, archiveName, 0);
                return(-E_create_open);
                } if (write(archive,&versionTime,INT_SIZE) != INT_SIZE) {
                result = -E_create_write;
                goto end_create_archive;
                }
        if (write(archive,&userId,INT_SIZE) != INT_SIZE) {
                result = -E_create_write;
                goto end_create_archive;
                }
        if (write(archive,&zero,INT_SIZE) != INT_SIZE) {
                result = -E_create_write;
                goto end_create_archive;
                }
        if (write(archive,&zero,INT_SIZE) != INT_SIZE) {
                result = -E_create_write;
                goto end_create_archive;
                }
        result = 0;
```

```
end_create_archive:
        close(archive);
        if (result < 0) setError(-result, "", 0);
        return(result);
} roll_back_archive(toTime, archiveName)
        int     toTime;
        char    *archiveName;
/************************************************************************
*                                                                       *
*       Rolls back archiveName by one changes set.      Returns 0 if    *
*  otherwise returns a negative error code.                             *
*                                                                       *
*************************************************************************/
{
        int     archive;        /* file descriptor for archive */
        char    tempName[100];  /* name for temporary file */
        int     oldArchive;     /* file descriptor for rolled back archive */
        int     result;
        int     versionTime;
        int     userId;
        int     dataSize;
        unsigned char   *data;
        unsigned char   c;
        int     pos, size;
        struct stat     statBuf;
        char    *buf;

#if DEBUGTRACE > 0
        fprintf(trace,"roll_back_archive(%s)\n",archiveName);
#endif
/************************************************************************
*       Create a temporary file to hold the archive while the rolled    *
*  back version is being made.                                          *
*************************************************************************/
        strcpy(tempName,archiveName);
        strcat(tempName,"XXXXXX");
        mktemp(tempName);
        logPendingTransaction(L_CREATETEMP,0,tempName,strlen(tempName) + 1);
#ifdef mag
        oldArchive      = open(tempName,O_CREAT|O_TRUNC|O_WRONLY,defaults.mask);
#else
        oldArchive      = creat(tempName,defaults.mask);
#endif
        if (oldArchive < 0) {
                unlink(tempName);
                setError(E_roll_back_open_archive, archiveName);
                return(-E_roll_back_open_archive);
        }
#ifdef mag
        archive = open(archiveName,O_RDONLY,0);
#else
        archive = open(archiveName,0);
#endif
        if (archive < 0) {
                close(oldArchive);
                unlink(tempName);
                setError(E_roll_back_open_temp, archiveName);
                return(-E_roll_back_open_temp);
        }

/************************************************************************
*       Skip over the last modification time in the archive, extract    *
*  the next to the last modification time and copy all but the last     *
*  modification and the creation time into the oldArchive.              *
*************************************************************************/
        if (read(archive,&versionTime,INT_SIZE) != INT_SIZE) {
                result = -E_roll_back_read;
                goto end_roll_back_archive;
        }
        if (read(archive,&userId,INT_SIZE) != INT_SIZE) {
                result = -E_roll_back_read;
                goto end_roll_back_archive;
        }
        if (versionTime < toTime) { /* already done */
                result = 0;
                goto end_roll_back_archive;
```

```
        if (read(archive,&versionTime,INT_SIZE) != INT_SIZE) {
                result  = -E_roll_back_read;
                goto end_roll_back_archive;
        }
        if (write(oldArchive,&versionTime,INT_SIZE) != INT_SIZE) {
                result  = -E_roll_back_write;
                goto end_roll_back_archive;
        }
        while (versionTime != 0) {
                if (read(archive,&userId,INT_SIZE) != INT_SIZE) {
                        result  = -E_roll_back_read;
                        goto end_roll_back_archive;
                }
                if (write(oldArchive,&userId,INT_SIZE) != INT_SIZE) {
                        result  = -E_roll_back_write;
                        goto end_roll_back_archive;
                }
                if (read(archive,&versionTime,INT_SIZE) != INT_SIZE) {
                        result  = -E_roll_back_read;
                        goto end_roll_back_archive;
                }
                if (write(oldArchive,&versionTime,INT_SIZE) != INT_SIZE) {
                        result  = -E_roll_back_write;
                        goto end_roll_back_archive;
                }
        }

/************************************************************************
 *    Get the previous version of the archive and write out its size    *
 *    and contents to the oldArchive.   Skip over the current contents  *
 *    in the archive.                                                   *
 ************************************************************************/
        result  = check_out_archive(versionTime,0,archiveName,&data,&dataSize);
        if (result < 0) goto end_roll_back_archive;
        if (write(oldArchive,&dataSize,INT_SIZE) != INT_SIZE) {
                result  = -E_roll_back_write;
                goto end_roll_back_archive;
        }
        if (write(oldArchive,data,dataSize) != dataSize) {
                result  = -E_roll_back_write;
                goto end_roll_back_archive;
        }
        free(data);
        if (read(archive,&dataSize,INT_SIZE) != INT_SIZE) {
                result  = -E_roll_back_read;
                goto end_roll_back_archive;
        }
        pos     = lseek(archive,0,1) + dataSize + 4; /* position at change-set*/
        if (lseek(archive,pos,0) == -1) {
                result  = -E_roll_back_read;
                goto end_roll_back_archive;
        }

/************************************************************************
 *    Skip over the most recent change set in archive and copy the      *
 *    remaining change sets to oldArchive.                              *
 ************************************************************************/
        result  = -E_roll_back_read;
        do {
                if (read(archive,&c,1) != 1)
                        goto end_roll_back_archive;
                pos     = pos + 1;
                if (c > 0) {
                    if (c <= 2)
                        pos     = pos + 2*INT_SIZE;
                    else if (c = 3)
                        pos     = pos + INT_SIZE;
                    if (c >= 2) {
                        if (lseek(archive,pos,0) == -1)
                                goto end_roll_back_archive;
                        if (read(archive,&dataSize,INT_SIZE) != INT_SIZE)
                                goto end_roll_back_archive;

pos     = pos + dataSize + 4;
                    }
                    if (lseek(archive,pos,0) == -1)
                        goto end_roll_back_archive;
                }
        } while (c != 0);
```

```
        fstat(archive,&statBuf);
        size    = statBuf.st_size;
        result  = -E_roll_back_read;
        if ((buf = (char *) malloc(size-pos)) == 0)
                goto end_roll_back_archive;
        if (read(archive,buf,size-pos) != (size-pos)) {
                free(buf);
                goto end_roll_back_archive;
        }
        if (write(oldArchive,buf,size-pos) != (size-pos)) {
                free(buf);
                result = -E_roll_back_write;
                goto end_roll_back_archive;
        }
        free(buf);
        result = 0;

end_roll_back_archive:
        if (result < 0) /* not successful */ {
                setError(-result,"",0);
        }
        else    {
                fsync(oldArchive); /* make sure it reaches the disk */
#ifdef mag
                rename(tempName,archiveName);
#else
                unlink(archiveName);
                link(tempName,archiveName);
#endif
        }
        close(oldArchive);      close(archive);
        unlink(tempName);
        return(result);
}

/* attribute.c provides operations on attributes of nodes or links in the
   hypertext graph. This routine runs as part of the directory server. */ include         <sys/types.h>
include         <sys/stat.h>
#include         <sys/file.h>
include         <stdio.h>
include         <setjmp.h> include         "directory.h"
include         "actions.h"
#include         "strings.h"
#include         "log.h"
#include         "log.h"
#include         "machine.h"
#include         "errors.h"

extern  char    *get_attribute_name();
static  char    name[200];

/***************************************************/
/* abstract hypertext machine attribute operations */
/***************************************************/ getAttributes(versionTime, numAttributes, bufId)
        int     versionTime, *numAttributes, bufId;
{       int     f, i, vt;
        struct  attributeDef    ad;
        struct  fileHeader      fh;
        char    *s;

#if DEBUGTRACE >= 2
        fprintf(trace, "called getAttributes(%d)\n", versionTime);
#endif
        *numAttributes = 0;
        if (startTransaction(T_ACCESS) == FALSE) return -1;
        if ((f = openDirectoryFile(ATTRIBUTEDEFS)) < 0) return -1;
        if (read(f, &fh, sizeof(fh)) != sizeof(fh)) goto out;

vt = (versionTime == CURRENTVERSION) ? now(): versionTime;
        for (i = 1; i <= fh.size; i++) {
                if (getAttributeDef(f, i, &ad) == 0) goto out;
                if ((ad.name != -1) && (ad.creationTime <= vt) &&
                                (ad.deletionTime > vt)) {
                        appendInt(i, bufId);
```

```
                        s = get_string(ad.name);
                        appendBytes(s, bufId, strlen(s) + 1);
                        *numAttributes += 1;
                    }
                }
            closeDirectoryFile(f);
            commitTransaction();
            return 1;

out:        closeDirectoryFile(f);
            abortTransaction();
            return -1;
} getAttributeValues(attributeIndex, versionTime, numValues, bufId)
        int     attributeIndex, versionTime, *numValues, bufId;
{       int     f, i, r, vt, avp, last, loop;
        struct  attributeDef        ad;
        struct  attributeValueBuffer    avb;
        struct  fileHeader          fh;
        struct  attributeHistory    val;
        char    *str;

#if DEBUGTRACE >= 2
        fprintf(trace, "called getAttributeValues(%d, %d)\n",
                                        attributeIndex, versionTime);
#endif
        *numValues = 0;
        if (startTransaction(T_ACCESS) == FALSE) return -1;
        if ((f = openDirectoryFile(ATTRIBUTEDEFS)) < 0) return -1;
        if (getAttributeDef(f, attributeIndex, &ad) == 0) goto out1;
        closeDirectoryFile(f);
        if (ad.name == -1) {
                setError(E_invalid_attribute_index, "", 0);
                goto out2;
                }
        vt = (versionTime == CURRENTVERSION) ? now(): versionTime;
        if ((ad.creationTime > vt) || (ad.deletionTime < vt)) {
                setError(E_invalid_version_time, "", 0);
                goto out2;
                }
        if ((f = openDirectoryFile(ATTRIBUTEVALUES)) < 0) return -1;
        avp = ad.nodeValuesList;
        last = ad.nextNodeIndex; loop = 1;
again:  while (avp != -1) {
                if (getAttributeValueBuffer(f, avp, &avb) == 0) goto out1;
                for (i = 0; i < last; i++) {
                        if (avb.values[i].entity != -1) {
                            if ((r = findAttValueVersion(vt,
                                &avb.values[i].currentValue,avb.values[i].prevIndex,
                                avb.values[i].previous, &val)) == -1) goto out1;
                            if (val.valueType != DELETEDATTVALUE) {
                                if (r == 1) {
                                    *numValues += 1;
                                    appendByte(val.valueType, bufId);
                                    if (val.valueType) {
                                        str = get_string(val.value);
                                        appendBytes(str, bufId, strlen(str) + 1);
                                        }
                                    else    appendInt(val.value, bufId);
                                    }
                                }
                            }
                        }
                avp = avb.next; last = NUMATTVALUES;
                }
        if (loop == 1) { /* do it again for the link values */
                avp = ad.linkValuesList; last = ad.nextLinkIndex;
                loop = 2; goto again;
                }
        closeDirectoryFile(f);
        commitTransaction();
        return 1;

out1:   closeDirectoryFile(f);
out2:   abortTransaction();
        return -1;
} getAttributeIndex(name)
        char    *name;
```

```
{       int     i, j;
        if (startTransaction(T_ACCESS) == FALSE) return -1;
        i = find_string(name);
        if (i == -1) {
                i = put_string(name, 0);
                if (i == -1) goto out1;
                j = 0; /* no need to try to get attribute index */
        }
        else    j = get_attribute_index(i);
        if (j == -1) goto out1;
        else if (j == 0) { /* not yet defined */
                commitTransaction();
                if (startTransaction(T_UPDATE) == FALSE) return -1;
                if ((j = newAttribute(i)) == 0) goto out1;
        }
        commitTransaction();
        return j;
out1:   abortTransaction();
        return -1;
} getNodeAttributeValue(nodeIndex, attributeIndex, versionTime,
                        isString, integerValue, stringValue)
        int nodeIndex, attributeIndex, versionTime;
        int *integerValue, *isString;
        char **stringValue;
/* gets the value for attribute 'attributeIndex' for node 'nodeIndex'
   at version time 'versiontTime'. Returns -1 if operation fails,
   returns 1 if a value is defined for the attribute, otherwise returns 0.

Preconditions: 1) project is a valid instance of a graphContext
                  2) nodeIndex is a valid node that existed at time versionTime
   Postconditions: 1) results = 1 implies that integerValue is the value of the
                attribute for that version of the node.  isString = 1 implies
                stringValue is the string corresponding to integerValue.

getNodeAttributeValue(nodeIndex, attributeIndex, versionTime)
                        -> isString, integerValue, stringValue
*/
{       struct  nodeEntry       ne;
        int     f;

#if DEBUGTRACE >= 2
        fprintf(trace, "called getNodeAttributeValue(%d, %d, %d)\n",
                        nodeIndex, attributeIndex, versionTime);
#endif
        if (startTransaction(T_ACCESS) == FALSE) return -1;
        if ((f = openDirectoryFile(DIRECTORY)) < 0) goto out2;
        if (getNodeEntry(f, nodeIndex, &ne) == 0) goto out1;
        closeDirectoryFile(f);
        f = getEntityAttributeValue(&ne.attributes, attributeIndex,
                        versionTime, isString, integerValue, stringValue);
        if (f == -1) goto out2;
        commitTransaction();
        return f;

out1:   closeDirectoryFile(f);
out2:   abortTransaction();
        return -1;
} getLinkAttributeValue(linkIndex, attributeIndex, versionTime,
                        isString, integerValue, stringValue)
        int linkIndex, attributeIndex, versionTime;
        int *integerValue, *isString;
        char **stringValue;
/* gets the value for attribute 'attributeIndex' for link 'linkIndex'
   at version time 'versiontTime'. Returns -1 if operation fails,
   returns 1 if a value is defined for the attribute, otherwise returns 0.

Preconditions: 1) project is a valid instance of a graphContext
                  2) linkIndex is a valid link that existed at time versionTime
   Postconditions: 1) results = 1 implies that 'value' is the value of the
                attribute for that version of the link.  isString = 1 implies
                stringValue is the string corresponding to integerValue.

getLinkAttributeValue(linkIndex, attributeIndex, versionTime)
                        -> isString, integerValue, stringValue
*/
```

```
{       struct  linkEntry       le;
        int     f;

#if DEBUGTRACE >= 2
        fprintf(trace, "called getLinkAttributeValue(%d, %d, %d)\n",
                        linkIndex, attributeIndex, versionTime);
#endif
        if (startTransaction(T_ACCESS) == FALSE) return -1;
        if ((f = openDirectoryFile(LINKENTRIES)) < 0) goto out2;

if (getLinkEntry(f, linkIndex, &le) == 0) goto out1;
        closeDirectoryFile(f);
        f = getEntityAttributeValue(&le.attributes, attributeIndex,
                        versionTime, isString, integerValue, stringValue);
        if (f == -1) goto out2;
        commitTransaction();
        return f;

out1:   closeDirectoryFile(f);
out2:   abortTransaction();
        return -1;
} getEntityAttributeValue(attributePairs, attributeIndex, versionTime,
                isString, integerValue, stringValue)
        int     attributeIndex, versionTime;
        int     *integerValue, *isString;
        char    **stringValue;
        struct  entityAttributes        *attributePairs;

/* gets the value for attribute 'attributeIndex' for the node or link
   corresponding to attributePairs,
   at version time 'versiontTime'. Returns -1 if operation fails,
   returns 1 if a value is defined for the attribute, otherwise returns 0.

Preconditions:  1) project is a valid instance of a graphContext
                   2) attributePairs/otherAttributes are valid instances
   Postconditions: 1) results = 1 implies that integerValue is the value of the
                   attribute for that version of the node. isString = 1 implies
                   that stringValue is the string corresponding to integerValue.

*/

{       struct  attributeHistory        ah;
        struct  entityAttributeValue    av;
        int     f, i;

#if DEBUGTRACE >= 3
        fprintf(trace, "called getEntityAttributeValue()\n");
endif if (versionTime == CURRENTVERSION)      versionTime = now();

if (findAttributePair(attributePairs, attributeIndex, &i) == 0)
                return 0;

/* assert i is the valuePtr from the attributePair
        whose attributeName == attributeIndex */ if ((f = openDirectoryFile(ATTRIBUTEVALUES)) < 0) return -1;
        if (getAttributeValue(f, i, &av) == 0) {
                        closeDirectoryFile(f); return -1;
                }
        closeDirectoryFile(f);

if ((i = findAttValueVersion(versionTime, &av.currentValue,
                av.prevIndex, av.previous, &ah)) != 1) return i;

/* assert: ah contains the desired version of the attributeHistory
        for the attributePair whose attribute == attributeIndex */ if (ah.valueType == DELETEDATTVALUE) return 0;
        *integerValue = ah.value;
        *isString = ah.valueType;
        if (*isString) *stringValue = get_string(*integerValue);
        return 1;
} setNodeAttributeValue(nodeIndex, attributeIndex, isString,
                stringValue, integerValue)
```

```
            int     nodeIndex, attributeIndex, integerValue, isString;
            char    *stringValue;
/* sets the value for attribute 'attributeIndex' for node 'nodeIndex'
   Returns 1 if operation succeeds, otherwise returns 0.

Preconditions:  1) project is a valid instance of a graphContext
                   2) nodeIndex is a valid node that exists now
   Postconditions: 1) results = 1 implies that "value" is now the current value
                   of the attribute for the node.  isString = 1 implies
                   that the value is interpreted as a string index.

setNodeAttributeValue(nodeIndex, attributeIndex, isString,
                                  stringValue, integerValue);
*/

{       struct  nodeEntry       ne, oldNe;
        int     f, r, shouldArchive;

#if DEBUGTRACE >= 2
        fprintf(trace, "called setNodeAttributeValue(%d, %d, %d)\n",
                nodeIndex, attributeIndex, isString);
#endif
        if (startTransaction(T_UPDATE) == FALSE) return 0;
        if ((f = openDirectoryFile(DIRECTORY)) < 0) goto out2;
        if (getNodeEntry(f, nodeIndex, &ne) == 0) goto out1;
        closeDirectoryFile(f);
        bcopy(&ne, &oldNe, sizeof(ne));  /* save node entry */
        shouldArchive = (ne.status & ARCHIVE) != 0;
        r = setEntityAttributeValue(nodeIndex, 1, &ne.attributes,
                shouldArchive, attributeIndex,
                isString, stringValue, integerValue);
        if (r == -1)    goto out2;
        else    {
            if (r == 0) {
                if ((f = openDirectoryFile(DIRECTORY)) < 0) goto out2;
                logPendingTransaction(L_PUTNODE,nodeIndex,&oldNe,sizeof(oldNe));
                if (putNodeEntry(f, nodeIndex, &ne) == 0) goto out1;
                closeDirectoryFile(f);
            }
            commitTransaction();
            return 1;
            } out1:   closeDirectoryFile(f);
out2:   abortTransaction();
        return 0;
} setLinkAttributeValue(linkIndex, attributeIndex, isString,
                      stringValue, integerValue)
        int     linkIndex, attributeIndex, integerValue, isString;
        char    *stringValue;
/* sets the value for attribute 'attributeIndex' for link 'linkIndex'.
   Returns 1 if operation succeeds, otherwise returns 0.

Preconditions:  1) project is a valid instance of a graphContext
                   2) linkIndex is a valid link that exists now
   Postconditions: 1) results = 1 implies that "value" is now the current value
                   of the attribute for the link.  isString = 1 implies
                   that the value is interpreted as a string index.

setLinkAttributeValue(linkIndex, attributeIndex, versionTime,
                                  value, isString)
*/

{       struct  linkEntry       le, oldLe;
        int     f, r;

#if DEBUGTRACE >= 2
        fprintf(trace, "called setLinkAttributeValue(%d, %d, %d)\n",
                linkIndex, attributeIndex, isString);
#endif
        if (startTransaction(T_UPDATE) == FALSE) return 0;

if ((f = openDirectoryFile(LINKENTRIES)) < 0) goto out2;
        if (getLinkEntry(f, linkIndex, &le) == 0) goto out1;
        closeDirectoryFile(f);
        bcopy(&le, &oldLe, sizeof(le));  /* save link entry */
        r = setEntityAttributeValue(linkIndex, 0, &le.attributes,
                1, attributeIndex, isString, stringValue, integerValue);
        if (r == -1)    goto out2;
        else    {
```

```
                if (r == 0) {
                    if ((f = openDirectoryFile(LINKENTRIES)) < 0) goto out2;
                    logPendingTransaction(L_PUTLINK,linkIndex,&oldLe,sizeof(oldLe));
                    if (putLinkEntry(f, linkIndex, &le) == 0) goto out1;
                    closeDirectoryFile(f);
                    }
                commitTransaction();
                return 1;
                } out1:       closeDirectoryFile(f);
out2:       abortTransaction();
            return 0;
} setEntityAttributeValue(entityIndex, isNode, attributePairs,
        shouldArchive, attributeIndex, isString, stringValue, integerValue)
            int     entityIndex, isNode;
            int     attributeIndex, integerValue;
            short   isString;
            int     shouldArchive;
            char    *stringValue;
            struct  entityAttributes        *attributePairs;

/* sets the value for attribute 'attributeIndex' for the node or link
    corresponding to attributePairs. Returns -1 if operation fails,
    returns 1 if operation succeeds and no update is needed to node/link entry,
    otherwise returns 0 implying operation succeeded but update needed to
    node/link entry.

Preconditions:  1) project is a valid instance of a graphContext
                    2) attributePairs are valid instances
    Postconditions: 1a) results = 1 implies that "value" is now the current value
                    of the attribute for the entity.  isString = 1 implies
                    that the value is interpreted as a string index.
                    1b) results = 0 implies that "value" is now the current value
                    of the attribute for the entity.  isString = 1 implies
                    that the value is interpreted as a string index. But an update
                    is needed to the node/link entry.

*/
{       struct  attributeHistory        ah, *ahPtr;
        struct  attributeHistoryBuffer  ahb;
        struct  entityAttributeValue    av;
        struct  attributePair           *apPtr;
        int     f, i, result, index, stringValueIndex;
        int     value, valuePtr;

#if DEBUGTRACE >= 3
        fprintf(trace, "called setEntityAttributeValue()\n");
#endif
        result = 1;

if (isString == 1)      {
                if ((value = put_string(stringValue, 0)) == -1) return -1;
                }
        else    value = integerValue;

if (findAttributePair(attributePairs, attributeIndex,
                        &valuePtr) != 0)
                goto gotIt;

/* assert this attribute is not yet defined for entity */

/* add a new entityAttributeValue for attribute */
        av.entity = entityIndex;
        av.previous = -1;
        av.prevIndex = 0;

if ((valuePtr = newAttributeValue(&av, isNode,
                        attributeIndex)) == 0) return -1;

/* add a new attributePair for the entity */
        result = 0;
        if (newAttributePair(attributePairs, attributeIndex, valuePtr)
                        == 0)
                return -1;

goto updateIt;
```

```
gotIt: /* assert valuePtr is the value from the attributePair
       whose attributeName == attributeIndex */ if ((f = openDirectoryFile(ATTRIBUTEVALUES)) < 0) return -1;
       if (getAttributeValue(f, valuePtr, &av) == 0) {
                    closeDirectoryFile(f); return -1; }
       closeDirectoryFile(f);

if ((isString == av.currentValue.valueType)
           && (av.currentValue.value == value))
              return result; /* value isn't changing */ logPendingTransaction(L_PUTATTVALUE, valuePtr, &av, sizeof(av));
       if (shouldArchive) {
           if ((f = openDirectoryFile(ATTRIBUTEHISTORY)) < 0) return -1;
           if (av.prevIndex == 0) {
               /* current buffer is full, make new one */
               av.prevIndex = NUMATTHISTORIES - 1;
               ahb.previous = av.previous;
               ahb.histories[av.prevIndex].value = av.currentValue.value;
               ahb.histories[av.prevIndex].valueType = av.currentValue.valueType;
               ahb.histories[av.prevIndex].versionTime = av.currentValue.versionTime;
               ahb.histories[av.prevIndex].author = av.currentValue.author;
               if ((i = addAttributeHistory(f, &ahb)) == 0) {
                       closeDirectoryFile(f); return -1;}
               av.previous = i;
               }
           else   {
               av.prevIndex -= 1;
               if ((i = getAttributeHistory(f, av.previous,
                                   &ahb)) == 0) {
                       closeDirectoryFile(f); return -1;}
               ahb.histories[av.prevIndex].value = av.currentValue.value;
               ahb.histories[av.prevIndex].valueType = av.currentValue.valueType;
               ahb.histories[av.prevIndex].versionTime = av.currentValue.versionTime;
               ahb.histories[av.prevIndex].author = av.currentValue.author;
               /* do not need to logPendingTransaction for ahb because it is
                       shadowed by update to av */
               if ((i = putAttributeHistory(f, av.previous, &ahb)) == 0) {
                       closeDirectoryFile(f); return -1;}
               }
           closeDirectoryFile(f);
           } updateIt:
       /* assert: attributeValue file is open and
                  av.currentIndex is location for new value */ av.currentValue.value = value;
       av.currentValue.valueType = isString;
       av.currentValue.versionTime = now();
       av.currentValue.author = defaults.author;
       if ((f = openDirectoryFile(ATTRIBUTEVALUES)) < 0) return -1;
       if (putAttributeValue(f, valuePtr, &av) == 0) {
                    closeDirectoryFile(f); return -1; }
       closeDirectoryFile(f);
       return result;
} getNodeAttributes(nodeIndex, versionTime, numPairs, bufId)
       int nodeIndex, versionTime, *numPairs, bufId;
/* builds a list of attribute/value pairs attachments in the response buffer
   'bufId' with the number of pairs in 'numPairs'.

Preconditions:  1) project is a valid instance of a graphContext
                   2) nodeIndex is a valid node that existed at time versionTime
   Postconditions: 1) bufId/numPairs contains the list of attribute pairs
                      for node, nodeIndex, that existed at time versionTime.

*/

{      struct nodeEntry    ne;
       int      f;

#if DEBUGTRACE >= 2
       fprintf(trace, "called getNodeAttributes(%d, %d)\n",
                       nodeIndex, versionTime);
#endif
       if (startTransaction(T_ACCESS) == FALSE) return 0;
       if ((f = openDirectoryFile(DIRECTORY)) < 0) goto out2;
```

```
            if (getNodeEntry(f, nodeIndex, &ne) == 0) goto out1;
            closeDirectoryFile(f);
            f = getEntityAttributes(&ne.attributes, versionTime, numPairs,bufId);
            if (f == 0) goto out2;
            commitTransaction();
            return 1;

out1:       closeDirectoryFile(f);
out2:       abortTransaction();
            return 0;
} getLinkAttributes(linkIndex, versionTime, numPairs, bufId)
        int linkIndex, versionTime, *numPairs, bufId;
/* builds a list of attribute/value pairs attachments in the response buffer
   'bufId' with the number of pairs in 'numPairs'.

Preconditions:  1) project is a valid instance of a graphContext
                   2) linkIndex is a valid node that existed at time versionTime
   Postconditions: 1) bufId/numPairs contains the list of attribute pairs
                      for link, linkIndex, that existed at time versionTime.

*/
{       struct  linkEntry       le;
        int     f;

#if DEBUGTRACE >= 2
        fprintf(trace, "called getLinkAttributes(%d, %d)\n",
                       linkIndex, versionTime);
#endif
        if (startTransaction(T_ACCESS) == FALSE) return 0;
        if ((f = openDirectoryFile(LINKENTRIES)) < 0) goto out2;
        if (getLinkEntry(f, linkIndex, &le) == 0) goto out1;
        closeDirectoryFile(f);
        f = getEntityAttributes(&le.attributes, versionTime, numPairs,bufId);
        if (f == 0) goto out2;
        commitTransaction();
        return 1;

out1:   closeDirectoryFile(f);
out2:   abortTransaction();
        return 0;
} static getEntityAttributes(attributePairs, versionTime, numPairs, bufId)
        int versionTime, *numPairs, bufId;
        struct  entityAttributes        *attributePairs;
/* builds a list of attribute/value pairs attachments in the response buffer
   'bufId' with the number of pairs in 'numPairs'.

Preconditions:  1) project is a valid instance of a graphContext
                   2) attributePairs are valid instances
   Postconditions: 1) bufId/numPairs contains the list of attribute pairs
                      for the entity corresponding to attributePairs/otherAttributes,
                      that existed at time versionTime.
*/
{       int     f1, f2, i, j, next, upperLimit;
        struct  entityAttributes        ea, *eaPtr;
        struct  entityAttributeValue    av;
        struct  attributeHistory        ah;

#if DEBUGTRACE >= 2
        fprintf(trace, "called getEntityAttributes(%d)\n", versionTime);
#endif

*numPairs = 0;

if (versionTime == CURRENTVERSION)      versionTime = now();

if ((f1 = openDirectoryFile(ATTRIBUTEVALUES)) < 0) goto out1;
        if ((f2 = openDirectoryFile(ENTITYATTRIBUTES)) < 0) goto out2;

eaPtr = attributePairs;
nextBuf:
        upperLimit = eaPtr->nextAttributeIndex;
        for (i = 0; i < upperLimit; i++) {
            if (getAttributeValue(f1, eaPtr->attributes[i].valuePtr, &av)
                       == 0)
```

```
                    goto out1;
                if ((j = findAttValueVersion(versionTime, &av.currentValue,
                        av.prevIndex, av.previous, &ah)) == -1) goto out1;
                else if (j == 1) {
                    if (ah.valueType != DELETEDATTVALUE) {
                        extractAttributePair(eaPtr->attributes[i].attributeName,
                                ah.value, ah.valueType, bufId);
                        *numPairs = *numPairs + 1;
                    }
                }
            }
            if (eaPtr->next != -1) {
                if (getEntityAttribute(f2, eaPtr->next, &ea) == 0)
                    goto out1;
                eaPtr = &ea;
                goto nextBuf;
            }
            closeDirectoryFile(f1);
            closeDirectoryFile(f2);
            return 1;

out1:   closeDirectoryFile(f2);
out2:   closeDirectoryFile(f1);
            return 0;
} extractAttributePair(attributeIndex, value, isString, bufId)
        int     attributeIndex, value, bufId;
        short   isString;
{       int     s;
        char    *sp;

#if DEBUGTRACE >= 2
        fprintf(trace, "called extractAttributePair(%d, %d, %d)\n",
                attributeIndex, value, isString);
endif appendInt(attributeIndex, bufId);

sp = get_attribute_name(attributeIndex);
        s = strlen(sp) + 1;  /* include null */
        appendBytes(sp, bufId, s);
        appendByte(isString, bufId);
        if (isString) {
            sp = get_string(value);
            s = strlen(sp) + 1;  /* include null */
            appendBytes(sp, bufId, s);
        }
        else    appendInt(value, bufId);
} getAttributeVersions(attributePairs, count, bufId)
        int     *count, bufId;
        struct  entityAttributes    *attributePairs;
/* builds a list of attribute/value pairs versions in the response buffer
   'bufId' with the number of versions in 'count'.

Preconditions:  1) project is a valid instance of a graphContext
                   2) attributePairs/otherAttributes are valid instances
   Postconditions: 1) bufId/count contains the list of attribute pairs versions
                   for the entity corresponding to attributePairs/otherAttributes.
*/
{       struct  attributeHistoryBuffer  ahb;
        struct  entityAttributeValue    av;
        struct  entityAttributes        ea, *eaPtr;
        int     f1, f2, f3, nameLen, pv, i, j, upperLimit, lowerBound;

#if DEBUGTRACE >= 2
        fprintf(trace, "called getAttributeVersions()\n");
#endif

*count = 0;

if ((f1 = openDirectoryFile(ATTRIBUTEVALUES)) < 0) goto out1;
        if ((f2 = openDirectoryFile(ENTITYATTRIBUTES)) < 0) goto out2;
        if ((f3 = openDirectoryFile(ATTRIBUTEHISTORY)) < 0) goto out3;

i = 0; eaPtr = attributePairs;
```

```
nextBuf:
       upperLimit = eaPtr->nextAttributeIndex;
       for (i = 0; i < upperLimit; i++) {
           strcpy(name, get_attribute_name(attributePairs->attributes[i].attributeName));
           strcat(name, " <- ");
           nameLen = strlen(name);
           if (getAttributeValue(f1, eaPtr->attributes[i].valuePtr, &av) == 0)
                   goto out1;

*count = *count + 1;
           formatAttributeUpdate(&av.currentValue, name, nameLen, bufId);
           pv = av.previous;
           lowerBound = av.prevIndex;
           while (pv != -1) {
               if (getAttributeHistory(f3, pv, &ahb) == 0)
                   goto out1;

for (j = lowerBound; j < NUMATTHISTORIES; j++) {
                   *count = *count + 1;
                   formatAttributeUpdate(&ahb.histories[j], name,
                                                   nameLen, bufId);
               }
               lowerBound = 0; /* all bufs except first are full */
               pv = ahb.previous;
           }
       }
       if (eaPtr->next != -1) {
           if (getEntityAttribute(f2, eaPtr->next, &ea) == 0)
                   goto out1;
           else    {
                   eaPtr = &ea;
                   goto nextBuf;
               }
       }
       closeDirectoryFile(f1);
       closeDirectoryFile(f2);
       closeDirectoryFile(f3);
       return 1;

out1:  closeDirectoryFile(f3);
out2:  closeDirectoryFile(f2);
out3:  closeDirectoryFile(f1);
       return 0;
} formatAttributeUpdate(ah, prefix, prefixLen, bufId)
       struct  attributeHistory     *ah;
       char    *prefix;
       int     prefixLen, bufId;
{
       char    *value, *s, intValue[20];
       int     t, valueLen;

appendInt(ah->versionTime, bufId);

if (ah->valueType == DELETEDATTVALUE) {
               value = "deleted";
               prefixLen -= 3; /* clip off '<- ' */
           }
       else if (ah->valueType == STRINGATTVALUE)
               value = get_string(ah->value);
       else    {
               sprintf(intValue, "%d", ah->value);
               value = intValue;
           }
       appendBytes(name, bufId, prefixLen);
       valueLen = strlen(value);
       appendBytes(value, bufId, valueLen);
       appendBytes(": ", bufId, 2);
       appendBytes(" (", bufId, 2);
       s = (char *) get_string(ah->author);
       appendBytes(s, bufId, strlen(s));
       appendByte(')', bufId);

appendByte(0, bufId); /* include null terminator */
} deleteNodeAttribute(nodeIndex, attributeIndex)
       int nodeIndex, attributeIndex;
/* deletes the attribute attributeIndex for node nodeIndex
```

```
    Preconditions:  1) project is a valid instance of a graphContext
                    2) nodeIndex, attributeIndex are a valid indices
    Postconditions: 1) attribute is deleted

*/

{       struct  nodeEntry       ne;
        int     f, shouldArchive;
        short   valueType;

#if DEBUGTRACE >= 2
        fprintf(trace, "called deleteNodeAttribute(%d, %d)\n",
                                        nodeIndex, attributeIndex);
#endif
        if (startTransaction(T_UPDATE) == FALSE) return 0;
        if ((f = openDirectoryFile(DIRECTORY)) < 0) goto out2;
        if (getNodeEntry(f, nodeIndex, &ne) == 0) goto out1;
        closeDirectoryFile(f);
        shouldArchive = (ne.status & ISARCHIVE) != 1;
        valueType = DELETEDATTVALUE;
        if (setEntityAttributeValue(nodeIndex, 1, &ne.attributes,
                shouldArchive, attributeIndex, valueType, "", 0) == -1)
                goto out2;

commitTransaction();
        return 1;

out1:   closeDirectoryFile(f);
out2:   abortTransaction();
        return 0;
} deleteLinkAttribute(linkIndex, attributeIndex)
        int     linkIndex, attributeIndex;
/* deletes the attribute, attributeIndex, for link, linkIndex Preconditions:  1) project is a valid instance of a graphContext
                   2) le is a valid instance of a linkEntry
   Postconditions: 1) attributes are deleted

*/

{       struct  linkEntry       le;
        int     f, shouldArchive;
        short   valueType;

#if DEBUGTRACE >= 2
        fprintf(trace, "called deleteLinkAttribute(%d, %d)\n",
                                        linkIndex, attributeIndex);
#endif
        if (startTransaction(T_UPDATE) == FALSE) return 0;
        if ((f = openDirectoryFile(LINKENTRIES)) < 0) goto out2;
        if (getLinkEntry(f, linkIndex, &le) == 0) goto out1;
        closeDirectoryFile(f);
        shouldArchive = 1; /* must fix this */
        valueType = DELETEDATTVALUE;
        if (setEntityAttributeValue(linkIndex, 0, &le.attributes,
                shouldArchive, attributeIndex, valueType, "", 0) == -1)
                goto out2;

commitTransaction();
        return 1;

out1:   closeDirectoryFile(f);
out2:   abortTransaction();
        return 0;
} destroyNodeAttributes(ne)
        struct nodeEntry *ne;
/* destroys the attributes for a node, reclaiming storage space Preconditions:  1) project is a valid instance of a graphContext
                   2) ne is a valid instance of a nodeEntry
   Postconditions: 1) attributes are destroyed destroyNodeAttributes(ne)
*/

{
```

```
#if DEBUGTRACE >= 2
        fprintf(trace, "called destroyNodeAttributes()\n");
#endif
        return destroyEntityAttributes(&ne->attributes, 1);
} destroyLinkAttributes(le)
        struct linkEntry *le;
/* destroys the attributes for a link, reclaiming storage space Preconditions:   1) project is a valid instance of a graphContext
                     2) le is a valid instance of a linkEntry
    Postconditions:  1) attributes are destroyed destroyLinkAttributes(le)
*/
{
#if DEBUGTRACE >= 2
        fprintf(trace, "called destroyLinkAttributes()\n");
#endif
        return destroyEntityAttributes(&le->attributes, 0);
} static destroyEntityAttributes(attributePairs, isNode)
        struct entityAttributes      *attributePairs;
        int     isNode;
/* destroys the attributes for an entity, reclaiming storage space Preconditions:   1) project is a valid instance of a graphContext
                     2) attributePairs are valid instances
    Postconditions:  1) attributes are destroyed
*/
{
        int     f, i, j, next, upperLimit;
        struct entityAttributes      ea, *eaPtr, *t;
        struct entityAttributeValue  av;
        struct attributeHistory      ah;

#if DEBUGTRACE >= 2
        fprintf(trace, "called destroyEntityAttributes()\n");
endif if ((f = openDirectoryFile(ENTITYATTRIBUTES)) < 0) goto out2;

eaPtr = attributePairs;
nextBuf:
        upperLimit = eaPtr->nextAttributeIndex;
        for (i = 0; i < upperLimit; i++) {
                if (destroyAttributeValue(isNode, eaPtr->attributes[i].valuePtr,
                                eaPtr->attributes[i].attributeName)
                        == 0)
                        goto out1;
        }
        if (eaPtr->next != -1) {
                if (getEntityAttribute(f, eaPtr->next, &ea) == 0)
                        goto out1;
                t = eaPtr; eaPtr = &ea;
                if (t != attributePairs)
                        if (removeEntityAttribute(f, t) == 0) goto out1;
                goto nextBuf;
        }
        closeDirectoryFile(f);
        return 1;

out1: closeDirectoryFile(f);
out2: return 0;
} struct attRec  {
        int     attributeIndex;
        int     crossIndex; };

extractEntityAttributes(attributePairs, versionTime,
                                numAttributes, attributeIndices, bufId)
        struct entityAttributes      *attributePairs;
        int versionTime, numAttributes, attributeIndices[], bufId;
{       int     i, sl, r, f;
        char    *stringValue;
        struct attributeHistory      ah;
        struct entityAttributeValue  av;
        int     valuePtr[100];
```

```
            struct  attRec  ai[100];
#if DEBUGTRACE >= 3
            fprintf(trace, "called extractEntityAttributes(%d)\n", numAttributes);
#endif
        /* because entityAttribute are stored in increasing order on
                attributeIndex, we will sort list of desired atttributes
                and then traverse the two sorted lists in parallel.
            But, we also have to return the attribute values in the order
                requested.  So a crossIndex is maintained to relate the
                sorted value to its index in request order. */
        if (numAttributes == 0) return 1;
        for (i = 0; i < numAttributes; i++) {
                ai[i].attributeIndex = attributeIndices[i];
                ai[i].crossIndex = i;
                }
        sortAttributeIndices(ai, numAttributes);
        initializeSequentialAttributePairSearch();
        for (i = 0; i < numAttributes; i++) {
                if ((r = findSequentialAttributePair(attributePairs,
                    ai[i].attributeIndex, &valuePtr[ai[i].crossIndex])) == -1)
                        return -1;
                else if (r == 0) valuePtr[ai[i].crossIndex] = -1;
                } if (versionTime == CURRENTVERSION)      versionTime = now();

if ((f = openDirectoryFile(ATTRIBUTEVALUES)) < 0) return -1;
        for (i = 0; i < numAttributes; i++) { if (valuePtr[i] == -1)
                        appendByte(2, bufId); /* not defined */
                else    {
                    if (getAttributeValue(f, valuePtr[i], &av) == 0) {
                        closeDirectoryFile(f); return -1;
                        } if ((r = findAttValueVersion(versionTime,
                        &av.currentValue, av.prevIndex, av.previous, &ah)) == -1) {
                        closeDirectoryFile(f); return -1;}
                    else if (r == 0)
                        appendByte(2, bufId); /* not defined */
                    else {

/* assert: ah contains the desired version of the attributeHistory
                    for the attributePair whose attribute == attributeIndex */ if (ah.valueType == DELETEDATTVALUE)
                            appendByte(2, bufId); /* not defined */
                        else if (ah.valueType == STRINGATTVALUE) {
                            stringValue = get_string(ah.value);
                            sl = strlen(stringValue) + 1; /* include null */
                            if (sl > 255) { sl = 255; stringValue[255] = 0;}
                            appendByte(1, bufId); /* is a string */
                            appendBytes(stringValue, bufId, sl);
                            }
                        else    {
                            appendByte(0, bufId); /* is not a string */
                            appendInt(ah.value, bufId);
                            }
                        }
                    }
                }
        closeDirectoryFile(f);
} sortAttributeIndices(ai, numAi)
        int     numAi;
        struct  attRec  ai[];
{ /* quick sort to order in increasing order, of attributeIndex */
        int     l, r, m;
        struct  attRec  temp;

l = 0; r = numAi - 1;
        m = (l + r) / 2;
        while (l <= r) { /* invariant: elements before l are < m,
                                elements beyond r are > m */
                while (ai[l].attributeIndex < ai[m].attributeIndex) l = l + 1;
                while (ai[r].attributeIndex > ai[m].attributeIndex) r = r - 1;
                if (l < r)      { /* exclude swap with itself */
                        bcopy(&ai[l], &temp, sizeof(temp));
```

```
                        bcopy(&ai[r], &ai[l], sizeof(temp));
                        bcopy(&temp, &ai[r], sizeof(temp));
                        }
                if (l <= r)     {
                        l = l + 1; r = r - 1;
                        }
                }
        if (0 < r)      sortAttributeIndices(ai, r + 1);
        if (l < (numAi - 1)) sortAttributeIndices(&ai[l], numAi - l);
}
/* demon.c provides operations on demons of nodes or the graph itself in the
   hypertext graph. This routine runs as part of the directory server. */ include         <sys/types.h>
include         <sys/stat.h>
#include         <sys/file.h>
include         <stdio.h>
include         <setjmp.h> include         "directory.h"
include         "actions.h"
#include         "strings.h"
#include         "errors.h"
#include         "log.h"
#include         "machine.h"

static char      name[200];

getNodeDemonValue(nodeIndex, demonIndex, versionTime, demonValue)
        int   nodeIndex, demonIndex, versionTime;
        char  **demonValue;
/* gets the value for demon 'demonIndex' for node 'nodeIndex'
   at version time 'versionTime'. Returns -1 if operation fails,
   returns 1 if a value is defined for the demon, otherwise returns 0.

Preconditions:  1) project is a valid instance of a graphContext
                   2) nodeIndex is a valid node that existed at time versionTime
   Postconditions: 1) result = 1 implies that demonValue is the value of the
                   demon for that version of the node.

getNodeDemonValue(nodeIndex, demonIndex, versionTime)
                                -> demonValue
*/

{       struct  nodeEntry       ne;
        int     f;

#if DEBUGTRACE >= 2
        fprintf(trace, "called getNodeDemonValue(%d, %d, %d)\n",
                        nodeIndex, demonIndex, versionTime);
#endif
        if ((demonIndex < 0) || (demonIndex > NUMNODEEVENTS)) {
                setError(E_invalid_demon_index, "", 0);
                goto out2;
                }
        if (startTransaction(T_ACCESS) == FALSE) return -1;
        if ((f = openDirectoryFile(DIRECTORY)) < 0) goto out2;
        if (getNodeEntry(f, nodeIndex, &ne) == 0) goto out1;
        closeDirectoryFile(f);
        f = getEntityDemonValue(ne.eventActions,
                        demonIndex, versionTime, demonValue);
        if (f == -1) goto out2;
        commitTransaction();
        return f;

out1:   closeDirectoryFile(f);
out2:   abortTransaction();
        return -1;
} getGraphDemonValue(demonIndex, versionTime, demonValue)
        int    demonIndex, versionTime;
        char   **demonValue;
/* gets the value for demon 'demonIndex' for the hypertext graph
   at version time 'versionTime'. Returns -1 if operation fails,
   returns 1 if a value is defined for the demon, otherwise returns 0.

Preconditions:  1) project is a valid instance of a graphContext
   Postconditions: 1) results = 1 implies that 'demonValue' is the value of the
                   demon for that version of the graph.

getGraphDemonValue(demonIndex, versionTime)
                                -> demonValue
```

```
*/
{       struct  directoryHeader dh;
        int     f;

#if DEBUGTRACE >= 2
        fprintf(trace, "called getGraphDemonValue(%d, %d)\n",
                        demonIndex, versionTime);
#endif
        if ((demonIndex < 0) || (demonIndex > NUMGRAPHEVENTS)) {
                setError(E_invalid_demon_index, "", 0);
                goto out2;
        }
        if (startTransaction(T_ACCESS) == FALSE) return -1;
        if ((f = openDirectoryFile(DIRECTORY)) < 0) goto out2;
        if (getDirectoryHeader(f, &dh) == 0) goto out1;
        closeDirectoryFile(f);
        f = getEntityDemonValue(dh.eventActions, demonIndex, versionTime,
                        demonValue);
        if (f == -1) goto out2;
        commitTransaction();
        return f;

out1:   closeDirectoryFile(f);
out2:   abortTransaction();
        return -1;
} static getEntityDemonValue(eventActions, demonIndex, versionTime, demonValue)
        int demonIndex, versionTime;
        char    **demonValue;
        struct  eventActionHistory      eventActions[];

/* gets the value for demon 'demonStringIndex' for the node or graph
   corresponding to eventActions
   at version time 'versiontTime'. Returns -1 if operation fails,
   returns 1 if a value is defined for the demon, otherwise returns 0.

Preconditions:   1) project is a valid instance of a graphContext
                    2) eventActions are valid instances
                    3) demonIndex is in range of eventActions
   Postconditions:  1) results = 1 implies that demonValue is the value of the
                    demon for that version of the node or graph.

getEntityDemonValue(eventActions, demonIndex, versionTime) ->
                        demonValue
*/
{       struct  eventActionHistory      ah, *ahPtr;
        int     f, i;

#if DEBUGTRACE >= 3
        fprintf(trace, "called getEntityDemonValue()\n");
endif if (versionTime == CURRENTVERSION)      versionTime = now();

ahPtr = &eventActions[demonIndex];

/* assert hpPtr points to the current version of the demon
        whose index == demonIndex */ if (ahPtr->versionTime <= versionTime)  {
                goto foundVersion;
        } if (ahPtr->previous == -1) return 0;

if ((f = openDirectoryFile(EVENTACTIONHISTORY)) < 0) return -1;
        i = ahPtr->previous;
        while (i != -1) {
                if (getEventActionHistory(f, i, &ah) == 0) {
                        closeDirectoryFile(f); return -1;
                }
                if (ah.versionTime <= versionTime) {
                        ahPtr = &ah;
                        goto foundVersion;
                }
```

```
                i = ah.previous;
                }
        /* assert i == -1, implying that the value of the demon was not
                yet defined for this entity at versionTime */
        closeDirectoryFile(f);
        return 0;

foundVersion: /* ahPtr points to the desired version of the demonHistory
        for the demonPair whose index == demonStringIndex */

*demonValue = get_string(ahPtr->eventAction);
        return 1;

} setNodeDemonValue(nodeIndex, demonIndex, demonValue)
        int     nodeIndex, demonIndex;
        char    *demonValue;
/* sets the value for demon 'demonIndex' for node 'nodeIndex'
   Returns 1 if operation succeeds, otherwise returns 0.

Preconditions:  1) project is a valid instance of a graphContext
                   2) nodeIndex is a valid node that exists now
   Postconditions: 1) results = 1 implies that "demonValue" is now the current
                   value of the demon for the node.

setNodeDemonValue(nodeIndex, demonIndex, demonValue);
*/

{       struct  nodeEntry       ne, oldNe;
        int     f, r, shouldArchive;

#if DEBUGTRACE >= 2
        fprintf(trace, "called setNodeDemonValue(%d, %d, %s)\n",
                nodeIndex, demonIndex, demonValue);
#endif
        if ((demonIndex < 0) || (demonIndex > NUMNODEEVENTS)) {
                setError(E_invalid_demon_index, "", 0);
                goto out2;
                }
        if (startTransaction(T_UPDATE) == FALSE) return -1;
        if ((f = openDirectoryFile(DIRECTORY)) < 0) goto out2;
        if (getNodeEntry(f, nodeIndex, &ne) == 0) goto out1;
        closeDirectoryFile(f);
        bcopy(&ne, &oldNe, sizeof(ne)); /* save copy of node entry */
        shouldArchive = (ne.status & ARCHIVE) != 0;
        r = setEntityDemonValue(ne.eventActions, shouldArchive, demonIndex,
                demonValue);
        if (r == -1)    goto out2;
        else {
            if (r == 0) {
                if ((f = openDirectoryFile(DIRECTORY)) < 0) goto out2;
                logPendingTransaction(L_PUTNODE,nodeIndex,&oldNe,sizeof(oldNe));
                if (putNodeEntry(f, nodeIndex, &ne) == 0) goto out1;
                closeDirectoryFile(f);
                }
            commitTransaction();
            return 1;
            } out1:   closeDirectoryFile(f);
out2:   abortTransaction();
        return 0;
}
setGraphDemonValue(demonIndex, demonValue)
        int demonIndex;
        char    *demonValue;
/* sets the value for demon 'demonIndex' for the graph.
   Returns 1 if operation succeeds, otherwise returns 0.

Preconditions:  1) project is a valid instance of a graphContext
   Postconditions: 1) results = 1 implies that "demonValue" is now the current
                   value of the demon for the graph.

setGraphDemonValue(demonIndex, demonValue)
*/

{       struct directoryHeader dh, oldDh;
        int     f, r;
```

```
#if DEBUGTRACE >= 2
        fprintf(trace, "called setGraphDemonValue(%d, %s)\n",
                demonIndex, demonValue);
#endif
        if ((demonIndex < 0) || (demonIndex > NUMGRAPHEVENTS)) {
                setError(E_invalid_demon_index, "", 0);
                goto out2;
        }
        if (startTransaction(T_UPDATE) == FALSE) return -1;
        if ((f = openDirectoryFile(DIRECTORY)) < 0) goto out2;
        if (getDirectoryHeader(f, &dh) == 0) goto out1;
        closeDirectoryFile(f);
        bcopy(&dh, &oldDh, sizeof(dh)); /* save copy of dir header */
        r = setEntityDemonValue(dh.eventActions, 1, demonIndex, demonValue);
        if (r == -1)    goto out2;
        else    {
                if (r == 0) {
                    if ((f = openDirectoryFile(DIRECTORY)) < 0) goto out2;
                    logPendingTransaction(L_PUTDIRHEAD, 0, &oldDh, sizeof(oldDh));
                    if (putDirectoryHeader(f, &dh) == 0) goto out1;
                    closeDirectoryFile(f);
                }
                commitTransaction();
                return 1;
        }
out1:   closeDirectoryFile(f);
out2:   abortTransaction();
        return 0;
} static setEntityDemonValue(eventActions, shouldArchive,
                demonIndex, demonValue)
        int     demonIndex;
        int     shouldArchive;
        char    *demonValue;
        struct  eventActionHistory      eventActions[];

/* sets the value for demon 'demonIndex' for the node or graph
   corresponding to eventActions
   Returns -1 if operation fails,
   returns 1 if operation succeeds and no update is needed to node/link entry,
   otherwise returns 0 implying operation succeeded but update needed to
   node/link entry.

Preconditions:  1) project is a valid instance of a graphContext
                   2) eventActions is a valid instance
                   3) demonIndex is in the range of eventActions
   Postconditions: 1a) results = 1 implies that "demonValue" is now the current
                       value of the demon for the entity.
                   1b) results = 0 implies that "demonValue" is now the current
                       value of the demon for the entity. But an update
                       is needed to the node/graph entry.

setEntityDemonValue(eventActions, shouldArchive, demonIndex, demonValue)
*/
{
        struct  eventActionHistory      *eahPtr, ea;
        int     f, result, index;

#if DEBUGTRACE >= 3
        fprintf(trace, "called setEntityDemonValue()\n");
endif eahPtr = &eventActions[demonIndex];

/* assert eahPtr points to the current version of the demon
        whose index == demonIndex */ ea.eventAction = eahPtr->eventAction;
        ea.versionTime = eahPtr->versionTime;
        ea.previous = eahPtr->previous;
        ea.author = eahPtr->author;

if (demonValue[0] == 0) eahPtr->eventAction = -1;
        else if ((eahPtr->eventAction = put_string(demonValue, 0)) == -1) return -1;

result = 1;
        if (eahPtr->eventAction != ea.eventAction) {
            eahPtr->versionTime = now();
            eahPtr->author = defaults.author;
            result = 0;
```

```
                if (shouldArchive) {
                    if ((f = openDirectoryFile(EVENTACTIONHISTORY)) < 0) return -1;
                    if ((index = addEventActionHistory(f, &ea)) == 0) {
                        closeDirectoryFile(f); return -1;
                    }
                    closeDirectoryFile(f);
                    eahPtr->previous = index;
                }
            } return result;
        } destroyNodeDemons(ne)
            struct  nodeEntry       *ne;
        {
        } getNodeDemons(nodeIndex, versionTime, bufId)
                int nodeIndex, versionTime, bufId;
        /* builds a list of demon/value pairs in the response buffer bufId.

Preconditions:  1) project is a valid instance of a graphContext
                            2) nodeIndex is a valid node that existed at time versionTime
            Postconditions: 1) bufId contains the list of demon pairs
                            for node, nodeIndex, that existed at time versionTime.

*/
        {       struct  nodeEntry       ne;
                int     f;

#if DEBUGTRACE >= 2
                fprintf(trace, "called getNodeDemons(%d, %d)\n",
                            nodeIndex, versionTime);
        #endif
                if (startTransaction(T_ACCESS) == FALSE) return -1;
                if ((f = openDirectoryFile(DIRECTORY)) < 0) goto out2;
                if (getNodeEntry(f, nodeIndex, &ne) == 0) goto out1;
                closeDirectoryFile(f);
                f = getEntityDemons(ne.eventActions, versionTime, 0, bufId);
                if (f == 0) goto out2;
                commitTransaction();
                return 1;

out1:   closeDirectoryFile(f);
        out2:   abortTransaction();
                return 0;
        } getGraphDemons(versionTime, bufId)
                int versionTime, bufId;
        /* builds a list of demon/value pairs for version 'versionTime' of the graph
            in the response buffer bufId.

Preconditions:  1) project is a valid instance of a graphContext
            Postconditions: 1) bufId contains the list of demon pairs
                            for the graph that existed at time versionTime.

*/
        {       struct  directoryHeader dh;
                int     f;

#if DEBUGTRACE >= 2
                fprintf(trace, "called getGraphDemons(%d)\n", versionTime);
        #endif
                if (startTransaction(T_ACCESS) == FALSE) return -1;
                if ((f = openDirectoryFile(DIRECTORY)) < 0) goto out2;
                if (getDirectoryHeader(f, &dh) == 0) goto out1;
                closeDirectoryFile(f);
                f = getEntityDemons(dh.eventActions, versionTime, 1, bufId);
                if (f == 0) goto out2;
                commitTransaction();
                return 1;

out1:   closeDirectoryFile(f);
        out2:   abortTransaction();
                return 0;
        }
```

```
getEntityDemons(eventActions, versionTime, isGraph, bufId)
        int      versionTime, isGraph, bufId;
        struct   eventActionHistory    eventActions[];
/* builds a list of demon/value pairs in the response buffer bufId.

Preconditions:  1) project is a valid instance of a graphContext
                   2) eventActions is a valid instance
   Postconditions: 1) bufId contains the list of demon pairs
                      for the entity corresponding to eventActions,
                      that existed at time versionTime.
*/

{       struct   eventActionHistory    eah;
        int      numEvents, hf, i;

#if DEBUGTRACE >= 2
        fprintf(trace, "called getEntityDemons()\n");
endif if (versionTime == CURRENTVERSION)       versionTime = now();

if ((hf = openDirectoryFile(EVENTACTIONHISTORY)) < 0) goto out;
        i = 0;
        numEvents = (isGraph) ? NUMGRAPHEVENTS : NUMNODEEVENTS;
        for (i = 0; i < numEvents; i++) {
            bcopy(&eventActions[i], &eah, sizeof(eah));
            while ((eah.previous != -1) &&
                    (eah.versionTime > versionTime)) {
                if (getEventActionHistory(hf, eah.previous, &eah) == 0)
                    goto out;
                }
            if (eah.versionTime <= versionTime)  { /* this is a good one */
                    extractDemonPair(i, eah.eventAction, isGraph, bufId);
                    }
            }
        closeDirectoryFile(hf);
        return 1;

out:    closeDirectoryFile(hf);
        return 0;
} formatDemonName(demonIndex, isGraph, bufId)
        int      demonIndex, isGraph, bufId;
{
        if (isGraph)
                switch (demonIndex) {
                        case OPENEDGRAPH:
                                appendBytes("opened graph", bufId, 12);
                                break;
                        case MODIFIEDGRAPH:
                                appendBytes("modified graph", bufId, 14);
                                break;
                        case DELETEDNODE:
                                appendBytes("deleted node", bufId, 12);
                                break;
                        case CREATEDNODE:
                                appendBytes("created node", bufId, 12);
                                break;
                        case DELETEDLINK:
                                appendBytes("deleted link", bufId, 12);
                                break;
                        case CREATEDLINK:
                                appendBytes("created link", bufId, 12);
                                break;
                        }
        else    switch (demonIndex) {
                        case DELETEDNODE2:
                                appendBytes("deleted node", bufId, 12);
                                break;
                        case MODIFIEDNODE:
                                appendBytes("modified link", bufId, 13);
                                break;
                        case OPENEDNODE:
                                appendBytes("opened node", bufId, 11);
                                break;
                        }
}
```

```
extractDemonPair(demonIndex, valueIndex, isGraph, bufId)
        int     demonIndex, valueIndex, isGraph, bufId;
{       int     s;
        char    c, *sp, name[30];

#if DEBUGTRACE >= 2
        fprintf(trace, "called extractDemonPair(%d, %d)\n",
                demonIndex, valueIndex);
endif appendInt(demonIndex, bufId);
        formatDemonName(demonIndex, isGraph, bufId);
        appendByte(0, bufId); /* null terminate */
        if (valueIndex == -1)
                appendByte(0, bufId);
        else    {
                sp = get_string(valueIndex);
                s = strlen(sp) + 1; /* include null */
                appendBytes(sp, bufId, s);
                }
} getDemonVersions(eventActions, isGraph, count, bufId)
        int     *count, isGraph, bufId;
        struct  eventActionHistory      eventActions[];
/* builds a list of demon/value pairs versions in the response buffer
   'bufId' with the number of versions in 'count'.

Preconditions:  1) project is a valid instance of a graphContext
                   2) eventActions are valid instances
   Postconditions: 1) bufId contains the list of demon pairs versions
                   for the entity corresponding to eventActions.

getDemonVersions(eventActions isGraph) -> count
*/
{       struct  eventActionHistory      ah;
        int     nameLen, numEvents, hf, of, pv, i;

#if DEBUGTRACE >= 2
        fprintf(trace, "called getDemonVersions()\n");
#endif

*count = 0;

if ((hf = openDirectoryFile(EVENTACTIONHISTORY)) < 0) goto out;
        i = 0;
        numEvents = (isGraph) ? NUMGRAPHEVENTS : NUMNODEEVENTS;
        for (i = 0; i < numEvents; i++) {
            pv = eventActions[i].previous;
            if ((eventActions[i].eventAction != -1) || (pv != -1)) {
                appendInt(eventActions[i].versionTime, bufId);
                *count = *count + 1;
                formatDemonUpdate(&eventActions[i], i, isGraph, bufId);
                }
            while (pv != -1) {
                if (getEventActionHistory(hf, pv, &ah) == 0) goto out;
                pv = ah.previous;
                if (pv != -1) { /* not initial default null value */
                        appendInt(ah.versionTime, bufId);
                        *count = *count + 1;
                        formatDemonUpdate(&ah, i, isGraph, bufId);
                        }
                }
            }
        closeDirectoryFile(hf);
        return 1;

out:    closeDirectoryFile(hf);
        return 0;
} formatDemonUpdate(dh, demonIndex, isGraph, bufId)
        struct  eventActionHistory      *dh;
        int     demonIndex, isGraph, bufId;
{       char    *value, *s, charValue[20];
        int     t, valueLen;

appendBytes("demon[", bufId, 6);
```

```
            formatDemonName(demonIndex, isGraph, bufId);
            appendBytes("]:= ", bufId, 4);
            if (dh->eventAction != -1) {
                    value = get_string(dh->eventAction);
                    valueLen = strlen(value);
                    appendBytes(value, bufId, valueLen);
                    }
            else    {
                    appendBytes("''", bufId, 2);
                    }
            appendBytes(": (", bufId, 3);
            s = (char *) get_string(dh->author);
            appendBytes(s, bufId, strlen(s));
            appendByte(')', bufId);

appendByte(0, bufId); /* include null terminator */

} initializeDemons(eventActions, time, isGraph)
            struct  eventActionHistory      *eventActions;
            int     time, isGraph;
    {
            int     i, numEvents;

numEvents = (isGraph) ? NUMGRAPHEVENTS : NUMNODEEVENTS;
            for (i = 0; i < numEvents; i++) {
                    eventActions[i].versionTime = time;
                    eventActions[i].previous = -1;
                    eventActions[i].eventAction = -1;
                    eventActions[i].author = defaults.author;
                    }
    } performDemon(eah, vt)
            struct  eventActionHistory *eah;
            int     vt;
    {       char    *action;
            if (eah->eventAction != -1) {
                    action = get_string(eah->eventAction);
                    system(action);
    #if DEBUGTRACE >= 2
                    fprintf(trace, "invoked demon: %s\n", action);
    #endif
                    }

}
    /* direct.c implements the operations on the hypertext directory. */ include         <sys/file.h>
    #include         <setjmp.h>
    #include         <stdio.h> include         "machine.h"
    #include         "directory.h"
    #include         "actions.h"
    #include         "strings.h"
    #include         "errors.h"
    #include         "log.h"
    extern char      *malloc();

extern int       thisHostId;

/*******************************************************************/
    /* routines that support pool of open directories */
    /*******************************************************************/
    static int       numOpenDirFiles, dirFileDesc[NUMDIRECTORYFILES+1];
    #define NUMUPDATEFLAGS 30
    char    wasUpdated[NUMUPDATEFLAGS];
    int     readOnlyDirAccess;

initDirectories()
    {       int i;
            numOpenDirFiles = 0;
            for (i = 1; i <= NUMDIRECTORYFILES + 1; i++)
                    dirFileDesc[i] = -1;
            for (i = 1; i <= NUMUPDATEFLAGS; i++)
                    wasUpdated[i] = 0;
            readOnlyDirAccess = FALSE;
    }
```

```
closeOpenDirectories()
{
        int   i;
        for (i = 1; i <= NUMDIRECTORYFILES + 1; i++)
                if (dirFileDesc[i] != -1) {
                        close(dirFileDesc[i]);
                        dirFileDesc[i] = -1;
                        }
        for (i = 1; i <= NUMUPDATEFLAGS; i++)
                wasUpdated[i] = 0;
        numOpenDirFiles = 0;
        readOnlyDirAccess = FALSE;
} syncUpdatedFiles()
{
        int     i;
        for (i = 1; i <= NUMUPDATEFLAGS; i++)
                if (wasUpdated[i]) {
                        fsync(i);
                        wasUpdated[i] = 0;
                        }
} openDirectoryFile(c)
        int   c;
/* opens the hypertext directory file corresponding to the manifest
   constant 'c' as defined in directory.h.  If success returns a file
   descriptor, else returns -1.

Preconditions: 1) project, an instance of projectContext is valid
   Postconditions: 2) result >= 0 implies result is a file descriptor that
                provides exclusive read/write access to the hypertext directory
                file corresponding to 'c' openDirectoryFile(c) -> aFileDescriptor
*/
{
        int   f;
        f = dirFileDesc[c];
        if (f == -1) {
           if (access(project.dirNames[c], R_OK | W_OK) == 0) {
#ifdef mag
              if ((f = open(project.dirNames[c], O_FOUR , 0)) < 0) {
#else
              if ((f = open(project.dirNames[c], 2)) < 0) {
#endif
                        setError(E_open_dirfile, project.dirNames[c], 0);
                        return -1;
                        }
                }
           else if (access(project.dirNames[c], R_OK) == 0) {
#ifdef mag
              if ((f = open(project.dirNames[c], O_RDONLY , 0)) < 0) {
#else
              if ((f = open(project.dirNames[c], 0)) < 0) {
#endif
                        setError(E_open_dirfile, project.dirNames[c], 0);
                        return -1;
                        }
              else     readOnlyDirAccess = TRUE;
              }
           else { setError(E_open_dirfile, project.dirNames[c], 0);
                        return -1;
                        }
           dirFileDesc[c] = f;
           }
        lseek(f, 0, L_SET);
        wasUpdated[f] = 0;
        return f;
} createDirectoryFile(c)
        int   c;
/* creates the hypertext directory file corresponding to the manifest
   constant 'c' as defined in directory.h.  If success returns a file
   descriptor, else returns -1.

Preconditions: 1) project, an instance of projectContext is valid
   Postconditions: 2) result >= 0 implies result is a file descriptor that
                provides exclusive write access to an empty hypertext directory
                file corresponding to 'c'
```

```
                createDirectoryFile(c) -> aFileDescriptor
    */
    {       int     f;
            f = dirFileDesc[c];
            if (f != -1) { closeDirectoryFile(f); dirFileDesc[c] = -1; }
    #ifdef mag
            if ((f = open(project.dirNames[c], O_RDWR | O_CREAT | O_TRUNC, defaults.mask)) < 0) {
    #else
            if ((f = creat(project.dirNames[c], defaults.mask)) < 0) {
                    setError(E_create_dirfile, project.dirNames[c], 0);
                    return -1;
                    }
            close(f); /* close and open again to establish read/write access */
            if ((f = open(project.dirNames[c], 2)) < 0) {
    #endif
                    setError(E_create_dirfile, project.dirNames[c], 0);
                    return -1;
                    }
            dirFileDesc[c] = f;
            wasUpdated[f] = 0;
            return f;
    } closeDirectoryFile(f)
            int     f;
    /* closed the hypertext directory file corresponding to the file descriptor
        'f'. If success returns 1 else returns 0.

Preconditions: 1) f is a file descriptor for an open file

Postconditions: 2) the file corresponding to f is closed closeDirectoryFile(f)
    */
    {
    } exitDirectoryFile(f)
            int     f;
    /* closed the hypertext directory file corresponding to the file descripto
        'f' and removes it from open table. If success returns 1 else returns 0.

Preconditions: 1) f is a file descriptor for an open file
       Postconditions: 2) the file corresponding to f is closed closeDirectoryFile(f)
    */
    {       int i;
            close(f);
            for (i = 1; i <= NUMDIRECTORYFILES + 1; i++)
                    if (dirFileDesc[i] == f) {
                            dirFileDesc[i] = -1;
                            return 1;}
            return 2; /* didn't find file descriptor */
    }

/**********************************************************************/
    /* routines for accessing directory header */
    /**********************************************************************/ getDirectoryHeader(f, dir)
            int     f;
            struct  directoryHeader *dir;
    /* gets the instance of a directoryHeader from the hypertext directory
       coresponding to 'f'. If success returns 1 else returns 0.

Preconditions: 1) f is a file descriptor for an open hypertext directory
                        as returned by openDirectoryFile(DIRECTORY).
       Postconditions: 2) dir is the instance of a directoryHeader from the
                        hypertext directory coresponding to 'f'.

getHirectoryHeader(f) -> dir
    */
    {
            if (lseek(f, 0, L_SET) == -1) {
                    setError(E_seek_dirfile, "DIRECTORY", 0);
                    return 0;
                    }
```

```c
        if (read(f, dir, sizeof(*dir)) != sizeof(*dir)) {
                setError(E_read_dirfile, "DIRECTORY", 0);
                return 0;
                }
        return 1;
} putDirectoryHeader(f, dir)
        int     f;
        struct  directoryHeader *dir;
/* updates the instance of a directoryHeader from the hypertext directory
   coresponding to 'f'. If success returns 1 else returns 0.

Preconditions: 1) f is a file descriptor for an open hypertext directory
                as returned by openDirectoryFile(DIRECTORY).
                2) dir is a valid instance of a directoryHeader for the
                hypertext directory coresponding to 'f'.
   Postconditions: 1) the instance of a directoryHeader from the
                hypertext directory coresponding to 'f' is equal to dir.

putHirectoryHeader(f, dir)
*/
{
        if (lseek(f, 0, L_SET) == -1) {
                setError(E_seek_dirfile, "DIRECTORY", 0);
                return 0;
                }
        if (write(f, dir, sizeof(*dir)) != sizeof(*dir)) {
                setError(E_write_dirfile, "DIRECTORY", 0);
                return 0;
                }
        wasUpdated[f] = 1;
        return 1;
}

/****************************************************************************/
/* directory file utility routines */
/****************************************************************************/ getNextEmptyEntry(f, entrySize, transOpCode)
        int     f, entrySize;
        int     transOpCode;
        /* checks the fileHeader of the directory file, f, and returns the
        next available entry record or allocates a new one */
{
        struct  emptyEntry      ee;
        struct  fileHeader      fh;
        int     r, v;

if (lseek(f, 0, L_SET) == -1) {
                setError(E_seek_dirfile, "", 0);
                return 0;
                }
        if (read(f, &fh, sizeof(fh)) != sizeof(fh)) {
                setError(E_read_dirfile, "", 0);
                return 0;
                }
        if (fh.nextEmpty == -1) { /* no recycled entried make new one */
                r = (fh.size += 1);
                }
        else    { /* can recycle an old entry */
                struct  emptyEntry      ee;
                if (fh.nextEmpty <= fh.size) {
                    r = fh.nextEmpty;
                    v = (fh.nextEmpty - 1) * entrySize + sizeof(fh);
                    if (lseek(f, v, L_SET) == -1) {
                        setError(E_seek_dirfile, "", 0); return 0; }
                    if (read(f, &ee, sizeof(ee)) != sizeof(ee)) {
                        setError(E_read_dirfile, "", 0); return 0; }
                    fh.nextEmpty = ee.nextEmpty;
                    }
                else    { /* extra robustness !!! */
#if DEBUGTRACE > 0
                    fprintf(trace, "free list ptr %d fixed in %d\n",
                                        fh.nextEmpty, transOpCode);
                    fprintf(stderr, "call norm. free list ptr fixed\n");
#endif
                    r = (fh.size += 1);
                    fh.nextEmpty = -1;
                    }
                }
```

```
                logPendingTransaction(transOpCode, r, 0, 0);
                if (lseek(f, 0, L_SET) == -1) {
                        setError(E_seek_dirfile, "", 0);
                        return 0;
                        }
                if (write(f, &fh, sizeof(fh)) != sizeof(fh)) {
                        setError(E_write_dirfile, "", 0);
                        return 0;
                        }
                return r;
        } removeDirFileEntry(f, entryIndex, entrySize)
        int     f, entryIndex, entrySize;
/* adds entryIndex to the list of free entries in the
   file coresponding to 'f'. If success returns TRUE else returns FALSE.  */
        {
        int     v;
        struct  fileHeader      fh;
        struct  emptyEntry      ee;

/* get the next available entry info */
        v = (entryIndex - 1) * entrySize + sizeof(fh);
        if (lseek(f, 0, L_SET) == -1) {
                setError(E_seek_dirfile, "", 0);
                return 0;
                }
        if (read(f, &fh, sizeof(fh)) != sizeof(fh)) {
                setError(E_read_dirfile, "", 0);
                return 0;
                }
        /* mark the entry as empty */
        if (lseek(f, v, L_SET) == -1) {
                setError(E_seek_dirfile, "", 0);
                return 0;
                }
        ee.mark = EMPTY_MARK; ee.nextEmpty = fh.nextEmpty;
        if (write(f, &ee, sizeof(ee)) != sizeof(ee)) {
                setError(E_write_dirfile, "", 0);
                return 0;
                }
        /* update the next available entries info */
        fh.nextEmpty = entryIndex;
        if (lseek(f, 0, L_SET) == -1) {
                setError(E_seek_dirfile, "", 0);
                return 0;
                }
        if (write(f, &fh, sizeof(fh)) != sizeof(fh)) {
                setError(E_write_dirfile, "", 0);
                return 0;
                }
        return TRUE;
        } isValidEntry(f, entryIndex, entrySize)
        int f, entryIndex, entrySize;
        /* checks to see if entryIndex points to a valid entry instance */
        struct emptyEntry       ee;
        struct fileHeader       fh;
        if (lseek(f, 0, L_SET) == -1) {
                setError(E_seek_dirfile, "", 0);
                return -1;
                }
        if (read(f, &fh, sizeof(fh)) != sizeof(fh)) {
                setError(E_read_dirfile, "", 0);
                return -1;
                }
        if (fh.size < entryIndex) return FALSE;
        if (lseek(f, sizeof(fh) + (entryIndex - 1) * entrySize, L_SET) == -1) {
                setError(E_seek_dirfile, "", 0);
                return -1;
                }
        if (read(f, &ee, sizeof(ee)) != sizeof(ee)) {
                setError(E_read_dirfile, "", 0);
                return -1;
                }
        if (ee.mark == EMPTY_MARK) return FALSE;
        else    return TRUE;
        }
```

```c
/* directory.h contains the definitions of the data structures used to
   represent a hypertext directory. */

/* invariants on the directory data structures
        1) there is a valid node entry for each node index referenced.
        2) there is a valid link entry for each link index referenced
        3) there is a valid string for each string index referenced.
        4) all history lists are ordered in decreasing versionTime,
           and terminated by -1.
        5) in/out link lists (which start at each node entry and are threaded
           through the link entries) are unordered and are terminated by -1.
        6) character positions in link histories refer to corresponding
           versions of node contents; charPosition <= number of characters
           in the contents of the node.
*/ define TRUE    1
define FALSE   0
#define MAXINT  2147483647
#define CURRENTVERSION  0

/* compile time constants */
#define INITIALATTDEFTABLESIZE  97
#define NUMATTPAIRS     10
#define NUMATTHISTORIES 10
#define NUMATTVALUES    10
#define NUMLINKHISTORIES 10
/* conditional compilation flag:
        0 = no trace, 1 = major routines, 2 = all routines */
#define DEBUGTRACE      2

/* file name constants */
#define NUMDIRECTORYFILES       15
#define DIRECTORY       1
        /* '+' contains directoryHeader, and an array of nodeEntry */
#define STRINGCHARS0    2
        /* '-' contains strings */
#define STRINGHASH0     3
        /* '9' contains string hash table */
#define STRINGINDEX0    4
        /* '8' contains string index table */
#define STRINGCHARS1    5
        /* '7' contains temporary string table */
#define STRINGHASH1     6
        /* '6' contains temporary string hash table */
#define STRINGINDEX1    7
        /* '5' contains temporary string index table */
#define LINKENTRIES     8
        /* '4' an array of linkEntry */
#define LINKHISTORY     9
        /* '3' contains an array of linkHistoryBuffer */
#define ATTRIBUTEDEFS   10
        /* '2' contains an array of attributeDef */
#define ATTRIBUTEVALUES 11
        /* '1' contains an array of entityAttributeValue */
#define ATTRIBUTEHISTORY 12
        /* '0' contains an array of attributeHistoryBuffer */
#define ENTITYATTRIBUTES        13
        /* 'Z' contains an array of attributeValueBuffer */
#define EVENTACTIONHISTORY      14
        /* 'Y' contains an array of eventActionHistory */
#define TRANSACTIONLOG  15
        /* 'X' contains a list of uncommitted transactions */

/* commonly used strings, save lookup time */
#define DIRECTORYPATHPREFIX     -1
#define DEFAULTPATHPREFIX       -2

/* graph events */
#define NUMGRAPHEVENTS          6
#define OPENEDGRAPH             0
#define MODIFIEDGRAPH           1
define DELETEDNODE             2 define CREATEDNODE             3
define DELETEDLINK             4
#define CREATEDLINK             5

/* node events */
#define NUMNODEEVENTS           3
#define MODIFIEDNODE            0
#define OPENEDNODE              1
#define DELETEDNODE2            2
```

```
/* entity status bits */
#define ARCHIVE         01
define COMMITTED       02 typedef struct fileHeader    {
        int     size;
        int     nextEmpty;
} FILE_HEADER;

/* NOTE: the first field of each struct that is an entry in a hypertext
        directory file is devised so that the value EMPTY_MARK does not
        occur as a value when the entry is well-formed. Thus, this field
        can be used to determine if the entry is empty. */ define EMPTY_MARK -2 typedef struct emptyEntry    {
        int     mark;
        int     nextEmpty;
} EMPTY_ENTRY;

struct attributeValue {
        short   valueType;
        int     integerValue;
        char    *stringValue;
};

#define INTEGERATTVALUE         0
#define STRINGATTVALUE          1
#define UNDEFINEDATTVALUE       2
#define DELETEDATTVALUE         3
struct attributeHistory {
        int     value;
        int     versionTime;
        short   valueType;
        int     author;
};

typedef struct  attributeHistoryBuffer  { /* previous == EMPTY_MARK if empty */
        int     previous;         /* -1 means none */
        struct  attributeHistory          histories[NUMATTHISTORIES];
} ATT_HIST_BUF;

typedef struct  entityAttributeValue    { /* entity == EMPTY_MARK if empty */
        int     entity; /* ptr to node/link entry that defines this value */
        struct  attributeHistory          currentValue;
        int     previous;  /* ptr to attributeHistoryBuffer, -1 means none */
        short   prevIndex;
} ENT_ATT_VALUE;

typedef struct  attributeValueBuffer    { /* next == EMPTY_MARK if empty */
        int     next;    /* -1 means none */
        struct  entityAttributeValue      values[NUMATTVALUES];
} ATT_VALUE_BUF;

typedef struct  attributeDef    { /* name == EMPTY_MARK if empty */
        int     name;   /* string index of original name */
        int     nodeValuesList; /* -1 means none */
        int     linkValuesList; /* -1 means none */
        short   nextNodeIndex;
        int     nextFreeNodeValuePtr;
        short   nextLinkIndex;
        int     nextFreeLinkValuePtr;
        int     deletionTime, deletor;
        int     creationTime, creator;
} ATT_DEF;

struct  attributePair   {
        int     attributeName;
        int     valuePtr;
};

typedef struct  entityAttributes        { /* next == EMPTY_MARK if empty */
        int     next;   /* -1 means none */
        struct  attributePair   attributes[NUMATTPAIRS];
        short   nextAttributeIndex;
} ENTITY_ATT;

typedef struct  eventActionHistory      { /* previous == EMPTY_MARK if empty */
        int     previous; /* -1 means none */
```

```c
        int     eventAction;
        int     versionTime;
        int     author;
} EVENT_ACT_HIST;

typedef struct nodeEntry        { /* creationTime == EMPTY_MARK if empty */
        int     creationTime;
        int     deletionTime;
        int     lastUpdateTime;
        int     status;
        int     pathPrefix;
        int     creator, deletor;
        struct  entityAttributes        attributes;
        struct  eventActionHistory      eventActions[NUMNODEEVENTS];
    /* in/out links are threaded through link entry file */
        int     firstOutLink, firstInLink;
} NODE_ENTRY;

struct  linkHistory     {
        int     toCharPosition, fromCharPosition;
        int     versionTime;
        int     author;
};

typedef struct linkHistoryBuffer { /* previous == EMPTY_MARK if empty */
        int     previous; /* -1 means none */
        struct  linkHistory     histories[NUMLINKHISTORIES];
} LINK_HIST_BUF;

typedef struct linkEntry        { /* fromNode == EMPTY_MARK if empty */
        int     fromNode, toNode;
        int     toVersionTime, toVersionBound; /* 0 means always current */
        int     fromVersionTime, fromVersionBound; /* 0 means always current */
        int     deletionTime, deletor;
        struct  linkHistory     currentValue;
        short   prevIndex;
        int     previous; /* ptr to linkHistoryBuffer, -1 means none */
        struct  entityAttributes        attributes;
    /* in/out links of a node are threaded through link entry file */
        int     nextOutLink, nextInLink;
} LINK_ENTRY;

typedef struct directoryHeader {
        int     lastUpdateTime;
        int     pathPrefix;
        int     numNodeEntries;
        int     firstFreeNodeEntry;
        int     hostMachine;
        struct  eventActionHistory      eventActions[NUMGRAPHEVENTS];
        int     originalHostMachine, creationTime; /* uniquely identify graph */
        int     parentHostMachine, parentOriginalHost, parentCreationTime; /* derived from */
} DIR_HEADER;

struct  creationDefaults {
        char    defined; /* are these defined yet ? */ int     mask; /* rwe protections for owner/group/all */
        char    *pathPrefixString; /* unix directory for new nodes */
        int     pathPrefixIndex;
        int     author; /* string index for user name */
        char    *authorName; /* string for user name */
        int     prefixLen; /* number of chars in path prefix string */
};

struct  graphContext {
        int     originalHostMachine, creationTime; /* uniquely identify graph */
        int     dirHost;
        int     dirSocketId;
        char    *pathPrefixString;
        char    *dirNames[NUMDIRECTORYFILES + 1];
};

extern  struct  graphContext    project;
extern  struct  creationDefaults defaults;
extern  int     thisHostId;
extern  FILE    *trace;

extern  int     max_lines;
extern  char    *archiveErrors();
extern  char    wasUpdated();
```

```
/* ds_link.c provides operations on links of the hypertext graph.
   this routine runs as part of the directory server. */ include      <sys/types.h>
include      <sys/stat.h>
#include      <sys/file.h>
#include      <stdio.h>
include      <setjmp.h> include      "directory.h"
include      "actions.h"
#include      "log.h"
#include      "machine.h"
#include      "errors.h"

static char   name[222];

getLinksOfNode(firstOutLink, firstInLink, versionTime,
                    numAttributes, attributeIndices, bufId)
       int firstOutLink, firstInLink, versionTime, bufId;
       int numAttributes, attributeIndices[];
/* appends a list of link attachments in the response buffer bufId
   with the number of links in numLinks.

Preconditions: 1) project is a valid instance of a graphContext
   Postconditions: 1) bufId contains the list of link
                      attachments that existed at time versionTime,
                      constructed by following the linked list rooted at firstOutLink,
                      and following the linked list rooted at firstInLink.
*/
{
       struct   linkEntry      le;
       struct   linkHistory    lh;
       int      linkVersionTime, inVersionTime, aVersionTime, charPos;
       int      f, h, nextLink, lvt, pv;
       short    s;

#if DEBUGTRACE >= 2
       fprintf(trace, "called getLinksOfNode(%d, %d, %d, %d, %d)\n",
                      firstOutLink, firstInLink, versionTime,
                      numAttributes);
endif numLinks = 0;
       if ((firstOutLink == -1) & (firstInLink == -1)) return 1;

inVersionTime = versionTime; /* save original version time */
       if (versionTime == CURRENTVERSION) versionTime = now();

if ((f = openDirectoryFile(LINKENTRIES)) < 0) goto out2;
       nextLink = firstOutLink;
       while (nextLink > -1) {
           if (getLinkEntry(f, nextLink, &le) == 0) goto out1;
           if ((le.deletionTime > versionTime) &&
               ((le.fromVersionTime == CURRENTVERSION)
                || ((le.fromVersionTime <= versionTime)
                    && (le.fromVersionBound > versionTime)))) {
               if (le.fromVersionTime == CURRENTVERSION) {
                   /* did it exist yet? */
                   if ((h = findLinkVersion(versionTime, &le.currentValue,
                                  le.prevIndex, le.previous, &lh)) == -1)
                         goto out1;
                   linkVersionTime = CURRENTVERSION;
                   charPos = lh.fromCharPosition;
                   aVersionTime = versionTime;
               }
               else {
                   linkVersionTime = le.fromVersionTime;
                   charPos = le.currentValue.fromCharPosition;
                   aVersionTime = CURRENTVERSION;
                   h = 1;
               } if (h == 1) {
                   /* assert lh was the version of link at time versionTime */
                   appendInt(nextLink, bufId);
                   appendInt(charPos, bufId);
                   appendInt(linkVersionTime, bufId);
                   appendInt(0, bufId); /* is not inLink */
```

```
                    extractEntityAttributes(&le.attributes, aVersionTime,
                            numAttributes, attributeIndices, bufId);
                    numLinks = numLinks + 1;
                    }
                }
            nextLink = le.nextOutLink;
            }
        nextLink = firstInLink;
        while (nextLink > -1) {
            if (getLinkEntry(f, nextLink, &le) == 0) goto out1;
            if ((le.deletionTime > versionTime) &&
                ((le.toVersionTime == CURRENTVERSION)
                 || ((le.toVersionTime <= versionTime)
                     && (le.toVersionBound > versionTime)))) {
                if (le.toVersionTime == CURRENTVERSION) {
                    /* did it exist yet? */
                    if ((h = findLinkVersion(versionTime, &le.currentValue,
                            le.previndex, le.previous, &lh)) == -1)
                        goto out1;
                    linkVersionTime = CURRENTVERSION;
                    charPos = lh.toCharPosition;
                    aVersionTime = versionTime;
                    }
                else    {
                    linkVersionTime = le.toVersionTime;
                    charPos = le.currentValue.toCharPosition;
                    aVersionTime = CURRENTVERSION;
                    h = 1;
                    }
                if (h == 1) {
                    /* assert lh was the version of link at time versionTime */
                    appendInt(nextLink, bufId);
                    appendInt(charPos, bufId);
                    appendInt(linkVersionTime, bufId);
                    appendInt(1, bufId); /* is in link */
                    extractEntityAttributes(&le.attributes, aVersionTime,
                            numAttributes, attributeIndices, bufId);
                    numLinks = numLinks + 1;
                    }
                }
            nextLink = le.nextInLink;
            }
        closeDirectoryFile(f);
        return 1;

out1:   closeDirectoryFile(f);
out2:   return 0;
} updateLinksOfNode(versionTime, shouldArchive)
        int versionTime, shouldArchive;
/* updates a list of link attachments using the global variable 'links'
   with the number of links in 'numLinks'.

Preconditions:  1) project is a valid instance of a graphContext
   Postconditions: 1) the version of link attachments with a creation time of
                versionTime, constructed by following the linked list rooted
                at firstOutLink and following the linked list rooted at
                firstInLink, is equal to the link attachments in links/numLinks.

updateLinksOfNode(versionTime, shouldArchive)
*/

{       struct  linkEntry       le;
        struct  linkHistory     lh;
        struct  linkHistoryBuffer       lhb;
        int     f, h, i, nh, needsUpdate;
#if DEBUGTRACE >= 2
        fprintf(trace, "called updateLinksOfNode(%d, %d)\n",
                                        versionTime, shouldArchive);
endif if (numLinks == 0) return 1;
        if ((f = openDirectoryFile(LINKENTRIES)) < 0) return 0;
        if ((h = openDirectoryFile(LINKHISTORY)) < 0) goto out2;
        for (i = 0; i < numLinks; i++)  {
            if (getLinkEntry(f, links[i].linkIndex, &le) == 0) goto out1;
            logPendingTransaction(L_FUTLINK, links[i].linkIndex, &le, sizeof(le));
            needsUpdate = 0;
            if (links[i].isInLink == 1) {
```

```c
                if (le.toVersionTime == CURRENTVERSION) {
                    if (le.currentValue.toCharPosition
                                    != links[i].charPosition) {
                        if (shouldArchive) {
                            if (saveLinkHistory(&le, h) == 0) goto out1;
                            le.currentValue.versionTime = versionTime;
                        }
                        le.currentValue.toCharPosition
                                        = links[i].charPosition;
                        needsUpdate = 1;
                        le.currentValue.author = defaults.author;
                    }
                }
                else if (le.toVersionBound == MAXINT) {
                    le.toVersionBound = versionTime;
                    needsUpdate = 1;
                }
            }
            else { /* assert links[i].isInLink == 0 */
                if (le.fromVersionTime == CURRENTVERSION) {
                    if (le.currentValue.fromCharPosition
                                    != links[i].charPosition) {
                        if (shouldArchive) {
                            if (saveLinkHistory(&le, h) == 0) goto out1;
                            le.currentValue.versionTime = versionTime;
                        }
                        le.currentValue.fromCharPosition
                                        = links[i].charPosition;
                        needsUpdate = 1;
                        le.currentValue.author = defaults.author;
                    }
                }
                else if (le.fromVersionBound == MAXINT) {
                    le.fromVersionBound = versionTime;
                    needsUpdate = 1;
                }
            }
            if (needsUpdate) {
                if (putLinkEntry(f, links[i].linkIndex, &le) == 0)
                        goto out1;
            }
        }
        closeDirectoryFile(h);
        closeDirectoryFile(f);
        return 1;

out1:   closeDirectoryFile(h);
out2:   closeDirectoryFile(f);
        return 0;
} saveLinkHistory(le, h)
        struct  linkEntry       *le;
        int     h;
{       int     i;
        struct  linkHistoryBuffer       lhb;

if (le->prevIndex == 0) {
            lhb.previous = le->previous;

i = NUMLINKHISTORIES - 1;
                le->prevIndex = i;
                lhb.histories[i].versionTime = le->currentValue.versionTime;
                lhb.histories[i].toCharPosition = le->currentValue.toCharPosition;
                lhb.histories[i].fromCharPosition = le->currentValue.fromCharPosition;
                lhb.histories[i].author = le->currentValue.author;
                if ((i = addLinkHistory(h, &lhb)) == 0)
                        return 0;
                le->previous = i;
        }
        else {
                if (getLinkHistory(h, le->previous, &lhb) == 0)
                        return 0;
                le->prevIndex -= 1;
                i = le->prevIndex;
                lhb.histories[i].versionTime = le->currentValue.versionTime;
                lhb.histories[i].toCharPosition = le->currentValue.toCharPosition;
                lhb.histories[i].fromCharPosition = le->currentValue.fromCharPosition;
                lhb.histories[i].author = le->currentValue.author;
                /* do not need to logPendingTransaction for lhb because it is
                        shadowed by le */
```

```
            if (putLinkHistory(h, le->previous, &lhb) == 0)
                return 0;
        }
        return 1;
} getToNode(linkIndex, linkVersion, nodeIndex, versionTime)
        int linkIndex, linkVersion, *nodeIndex, *versionTime;
/* returns the nodeIndex and versionTime corresponding to the node at the
   destination of version linkVersion of the link corresponding to linkIndex.

Preconditions:  1) project is a valid instance of a graphContext
                   2) the link corresponding to linkIndex existed in the graph
                      at time linkVersion
   Postconditions: 1) nodeIndex and versionTime specify the node at the
                      destination of the link corresponding to version linkVersion
                      of linkIndex.

getToNode(linkIndex, linkVersion) -> nodeIndex, versionTime
*/

{       struct  linkEntry       le;
        struct  linkHistory     lh;
        int     f, i, inLinkVersion;

#if DEBUGTRACE >= 1
        fprintf(trace, "called getToNode(%d, %d)\n", linkIndex, linkVersion);
endif inLinkVersion = linkVersion;
        if (linkVersion == CURRENTVERSION) linkVersion = now();

if (startTransaction(T_ACCESS) == FALSE) return 0;
        if ((f = openDirectoryFile(LINKENTRIES)) < 0) goto out2;
        if (getLinkEntry(f, linkIndex, &le) == 0) goto out1;
        closeDirectoryFile(f);
        *nodeIndex = le.toNode;

if (linkVersion > le.deletionTime) {
                setError(E_link_deleted, "getting to node", 0);
                goto out1;
        } if (le.toVersionTime != CURRENTVERSION) {
                *versionTime = le.toVersionTime;
                commitTransaction();
                return 1;
        } i = findLinkVersion(linkVersion, &le.currentValue,
                        le.prevIndex, le.previous, &lh);
        if (i < 0) goto out2;
        else if (i == 0) {
                setError(E_link_not_yet_defined, "getting to node", 0);
                goto out1;
        }

*versionTime = inLinkVersion;
        commitTransaction();
        return 1;
out1:   closeDirectoryFile(f);
out2:   abortTransaction();
        return 0;
} getFromNode(linkIndex, linkVersion, nodeIndex, versionTime)
        int linkIndex, *nodeIndex, *versionTime;

/* returns the nodeIndex and versionTime corresponding to the node at the
   source of version linkVersion of the link corresponding to linkIndex.

Preconditions:  1) project is a valid instance of a graphContext
                   2) the link corresponding to linkIndex existed in the graph
                      at version time linkVersion
   Postconditions: 1) nodeIndex and versionTime specify the node at the
                      source of the link corresponding to version linkVersion
                      of linkIndex.
```

```
        getFromNode(linkIndex, linkVersion) -> nodeIndex, versionTime
*/
{       struct  linkEntry       le;
        struct  linkHistory     lh;
        int     f, i, inLinkVersion;
#if DEBUGTRACE >= 1
        fprintf(trace, "called getFromNode(%d, %d)\n", linkIndex, linkVersion);
endif inLinkVersion = linkVersion;
        if (linkVersion == CURRENTVERSION) linkVersion = now();

if (startTransaction(T_ACCESS) == FALSE) return 0;
        if ((f = openDirectoryFile(LINKENTRIES)) < 0) goto out2;
        if (getLinkEntry(f, linkIndex, &le) == 0) goto out1;
        closeDirectoryFile(f);
        *nodeIndex = le.fromNode;

if (linkVersion > le.deletionTime) {
                setError(E_link_deleted, "getting from node", 0);
                goto out1;
        } if (le.fromVersionTime != CURRENTVERSION) {
                *versionTime = le.fromVersionTime;
                commitTransaction();
                return 1;
        } i = findLinkVersion(linkVersion, &le.currentValue,
                        le.prevIndex, le.previous, &lh);
        if (i < 0) goto out2;
        else if (i == 0) {
                setError(E_link_not_yet_defined, "getting from node", 0);
                goto out1;
        }

*versionTime = inLinkVersion;
        commitTransaction();
        return 1;

out1:   closeDirectoryFile(f);
out2:   abortTransaction();
        return 0;

} getLinkVersion(linkIndex, linkVersion, link, lh)
        int     linkIndex, linkVersion;
        struct  linkEntry *link;
        struct  linkHistroy *lh;
/* returns the linkEntry and linkHistroy corresponding to the linkVersion of
   linkIndex.

Preconditions:  1) project is a valid instance of a graphContext
                   2) the link corresponding to linkIndex existed in the graph
                      at time linkVersion
   Postconditions: 1)  link and lh correspond to version linkVersion
                      of linkIndex.

*/

{       int     f, i, lvt, pv, inLinkVersion;

#if DEBUGTRACE >= 1
        fprintf(trace, "called getToNode(%d, %d)\n", linkIndex, linkVersion);
endif inLinkVersion = linkVersion;
        if (linkVersion == CURRENTVERSION) linkVersion = now();

if ((f = openDirectoryFile(LINKENTRIES)) < 0) return 0;
        if (getLinkEntry(f, linkIndex, link) == 0) {
                closeDirectoryFile(f); return 0; }
        closeDirectoryFile(f);

if (linkVersion > link->deletionTime) return 0;

if (findLinkVersion(linkVersion, &link->currentValue,
                        link->prevIndex, link->previous, lh) != 1)
                return 0;
```

```
        return 1;
} getLinkVersions(firstInLink, firstOutLink, count, bufId)
        int     firstInLink, firstOutLink, *count;
/* builds a list of link attachments in the response buffer bufId
   also returns count of number of versions Preconditions:  1) project is a valid instance of a graphContext
   Postconditions: 1) bufId contains the list of link versions
                      constructed by following the linked list rooted at firstInLink,
                      and by following the linked list rooted at firstOutLink.

*/
{       struct  linkEntry       le;
        struct  linkHistoryBuffer       lhb;
        int     i, lowerLimit, f, h, nextLink, pv, previous;

#if DEBUGTRACE >= 2
        fprintf(trace, "called getLinksVersions(%d, %d)\n",
                                        firstInLink, firstOutLink);
#endif

*count = 0;
        if ((firstInLink == -1) && (firstOutLink == -1)) return 1;

if ((f = openDirectoryFile(LINKENTRIES)) < 0) return 0;
        if ((h = openDirectoryFile(LINKHISTORY)) < 0) goto out2;
        nextLink = firstOutLink;
        while (nextLink > -1) {
                if (getLinkEntry(f, nextLink, &le) == 0) goto out1;
                if (le.deletionTime != MAXINT) {
                        appendInt(le.deletionTime, bufId);
                        *count = *count + 1;

formatLinkDeletion(&le, bufId);
                }
                pv = (le.previous == -1);
                if (le.fromVersionTime != CURRENTVERSION)
                        appendInt(le.fromVersionTime, bufId);
                else
                        appendInt(le.currentValue.versionTime, bufId);
                *count = *count + 1;
                formatLinkUpdate(&le.currentValue, pv, bufId);
                lowerLimit = le.prevIndex;
                previous = le.previous;
                while (previous != -1) {
                        if (getLinkHistory(h, previous, &lhb) == 0) goto out1;
                        for (i = lowerLimit; i < NUMLINKHISTORIES; i++) {
                                pv = (lhb.previous == -1) && (i == NUMLINKHISTORIES - 1);
                                if (le.fromVersionTime != CURRENTVERSION)
                                        appendInt(le.fromVersionTime, bufId);
                                else
                                        appendInt(lhb.histories[i].versionTime, bufId);
                                *count = *count + 1;
                                formatLinkUpdate(&lhb.histories[i], pv, bufId);
                        }
                        lowerLimit = 0;
                        previous = lhb.previous;
                }
                nextLink = le.nextOutLink;
        }
        nextLink = firstInLink;
        while (nextLink > -1) {
                if (getLinkEntry(f, nextLink, &le) == 0) goto out1;
                if (le.deletionTime != MAXINT) {
                        appendInt(le.deletionTime, bufId);
                        *count = *count + 1;
                        formatLinkDeletion(&le, bufId);
                } pv = (le.previous == -1);
                if (le.toVersionTime != CURRENTVERSION)
                        appendInt(le.toVersionTime, bufId);
                else
                        appendInt(le.currentValue.versionTime, bufId);
                *count = *count + 1;
                formatLinkUpdate(&le.currentValue, pv, bufId);
                lowerLimit = le.prevIndex;
                previous = le.previous;
                while (previous != -1) {
```

```
            if (getLinkHistory(h, previous, &lhb) == 0) goto out1;
            for (i = lowerLimit; i < NUMLINKHISTORIES; i++) {
                pv = (lhb.previous == -1) && (i == NUMLINKHISTORIES - 1);
                if (le.toVersionTime != CURRENTVERSION)
                    appendInt(le.toVersionTime, bufId);
                else
                    appendInt(lhb.histories[i].versionTime, bufId);
                *count = *count + 1;
                formatLinkUpdate(&lhb.histories[i], pv, bufId);
            }
            lowerLimit = 0;
            previous = lhb.previous;
            }
            nextLink = le.nextInLink;
        }
        closeDirectoryFile(h);
        closeDirectoryFile(f);
        return 1;

out1:   closeDirectoryFile(h);
out2:   closeDirectoryFile(f);
        return 0;
} formatLinkDeletion(le, bufId)
        struct  linkEntry       *le;
        int     bufId;
{       int     t;
        char    *s;
        appendBytes("deleted link: ", bufId, 14);
        appendBytes(" (", bufId, 2);
        s = (char *) get_string(le->deletor);
        appendBytes(s, bufId, strlen(s));
        appendByte(')', bufId);
        appendByte(0, bufId); /* include null terminator */
} formatLinkUpdate(lh, isCreation, bufId)
        struct  linkHistory     *lh;
        int     isCreation, bufId;
{       int     t;
        char    *s;
        if (isCreation)
                appendBytes("added link: ", bufId, 12);
        else    appendBytes("updated link: ", bufId, 14);
        appendBytes(" (", bufId, 2);
        s = (char *) get_string(lh->author);
        appendBytes(s, bufId, strlen(s));
        appendByte(')', bufId);

appendByte(0, bufId); /* include null terminator */
} deleteLinksOfNode(firstOutLink, firstInLink, deletionTime)
        int firstOutLink, firstInLink, deletionTime;
/* deletes links from a node Preconditions:  1) project is a valid instance of a graphContext
    Postconditions: 1) links from/to node are deleted deleteLinksOfNode(firstOutLink, firstInLink, deletionTime)
*/
{       struct  linkEntry       le;
        struct  directoryHeader dir;
        int     dirOk, f, nextLink, numLinks;

#if DEBUGTRACE >= 2
        fprintf(trace, "called deleteLinksOfNode(%d, %d, %d)\n",
                        firstOutLink, firstInLink, deletionTime);
endif numLinks = 0;
        if ((firstOutLink == -1) & (firstInLink == -1)) return 1;

dirOk = 1;
        if ((f = openDirectoryFile(DIRECTORY)) < 0) dirOk = 0;
        if (getDirectoryHeader(f, &dir) == 0) dirOk = 0;
        closeDirectoryFile(f);
```

```
        if ((f = openDirectoryFile(LINKENTRIES)) < 0) return 0;
    nextLink = firstOutLink;
    while (nextLink > -1) {
        if (getLinkEntry(f, nextLink, &le) == 0) goto out1;
        logPendingTransaction(L_PUTLINK, nextLink, &le, sizeof(le));
        if (le.deletionTime == MAXINT) {
            le.deletionTime = deletionTime;
            le.deletor = defaults.author;
            if (putLinkEntry(f, nextLink, &le) == 0) goto out1;
        }
        nextLink = le.nextOutLink;
        if (dirOk) {
            performDemon(&dir.eventActions[DELETEDLINK], 0);
            performDemon(&dir.eventActions[MODIFIEDGRAPH], 0);
        }
    }
    nextLink = firstInLink;
    while (nextLink > -1) {
        if (getLinkEntry(f, nextLink, &le) == 0) goto out1;

if (le.deletionTime == MAXINT) {
            logPendingTransaction(L_PUTLINK, nextLink, &le, sizeof(le));
            le.deletionTime = deletionTime;
            le.deletor = defaults.author;
            if (putLinkEntry(f, nextLink, &le) == 0) goto out1;
        }
        nextLink = le.nextInLink;
        if (dirOk) {
            performDemon(&dir.eventActions[DELETEDLINK], 0);
            performDemon(&dir.eventActions[MODIFIEDGRAPH], 0);
        }
    } closeDirectoryFile(f);
    return 1;

out1:   closeDirectoryFile(f);
        return 0;
} deleteLink(linkIndex)
        int linkIndex;
/* deletes a link

Preconditions:  1) project is a valid instance of a graphContext
                   2) link exists in current version of graph
   Postconditions: 1) link is deleted deleteLink(firstOutLink, firstInLink, deletionTime)
*/
{       struct  linkEntry       le;
        struct  directoryHeader dir;
        int     f, time;

#if DEBUGTRACE >= 2
        fprintf(trace, "called deleteLink(%d)\n", linkIndex);
#endif
        if (startTransaction(T_UPDATE) == FALSE) return 0;
        if ((f = openDirectoryFile(LINKENTRIES)) < 0) goto out2;
        if (getLinkEntry(f, linkIndex, &le) == 0) goto out1;
        time = now();
        if (le.deletionTime < time) goto out1; /* already deleted */
        logPendingTransaction(L_PUTLINK, linkIndex, &le, sizeof(le));
        le.deletionTime = time;
        le.deletor = defaults.author;
        if (putLinkEntry(f, linkIndex, &le) == 0) goto out1;
        closeDirectoryFile(f);

if ((f = openDirectoryFile(DIRECTORY)) < 0) goto out2;
        if (getDirectoryHeader(f, &dir) == 0) goto out1;
        closeDirectoryFile(f);

performDemon(&dir.eventActions[DELETEDLINK], 0);
        performDemon(&dir.eventActions[MODIFIEDGRAPH], 0);

commitTransaction();
        return 1;

out1:   closeDirectoryFile(f);
out2:   abortTransaction();
        return 0;
}
```

```
destroyLink(linkIndex)
        int linkIndex;
/* destroys a link, reclaiming its storage space Preconditions:  1) project is a valid instance of a graphContext
                    2) link exists in current version of graph
    Postconditions: 1) link is deleted destroyLink(linkIndex)
*/

{       struct  linkEntry       le;
        struct  directoryHeader dir;
        int     f, time;

#if DEBUGTRACE >= 2
        fprintf(trace, "called destroyLink(%d)\n", linkIndex);
#endif
        if (startTransaction(T_UPDATE) == FALSE) return 0;
        if ((f = openDirectoryFile(LINKENTRIES)) < 0) goto out2;
        if (getLinkEntry(f, linkIndex, &le) == 0) goto out1;
        if (destroyLinkAttributes(&le)) goto out1;
        logPendingTransaction(L_DESTROYLINK, linkIndex, &le, sizeof(le));
        if (removeLinkEntry(f, linkIndex) == 0) goto out1;
        closeDirectoryFile(f);

if ((f = openDirectoryFile(DIRECTORY)) < 0) goto out2;
        if (getDirectoryHeader(f, &dir) == 0) goto out1;
        closeDirectoryFile(f);

performDemon(&dir.eventActions[DELETEDLINK], 0);
        performDemon(&dir.eventActions[MODIFIEDGRAPH], 0);

commitTransaction();
        return 1;

out1:   closeDirectoryFile(f);
out2:   abortTransaction();
        return 0;
} destroyLinksOfNode(firstOutLink, firstInLink)
        int firstOutLink, firstInLink;
/* destroys links from a node, reclaiming storage space Preconditions:  1) project is a valid instance of a graphContext
    Postconditions: 1) links from/to node are destroyed destroyLinksOfNode(firstOutLink, firstInLink, deletionTime)
*/

{       struct  linkEntry       le;
        struct  linkHistory     lh;
        int     f, nextLink;
        char    dirOk;
        struct  directoryHeader dir;

#if DEBUGTRACE >= 2
        fprintf(trace, "called destroyLinksOfNode(%d, %d)\n",
                        firstOutLink, firstInLink);
endif numLinks = 0;
        if ((firstOutLink == -1) & (firstInLink == -1)) return 1;

dirOk = 1;
        if ((f = openDirectoryFile(DIRECTORY)) < 0) dirOk = 0;
        if (getDirectoryHeader(f, &dir) == 0) dirOk = 0;
        closeDirectoryFile(f);

if ((f = openDirectoryFile(LINKENTRIES)) < 0) return 0;
        nextLink = firstOutLink;
        while (nextLink > -1) {
            if (getLinkEntry(f, nextLink, &le) == 0) goto out1;
            if (destroyLinkAttributes(&le)) goto out1;
            logPendingTransaction(L_DESTROYLINK, nextLink, &le, sizeof(le));
            if (removeLinkEntry(f, nextLink) == 0) goto out1;
            nextLink = le.nextOutLink;
            if (dirOk) {
                performDemon(&dir.eventActions[DELETEDLINK], 0);
                performDemon(&dir.eventActions[MODIFIEDGRAPH], 0);
                }
```

```
            }
            nextLink = firstInLink;
            while (nextLink > -1) {
                if (getLinkEntry(f, nextLink, &le) == 0) goto out1;
                if (destroyLinkAttributes(&le)) goto out1;
                logPendingTransaction(L_DESTROYLINK, nextLink, &le, sizeof(le));
                if (removeLinkEntry(f, nextLink) == 0) goto out1;
                nextLink = le.nextInLink;
                if (dirOk) {
                    performDemon(&dir.eventActions[DELETEDLINK], 0);
                    performDemon(&dir.eventActions[MODIFIEDGRAPH], 0);
                }
            }
        }
        closeDirectoryFile(f);
        return 1;

cut1:   closeDirectoryFile(f);
        return 0;
}
/* node.c provides operations on nodes of the hypertext graph.
   this routine runs as part of the directory server. */ include     <sys/types.h>
include     <sys/stat.h>
#include     <sys/file.h>
#include     <stdio.h>
include     <setjmp.h> include     "directory.h"
include     "actions.h"
#include     "strings.h"
#include     "errors.h"
#include     "log.h"

static char     name[200];

OpenNode(nodeIndex, versionTime, numNodeAttributes, nodeAttributeIndices,
         numLinkAttributes, linkAttributeIndices,
         linkCount, timeStamp, bufId, data, dataSize)
    int     nodeIndex, versionTime, *timeStamp, *linkCount, bufId;
    int     numNodeAttributes, numLinkAttributes;
    int     nodeAttributeIndices[], linkAttributeIndices[];
    int     *dataSize;
    char    **data;
/* opens the node corresponding to nodeIndex retuning its contents,
   its link attachments and a list of attribute values corresponding to
   'nodeAttributeIndices'. If the node is an archive then opens the version
   specified by versionTime. The link attachment info is returned via the
   response buffer bufId and includes values for attributes
   'linkAttributesIndices' for each link. The node contents
   are returned via the pair data/dataSize.
   Returns 0 if operation fails, +1 if operation carried to completion.

Preconditions: 1) the node corresponding to nodeIndex exists
                  2) if the node is an archive, the node was created before or at
                     versionTime.
                  3) if access is to current version of the node then
                     status of the node is committed.
   Postconditions: 1) bufId contains link attachments of desired
                      version of node.
                   2) result == +1 implies (data/dataSize contains contents of
                      desired version of node) and timeStamp is time of that version.

*/
{
        struct  nodeEntry       ne;
        int     i, t, f, mask, size, vt;
        char    b, isArchive;
        struct  stat    statBuf;

#if DEBUGTRACE >= 1
        fprintf(trace, "called OpenNode(%d, %d)\n",
                       nodeIndex, versionTime);
#endif
        if (startTransaction(T_ACCESS) == FALSE) return 0;
        if ((f = openDirectoryFile(DIRECTORY)) < 0) goto out2;
        if (getNodeEntry(f, nodeIndex, &ne) == 0) goto out1;
        closeDirectoryFile(f);
```

```
          if (versionTime == CURRENTVERSION)
                  vt = now();
          else    vt = versionTime;
          if ((ne.creationTime > vt) || (ne.deletionTime < vt)) {
                  setError(E_invalid_version_time, "", 8);
                  goto out1;
                  } isArchive = (char ) ne.status & ARCHIVE;
          makeFileName(ne.pathPrefix, nodeIndex, name);
          if (getNode(name, isArchive, versionTime, data, dataSize) == 0)
                          goto out2;
          if (getLinksOfNode(ne.firstOutLink, ne.firstInLink, versionTime,
                          numLinkAttributes, linkAttributeIndices, build) == 0)
                  goto out2;
          *linkCount = numLinks;

if (versionTime == CURRENTVERSION)
                  *timeStamp = ne.lastUpdateTime;
          else    *timeStamp = versionTime;

extractEntityAttributes(&ne.attributes, versionTime,
                  numNodeAttributes, nodeAttributeIndices, build);

performDemon(&ne.eventActions[OPENEDNODE], 8);
          commitTransaction();
          return 1;

out1:     closeDirectoryFile(f);
out2:     abortTransaction();
          return 0;
}

ModifyNode(nodeIndex, timeStamp, versionTime, data, dataSize)
          int     nodeIndex, timeStamp, *versionTime, dataSize;
          char    *data;
/* modifies the node corresponding to nodeIndex altering its contents and
   link attachments. The link attachment info
   is passed via the global variable pair links/numLinks. The node contents
   are passed via the variable pair data/dataSize.
   Returns 0 if operation fails, +1 if operation carried to completion.

Preconditions:  1) the node corresponding to nodeIndex exists
                   2) the creation time of the current version == timeStamp.
                   3) status of the node is committed.
   Postconditions: 1) current version of node contains link attachments equal
                      to links/numLinks.
                   2) result == +1 implies (current version of node contains
                      contents equal to data/dataSize)
                      and (versionTime is the version time of the chaked-out node).

ModifyNode(nodeIndex, timeStamp) -> versionTime
*/
{
          struct  directoryHeader dir;
          struct  nodeEntry       ne;
          int     f, i, vt, shouldArchive;
          char    isArchive;

#if DEBUGTRACE >= 1
          fprintf(trace, "called ModifyNode(%d, %d)\n", nodeIndex, timeStamp);
#endif
          *versionTime = vt = now();

if (startTransaction(T_UPDATE) == FALSE) return 0;
          if ((f = openDirectoryFile(DIRECTORY)) < 0) goto out2;
          if (getDirectoryHeader(f, &dir) == 0) goto out1;
          if (getNodeEntry(f, nodeIndex, &ne) == 0) goto out1;

if (timeStamp != ne.lastUpdateTime) {
                  setError(E_outdated_timestamp, "", 8);
                  goto out1;
                  } shouldArchive = (ne.status & ARCHIVE) != 0;
          if (updateLinksOfNode(vt, shouldArchive) == 0) goto out1;

/* update contents */ makeFileName(ne.pathPrefix, nodeIndex, name);
          isArchive = (char ) ne.status & ARCHIVE;

performDemon(&ne.eventActions[OPENEDNODE], 8);
          performDemon(&dir.eventActions[MODIFIEDGRAPH], 8);
```

```
            if (putNode(name, isArchive, vt, data, dataSize) == 1) {
                    logPendingTransaction(L_PUTNODE, nodeIndex, &ne, sizeof(ne));
                    ne.lastUpdateTime = vt;
                    ne.deletor = defaults.author;  /* save who updated file here */
                    if (putNodeEntry(f, nodeIndex, &ne) == 0) goto out1;
                    closeDirectoryFile(f);
                    commitTransaction();
                    return 1;
            } out1:   closeDirectoryFile(f);
out2:   abortTransaction();
        return 0;
}

DeleteNode(nodeIndex)
        int     nodeIndex;
/* deletes the node corresponding to nodeIndex.
   attachments. If the node is a file then also deletes its links,
   and attributes, and demons recliaming storage space.
   Returns 0 if operation fails, +1 if operation carried to completion.

Preconditions: 1) the node corresponding to nodeIndex exists
   Postconditions:

DeleteNode(nodeIndex) ->
*/
{
        struct  directoryHeader dir;
        struct  nodeEntry       ne;
        int     time, f;
        char    b;

#if DEBUGTRACE >= 1
        fprintf(trace, "called DeleteNode(%d)\n", nodeIndex);
#endif
        if (startTransaction(T_UPDATE) == FALSE) return 0;
        if ((f = openDirectoryFile(DIRECTORY)) < 0) goto out2;

if (getDirectoryHeader(f, &dir) == 0) goto out1;
        if (getNodeEntry(f, nodeIndex, &ne) == 0) goto out1;

time = now();

performDemon(&ne.eventActions[DELETEDNODE2], 0);
        performDemon(&dir.eventActions[DELETEDNODE], 0);
        performDemon(&dir.eventActions[MODIFIEDGRAPH], 0);

if ((char ) ne.status & ARCHIVE) {
                logPendingTransaction(L_PUTNODE, nodeIndex, &ne, sizeof(ne));
                ne.deletionTime = time;
                ne.deletor = defaults.author;
                if (putNodeEntry(f, nodeIndex, &ne) == 0) goto out1;
                closeDirectoryFile(f);
                deleteLinksOfNode(ne.firstOutLink, ne.firstInLink, time);
        }
        else    { /* a file: delete contents, links, attributes and demons */
                logPendingTransaction(L_DESTROYNODE,nodeIndex,&ne,sizeof(ne));
                if (removeNodeEntry(f, nodeIndex) == 0) goto out1;
                closeDirectoryFile(f);
                destroyNodeAttributes(&ne);
                destroyNodeDemons(&ne);
                destroyLinksOfNode(ne.firstOutLink, ne.firstInLink);
                makeFileName(ne.pathPrefix, nodeIndex, name);
                destroyNode(name);
        }
        commitTransaction();
        return 1;

out1:   closeDirectoryFile(f);
out2:   abortTransaction();
        return 0;
} getNodeVersions(nodeIndex, minorVersions, majorVersions, buf1, buf2)
        int     nodeIndex, buf1, buf2;
        int     *minorVersions, *majorVersions;
/* returns a list of version times corresponding to each of the updates of
   node nodeIndex. The version times are returned via the response buffers
   buf1/buf2.
```

Returns 0 if operation fails, +1 if operation carried to completion.

Preconditions: 1) the node corresponding to nodeIndex exists
Postconditions: 1) result == +1 implies (list of versions of node are in response buffers buf1/buf2

```
*/
{
        struct  nodeEntry       ne;
        int     f, numVersions, count;

#if DEBUGTRACE >= 1
        fprintf(trace, "called getNodeVersions(%d)\n", nodeIndex);
endif if (startTransaction(T_ACCESS) == FALSE) return 0;
        if ((f = openDirectoryFile(DIRECTORY)) < 0) goto out2;

if (getNodeEntry(f, nodeIndex, &ne) == 0) goto out1;
        closeDirectoryFile(f);

makeFileName(ne.pathPrefix, nodeIndex, name);

/* get minor versions */ numVersions = 0;
        if (getLinkVersions(ne.firstInLink, ne.firstOutLink, &count, buf2) == 0)
                        goto out2;
        numVersions = numVersions + count;
        if (getAttributeVersions(&ne.attributes, &count, buf2) == 0) goto out2;
        numVersions = numVersions + count;
        if (getDemonVersions(ne.eventActions, 0, &count, buf2) == 0) goto out2;
        *minorVersions = numVersions + count;

if (getContentVersions(&ne, name, majorVersions, buf1) == FALSE) goto out2;
        commitTransaction();
        return 1;

out1:   closeDirectoryFile(f);
out2:   abortTransaction();
        return 0;
} getVersionBound(nodeIndex, ne, versionTime, bound)
        struct  nodeEntry       *ne;
        int     nodeIndex, versionTime, *bound;
/*
        gets the time of the node update immediately after versionTime.
*/
{
        int     i, p, t;
        int     count, times[1024];
        if (ne->lastUpdateTime <= versionTime) {
                *bound = MAXINT;  /* don't know yet */
                return 1;
        }
        makeFileName(ne->pathPrefix, nodeIndex, name);
        count = 1024;
        if (get_versions(name, times, &count) < 0) return 0;
        p = MAXINT;
        for (i = 0; i < count; i += 2) {
            /* invariant: versionTime > all times up to the i'th */
                if (times[i] <= versionTime) {
                        *bound = p; return 1;
                }
                else    p = times[i];
            }
        return 1;
} getNodeDifferences(nodeIndex, versionTime1, versionTime2, bufId)
        int     nodeIndex, versionTime1, versionTime2, bufId;
{
        char    *data1, *data2;
        int     f, dataSize1, dataSize2;
        struct  nodeEntry       ne;
        char    b, isArchive;
        int     size;

#if DEBUGTRACE >= 1
        fprintf(trace, "called getNodeDifferences(%d, %d, %d)\n",
                        nodeIndex, versionTime1, versionTime2);
```

```
#endif
        if (versionTime1 == versionTime2) return 1; /* no differnece */
        if (versionTime1 == CURRENTVERSION) versionTime1 = now();
        if (versionTime2 == CURRENTVERSION) versionTime2 = now();

if (startTransaction(T_ACCESS) == FALSE) return 0;
        if ((f = openDirectoryFile(DIRECTORY)) < 0) goto out2;
        if (getNodeEntry(f, nodeIndex, &ne) == 0) goto out1;
        closeDirectoryFile(f);

isArchive = (char) ne.status & ARCHIVE;
        if (isArchive == 0) return 1; /* no differences for file */
        makeFileName(ne.pathPrefix, nodeIndex, name);
        if (getNode(name, isArchive, versionTime1, &data1, &dataSize1) == 0)
                goto out2;
        if (getNode(name, isArchive, versionTime2, &data2, &dataSize2) == 0)
                goto out1;
        if (compute_differences(data1, data2, dataSize1, dataSize2,
                                        bufId, &size, TRUE) < 0)
                goto out1;
        free(data1); free(data2);
        commitTransaction();
        return 1;

out1:   free(data1);
out2:   free(data2);
        abortTransaction();
        return 0;
} getNodeTimeStamp(nodeIndex, timeStamp)
        int nodeIndex, *timeStamp;
{       int     f;
        struct  nodeEntry       ne;

#if DEBUGTRACE >= 1
        fprintf(trace, "called getNodeTimeStamp(%d)\n", nodeIndex);
#endif
        if (startTransaction(T_ACCESS) == FALSE) return 0;
        if ((f = openDirectoryFile(DIRECTORY)) < 0) goto out2;
        if (getNodeEntry(f, nodeIndex, &ne) == 0) goto out1;
        closeDirectoryFile(f);

*timeStamp = ne.lastUpdateTime;
        commitTransaction();
        return 1;

out1:   closeDirectoryFile(f);
out2:   abortTransaction();
        return 0;
} isArchive(nodeIndex, isArchive)
        int nodeIndex;
        int *isArchive;
{       int     f;
        struct  nodeEntry       ne;

#if DEBUGTRACE >= 1
        fprintf(trace, "called isArchive(%d)\n", nodeIndex);
#endif
        if (startTransaction(T_ACCESS) == FALSE) return 0;
        if ((f = openDirectoryFile(DIRECTORY)) < 0) goto out2;
        if (getNodeEntry(f, nodeIndex, &ne) == 0) goto out1;
        closeDirectoryFile(f);

*isArchive = ne.status & ARCHIVE;
        commitTransaction();
        return 1;

out1:   closeDirectoryFile(f);
out2:   abortTransaction();
        return 0;
} setNodeProtections(nodeIndex, protectionMask)
        int nodeIndex;
        int protectionMask;
{       int     f;
        struct  nodeEntry       ne;
```

```
#if DEBUGTRACE >= 1
        fprintf(trace, "called setNodeProtections(%d, %d)\n",
                        nodeIndex, protectionMask);
#endif
        if (startTransaction(T_UPDATE) == FALSE) return 0;
        if ((f = openDirectoryFile(DIRECTORY)) < 0) goto out2;
        if (getNodeEntry(f, nodeIndex, &ne) == 0) goto out1;
        closeDirectoryFile(f);

makeFileName(ne.pathPrefix, nodeIndex, name);
        if (chmod(name, protectionMask) != 0) goto out2;
        commitTransaction();
        return 1;

out1:   closeDirectoryFile(f);
out2:   abortTransaction();
        return 0;
} convertFileToArchive(nodeIndex)
        int nodeIndex;
{       int     f, vt, dataSize;
        char    *data;
        struct  nodeEntry       ne;

#if DEBUGTRACE >= 1
        fprintf(trace, "called convertFileToArchive(%d)\n", nodeIndex);
#endif
        if (startTransaction(T_UPDATE) == FALSE) return 0;
        if ((f = openDirectoryFile(DIRECTORY)) < 0) goto out2;
        if (getNodeEntry(f, nodeIndex, &ne) == 0) goto out1;

if ((ne.status & ARCHIVE) == 0) {
                makeFileName(ne.pathPrefix, nodeIndex, name);
                vt = now();
                if (getNode(name, 0, vt, &data, &dataSize) != 1) goto out1;
                if (destroyNode(name) != 1) goto out1;
                if (newNode(name, 1, defaults.mask, ne.creationTime) != 1)
                        goto out1;
                if (putNode(name, 1, vt, data, dataSize) != 1) goto out1;
                free(data);

logPendingTransaction(L_PUTNODE, nodeIndex, &ne, sizeof(ne));
                ne.status &= ARCHIVE;
                if (putNodeEntry(f, nodeIndex, &ne) == 0) goto out1;
                }
        closeDirectoryFile(f);
        commitTransaction();

return 1;

out1:   closeDirectoryFile(f);
out2:   abortTransaction();
        return 0;
}

/* graph.c implements the operations on the hypertext directory.
   It runs as part of the hypertext directory server, so the unix files
   that contain the hypertext directory are on the machine where it is running.
*/ include        <sys/file.h>
include        <setjmp.h>
include        <stdio.h> include        "machine.h"
include        "directory.h"
include        "actions.h"
include        "strings.h"
include        "errors.h"
include        "log.h"
extern char     *malloc();

extern int      thisHostId;
extern int      dirFileDesc();
extern int      readOnlyDirAccess;

CreateGraph(pathPrefix, mask, projectId, creationTime)
        int     mask, *projectId, *creationTime;
        char    *pathPrefix;
/* creates a new hypertext graph on this machine, using pathPrefix as
   the unix-directory where the hypertext-directory files are stored,
   using mask as the protection mask for the hypertext-directory files.
*/
```

```
    Returns projectId, and creationTime: two integers that uniquely
    identify the new graph (used as parameters to OpenGraph below).

Preconditions: 1) pathPrefix is a valid unix path name for a unix-directory
                      that exists and is readable and writable by the owner.
                   2) mask is a valid unix file protection mask that allows
                      the owner read and write permissions.
    Postconditions: 1) projectId, and creationTime are two integers that uniquely
                       identify the new graph.
                    2) all hypertext-directory files exist and are initialized
                    3) project, an instance of projectContext is valid CreateGraph(pathPrefix, mask) -> projectId, creationTime
*/
{
        int     i;
        struct  directoryHeader dir;
        int     f, pLen;
        struct  fileHeader       fh;

#if DEBUGTRACE >= 1
        fprintf(trace, "called CreateGraph(%s, %d)\n", pathPrefix, mask);
endif closeOpenDirectories(f);
        reinitHypertextMachine();
    /* initialize directory header */
        dir.creationTime = now();
        dir.originalHostMachine = thisHostId;
        dir.hostMachine = thisHostId;
        dir.lastUpdateTime = dir.creationTime;
        dir.numNodeEntries = 0; dir.firstFreeNodeEntry = -1;
        dir.parentHostMachine = 0;
        initializeDemons(dir.eventActions, dir.creationTime, 1);

/* initialize project context */
        project.originalHostMachine = dir.originalHostMachine;
        *creationTime = project.creationTime = dir.creationTime;
        *projectId = project.dirHost= dir.originalHostMachine;
        defaults.defined = 0;
        if (DefineCreationDefaults(pathPrefix, mask, 0) == 0) return 0;
        pLen = defaults.prefixLen;
        if ((project.pathPrefixString= malloc(pLen + 1)) == 0) goto out;
        strcpy(project.pathPrefixString, defaults.pathPrefixString);

for (i = 1; i <= NUMDIRECTORYFILES; i ++) {
            if ((project.dirNames[i] = malloc(pLen + 18)) == 0) goto out;
            makeFileName(DIRECTORYPATHPREFIX, -i, project.dirNames[i]);
            }
    /* initialize directory files */
        if (initialize_strings(mask) == 0) goto out;
        fh.nextEmpty = -1; fh.size = 0;
        for (i = LINKENTRIES; i <= EVENTACTIONHISTORY; i ++) {
            if ((f = createDirectoryFile(i)) < 0)
                            goto out;
            if ((i == LINKHISTORY) || (i == LINKENTRIES) ||
                    (i == ATTRIBUTEHISTORY) || (i == ATTRIBUTEVALUES) ||
                    (i == ATTRIBUTEDEFS) || (i == ENTITYATTRIBUTES) ||
                    (i == EVENTACTIONHISTORY))
                { /* initialize to 0 entries */
                  if (write(f, &fh, sizeof(fh)) != sizeof(fh)) goto out;
                }
            }
        if (createTransactionLog() < 0)
                goto out;
        if ((f = createDirectoryFile(DIRECTORY)) < 0)
                goto out;
        if (write(f, &dir, sizeof(dir)) != sizeof(dir)) goto out;
        if (DefineCreationDefaults(pathPrefix, mask, 1) == 0) return 0;
        return 1;

out:    setError(E_internal_error, "creating graph", 0);
        return 0;
}

DestroyGraph(originalMachine, creationTime, pathPrefix)
        int     originalMachine, creationTime;
        char    *pathPrefix;
/* destroys an existing hypertext graph  using originalMachine and
    creationTime as two integers that uniquely identify the graph
    (as returned by CreateGraph).
``` using pathPrefix as the unix-directory name where the directory files are stored.

Preconditions: 1) originalMachine and creationTime are a pair of integers that were returned by CreateGraph.
2) pathPrefix is a valid unix path name for a unix-directory that exists and is readable and writable by the owner.
3) the files corresponding to the hypertext-directory for originalMachine/creationTime exist and are in pathPrefix.
Postconditions: 1) strorage space occupied by graph is reclaimed

```
*/
{
        struct  directoryHeader dir;
        struct  nodeEntry       ne;
        int     i;
        int     f, pLen;
        char    name[200], c, *p;

#if DEBUGTRACE >= 1
        fprintf(trace, "called DestroyGraph(%d, %d, %s)\n",
                        originalMachine, creationTime, pathPrefix);
#endif
        closeOpenDirectories();
        reinitHypertextMachine();
    /* initialize project context */
        project.originalHostMachine = originalMachine;
        project.creationTime = creationTime;
        defaults.defined = 0;
        if (DefineCreationDefaults(pathPrefix, 0x3f, 0) == 0) return 0;
        pLen = defaults.prefixLen;
        if ((project.pathPrefixString= malloc(pLen + 1)) == 0) goto out;
        strcpy(project.pathPrefixString, defaults.pathPrefixString);
        project.dirHost= project.originalHostMachine;

for (i = DIRECTORY; i <= NUMDIRECTORYFILES; i ++) {
                if ((project.dirNames[i] = malloc(pLen + 18)) == 0) goto out;

makeFileName(DIRECTORYPATHPREFIX, -i, project.dirNames[i]);
                } if (access(project.dirNames[DIRECTORY], R_OK | W_OK) != 0) {
                setError(E_cannot_access_hyperdata, "", 0);
                return 0;
                }
        if (openTransactionLog() < 0) goto out;
        if (startTransaction(T_UPDATE) == FALSE) return 0;
        if ((f = openDirectoryFile(DIRECTORY)) < 0) goto out;
        if (getDirectoryHeader(f, &dir) == 0) goto out;
        closeDirectoryFile(f);

/* delete node files */
        for (i = 1; i <= dir.numNodeEntries; i++) {
                if (getNodeEntry(f, i, &ne) == 0) goto out;
                makeFileName(ne.pathPrefix, i, name);
                unlink(name);
                }
        /* delete directory files */
        for (i = DIRECTORY; i <= NUMDIRECTORYFILES; i ++) {
                unlink(project.dirNames[i]);
                } closeDirectoryFile(f);
        commitTransaction();
        unlink(project.dirNames[TRANSACTIONLOG]);
        return 1;

out:    setError(E_internal_error, "destroying graph", 0);
        closeDirectoryFile(f);
        abortTransaction();
        return 0;
}

OpenGraph(originalMachine, creationTime, pathPrefix)
        int     originalMachine, creationTime;
        char    *pathPrefix;
/* opens an existing hypertext graph, using originalMachine and creationTime as
   two integers that uniquely identify the graph (as returned by CreateGraph),
   using pathPrefix as the unix-directory name where the directory files are
   stored.
```

```
        Preconditions: 1) originalMachine and creationTime are a pair of integers
                          that were returned by CreateGraph.
                       2) pathPrefix is a valid unix path name for a unix-directory
                          that exists and is readable and writable by the owner.
                       3) the files corresponding to the hypertext-directory for
                          originalMachine/creationTime exist and are in pathPrefix.
        Postconditions: 1) project, an instance of projectContext is valid OpenGraph(originalMachine, creationTime, pathPrefix)
*/
{
        struct   directoryHeader dir;
        int      i;
        int      f, pLen;
        char     c, *p;

#if DEBUGTRACE >= 1
        fprintf(trace, "called OpenGraph(%d, %d, %s)\n",
                       originalMachine, creationTime, pathPrefix);
#endif
        closeOpenDirectories();
        reinitHypertextMachine();
        if (now() < creationTime) {
                setError(E_bad_system_clock, "opening graph", 0);
                return 0;
        }
    /* initialize project context */
        project.originalHostMachine = originalMachine;
        project.creationTime = creationTime;
        defaults.defined = 0;
        if (DefineCreationDefaults(pathPrefix, 0x3f, 0) == 0) return 0;
        pLen = defaults.prefixLen;
        if ((project.pathPrefixString= malloc(pLen + 1)) == 0) goto out;
        strcpy(project.pathPrefixString, defaults.pathPrefixString);
        project.dirHost= project.originalHostMachine;

for (i = DIRECTORY; i <= NUMDIRECTORYFILES; i ++) {
                if ((project.dirNames[i] = malloc(pLen + 18)) == 0) goto out;
                makeFileName(DIRECTORYPATHPREFIX, -i, project.dirNames[i]);
        } if (access(project.dirNames[DIRECTORY], R_OK) != 0) {
                setError(E_cannot_access_hyperdata, "", 0);
                return 0;
        }
        if (openTransactionLog() < 0) goto out;
        if (startTransaction(T_ACCESS) == FALSE) return 0;
        if ((f = openDirectoryFile(DIRECTORY)) < 0) goto out;
        if (getDirectoryHeader(f, &dir) == 0) return 0;
        closeDirectoryFile(f);

performDemon(&dir.eventActions[OPENEDGRAPH], 0);
        commitTransaction();
        if (DefineCreationDefaults(pathPrefix, 0x3f, 1) == 0) return 0;
        return 1;

out:    setError(E_internal_error, "opening graph", 0);
        abortTransaction();
        return 0;
}

AddNode(asArchive, pathPrefix, mask, nodeIndex, timeStamp)
        char   asArchive, *pathPrefix;
        int    mask, *nodeIndex, *timeStamp;
/* adds a node to the current hypertext graph (defined by project context).
   If asArchive == 1, then new node is created as an archive.
   Uses creationDefaults, a global struct, to define where and how the
   storage for new node will be alocated.
   Returns 0 if operation fails, +1 if operation is carried to completion.

Preconditions: 1) defaults, an instance of creationDefaults is valid
                  2) project, an instance of projectContext is valid
   Postconditions: 1) nodeIndex is a unique index representing the new node
                   2a) result == +1 implies storage for new node
                       is allocated and initialized

*/
{
        char     *name;
        struct   directoryHeader dir;
        struct   nodeEntry        n;
```

```
         int     i, t, f;
         char    b;

#if DEBUGTRACE >= 1
         fprintf(trace, "called AddNode(%x, %s, %d)\n",
                                   asArchive, pathPrefix, mask);
#endif
         if (DefineCreationDefaults(pathPrefix, mask, 1) == 0) return 0;

if (startTransaction(T_UPDATE) == FALSE) return 0;
         if ((f = openDirectoryFile(DIRECTORY)) < 0) goto out2;
         if (getDirectoryHeader(f, &dir) == 0) goto out1;

t = now();
         *timeStamp = t;

/* make the new node entry in the directory */
         n.creationTime = t; n.deletionTime = MAXINT;
         n.lastUpdateTime = t;
         n.status = (asArchive == 1) ? ARCHIVE : 0;
         n.pathPrefix = defaults.pathPrefixIndex;
         n.creator = defaults.author;
         n.attributes.next = -1;
         n.attributes.nextAttributeIndex = 0;
         initializeDemons(n.eventActions, t, 0);
         n.firstInLink = -1; n.firstOutLink = -1;

if ((*nodeIndex = addNodeEntry(f, &n)) == 0) {
                 closeDirectoryFile(f);
                 goto out3;
         }
         closeDirectoryFile(f);

if ((name = malloc(defaults.prefixLen + 18)) == 0) goto out2;
         makeFileName(DEFAULTPATHPREFIX, *nodeIndex, name);
         if (newNode(name, asArchive, defaults.mask, t) == 0) goto out3;

performDemon(&dir.eventActions[CREATEDNODE], 0);
         performDemon(&dir.eventActions[MODIFIEDGRAPH], 0);
         commitTransaction();
         return 1;

out1:    closeDirectoryFile(f);
out2:    setError(E_internal_error, "adding node", 0);
out3:    abortTransaction();
         return 0;

}

AddLink(fromNodeIndex, toNodeIndex, fromPos, toPos,
                                    fromVersionTime, toVersionTime,
                             linkIndex, timeStamp)
     int fromNodeIndex, toNodeIndex, fromPos;
     int toPos, fromVersionTime, toVersionTime;
     int *linkIndex, *timeStamp;
/* adds a link to the current hypertext graph (defined by project context).
   Link starts at character position, fromPos, of version, fromVersionTime,
   of node corresponding to fromNodeIndex and ends at at character position,
   toPos, of version, toVersionTime, of node corresponding to toNodeIndex.

Preconditions: 1) project, an instance of projectContext is valid
                  2) fromNodeIndex and toNodeIndex are nodes in the graph
                  3) a version of the node corresponding to fromNodeIndex existed
                     at fromVersionTime, and had at least fromPos characters in
                     its contents.
                  4) a version of the node corresponding to toNodeIndex existed
                     at toVersionTime, and had at least toPos characters in its
                     contents.
   Postconditions: 1) linkIndex is a unique index representing the new link
                     created at time timeStamp AddLink(fromNode, toNode, fromPos, toPos,
                             fromVersionTime, toVersionTime) -> linkIndex, timeStamp
*/
{        char    b, b1, b2;
         struct  directoryHeader dir;
         struct  linkEntry       link;
         int     i, f1, f2, time;
         struct  nodeEntry       toNode, fromNode;
```

```
#if DEBUGTRACE >= 1
        fprintf(trace, "called AddLink(%d, %d)\n", fromNodeIndex, toNodeIndex);
#endif
        if (startTransaction(T_UPDATE) == FALSE) return 0;
        time = now();

link.fromNode = fromNodeIndex;
        link.toNode = toNodeIndex;
        link.currentValue.fromCharPosition = fromPos;
        link.currentValue.toCharPosition = toPos;
        link.currentValue.versionTime = time;
        link.currentValue.author = defaults.author;
        link.prevIndex = 0;
        link.previous = -1;

link.fromVersionTime = fromVersionTime;
        link.toVersionTime = toVersionTime;

/* validate and get node entries */
        if ((f1 = openDirectoryFile(DIRECTORY)) < 0) goto out3;
        if (getDirectoryHeader(f1, &dir) == 0) goto out2;
        b1 = isValidNodeEntry(f1, toNodeIndex);
        b2 = isValidNodeEntry(f1, fromNodeIndex);
        if ((b1 != TRUE) || (b2 != TRUE)) {
                closeDirectoryFile(f1);
                if ((b1 == FALSE) || (b2 == FALSE))
                        setError(E_invalid_node, "adding link", 0);
                goto out4;
        }
        if (getNodeEntry(f1, link.toNode, &toNode) == 0) goto out2;
        if (getNodeEntry(f1, link.fromNode, &fromNode) == 0) goto out2;
        if (fromVersionTime != CURRENTVERSION) {
                if (fromNode.creationTime > fromVersionTime) {
                        setError(E_invalid_node, "adding link", 0);
                        closeDirectoryFile(f1);
                        goto out4;
                }
                if (getVersionBound(link.fromNode, &fromNode, fromVersionTime,
                        &link.fromVersionBound) == 0) goto out2;
        }
        else    if (fromNode.deletionTime != MAXINT) {
                        setError(E_invalid_node, "adding link", 0);
                        closeDirectoryFile(f1);
                        goto out4;
                }
        if (toVersionTime != CURRENTVERSION) {
                if (toNode.creationTime > toVersionTime) {
                        setError(E_invalid_node, "adding link", 0);
                        closeDirectoryFile(f1);
                        goto out4;
                }
                if (getVersionBound(link.toNode, &toNode, toVersionTime,
                        &link.toVersionBound) == 0) goto out2;
        }
        else    if (toNode.deletionTime != MAXINT) {
                        setError(E_invalid_node, "adding link", 0);
                        closeDirectoryFile(f1);
                        goto out4;
                }

/* make new link entry */
        link.deletionTime = MAXINT;
        link.nextOutLink = fromNode.firstOutLink;
        link.nextInLink = toNode.firstInLink;
        link.attributes.next = -1;
        link.attributes.nextAttributeIndex = 0;
        if ((f2 = openDirectoryFile(LINKENTRIES)) < 0) goto out2;
        if ((*linkIndex = addLinkEntry(f2, &link)) == 0) goto out1;
        closeDirectoryFile(f2);

/* update node entries, (in and out link pointers) */
        logPendingTransaction(L_PUTNODE, link.toNode, &toNode, sizeof(toNode));
        toNode.firstInLink = *linkIndex;
        toNode.lastUpdateTime = time;
        if (link.toNode == link.fromNode) {
                toNode.firstOutLink = *linkIndex;
                toNode.lastUpdateTime = time;
                if (putNodeEntry(f1, link.toNode, &toNode) == 0) goto out2;
        }
        else    {
                if (putNodeEntry(f1, link.toNode, &toNode) == 0) goto out2;
```

```
        logPendingTransaction(L_PUTNODE, link.fromNode,
                                    &fromNode, sizeof(fromNode));
        fromNode.firstOutLink = *linkIndex;
        fromNode.lastUpdateTime = time;
        if (putNodeEntry(f1, link.fromNode, &fromNode) == 0) goto out2;
        }
    closeDirectoryFile(f1);

performDemon(&dir.eventActions[CREATEDLINK], 0);
        performDemon(&dir.eventActions[MODIFIEDGRAPH], 0);

*timeStamp = time;
        commitTransaction();
        return 1;

out1:   closeDirectoryFile(f2);
out2:   closeDirectoryFile(f1);
out3:   setError(E_internal_error, "adding link", 0);
out4:   abortTransaction();
        return 0;
} copyLink(linkIndex, linkVersionTime, isInLink,
                nodeIndex, charPosition, nodeVersionTime,
                            outLinkIndex, timeStamp)
    int linkIndex, linkVersionTime;
    int nodeIndex, charPosition, nodeVersionTime;
    int *outLinkIndex, *timeStamp;
/* adds a link to the current hypertext graph (defined by project context).
    Link is based on linkIndex, an existing link.
    One end of the new link is identical to linkIndex, the other is defined
    by nodeIndex, charPosition, nodeVersionTime.

Preconditions: 1) project, an instance of projectContext is valid
                2a) nodeIndex is a node in the graph
                2b) linkIndex is a link in the graph
                3) a version of the node corresponding to nodeIndex existed
                    at nodeVersionTime, and had at least charPosition characters in
                    its contents.
    Postconditions: 1) linkIndex is a unique index representing the new link
                    created at time timeStamp copyLink(linkIndex, linkVersionTime, isInLink,
                    nodeIndex, charPosition, nodeVersionTime) -> linkIndex, timeStamp
*/
{       struct  directoryHeader dir;
        struct  linkEntry       link;
        struct  linkHistory     lh;
        int     r;

#if DEBUGTRACE >= 1
        fprintf(trace, "called copyLink(%d, %d)\n", linkIndex, nodeIndex);
endif if (startTransaction(T_UPDATE) == FALSE) return 0;
        if (getLinkVersion(linkIndex, linkVersionTime, &link, &lh) == 0) {
                setError(E_invalid_version_time, "", 0);
                abortTransaction();
                return 0;}
        /* make new copy of link */
        if (isInLink)
                r = AddLink(link.fromNode, nodeIndex, lh.fromCharPosition,
                        charPosition, link.fromVersionTime, nodeVersionTime,
                        outLinkIndex, timeStamp);

else r = AddLink(nodeIndex, link.toNode, charPosition,
                        lh.toCharPosition, nodeVersionTime, link.toVersionTime,
                        outLinkIndex, timeStamp);
        if (r == 0) { abortTransaction(); return 0; }
        else { commitTransaction(); return 1; }
}

DefineCreationDefaults(pathPrefix, mask, graphOpened)
        char    *pathPrefix, graphOpened;
        int     mask;
/* defines the default parameters to be used when new nodes are created in the
    current graph.
```

```
     Preconditions: 1) project, an instance of projectContext is valid
                    2) defaults.author is a valid login name
                    3) pathPrefix is a valid unix-directory name and the
                       directory exists
                    4) mask is a valid unix-protection mask that allows the owner
                       read/write permission
     Postconditions: 1) defaults, an instance of creationDefaults is valid DefineCreationDefaults(pathPrefix, mask)
*/
{
        int     len;
        char    name[1024];
        struct  directoryHeader dir;

#if DEBUGTRACE >= 1
        fprintf(trace, "called DefineCreationDefaults(%s, %d)\n",
                       pathPrefix, mask);
#endif
        if (defaults.defined != 0) { free(defaults.pathPrefixString); }
        if (pathPrefix[0] != '/') {
#ifdef mag
                if (getwd(name) == 0) {
#else
                if (getcwd(name, 1024) == 0) {
#endif
                        setError(E_internal_error, "building pathname", 0);
                        return 0;
                }
                len = strlen(pathPrefix) + strlen(name);
                if ((defaults.pathPrefixString = malloc(len + 2)) == 0) {
                        setError(E_internal_error, "malloc", 0);
                        return 0;
                }
                strcpy(defaults.pathPrefixString, name);
                strcat(defaults.pathPrefixString, pathPrefix);
        }
        else  {
                len = strlen(pathPrefix);
                if ((defaults.pathPrefixString = malloc(len + 2)) == 0) {
                        setError(E_internal_error, "malloc", 0);
                        return 0;
                }
                strcpy(defaults.pathPrefixString, pathPrefix);
        }
        if (defaults.pathPrefixString[len - 1] != '/') {
                defaults.pathPrefixString[len++] = '/';
                defaults.pathPrefixString[len] = 0;
        }
        defaults.prefixLen = len;
        if (access(defaults.pathPrefixString, R_OK | W_OK) != 0) {
                setError(E_cannot_access_directory, "", 0);
                return 0;
        }
        /* mask format: 0x1 write others
                        0x2 read others
                        0x4 write group
                        0x8 read group
                        0x10 write owner
                        0x20 read owner
        */
#ifdef mag
        defaults.mask = ((mask & 32) != 0)*256 + ((mask & 16) != 0)*128
                      + ((mask & 8) != 0)*32 + ((mask & 4) != 0)*16
                      + ((mask & 2) != 0)*4 + ((mask & 1) != 0)*2;
#else
        defaults.mask = ((mask & 32) != 0)*1 + ((mask & 16) != 0)*2
                      + ((mask & 2) != 0)*8 + ((mask & 1) != 0)*16;
endif if (graphOpened && !readOnlyDirAccess) {
          if (startTransaction(T_UPDATE) == FALSE) return 0;

if (defaults.defined == 0)
            if ((defaults.author = put_string(defaults.authorName, 0)) == -1) {
                abortTransaction();
                return 0;
            }
          if ((defaults.pathPrefixIndex
                        = put_string(defaults.pathPrefixString, 0)) == -1) {
                abortTransaction();
                return 0;
            }
```

```
        commitTransaction();
        defaults.defined = 1;
        }
    return 1;
}

/* linear.c implements the operations that extract a subgraph of the
   hypertext graph by traversing nodes via their outlinks.
   It runs as part of the hypertext directory server, so the unix files
   that contain the hypertext directory are on the machine where it is running.
*/
include         <netdb.h>
include         <setjmp.h>
include         <stdio.h> include         "directory.h"
include         "actions.h"
#include         "strings.h"
#include         "log.h"
extern char      *malloc();

extern int       thisHostId;

static int       nextLinkIndex, linkEntries[1000];
static int       nodeCount, inVersionTime, mark;
static versionTime, numNodeAttributes, *nodeAttributeIndices;
static numLinkAttributes, *linkAttributeIndices;
struct   linkRec {
         int     linkIndex;
         int     fromCharPos;
         int     toNodeIndex;
         int     toNodeVersion;
         };
static int       nodeNumNeeded, *nodeAttributeList;
static int       linkNumNeeded, *linkAttributeList;
static int       dirFile;
static int       nodeBuf, linkBuf;
static int       maxDepth;

linearizeGraph(nodeIndex, pversionTime, depth, nodePredicate, linkPredicate,
               pNumNodeAttributes, pNodeAttributeIndices,
               pNumLinkAttributes, pLinkAttributeIndices,
               numNodes, numLinks, buf1, buf2)
         int     nodeIndex, pversionTime, depth, *numNodes, *numLinks, buf1, buf2;
         int     pNumNodeAttributes, pNodeAttributeIndices[];
         int     pNumLinkAttributes, pLinkAttributeIndices[];
         char    *nodePredicate, *linkPredicate;
/* retrieves a subgraph of the hypertext graph based on predicates expressed
   in terms of attribute values.
   Also returns a list of attribute values for attributeIndices for each node
   and link.

Preconditions: 1) project, an instance of projectContext is valid
                  2) predicate is syntactically correct
                  3a) there are pNumNodeAttributes valid entries in
                      pNodeAttributeIndices
                  3b) there are pNumLinkAttributes valid entries in
                      pLinkAttributeIndices
   Postconditions: 1) buf1 contains the designated list of nodes
                   and buf2 contains links with their associated attribute values.

*/
{       struct   directoryHeader dir;
        int      i;

#if DEBUGTRACE >= 1
        fprintf(trace, "called linearizeGraph(%d, %d, %s, %s)\n",
                       nodeIndex, pversionTime, nodePredicate, linkPredicate);
endif if (startTransaction(T_ACCESS) == FALSE) return 0;
        if ((dirFile = openDirectoryFile(DIRECTORY)) < 0) goto out2;
        if (getDirectoryHeader(dirFile, &dir) == 0) goto out1;
        if (isValidNodeEntry(dirFile, nodeIndex) == FALSE) {
                *numNodes = *numLinks = 0;
                closeDirectoryFile(dirFile);
                commitTransaction();
                return 1;
```

```
        if (parse(nodePredicate,0) != 1) goto out2;
        nodeNumNeeded = attributesNeeded(&nodeAttributeList,0);
        if (parse(linkPredicate,1) != 1) goto out2;
        linkNumNeeded = attributesNeeded(&linkAttributeList,1);

inVersionTime = pversionTime;
        if (pversionTime == CURRENTVERSION) pversionTime = now();
        versionTime = pversionTime;
        numNodeAttributes = pNumNodeAttributes;
        nodeAttributeIndices = pNodeAttributeIndices;
        numLinkAttributes = pNumLinkAttributes;
        linkAttributeIndices = pLinkAttributeIndices;
        nodeBuf = buf1;
        linkBuf = buf2;
        maxDepth = (depth == 0) ? MAXINT : depth;

mark = now(); nodeCount = 0;
        nextLinkIndex = 0;
        initializeMap();
        if (getSonsOf(nodeIndex, inVersionTime, 1) == 0)
                {disposeMap(); goto out2;}
        closeDirectoryFile(dirFile);
        *numNodes = nodeCount;
        if (getLinkInfo() == 0) { disposeMap(); goto out2; }
        *numLinks = nextLinkIndex;
        commitTransaction();
        disposeMap();
        return 1;

out1:   closeDirectoryFile(dirFile);
out2:   abortTransaction();
        return 0;

} static getSonsOf(nodeIndex, nodeVersion, depth)
        int     nodeIndex, nodeVersion, depth;
{       struct  nodeEntry       ne;
        int     i, f, j, placeHolder, wantThisOne;
        int     numSons;
        struct  linkRec sons[200];
        struct  attributeValue p[10];
        int     myBuf;
        char    *data;

#if DEBUGTRACE >= 2
        fprintf(trace, "called getSonsof(%d, %d %d)\n",
                                nodeIndex, versionTime, depth);
endif if (depth > maxDepth) return 1;
if (isNodeChecked(nodeIndex)) return 1;
addNodeToMap(nodeIndex, 1, 0);
if (getNodeEntry(dirFile, nodeIndex, &ne) == 0)  return 0;
if (nodeVersion != CURRENTVERSION ||
        (ne.deletionTime > versionTime && ne.creationTime <= versionTime)) {
        if (nodeNumNeeded == 0) wantThisOne = 1;
        else {
                myBuf = makeBuffer();
                extractEntityAttributes(&ne.attributes, nodeVersion,
                                nodeNumNeeded, nodeAttributeList, myBuf);
                data = (char *) malloc(sizeOf(myBuf));
                copyBufDisposing(myBuf, data);
                placeHolder = 0;
                for (i = 0; i < nodeNumNeeded; i++) {
                        p[i].valueType = data[placeHolder++];
                        if (p[i].valueType == 1) {
                                p[i].stringValue = &data[placeHolder];
                                for (;data[placeHolder] != 0; placeHolder++);
                                placeHolder = placeHolder + 1; /* skip over null */
                        }
                        else if (p[i].valueType == 0)  {
                                bcopy(&data[placeHolder], &j, 4);
                                p[i].integerValue = ntohl(j);
                                placeHolder = placeHolder + 4;
                        }
                }
                free(data);
                wantThisOne = interp(p, 0);
        }
```

```
                if (wantThisOne) {
                        nodeCount = nodeCount + 1;
                        appendInt(nodeIndex, nodeBuf);
                        if (nodeVersion != CURRENTVERSION)
                                appendInt(nodeVersion, nodeBuf);
                        else if (inVersionTime == CURRENTVERSION)
                                appendInt(inVersionTime, nodeBuf);
                        else    appendInt(ne.lastUpdateTime, nodeBuf);
                        if (nodeVersion == CURRENTVERSION) nodeVersion = versionTime;
                        extractEntityAttributes(&ne.attributes, nodeVersion,
                                    numNodeAttributes, nodeAttributeIndices, nodeBuf);
                }
                if (ne.firstOutLink != -1)        {
                        if (getSonsList(ne.firstOutLink, &numSons, sons) == 0) return 0;
                        for (j = 0; j < numSons; j++) {
                          f = getSonsOf(sons[j].toNodeIndex, sons[j].toNodeVersion,
                                                                     depth + 1);
                          if (f == 0) return 0;
                          else  if ((f == 1) && (wantThisOne))
                                  linkEntries[nextLinkIndex++] = sons[j].linkIndex;
                        }
                }
                if (wantThisOne) return 1;
                else    return -1;
        }
else    return -1;
} static getSonsList(firstLink, numSons, sons)
        int     firstLink, *numSons;
        struct  linkRec sons[];
{       struct  linkEntry       le;
        struct  linkHistory     lh;
        int     charPos, linkVersionTime, nextLink, f, h, count;
        int     lvt, pv;
        struct  linkRec outLinks[220];

#if DEBUGTRACE >= 2
        fprintf(trace, "called getSonsList(%d)\n", firstLink);
endif if ((f = openDirectoryFile(LINKENTRIES)) < 0) return 0;
        count = 0;

nextLink = firstLink;
        while (nextLink != -1)  {
                if (getLinkEntry(f, nextLink, &le) == 0) goto out;
                if (((le.deletionTime > versionTime) &&
                   (((le.fromVersionTime == CURRENTVERSION)
                   || ((le.fromVersionTime <= versionTime)
                        && (le.fromVersionBound > versionTime))))) {
                        if (le.fromVersionTime == CURRENTVERSION) {
                                if ((h = findLinkVersion(versionTime, &le.currentValue,
                                        le.prevIndex, le.previous, &lh)) == -1)
                                                goto out;
                                charPos = lh.fromCharPosition;
                        }
                        else {
                           charPos = le.currentValue.fromCharPosition;
                           h = 1;
                        }
                        if (le.toVersionTime == CURRENTVERSION)
                                linkVersionTime = inVersionTime;

else linkVersionTime = le.toVersionTime;
                        if ((h == 1) && wantLink(&le)) {
                                sons[count].linkIndex = nextLink;
                                sons[count].fromCharPos = charPos;
                                sons[count].toNodeIndex = le.toNode;
                                sons[count++].toNodeVersion = linkVersionTime;
                        }
                }
                nextLink = le.nextOutLink;
        }
        closeDirectoryFile(f);
        sortSons(sons, count);
        *numSons = count;
        return 1;

out:    closeDirectoryFile(f);
        return 0;
}
```

```
static sortSons(sons, numSons)
        int     numSons;
        struct  linkRec sons[];
{ /* quick sort to order as increasing char position */
        int     l, r, m;
        struct  linkRec temp;
#if DEBUGTRACE >= 2
        fprintf(trace, "called sortSons(%d)\n", numSons);
endif l = 0; r = numSons - 1;
        m = sons[(l + r) / 2].fromCharPos;
        do { /* invariant: elements before l are < m,
                           elements beyond r are > m */
                while (sons[l].fromCharPos < m) l = l + 1;
                while (sons[r].fromCharPos > m) r = r - 1;
                if (l < r)      { /* exclude swap with itself */
                        bcopy(&sons[l], &temp, sizeof(temp));
                        bcopy(&sons[r], &sons[l], sizeof(temp));
                        bcopy(&temp, &sons[r], sizeof(temp));
                }
                if (l <= r)     {
                        l = l + 1; r = r - 1;
                }
        }
        while   (l <= r);
        if (0 < r)      sortSons(sons, r + 1);
        if (l < (numSons - 1)) sortSons(&sons[l], numSons - l);
} static getLinkInfo()
{
        struct  linkEntry       le;
        struct  linkHistory     lh;
        int     f, i;

#if DEBUGTRACE >= 2
        fprintf(trace, "called getLinkInfo, links: %d\n", nextLinkIndex);
endif if ((f = openDirectoryFile(LINKENTRIES)) < 0) return 0;
        for (i = 0; i < nextLinkIndex; i++) {
                if (getLinkEntry(f, linkEntries[i], &le) == 0) goto out;
                appendInt(linkEntries[i], linkBuf);
                if (inVersionTime == CURRENTVERSION)
                        appendInt(inVersionTime, linkBuf);
                else {
                        if (findLinkVersion(versionTime, &le.currentValue,
                            le.prevIndex, le.previous, &lh) == -1)
                                goto out;
                        appendInt(lh.versionTime, linkBuf);
                }
                appendInt(le.fromNode, linkBuf);
                appendInt(le.fromVersionTime, linkBuf);
                appendInt(le.toNode, linkBuf);
                appendInt(le.toVersionTime, linkBuf);
                extractEntityAttributes(&le.attributes, versionTime,
                        numLinkAttributes, linkAttributeIndices, linkBuf);
        }
        closeDirectoryFile(f);
        return 1;

out:    closeDirectoryFile(f);
        return 0;
} static wantLink(le)
        struct. linkEntry       *le;
{       int     i, j, myBuf, placeHolder;
        char    *data;
        struct  attributeValue  p[10];
if (le->deletionTime > versionTime) {
        if (linkNumNeeded == 0) return TRUE;
        myBuf = makeBuffer();
        extractEntityAttributes(&le->attributes,
                        versionTime, linkNumNeeded, linkAttributeList, myBuf);
        data = (char *) malloc(sizeOf(myBuf));
        copyBufDisposing(myBuf, data);
        placeHolder = 0;
        for (i = 0; i < linkNumNeeded; i++) {
```

```
                    p[i].valueType = data[placeHolder++];
                    if (p[i].valueType == 1) {
                            p[i].stringValue = &data[placeHolder];
                            for (;data[placeHolder] != 0; placeHolder++);
                            placeHolder += 1; /* skip over null */
                            }
                    else if (p[i].valueType == 0)     {
                            bcopy(&data[placeHolder], &j, 4);
                            p[i].integerValue = ntohl(j);
                            placeHolder += 4;
                            }
                    }
            free(data);
            return interp(p,1);
            }
    return 0;
    }

/* f_attDef.c implements the operations on the hypertext directory
            file that contains the attributeDef entries.
        This file consists of a fileHeader at seek offset == 0
        followed by a parrtially filled rray of attributeDef records.

invariants:
                    1) there are fileHeader.size attributeDef records in
                            the file
                        for each attributeDef record:
                            1) next == -1 or points to a valid instance
                                    of another attributeDef in this file.
                            2) name is a valid string index
                            3) nodeValueList == -1 or points to a valid instance
                                    of an entityAttributeValue in this file.
                            4) linkValueList == -1 or points to a valid instance
                                    of an entityAttributeValue in this file.
    */ include     <sys/file.h>
    #include     <setjmp.h>
    #include     <stdio.h> include     "directory.h"
    #include     "actions.h"
    #include     "strings.h"
    #include     "errors.h"
    #include     "log.h"
    extern char  *malloc();

extern int   thisHostId;

newAttribute(stringIndex)
            int     stringIndex;
    {       struct attributeDef    ad;
            int     f, defIndex;

ad.name = stringIndex;
            ad.nodeValuesList = -1;
            ad.linkValuesList = -1;
            ad.nextNodeIndex = NUMATTVALUES;
            ad.nextFreeNodeValuePtr = -1;
            ad.nextLinkIndex = NUMATTVALUES;
            ad.nextFreeLinkValuePtr = -1;
            ad.deletionTime = MAXINT;
            ad.creationTime = now();
            ad.creator = defaults.author;
            if ((f = openDirectoryFile(ATTRIBUTEDEFS)) < 0) return 0;
            if ((defIndex = addAttributeDef(f, &ad)) == 0) {
                    closeDirectoryFile(f); return 0; }
            closeDirectoryFile(f);
            if (set_attribute_index(stringIndex, defIndex) == 0)
                    return 0;
            return defIndex;
    } char    *get_attribute_name(attributeIndex)
    {       int     f;
            struct  attributeDef    ad;
            if ((f = openDirectoryFile(ATTRIBUTEDEFS)) < 0) return 0;
            if (getAttributeDef(f, attributeIndex, &ad) == 0) {
                    closeDirectoryFile(f); return 0; }
            closeDirectoryFile(f);
            return get_string(ad.name);
    }
```

```
/**********************************************************************/
/* low level operations of the attributeDef file */
/**********************************************************************/ getAttributeDef(f, pv, ad)
        int     f, pv;
        struct  attributeDef    *ad;
/* gets the instance of an attributeDef for pointer, pv, from the
   hypertext attributeValue file corresponding to 'f'. If success returns 1,
   else returns 0.

Preconditions: 1) f is a file descriptor for an open hypertext
                     attributeValue file as returned by
                     openDirectoryFile(ATTRIBUTEDEF).
                  2) the attributeDef for pv exists in f
   Postconditions: 1) ad is the instance of an attributeDef for pv
            from the hypertext attributeValue file coresponding to 'f'.

getAttributeDef(f, pv) -> ad
*/
{
        struct  fileHeader      fh;
        if (lseek(f, (pv - 1) * sizeof(*ad) + sizeof(fh), L_SET) == -1) {
                setError(E_seek_dirfile, "ATTRIBUTEDEF", 0);
                return 0;
        }
        if (read(f, ad, sizeof(*ad)) != sizeof(*ad)) {
                setError(E_read_dirfile, "ATTRIBUTEDEF", 0);
                return 0;
        }
        return 1;
} putAttributeDef(f, pv, ad)
        int     f, pv;
        struct  attributeDef    *ad;
/* updates the instance of an attributeDef for pointer, pv, from the
   hypertext attributeValue file corresponding to 'f'. If success returns 1,
   else returns 2.

Preconditions: 1) f is a file descriptor for an open hypertext
                     attributeValue file as returned by
                     openDirectoryFile(ATTRIBUTEDEF).
                  2) the attributeDef for pv exists in f
   Postconditions: 1) the value of the instance of an attributeDef for
                     pv from the hypertext attributeValue file coresponding to 'f'
                     is equal to ad.

putAttributeDef(f, pv) -> ad
*/
{
        struct  fileHeader      fh;
        if (lseek(f, (pv - 1) * sizeof(*ad) + sizeof(fh), L_SET) == -1) {
                setError(E_seek_dirfile, "ATTRIBUTEDEF", 0);
                return 0;
        }
        if (write(f, ad, sizeof(*ad)) != sizeof(*ad)) {
                setError(E_write_dirfile, "ATTRIBUTEDEF", 0);
                return 0;
        }
        wasUpdated[f] = 1;
        return 1;
} addAttributeDef(f, ad)
        int     f;
        struct  attributeDef    *ad;
/* appends an instance of attributeDef in the hypertext attributeValue
   file corresponding to 'f'. If success returns an index corresponding to the
   new attributeDef entry else returns 0.

Preconditions: 1) f is a file descriptor for an open hypertext
                     attributeValue file as returned by
                     openDirectoryFile(ATTRIBUTEDEF).
                  2) aa is a valid instance of attributeDef
   Postconditions: 1) result > 0 implies the instance of an attributeDef
                     corresponding to the result from the hypertext attributeValue
                     file coresponding to 'f' is equal to ae.

addAttributeDef(f, ad) -> an index
*/
```

```
        int     v;

/* get the next available attribute def entry */
        if ((v = getNextEmptyEntry(f, sizeof(*ad), L_ADDATTDEF)) == FALSE)
            return FALSE;
    /* append the new attribute def entry */
        if (lseek(f, (v - 1) * sizeof(*ad) + sizeof(FILE_HEADER),L_SET) == -1) {
            setError(E_seek_dirfile, "ATTRIBUTEDEF", 0);
            return 0;
        }
        if (write(f, ad, sizeof(*ad)) != sizeof(*ad)) {
            setError(E_write_dirfile, "ATTRIBUTEDEF", 0);
            return 0;
        }
        wasUpdated[f] = 1;
        return v;
} removeAttributeDef(f, adIndex)
        int     f, adIndex;
/* removes an instance of attributeDef from the hypertext ATTRIBUTEDEF
   file coresponding to 'f'. If success returns TRUE else returns FALSE.

Preconditions: 1) f is a file descriptor for an open hypertext
                     attributeDef file as returned by openDirectoryFile(ATTRIBUTEDEF)
                  2) adIndex is the index of a valid instance of attributeDef
   Postconditions: 1) result == TRUE implies that the storage space previously
                     occupied by instance of the attributeDef, adIndex,
                     is marked empty and is available for recycling.

*/
{
        wasUpdated[f] = 1;
        return removeDirFileEntry(f, adIndex, sizeof(ATT_DEF));
} isValidAttributeDef(f, adIndex)
        int     f, adIndex;
{
        return isValidEntry(f, adIndex, sizeof(ATT_DEF));
}

/* f_attHist.c implements the operations on the hypertext directory
   file that contains the attributeHistory entries.
   This file consists of a fileHeader at seek offset == 0
   followed by an array of attributeHistoryBuffer records.

invariants:
            1) there are fileHeader.size attributeHistoryBuffer records in
               the file
            for each attributeHistoryBuffer record:
                1) previous == -1 or points to a valid instance
                   of another attributeHistoryBuffer in this file.
                2) the elements in array histories are ordered in
                   decreasing order of versionTime.
                3) if previous != -1, the most recent versionTime in
                   the record referred to by previous is less than
                   the earliest versionTime in self
*/ include        <sys/file.h>
include        <setjmp.h>
include        <stdio.h> include        "directory.h"
include        "actions.h"
include        "strings.h"
include        "errors.h"
include        "log.h"
extern char     *malloc();

extern int      thisHostId;

/*****************************************************************/
/* operations on the abstraction attributeHistoryBuffer */
/*****************************************************************/
```

```
findAttValueVersion(versionTime, currentValue, prevIndex, firstBuf, valueRec)
        struct  attributeHistory         *currentValue;
        int     versionTime, firstBuf;
        short   prevIndex;
        struct  attributeHistory         *valueRec;
/* returns the desired version of an attribute value.
   Returns -1 if fails, 0 if value not defined, 1 if succeeds.
   ctual value is copied into result buffer valueRec. */

{
        struct  attributeHistory        ah, *ahPtr;
        struct  attributeHistoryBuffer  ahb, *abPtr;
        int     lowerBound, f, i;
        short   r, l, m;

/* quick special case for current version */
        if (currentValue->versionTime <= versionTime) {
                ahPtr = currentValue;
                goto foundVersion;
                }

/* desired version was not in first buffer, need to check others */
        lowerBound = prevIndex;
        if ((f = openDirectoryFile(ATTRIBUTEHISTORY)) < 0) return -1;
        i = firstBuf;
        while (i != -1) {
                if (getAttributeHistory(f, i, &ahb) == 0) {
                        closeDirectoryFile(f); return -1;
                        }
                if (ahb.histories[NUMATTHISTORIES - 1].versionTime <= versionTime) {
                        abPtr = &ahb;
                        closeDirectoryFile(f);
                        goto foundVersionBuffer;
                        }
                lowerBound = 0; /* all except first buf are full */
                i = ahb.previous;
                }
        /* assert i == -1, implying that the value of the attribute was not
                yet defined for this node at versionTime */
        closeDirectoryFile(f);
        return 0;

foundVersionBuffer: /* desired version is in buffer of versions pointed to by
                abPtr. We'll do a binary search to find it.
                assert: lowerBound is the lowest used index in the buffer */ l = lowerBound; r = NUMATTHISTORIES - 1;
        while (l < r)   {
                m = (r + l) / 2;
                i = abPtr->histories[m].versionTime;
                if (i == versionTime) {
                        ahPtr = &abPtr->histories[m];
                        goto foundVersion;
                        }
                else if (i > versionTime) l = m + 1;
                else    r = m - 1;
                }
        /* assert: histories[l].versionTime <= versionTime */
        ahPtr = &abPtr->histories[l];

foundVersion: /* assert ahPtr points to the version of the value we wanted */
        bcopy(ahPtr, valueRec, sizeof(ah)); /* copy into result buffer */
        return 1;
} destroyAttributeHistories(pv)
        int     pv;
        /* removes the list of attributeHistoryBuffer instances starting at
                pv */
{       int     f, p, n;
        struct  attributeHistoryBuffer ah;
        if (pv == -1) return 1;
        if ((f = openDirectoryFile(ATTRIBUTEHISTORY)) < 0) return 0;
        p = pv;
        while (p != -1) {
                if (getAttributeHistory(f, p, &ah) == 0) goto out1;
                logPendingTransaction(L_DESTROYATTHIST, p, &ah, sizeof(ah));
                n = p; p = ah.previous;
                if (removeAttributeHistory(f, n) == 0) goto out1;
                }
```

```
            closeDirectoryFile(f);
            return 1;

out1:       closeDirectoryFile(f);
out2:       return 0;
}

/*******************************************************************/
/* low level operations on the atributeHistory file */
/*******************************************************************/ getAttributeHistory(f, pv, ah)
        int     f, pv;
        struct  attributeHistoryBuffer *ah;
/* gets the instance of a attributeHistoryBuffer for previousVersion, pv,
   from the hypertext attributeHistory file corresponding to 'f'.
   If success returns 1, else returns 0.

Preconditions: 1) f is a file descriptor for an open hypertext
                     attributeHistory file as returned by
                     openDirectoryFile(ATTRIBUTEHISTORY).
                  2) the attributeHistoryBuffer for pv exists in f
   Postconditions: 1) ah is the instance of an attributeHistoryBuffer for pv
                      from the hypertext attributeHistory file coresponding to 'f'.

getAttributeHistory(f, pv) -> ah
*/
{
        if (lseek(f, pv, L_SET) == -1) {
                setError(E_seek_dirfile, "ATTRIBUTEHISTORY", 0);
                return 0;
                }
        if (read(f, ah, sizeof(*ah)) != sizeof(*ah)) {
                setError(E_read_dirfile, "ATTRIBUTEHISTORY", 0);
                return 0;
                }
        return 1;
}
putAttributeHistory(f, pv, ah)
        int     f, pv;
        struct  attributeHistoryBuffer *ah;
/* put the instance of a attributeHistoryBuffer for previousVersion, pv,
   from the hypertext attributeHistory file corresponding to 'f'.
   If success returns 1, else returns 0.

Preconditions: 1) f is a file descriptor for an open hypertext
                     attributeHistory file as returned by
                     openDirectoryFile(ATTRIBUTEHISTORY).
                  2) the attributeHistoryBuffer for pv exists in f
   Postconditions: 1) the instance of an attributeHistoryBuffer for pv from the
                     hypertext attributeHistory file coresponding to 'f' is equal to ah.

putAttributeHistory(f, pv, ah)
*/
{
        if (lseek(f, pv, L_SET) == -1) {
                setError(E_seek_dirfile, "ATTRIBUTEHISTORY", 0);
                return 0;
                }
        if (write(f, ah, sizeof(*ah)) != sizeof(*ah)) {
                setError(E_write_dirfile, "ATTRIBUTEHISTORY", 0);
                return 0;
                }
        wasUpdated(f) = 1;
        return 1;
} addAttributeHistory(f, ah)
        int     f;
        struct  attributeHistoryBuffer *ah;
/* appends an instance of attributeHistoryBuffer in the hypertext
   attributeHistory file coresponding to 'f'. If success returns an index
   corresponding to the new attributeHistoryBuffer entry else returns 0.

Preconditions: 1) f is a file descriptor for an open hypertext
                     attributeHistory file as returned by
                     openDirectoryFile(ATTRIBUTEHISTORY).
                  2) ah is a valid instance of attributeHistory
   Postconditions: 1) result > 0 implies the instance of an attributeHistoryBuffer
                      corresponding to the result from the hypertext attributeHistory
                      file coresponding to 'f' is equal to ae.
```

```
                        addAttributeHistory(f, ah) -> an index
    */
    {
            int     v;

/* get the next available attribute history entry */
            if ((v = getNextEmptyEntry(f, sizeof(*ah), L_ADDATTHIST)) == FALSE)
                    return FALSE;
        /* append the new attribute history entry */
            v = (v - 1) * sizeof(*ah) + sizeof(FILE_HEADER);
            if (!seek(f, v, L_SET) == -1) {
                    setError(E_seek_dirfile, "ATTRIBUTEHISTORY", 0);
                    return 0;
            }
            if (write(f, ah, sizeof(*ah)) != sizeof(*ah)) {
                    setError(E_write_dirfile, "ATTRIBUTEHISTORY", 0);
                    return 0;
            }
            wasUpdated[f] = 1;
            return v;

} removeAttributeHistory(f, ahPtr)
        int     f, ahPtr;
/* removes an instance of attributeHistory from the hypertext ATTRIBUTEHISTORY
    file coresponding to 'f'. If success returns TRUE else returns FALSE.

Preconditions: 1) f is a file descriptor for an open hypertext
                    attributeHistory file as returned by
                    openDirectoryFile(ATTRIBUTEHISTORY).
                2) ahPtr is the seek offset of a valid instance of
                    attributeHistroy
    Postconditions: 1) result == TRUE implies that the storage space previously
                    occupied by instance of the attributeHistroy, ahPtr,
                    is marked empty and is available for recycling.

*/
{
        int     v;
        wasUpdated[f] = 1;
        v = (ahPtr - sizeof(FILE_HEADER)) / sizeof(ATT_HIST_BUF) + 1;
        return removeDirFileEntry(f, v, sizeof(ATT_HIST_BUF));
} isValidAttributeHistory(f, ahPtr)
        int     f, ahPtr;
{       int     v;
        v = (ahPtr - sizeof(FILE_HEADER)) / sizeof(ATT_HIST_BUF) + 1;
        return isValidEntry(f, v, sizeof(ATT_HIST_BUF));
}

/* attValue.c implements the operations on the hypertext directory
        file that contains the attributeValue entries.
    This file consists of a fileHeader at seek offset == 0
    followed by an array of entityAttributeValue records.

invariants:
                1) there are fileHeader.size entityAttributeValue records in
                    the file
                for each entityAttributeValue record:
                    1) nextValue == -1 or points to a valid
                            instance of another entityAttributValue in
                            this file.
                    2) entity points to a valid node or link entry
                    3) currentIndex is in the range:
                                    0<=currentIndex<=NUMATTHISTORIES-1
                    4) recentHistory.previous == -1 or points to a valid
                            instance of a attributeHistoryBuffer in the
                            ATTRIBUTEHISTORY file.

*/ include        <sys/file.h>
include        <setjmp.h>
include        <stdio.h> include        "directory.h"
include        "actions.h"
include        "strings.h"
include        "errors.h"
```

```
#include      "log.h"
extern char   *malloc();

extern int    thisHostId;

/*******************************************************************/
/* operations on entityAttributeValue */
/*******************************************************************/ newAttributeValue(av, isNode, attributeIndex)
         struct  entityAttributeValue   *av;
         int     isNode, attributeIndex;
  /* adds an entityAttributeValue node to the linked list of values for
         an attributeDef. If the attributeDef does not exist for
         attributeIndex, then creates it first. */
{        int     i, j, f1, f2, valuePtr;
         struct  attributeDef       ad;
         struct  attributeValueBuffer   avb;
         struct  entityAttributeValue   fav;

if ((f1 = openDirectoryFile(ATTRIBUTEDEFS)) < 0) goto out3;
         if (getAttributeDef(f1, attributeIndex, &ad) == 0) goto out2;

if ((f2 = openDirectoryFile(ATTRIBUTEVALUES)) < 0) goto out2;
         i = isNode ? ad.nextNodeIndex : ad.nextLinkIndex;
         j = isNode ? ad.nextFreeNodeValuePtr : ad.nextFreeLinkValuePtr;
         logPendingTransaction(L_PUTATTDEF, attributeIndex, &ad, sizeof(ad));
         if ((i == NUMATTVALUES) && (j == -1)) {
                  if (isNode)    {
                           ad.nextNodeIndex = 1;
                           avb.next = ad.nodeValuesList;
                           }
                  else     {
                           ad.nextLinkIndex = 1;
                           avb.next = ad.linkValuesList;
                           }
                  bcopy(av, &avb.values[0], sizeof(*av));

if ((i = addAttributeValueBuffer(f2, &avb)) == 0) goto out1;
                  if (isNode)    ad.nodeValuesList = i;
                  else     ad.linkValuesList = i;
                  valuePtr = attributeValueIndex(i, 0);
                  }
         else    {
                  if (j != -1) {
                           if (getAttributeValue(f2, j, &fav) == 0) goto out1;
                           logPendingTransaction(L_PUTATTVALUE, j, &fav, sizeof(fav));
                           }
                  if (isNode) {
                           if (ad.nextFreeNodeValuePtr == -1) {
                                    valuePtr = attributeValueIndex(ad.nodeValuesList,
                                                                        ad.nextNodeIndex);
                                    ad.nextNodeIndex += 1;
                                    }
                           else    valuePtr = ad.nextFreeNodeValuePtr;
                           }
                  else    {
                           if (ad.nextFreeLinkValuePtr == -1) {
                                    valuePtr = attributeValueIndex(ad.linkValuesList,
                                                                        ad.nextLinkIndex);
                                    ad.nextLinkIndex += 1;
                                    }
                           else    valuePtr = ad.nextFreeLinkValuePtr;
                           }
                  /* don't need to logPendingTransaction here because this new
                           record is not visible unless update to ad is committed */
                  if (putAttributeValue(f2, valuePtr, &av) == 0) goto out1;
                  }
         closeDirectoryFile(f2);

if (putAttributeDef(f1, attributeIndex, &ad) == 0) goto out2;

closeDirectoryFile(f1); return valuePtr;

out1:    closeDirectoryFile(f2);
out2:    closeDirectoryFile(f1);
out3:    return 0;
} destroyAttributeValue(isNode, attributeIndex, valuePtr)
         int     valuePtr;
```

```
        int     isNode, attributeIndex;
/* removes an instance of attributeValue from the hypertext ATTRIBUTEVALUE
   file coresponding to 'f'. If success returns TRUE else returns FALSE.

Preconditions: 1) f is a file descriptor for an open hypertext
                     attributeValue file as returned by
                     openDirectoryFile(ATTRIBUTEVALUE).
                  2) valuePtr is the seek offset of a valid instance of
                     attributeValue
   Postconditions: 1) result == TRUE implies that the storage space previously
                      occupied by instance of the attributeValue, valuePtr,
                      is marked empty and is available for recycling.

*/
{
        int     f1, f2;
        struct  attributeDef    ad;
        struct  entityAttributeValue    av;

if ((f1 = openDirectoryFile(ATTRIBUTEDEFS)) < 0) goto out3;
        if (getAttributeDef(f1, attributeIndex, &ad) == 0) goto out2;

if ((f2 = openDirectoryFile(ATTRIBUTEVALUES)) < 0) goto out2;
        logPendingTransaction(L_PUTATTDEF, attributeIndex, &ad, sizeof(ad));
        if (getAttributeValue(f2, valuePtr, &av) == 0) goto out1;
        logPendingTransaction(L_PUTATTVALUE, valuePtr, &av, sizeof(av));
        av.entity = -1; /* mark as empty */
        if (av.previous != -1)
                if (destroyAttributeHistories(av.previous) == 0) goto out1;
        if (isNode)
                ad.nextFreeNodeValuePtr = valuePtr;
        else    ad.nextFreeLinkValuePtr = valuePtr;
        if (putAttributeValue(f2, valuePtr, &av) == 0) goto out1;
        closeDirectoryFile(f2);

if (putAttributeDef(f1, attributeIndex, &ad) == 0) goto out2;

closeDirectoryFile(f1); return 1;

out1:   closeDirectoryFile(f2);
out2:   closeDirectoryFile(f1);
out3:   return 0;
}

/***********************************************************************/
/* low level operations on the attributeValue file */
/***********************************************************************/ getAttributeValue(f, pv, av)
        int     f, pv;
        struct  entityAttributeValue    *av;
/* gets the instance of an entityAttributeValue for pointer, pv, from the
   hypertext attributeValue file corresponding to 'f'. If success returns 1,
   else returns 0.

Preconditions: 1) f is a file descriptor for an open hypertext
                     attributeValue file as returned by
                     openDirectoryFile(ATTRIBUTEVALUE).
                  2) the entityAttributeValue for pv exists in f
   Postconditions: 1) av is the instance of an entityAttributeValue for pv
                      from the hypertext attributeValue file coresponding to 'f'.

getAttributeValue(f, pv) -> av
*/
{
        if ((seek(f, pv, L_SET) == -1) {
                setError(E_seek_dirfile, "ATTRIBUTEVALUE", 0);
                return 0;
                }
        if (read(f, av, sizeof(*av)) != sizeof(*av)) {
                setError(E_read_dirfile, "ATTRIBUTEVALUE", 0);
                return 0;
                }
        return 1;
} putAttributeValue(f, pv, av)
        int     f, pv;
        struct  entityAttributeValue    *av;
/* updates the instance of an entityAttributeValue for pointer, pv, from the
   hypertext attributeValue file corresponding to 'f'. If success returns 1,
   else returns 0.
```

```
   Preconditions: 1) f is a file descriptor for an open hypertext
                     attributeValue file as returned by
                     openDirectoryFile(ATTRIBUTEVALUE).
                  2) the entityAttributeValue for pv exists in f
   Postconditions: 1) the value of the instance of an entityAttributeValue for
                     pv from the hypertext attributeValue file coresponding to 'f'
                     is equal to av.

putAttributeValue(f, pv) -> av
*/
{
        if (lseek(f, pv, L_SET) == -1) {
                setError(E_seek_dirfile, "ATTRIBUTEVALUE", 0);
                return 0;
                }
        if (write(f, av, sizeof(*av)) != sizeof(*av)) {
                setError(E_write_dirfile, "ATTRIBUTEVALUE", 0);
                return 0;
                }
        wasUpdated[f] = 1;
        return 1;
} attributeValueIndex(bufIndex, vIndex)
        int     bufIndex, vIndex;
{
        struct  entityAttributeValue    av;
        return (bufIndex + 4 + sizeof(av) * vIndex);
} getAttributeValueBuffer(f, pv, avb)
        int     f, pv;
        struct  attributeValueBuffer    *avb;
/* gets the instance of an attributeValueBuffer for pointer, pv, from the
   hypertext attributeValue file corresponding to 'f'. If success returns 1,
   else returns 0.

Preconditions: 1) f is a file descriptor for an open hypertext
                     attributeValue file as returned by
                     openDirectoryFile(ATTRIBUTEVALUE).
                  2) the attributeValueBuffer for pv exists in f
   Postconditions: 1) avb is the instance of an attributeValueBuffer for pv
                     from the hypertext attributeValue file corresponding to 'f'.

getAttributeValue(f, pv) -> avb
*/
{
        if (lseek(f, pv, L_SET) == -1) {
                setError(E_seek_dirfile, "ATTRIBUTEVALUE", 0);
                return 0;
                }
        if (read(f, avb, sizeof(*avb)) != sizeof(*avb)) {
                setError(E_read_dirfile, "ATTRIBUTEVALUE", 0);
                return 0;
                }
        return 1;
} addAttributeValueBuffer(f, avb)
        int     f;
        struct  attributeValueBuffer    *avb;
/* appends an instance of attributeValueBuffer in the hypertext attributeValue
   file coresponding to 'f'. If success returns an index corresponding to the
   new entityAttributeValue entry else returns 0.

Preconditions: 1) f is a file descriptor for an open hypertext
                     attributeValue file as returned by
                     openDirectoryFile(ATTRIBUTEVALUE).
                  2) avb is a valid instance of attributeValueBuffer
   Postconditions: 1) result > 0 implies the instance of an attributeValueBuffer
                     corresponding to the result from the hypertext attributeValue
                     file coresponding to 'f' is equal to ae.

addAttributeValue(f, avb) -> an index
*/
{       int     v;

/* get the next available entity attribute value entry */
        if ((v = getNextEmptyEntry(f, sizeof(*avb), L_ADDATTVALUE)) == FALSE)
                return FALSE;
```

```c
        /* append the new entity attribute value entry */
        v = (v - 1) * sizeof(*avb) + sizeof(FILE_HEADER);
        if (lseek(f, v, L_SET) == -1) {
                setError(E_seek_dirfile, "ATTRIBUTEVALUE", 0);
                return 0;
                }
        if (write(f, avb, sizeof(*avb)) != sizeof(*avb)) {
                setError(E_write_dirfile, "ATTRIBUTEVALUE", 0);
                return 0;
                }
        wasUpdated[f] = 1;
        return v;
} removeAttributeValueBuffer(f, avbPtr)
        int     f, avbPtr;
/* removes an instance of attributeValueBuffer from the hypertext ATTRIBUTEVALUE
   file coresponding to 'f'. If success returns TRUE else returns FALSE.

Preconditions: 1) f is a file descriptor for an open hypertext
                     attributeValue file as returned by
                     openDirectoryFile(ATTRIBUTEVALUE).
                  2) avbPtr is the seek offset of a valid instance of
                     attributeValueBuffer
   Postconditions: 1) result == TRUE implies that the storage space previously
                     occupied by instance of the attributeValueBuffer, avbPtr,
                     is marked empty and is available for recycling.

*/
{
        int     v;
        wasUpdated[f] = 1;
        v = (avbPtr - sizeof(FILE_HEADER)) / sizeof(ATT_VALUE_BUF) + 1;
        return removeDirFileEntry(f, v, sizeof(ATT_VALUE_BUF));
} isValidAttributeValueBuffer(f, avbPtr)
        int     f, avbPtr;
{
        int     v;
        v = (avbPtr - sizeof(FILE_HEADER)) / sizeof(ATT_VALUE_BUF) + 1;
        return isValidEntry(f, v, sizeof(ATT_VALUE_BUF));
}

/* f_entAtt.c implements the operations on the hypertext directory
        file that contains the entityAttribute lists.
   This file consists of a fileHeader at seek offset == 0
   followed by an array of entityAttributes records.

invariants:
                1) there are fileHeader.size entityAttributes records in
                        the file
                for each entityAttributes record:
                        1) the next field == -1 or points to a valid instance
                                of another entityAttribute in this file.
                        2) each valuePtr points to a valid record in the
                                ENTITYATTRIBUTE file.
                        3) each attributeName contains a valid string index
                                for an attribute name.
*/ include        <sys/file.h>
include        <setjmp.h>
include        <stdio.h> include        "directory.h"
include        "actions.h"
include        "strings.h"
include        "errors.h"
include        "log.h"
extern char     *malloc();

extern int      thisHostId;

/**************************************************************************/
/* operations of the abstract object entityAttribute */
/**************************************************************************/ newAttributePair(ab, attributeStringIndex, valuePtr)
        int     attributeStringIndex, valuePtr;
        struct  entityAttributes        *ab;
    /* creates a new attributePair into the list of entityAttribute buffers.
        Maintains property that list of buffers is sorted on
        attributeStringIndex. Buffers are not always full, so it is possible
        to insert a new entry without needing to propogate copying to all
        subsequent buffers. */
```

```
{
        int     f, i, j, k, m, here;
        struct  attributePair       ap;
        struct  entityAttributes    ea1, ea2;
        struct  entityAttributes    *prev, *abPtr;
        int     abAddr, prevAddr;

/* find the buffer where the new entry should go */
    /* first: if only one buffer, and it is not full */
    prev = (struct entityAttributes *) -1; abPtr = ab; abAddr = -1;
    if (ab->next == -1) /* only one buffer, so far */
            if (ab->nextAttributeIndex != NUMATTPAIRS) goto insertIt;
            else    goto foundBuf;
    else {  /* traverse list of buffers to find one whose largest value is greater
                than new one */
            if (ab->attributes[ab->nextAttributeIndex - 1].attributeName >
                                                attributeStringIndex)
                    goto foundBuf; /* belongs in first buf */
            if (((f = openDirectoryFile(ENTITYATTRIBUTES)) < 0) return -1;
            prev = ab; prevAddr = -1;
            abPtr = &ea1; abAddr = ab->next;
    }
searchLoop:
            if (getEntityAttribute(f, abAddr, abPtr) == 0) {
                        closeDirectoryFile(f); return -1; }
            if (ea1.attributes[abPtr->nextAttributeIndex -1].attributeName >
                                                attributeStringIndex) {
                        closeDirectoryFile(f);
                        goto foundBuf; }
            if (abPtr->next != -1) {
                        prevAddr = abAddr; abAddr = abPtr->next;

prev = abPtr;
                        if (abPtr == &ea1) abPtr = &ea2;
                        else    abPtr = &ea1;
                        goto searchLoop;
            }
            closeDirectoryFile(f);
            /* new one is larger than largest */ foundBuf:   /* assert the largest one in abPtr is greater than new one and
                prev points to abPtr's predecessor */ if (abPtr->nextAttributeIndex != NUMATTPAIRS) goto insertIt;
            else if (((int )prev != -1) && (prev->nextAttributeIndex != NUMATTPAIRS))
                    if (abPtr->attributes[0].attributeName
                                            > attributeStringIndex) {
                        abPtr = prev; abAddr = prevAddr;
                        goto insertIt;
                    }
                    else { /* room in prev, shift first from abPtr and merge new one */
                            if (prevAddr != -1)
                                logPendingTransaction(L_PUTENTATT, prevAddr, prev, sizeof(*prev));
                            bcopy(&abPtr->attributes[0],
                                    &prev->attributes[prev->nextAttributeIndex], sizeof(ap));
                            prev->nextAttributeIndex += 1;
                            if (((f = openDirectoryFile(ENTITYATTRIBUTES)) < 0) return -1;
                            if (prevAddr != -1)
                                if (putEntityAttribute(f, prevAddr, prev) == 0) {
                                    closeDirectoryFile(f); return -1; }
                            /* empty a slot for new value by shifting elements of buffer */
                            j = 0;
                            while ((j < NUMATTPAIRS - 1) &&
                                (abPtr->attributes[j+1].attributeName < attributeStringIndex))
                                    { bcopy(&abPtr->attributes[j+1], &abPtr->attributes[j],
                                                                    sizeof(ap));
                                      j += 1; }
                    /* insert new value */
                            if (abAddr != -1)
                                logPendingTransaction(L_PUTENTATT, abAddr, abPtr, sizeof(*abPtr));
                            abPtr->attributes[j].attributeName = attributeStringIndex;
                            abPtr->attributes[j].valuePtr = valuePtr;
                            if (abAddr != -1)
                                if (putEntityAttribute(f, abAddr, abPtr) == 0) {
                                    closeDirectoryFile(f); return -1; }
                            closeDirectoryFile(f);
                            return 1;
                    }
            else /* no room in prev and no room in abPtr, check next */
                    if (abPtr->next == -1)
                            /* no next and prev and current are full */
                            goto splitIt;
```

```
            prevAddr = abAddr; abAddr = abPtr->next;
            prev = abPtr;
            if (abPtr == ab) abPtr = &ea1;
            else if (abPtr == &ea1) abPtr = &ea2;
            else    abPtr = &ea1;
            if ((f = openDirectoryFile(ENTITYATTRIBUTES)) < 0) return -1;
            if (getEntityAttribute(f, abAddr, abPtr) == 0) {
                        closeDirectoryFile(f); return -1; }
            if (abPtr->nextAttributeIndex == NUMATTPAIRS) {
                        /* next, current and prev are full, split it */
                        abPtr = prev; abAddr = prevAddr;
                        closeDirectoryFile(f);
                        goto splitIt;
                        }
      /* there is room in next, shift top one */
            logPendingTransaction(L_PUTENTATT, abAddr,abPtr,sizeof(*abPtr));
            for (i = abPtr->nextAttributeIndex; i > 0; i--)
                        bcopy(&abPtr->attributes[i-1],
                                          &abPtr->attributes[i], sizeof(ap));
            abPtr->nextAttributeIndex += 1;
            bcopy(&prev->attributes[NUMATTPAIRS - 1],
                                          &abPtr->attributes[0], sizeof(ap));
            if (putEntityAttribute(f, abAddr, abPtr) == 0) {
                                          closeDirectoryFile(f); return -1; }
      /* empty a slot for new value by shifting elements of buffer */
            j = NUMATTPAIRS - 1;
            while ((j > 0) && (prev->attributes[j-1].attributeName
                                          > attributeStringIndex)) {
                        bcopy(&prev->attributes[j-1], &prev->attributes[j],
                                                              sizeof(ap));
                        j -= 1; }
      /* insert new value */
            logPendingTransaction(L_PUTENTATT, prevAddr,prev,sizeof(*prev));
            prev->attributes[j].attributeName = attributeStringIndex;
            prev->attributes[j].valuePtr = valuePtr;
            if (prevAddr != -1)
                   if (putEntityAttribute(f, prevAddr, prev) == 0) {
                                 closeDirectoryFile(f); return -1; }
            closeDirectoryFile(f);
            return 1;

insertIt: /* abPtr is not full and new one belongs in it */
            if (abAddr != -1)
                   logPendingTransaction(L_PUTENTATT, abAddr, abPtr, sizeof(*abPtr));
      /* empty a slot for new value by shifting elements of old buffer */
            j = abPtr->nextAttributeIndex;
            while ((j > 0) && (abPtr->attributes[j-1].attributeName
                                          > attributeStringIndex)) {
                        bcopy(&abPtr->attributes[j-1], &abPtr->attributes[j], sizeof(ap));
                        j -= 1; }
      /* insert new value */
            abPtr->attributes[j].attributeName = attributeStringIndex;
            abPtr->attributes[j].valuePtr = valuePtr;
            abPtr->nextAttributeIndex += 1;
            if (abAddr != -1) {
                        if ((f = openDirectoryFile(ENTITYATTRIBUTES)) < 0)
                                    return -1;
                        if (putEntityAttribute(f, abAddr, abPtr) == 0) {
                                    closeDirectoryFile(f); return -1; }
                        closeDirectoryFile(f);
                        }
            return 1;

splitIt: /* abPtr is full and new one belongs in it */
            if (abPtr == ab) prev = &ea1;
            else if (abPtr == &ea1) prev = &ea2;
            else    prev = &ea1;
            m = NUMATTPAIRS / 2;
            logPendingTransaction(L_PUTENTATT, abAddr, abPtr, sizeof(*abPtr));
            if (abPtr->attributes[m].attributeName < attributeStringIndex) {
                  /* merge new value with new buffer */
                        j = NUMATTPAIRS - 1; k = m - 1;
                  /* copy first part */
                        while ((k > 0) && (abPtr->attributes[j].attributeName
                                                       > attributeStringIndex))
                                    bcopy(&abPtr->attributes[j--], &prev->attributes[k--],
                                                              sizeof(ap));
                  /* insert new value */
                        prev->attributes[k].attributeName = attributeStringIndex;
                        prev->attributes[k--].valuePtr = valuePtr;
```

```
                /* copy last part */
                while (k >= 0)
                        bcopy(&abPtr->attributes[j--], &prev->attributes[k--],
                                                sizeof(ap));
                abPtr->nextAttributeIndex = NUMATTPAIRS - m + 1;
                prev->nextAttributeIndex = m;
                }
        else { /* copy new buffer and then insert new value in old buffer */
                /* copy top half into new buffer */
                for (i = 0; i < m; i++) {
                        bcopy(&abPtr->attributes[m + i],
                                        &prev->attributes[i], sizeof(ap));}
                abPtr->nextAttributeIndex = NUMATTPAIRS - m + 1;
                prev->nextAttributeIndex = m;
                /* empty slot for new value by shifting elements of old buffer */
                j = NUMATTPAIRS - m;

while ((j > 0) && (abPtr->attributes[j-1].attributeName
                                                > attributeStringIndex)) {
                        bcopy(&abPtr->attributes[j-1],
                                        &abPtr->attributes[j], sizeof(ap));
                        j -= 1;
                        }
                /* insert new value */
                abPtr->attributes[j].attributeName = attributeStringIndex;
                abPtr->attributes[j].valuePtr = valuePtr;
                }
        /* need to output the two buffers */
        if ((f = openDirectoryFile(ENTITYATTRIBUTES)) < 0) return -1;
        prev->next = abPtr->next;
        if ((i = addEntityAttribute(f, prev)) == 0) {
                closeDirectoryFile(f); return -1; }
        abPtr->next = i;
        if (abAddr != -1)
                if ((i = putEntityAttribute(f, abAddr, abPtr)) == 0) {
                        closeDirectoryFile(f); return -1; }
        closeDirectoryFile(f);
        return 1;

} static struct    entityAttributes         *eaPtr, eaBuffer;
static int       nextElement;

initializeSequentialAttributePairSearch()
{
        nextElement = -1;
} findAttributePair(ab, attributeStringIndex, valuePtr)
        struct  entityAttributes        *ab;
        int     *valuePtr, attributeStringIndex;
{ /* non sequential search, each search is treated as first */
    nextElement = -1;
    return findSequentialAttributePair(ab, attributeStringIndex, valuePtr);
} findSequentialAttributePair(ab, attributeStringIndex, valuePtr)
        struct  entityAttributes        *ab;
        int     *valuePtr, attributeStringIndex;
{
        int     next, f, r, l, m, v, firstIndex;
        struct  attributePair   ap;

if (nextElement == -1) { /* first lookup */
                eaPtr = ab; firstIndex = 0;
                }
        else    firstIndex = nextElement;
        if (eaPtr->nextAttributeIndex == 0) return 0; /* empty buffer */
        if (eaPtr->attributes[eaPtr->nextAttributeIndex - 1].attributeName
                                >= attributeStringIndex)
                        goto foundBuffer;

next = eaPtr->next;
        eaPtr = &eaBuffer;
        firstIndex = 0;
        if ((f = openDirectoryFile(ENTITYATTRIBUTES)) < 0) return -1;
        while (next != -1) {
            if (getEntityAttribute(f, next, &eaBuffer) == 0) {
                        closeDirectoryFile(f); return -1; }
```

```
            if (eaPtr->attributes[eaPtr->nextAttributeIndex - 1].attributeName
                            >= attributeStringIndex) {
                    closeDirectoryFile(f); goto foundBuffer; }
        next = eaPtr->next;
        }
    closeDirectoryFile(f); return 0; /* not found */ foundBuffer: /* assert: the largest attribute in eaPtr >= attributeStringIndex.
                find element using binary search */ l = firstIndex; r = eaPtr->nextAttributeIndex - 1;
        while (l <= r) {
                m = (r + l) / 2;
                v = eaPtr->attributes[m].attributeName;
                if (v == attributeStringIndex) {
                        nextElement = m;
                        *valuePtr = eaPtr->attributes[m].valuePtr;
                        return 1;
                        }
                if (v < attributeStringIndex) l = m + 1;
                else    r = m - 1;
                }
        nextElement = l;
        return 0;
}

/***************************************************************/
/* operations of the entityAttribute file */
/***************************************************************/ getEntityAttribute(f, pv, ea)
        int     f, pv;
        struct  entityAttributes        *ea;
/* gets the instance of an entityAttribute for pointer, pv, from the
   hypertext entityAttribute file corresponding to 'f'. If success returns 1,
   else returns 0.

Preconditions: 1) f is a file descriptor for an open hypertext
                entityAttribute file as returned by
                openDirectoryFile(ENTITYATTRIBUTE).
                2) the entityAttribute for pv exists in f
   Postconditions: 1) ea is the instance of an entityAttribute for pv
                from the hypertext entityAttribute file corresponding to 'f'.

getEntityAttribute(f, pv) -> ea
*/
{
        if (lseek(f, pv, L_SET) == -1) {
                setError(E_seek_dirfile, "ENTITYATTRIBUTE", 0);
                return 0;
                }
        if (read(f, ea, sizeof(*ea)) != sizeof(*ea)) {
                setError(E_read_dirfile, "ENTITYATTRIBUTE", 0);
                return 0;
                }
        return 1;
} putEntityAttribute(f, pv, ea)
        int     f, pv;
        struct  entityAttributes        *ea;
/* updates the instance of an entityAttribute for pointer, pv, from the
   hypertext entityAttribute file corresponding to 'f'. If success returns 1,
   else returns 0.

Preconditions: 1) f is a file descriptor for an open hypertext
                entityAttribute file as returned by
                openDirectoryFile(ENTITYATTRIBUTE).
                2) the entityAttribute for pv exists in f
   Postconditions: 1) the value of the instance of an entityAttribute for
                pv from the hypertext entityAttribute file corresponding to 'f'
                is equal to ea.

putEntityAttribute(f, pv) -> ea
*/
{
        if (lseek(f, pv, L_SET) == -1) {
                setError(E_seek_dirfile, "ENTITYATTRIBUTE", 0);
                return 0;
                }
        if (write(f, ea, sizeof(*ea)) != sizeof(*ea)) {
                setError(E_write_dirfile, "ENTITYATTRIBUTE", 0);
```

```
                return 0;
                }
        wasUpdated[f] = 1;
        return 1;
} addEntityAttribute(f, ea)
        int     f;
        struct  entityAttributes  *ea;
/* appends an instance of entityAttribute in the hypertext entityAttribute
   file coresponding to 'f'. If success returns an index corresponding to the
   new entityAttribute entry else returns 0.

Preconditions: 1) f is a file descriptor for an open hypertext
                     entityAttribute file as returned by
                     openDirectoryFile(ENTITYATTRIBUTE).
                  2) aa is a valid instance of entityAttribute
   Postconditions: 1) result > 0 implies the instance of an entityAttribute
                     corresponding to the result from the hypertext entityAttribute
                     file coresponding to 'f' is equal to ae.

addEntityAttribute(f, ea) -> an index
*/
{
        int     v;

/* get the next available entity attribute entry */
        if ((v = getNextEmptyEntry(f, sizeof(*ea), L_ADDENTATT)) == FALSE)
                return FALSE;
        /* append the new entity attribute entry */
        v = (v - 1) * sizeof(*ea) + sizeof(FILE_HEADER);
        if (lseek(f, v, L_SET) == -1) {
                setError(E_seek_dirfile, "ENTITYATTRIBUTE", 0);
                return 0;
                }
        if (write(f, ea, sizeof(*ea)) != sizeof(*ea)) {
                setError(E_write_dirfile, "ENTITYATTRIBUTE", 0);
                return 0;
                }
        wasUpdated[f] = 1;
        return v;
} removeEntityAttribute(f, eaPtr)
        int     f, eaPtr;
/* removes an instance of entityAttribute from the hypertext ENTITYATTRIBUTE
   file coresponding to 'f'. If success returns TRUE else returns FALSE.

Preconditions: 1) f is a file descriptor for an open hypertext
                     entityAttribute file as returned by
                     openDirectoryFile(ENTITYATTRIBUTE).
                  2) avbPtr is the seek offset of a valid instance of
                     entityAttribute
   Postconditions: 1) result == TRUE implies that the storage space previously
                     occupied by instance of the entityAttribute, eaPtr,
                     is marked empty and is available for recycling.

*/
{
        int     v;
        wasUpdated[f] = 1;
        v = (eaPtr - sizeof(FILE_HEADER)) / sizeof(ENTITY_ATT) + 1;
        return removeDirFileEntry(f, v, sizeof(ENTITY_ATT));
} isValidEntityAttribute(f, eaPtr)
        int     f, eaPtr;
{       int     v;
        v = (eaPtr - sizeof(FILE_HEADER)) / sizeof(ENTITY_ATT) + 1;
        return isValidEntry(f, v, sizeof(ENTITY_ATT));
}

/* f_demonHist.c implements the operations on the hypertext directory
   file that contain the eventActionHistory entries. */ include        <sys/file.h>
include        <setjmp.h>
include        <stdio.h> include        "directory.h"
include        "actions.h"
include        "strings.h"
```

```
#include        "errors.h"
include        "log.h"
extern char     *malloc();

extern int      thisHostId;

getEventActionHistory(f, pv, eah)
        int     f, pv;
        struct  eventActionHistory      *eah;
/* gets the instance of a eventActionHistory for previousVersion, pv, from the
   hypertext eventActionHistory file corresponding to 'f'. If success returns 1,
   else returns 0.

Preconditions: 1) f is a file descriptor for an open hypertext
                     eventActionHistory file as returned by
                     openDirectoryFile(EVENTACTIONHISTORY).
                  2) the eventActionHistory for pv exists in f
   Postconditions: 1) eah is the instance of a eventActionHistory for pv from the
                     hypertext eventActionHistory file coresponding to 'f'.

getEventActionHistory(f, pv) -> eah
*/
{
        if (lseek(f, pv, L_SET) == -1) {
                setError(E_seek_dirfile, "EVENTACTIONHISTORY", 0);
                return 0;
                }
        if (read(f, eah, sizeof(*eah)) != sizeof(*eah)) {
                setError(E_read_dirfile, "EVENTACTIONHISTORY", 0);
                return 0;
                }
        return 1;
} addEventActionHistory(f, eah)
        int     f;
        struct  eventActionHistory      *eah;
/* appends an instance of eventActionHistory in the hypertext eventActionHistory file
   coresponding to 'f'. If success returns an index corresponding to the
   new eventActionHistory entry else returns 0.

Preconditions: 1) f is a file descriptor for an open hypertext
                     eventActionHistory file as returned by
                     openDirectoryFile(EVENTACTIONHISTORY).
                  2) eah is a valid instance of eventActionHistory
   Postconditions: 1) result > 0 implies the instance of a eventActionHistory
                     corresponding to the result from the hypertext
                     eventActionHistory file coresponding to 'f' is equal to eah.

addEventActionHistory(f, eah) -> an index
*/
{
        int     v;

/* get the next available event action history entry */
        if ((v = getNextEmptyEntry(f, sizeof(*eah),L_ADDEVENTACTHIST)) == FALSE)
                return FALSE;
    /* append the new event action history entry */
        v = (v - 1) * sizeof(*eah) + sizeof(FILE_HEADER);
        if (lseek(f, v, L_SET) == -1) {
                setError(E_seek_dirfile, "EVENTACTIONHISTORY", 0);
                return 0;
                }
        if (write(f, eah, sizeof(*eah)) != sizeof(*eah)) {
                setError(E_write_dirfile, "EVENTACTIONHISTORY", 0);
                return 0;
                }
        wasUpdated[f] = 1;
        return v;
} removeEventActionHistory(f, eahPtr)
        int     f, eahPtr;
/* removes an instance of eventActionHistory from the hypertext EVENTACTIONHISTORY
   file coresponding to 'f'. If success returns TRUE else returns FALSE.

Preconditions: 1) f is a file descriptor for an open hypertext
                     eventActionHistory file as returned by
                     openDirectoryFile(EVENTACTIONHISTORY).
                  2) eahPtr is the seek offset of a valid instance of
                     eventActionHistory
```

Postconditions: 1) result == TRUE implies that the storage space previously
    occupied by instance of the eventActionHistory, eahPtr,
    is marked empty and is available for recycling.
*/
{
        int     v;
        wasUpdated[f] = 1;
        v = (eahPtr - sizeof(FILE_HEADER)) / sizeof(EVENT_ACT_HIST) + 1;
        return removeDirFileEntry(f, v, sizeof(EVENT_ACT_HIST));
} isValidEventActionHistory(f, eahPtr)
        int     f, eahPtr;
{
        int     v;
        v = (eahPtr - sizeof(FILE_HEADER)) / sizeof(EVENT_ACT_HIST) + 1;
        return isValidEntry(f, v, sizeof(EVENT_ACT_HIST));
}

/* f_linkHist.c implements the operations on the hypertext directory file
    that contains the array of linkHistories.
    This file consists of a fileHeader at seek offset == 0
    followed by an array of linkHistoryBuffer records.

invariants:
                1) there are fileHeader.size linkHistoryBuffer records in
                        the file
                for each linkHistoryBuffer record:
                        1) previous == -1 or points to a valid instance
                                of another linkHistoryBuffer in this file.
                        2) the elements in array histories are ordered in
                                decreasing order of versionTime.
                        3) if previous != -1, the most recent versionTime in
                                the record referred to by previous is less than
                                the earliest versionTime in self
*/ include        <sys/file.h>
include        <setjmp.h>
include        <stdio.h> include        "directory.h"
include        "actions.h"
include        "strings.h"
include        "errors.h"
include        "log.h"
extern char     *malloc();

extern int      thisHostId;

/***********************************************************************/
/* operations on the abstraction linkHistoryBuffer */
/***********************************************************************/ findLinkVersion(versionTime, currentValue, prevIndex, prevPtr, valueRec)
        int     versionTime, prevPtr;
        short   prevIndex;
        struct  linkHistory     *currentValue, *valueRec;
/* returns the desired version of an link value.
    Returns -1 if fails, 0 if value not defined, 1 if succeeds.
    ctual value is copied into result buffer valueRec. */

{
        struct  linkHistory     lh, *lhPtr;
        struct  linkHistoryBuffer       lhb, *lbPtr;
        int     lowerBound, f, i;
        short   r, l, m;

/* quick special case for current version */
        if (currentValue->versionTime <= versionTime) {
                lhPtr = currentValue;
                goto foundVersion;
        }

/* desired version was not current one, need to check buffers */
        lowerBound = prevIndex;
        if ((f = openDirectoryFile(LINKHISTORY)) < 0) return -1;
        i = prevPtr;
        while (i != -1) {
                if (getLinkHistory(f, i, &lhb) == 0) {
                        closeDirectoryFile(f); return -1;
                }

```
            if (lhb.histories[NUMLINKHISTORIES - 1].versionTime <= versionTime) {
                lhPtr = &lhb;
                closeDirectoryFile(f);
                goto foundVersionBuffer;
            }
            lowerBound = 0;
            i = lhb.previous;
        }

/* assert i == -1, implying that the value of the link was not
                yet defined for this node at versionTime */
        closeDirectoryFile(f);
        return 0;

foundVersionBuffer: /* desired version is in buffer of versions pointed to by
                lhPtr. We'll do a binary search to find it.
                assert: lowerBound is the lowest used index in the buffer */ l = lowerBound; r = NUMLINKHISTORIES - 1;
        while (l < r)   {
                m = (r + l) / 2;
                i = lhPtr->histories[m].versionTime;
                if (i == versionTime) {
                        lhPtr = &lhPtr->histories[m];
                        goto foundVersion;
                }
                else if (i > versionTime) l = m + 1;
                else      r = m - 1;
        }
        /* assert: histories[l].versionTime <= versionTime */
        lhPtr = &lhPtr->histories[l];

foundVersion: /* assert lhPtr points to the version of the value we wanted */
        bcopy(lhPtr, valueRec, sizeof(lh)); /* copy into result buffer */
        return 1;
    }

/*****************************************************************************/
/* low level operations on the linkHistory file */
/*****************************************************************************/ getLinkHistory(f, pv, lhb)
        int     f, pv;
        struct  linkHistoryBuffer *lhb;
/* gets the instance of a linkHistoryBuffer for previousVersion, pv, from the
   hypertext linkHistory file corresponding to 'f'. If success returns 1,
   else returns 0.

Preconditions: 1) f is a file descriptor for an open hypertext linkHistory
                file as returned by openDirectoryFile(LINKHISTORY).
                2) the linkHistoryBuffer for pv exists in f
   Postconditions: 1) lhb is the instance of a linkHistoryBuffer for pv from the
                hypertext linkHistory file coresponding to 'f'.

getLinkHistory(f, pv) -> lhb
*/
{
        if (lseek(f, pv, L_SET) == -1) {
                setError(E_seek_dirfile, "LINKHISTORY", 0);
                return 0;
        }
        if (read(f, lhb, sizeof(*lhb)) != sizeof(*lhb)) {
                setError(E_read_dirfile, "LINKHISTORY", 0);
                return 0;
        }
        return 1;
} putLinkHistory(f, pv, lhb)
        int     f, pv;
        struct  linkHistoryBuffer *lhb;
/* puts the instance of a linkHistoryBuffer for previousVersion, pv, from the
   hypertext linkHistory file corresponding to 'f'. If success returns 1,
   else returns 0.

Preconditions: 1) f is a file descriptor for an open hypertext linkHistory
                file as returned by openDirectoryFile(LINKHISTORY).
                2) the linkHistoryBuffer for pv exists in f
   Postconditions: 1) the instance of a linkHistoryBuffer for pv from the
                hypertext linkHistory file coresponding to 'f' is equal to lhb.

putLinkHistory(f, pv, lhb)
*/
```

```
        if (lseek(f, pv, L_SET) == -1) {
                setError(E_seek_dirfile, "LINKHISTORY", 0);
                return 0;
                }
        if (write(f, lhb, sizeof(*lhb)) != sizeof(*lhb)) {
                setError(E_write_dirfile, "LINKHISTORY", 0);
                return 0;
                }
        wasUpdated(f) = 1;
        return 1;
} addLinkHistory(f, lhb)
        int     f;
        struct  linkHistoryBuffer       *lhb;
/* appends an instance of linkHistoryBuffer in the hypertext linkHistory file
   coresponding to 'f'. If success returns an index corresponding to the
   new linkHistoryBuffer entry else returns 0.

Preconditions: 1) f is a file descriptor for an open hypertext linkHistory
                     file as returned by openDirectoryFile(LINKHISTORY).
                  2) lhb is a valid instance of linkHistoryBuffer
   Postconditions: 1) result > 0 implies the instance of a linkHistoryBuffer
                     corresponding to the result from the hypertext linkHistory file
                     coresponding to 'f' is equal to le.

addLinkHistory(f, lhb) -> an index
*/
{
        int     v;

/* get the next available link history entry */
        if ((v = getNextEmptyEntry(f, sizeof(*lhb), L_ADDLINKHIST)) == FALSE)
                return FALSE;
    /* append the new link history entry */
        v = (v - 1) * sizeof(*lhb) + sizeof(FILE_HEADER);
        if (lseek(f, v, L_SET) == -1) {
                setError(E_seek_dirfile, "LINKHISTORY", 0);
                return 0;
                }
        if (write(f, lhb, sizeof(*lhb)) != sizeof(*lhb)) {
                setError(E_write_dirfile, "LINKHISTORY", 0);
                return 0;
                }
        wasUpdated(f) = 1;
        return v;
} removeLinkHistory(f, lhbPtr)
        int     f, lhbPtr;
/* removes an instance of linkHistoryBuffer from the hypertext LINKHISTORY
   file coresponding to 'f'. If success returns TRUE else returns FALSE.

Preconditions: 1) f is a file descriptor for an open hypertext
                     linkHistory file as returned by
                     openDirectoryFile(LINKHISTORY).
                  2) lhbPtr is the seek offset of a valid instance of
                     linkHistoryBuffer
   Postconditions: 1) result == TRUE implies that the storage space previously
                     occupied by instance of the linkHistoryBuffer, lhbPtr,
                     is marked empty and is available for recycling.

*/
{       int     v;
        wasUpdated(f) = 1;
        v = (lhbPtr - sizeof(FILE_HEADER)) / sizeof(LINK_HIST_BUF) + 1;
        return removeDirFileEntry(f, v, sizeof(LINK_HIST_BUF));
} isValidLinkHistory(f, lhbPtr)
        int     f, lhbPtr;
{       int     v;

v = (lhbPtr - sizeof(FILE_HEADER)) / sizeof(LINK_HIST_BUF) + 1;
        return isValidEntry(f, v, sizeof(LINK_HIST_BUF));
}
```

```
/* f_links.c implements the operations on the hypertext directory file
   that cointains the array of linkEntries. */ include        <sys/file.h>
include        <setjmp.h>
include        <stdio.h> include        "directory.h"
include        "actions.h"
include        "strings.h"
include        "errors.h"
include        "log.h"
extern char     *malloc();

extern int      thisHostId;

getLinkEntry(f, li, le)
        int     f, li;
        struct  linkEntry       *le;
/* gets the instance of a linkEntry for linkIndex, li, from the hypertext
   linkEntry file coresponding to 'f'. If success returns 1 else returns 0.

Preconditions: 1) f is a file descriptor for an open hypertext linkEntry file
                as returned by openDirectoryFile(LINKENTRY).
                2) the linkEntry for li exists in f
   Postconditions: 1) le is the instance of a linkEntry for li from the
                hypertext linkEntry file coresponding to 'f'.

getLinkEntry(f, li) -> le
*/
{
        if ((seek(f,(li - 1) * sizeof(*le) + sizeof(FILE_HEADER),L_SET) == -1) {
                setError(E_seek_dirfile, "LINKENTRY", 0);
                return 0;
                }
        if (read(f, le, sizeof(*le)) != sizeof(*le)) {
                setError(E_read_dirfile, "LINKENTRY", 0);
                return 0;
                }
        return 1;
} putLinkEntry(f, li, le)
        int     f, li;
        struct  linkEntry       *le;
/* updates the instance of a linkEntry for the linkIndex, li, from the
   hypertext linkEntry file coresponding to 'f'. If success returns 1.
   else returns 0.

Preconditions: 1) f is a file descriptor for an open hypertext linkEntry file
                as returned by openDirectoryFile(LINKENTRY).
                2) the linkEntry for li exists in f
   Postconditions: 1) the instance of a linkEntry for li from the
                hypertext linkEntry file coresponding to 'f' is equal to le.

putLinkEntry(f, li, le)
*/
{
        if ((seek(f,(li - 1) * sizeof(*le) + sizeof(FILE_HEADER),L_SET) == -1) {
                setError(E_seek_dirfile, "LINKENTRY", 0);
                return 0;
                }
        if (write(f, le, sizeof(*le)) != sizeof(*le)) {
                setError(E_read_dirfile, "LINKENTRY", 0);
                return 0;
                }
        wasUpdated[f] = 1;
        return 1;
} addLinkEntry(f, le)
        int     f;
        struct  linkEntry       *le;
/* appends an instance of linkEntry in the hypertext linkEntry
   file coresponding to 'f'. If success returns an index corresponding to the
   new linkEntry entry else returns 0.

Preconditions: 1) f is a file descriptor for an open hypertext
                linkEntry file as returned by
                openDirectoryFile(LINKENTRIES).
```

```
                      2) le is a valid instance of linkEntry
    Postconditions: 1) result > 0 implies the instance of a linkEntry
                       corresponding to the result from the hypertext linkEntry
                       file coresponding to 'f' is equal to le.

addLinkEntry(f, le) -> an index
*/
{
        int     v;

/* get the next available link entry */
        if ((v = getNextEmptyEntry(f, sizeof(*le), L_ADDLINK)) == FALSE)
                return 0;
    /* append the new link entry */
        if (lseek(f, (v - 1) * sizeof(*le) + sizeof(FILE_HEADER),L_SET) == -1) {
                setError(E_seek_dirfile, "LINKENTRY", 0);
                return 0;
        }
        if (write(f, le, sizeof(*le)) != sizeof(*le)) {
                setError(E_write_dirfile, "LINKENTRY", 0);
                return 0;
        }
        wasUpdated[f] = 1;
        return v;
} removeLinkEntry(f, li)
        int     f, li;
/* removes an instance of linkEntry in the hypertext linkEntry
   file coresponding to 'f'. If success returns TRUE else returns FALSE.

Preconditions: 1) f is a file descriptor for an open hypertext
                     linkEntry file as returned by
                     openDirectoryFile(LINKENTRIES).
                  2) li is a link index for a valid instance of linkEntry
   Postconditions: 1) result == TRUE implies that the storage space previously
                      occupied by instance of the linkEntry, li,
                      is marked empty adn is available for recycling.

*/
{
        wasUpdated[f] = 1;
        return removeDirFileEntry(f, li, sizeof(LINK_ENTRY));
} isValidLinkEntry(f, li)
        int     f, li;
{
        return isValidEntry(f, li, sizeof(LINK_ENTRY));
}

/* f_nodes.c implements the operations on the hypertext directory file
   that cointains the array of nodeEntries. */ include        <sys/file.h>
include        <setjmp.h>
include        <stdio.h> include        "directory.h"
include        "actions.h"
include        "strings.h"
include        "errors.h"
include        "log.h"
extern char     *malloc();

extern int      thisHostId;

getNodeEntry(f, ni, ne)
        int     f, ni;
        struct  nodeEntry       *ne;
/* gets the instance of a nodeEntry for nodeIndex, ni, from the hypertext
   directory coresponding to 'f'. If success returns 1 else returns 0.

Preconditions: 1) f is a file descriptor for an open hypertext directory
                     as returned by openDirectoryFile(DIRECTORY).
                  2) the nodeEntry for ni exists in f
   Postconditions: 1) ne is the instance of a nodeEntry for ni from the
                      hypertext directory coresponding to 'f'.

getNodeEntry(f, ni) -> ne
*/
{       struct  directoryHeader dir;
```

```
            if (lseek(f, sizeof(dir) + (ni - 1) * sizeof(*ne), L_SET) == -1) {
                    setError(E_seek_dirfile, "NODEENTRY", 0);
                    return 0;
                    }
            if (read(f, ne, sizeof(*ne)) != sizeof(*ne)) {
                    setError(E_read_dirfile, "NODEENTRY", 0);
                    return 0;
                    }
            return 1;
} putNodeEntry(f, ni, ne)
        int     f, ni;
        struct  nodeEntry       *ne;
/* updates the instance of a nodeEntry for the nodeIndex, ni, from the
   hypertext directory coresponding to 'f'. If success returns 1 else returns 0.

Preconditions: 1) f is a file descriptor for an open hypertext directory
                as returned by openDirectoryFile(DIRECTORY).
                2) the nodeEntry for ni exists in f
   Postconditions: 1) the instance of a nodeEntry for ni from the
                hypertext directory coresponding to 'f' is equal to ne.

putNodeEntry(f, ni, ne)
*/
{       struct  directoryHeader dir;

if (lseek(f, sizeof(dir) + (ni - 1) * sizeof(*ne), L_SET) == -1) {
                    setError(E_seek_dirfile, "NODEENTRY", 0);
                    return 0;
                    }
            if (write(f, ne, sizeof(*ne)) != sizeof(*ne)) {
                    setError(E_write_dirfile, "NODEENTRY", 0);
                    return 0;
                    }
            wasUpdated[f] = 1;
            return 1;
}
addNodeEntry(f, ne)
        int     f;
        struct  nodeEntry       *ne;
/* appends an instance of nodeEntry in the hypertext nodeEntry
   file coresponding to 'f'. If success returns an index corresponding to the
   new nodeEntry entry else returns 0.

Preconditions: 1) f is a file descriptor for an open hypertext
                nodeEntry file as returned by
                openDirectoryFile(NODEENTRIES).
                2) ne is a valid instance of nodeEntry
   Postconditions: 1) result > 0 implies the instance of a nodeEntry
                coresponding to the result from the hypertext nodeEntry
                file coresponding to 'f' is equal to ne.

addNodeEntry(f, ne) -> an index
*/
{
        int     v;

/* get the next available node entry */
            if ((v = getNextEmptyNodeEntry(f)) == FALSE) return 0;
    /* append the new node entry */
            if (lseek(f, (v - 1) * sizeof(*ne) + sizeof(DIR_HEADER), L_SET) == -1) {
                    setError(E_seek_dirfile, "NODEENTRY", 0);
                    return 0;
                    }
            if (write(f, ne, sizeof(*ne)) != sizeof(*ne)) {
                    setError(E_write_dirfile, "NODEENTRY", 0);
                    return 0;
                    }
            wasUpdated[f] = 1;
            return v;
} getNextEmptyNodeEntry(f)
        int     f;
        /* checks the directoryHeader of the directory file, f, and returns the
           next available entry record or allocates a new one */
{       struct  emptyEntry      ee;
```

```c
        struct   directoryHeader dir;
        int      r, v;

if (lseek(f, 0, L_SET) == -1) {
                setError(E_seek_dirfile, "NODEENTRY", 0);
                return 0;
        }
        if (read(f, &dir, sizeof(dir)) != sizeof(dir)) {
                setError(E_read_dirfile, "NODEENTRY", 0);
                return 0;
        }
        if (dir.firstFreeNodeEntry == -1) { /* no empty entries make new one */
                r = (dir.numNodeEntries += 1);
        }
        else    { /* can recycle an old entry */
                struct  emptyEntry     ee;
                if (dir.firstFreeNodeEntry <= dir.numNodeEntries) {
                   r = dir.firstFreeNodeEntry;
                   v = (dir.firstFreeNodeEntry - 1) * sizeof(NODE_ENTRY)
                        + sizeof(dir);
                   if (lseek(f, v, L_SET) == -1) {
                      setError(E_seek_dirfile, "NODEENTRY", 0); return 0; }
                   if (read(f, &ee, sizeof(ee)) != sizeof(ee)) {
                      setError(E_read_dirfile, "NODEENTRY", 0); return 0; }
                   dir.firstFreeNodeEntry = ee.nextEmpty;
                }
                else    { /* extra robustness !!! */
#if DEBUGTRACE > 0
                   fprintf(trace, "free list ptr %d fixed in NODEENTRY\n",
                                              dir.firstFreeNodeEntry);
                   fprintf(stderr, "call norm, free list ptr fixed\n");
#endif
                   r = (dir.numNodeEntries += 1);
                   dir.firstFreeNodeEntry = -1;
                }
        }
        logPendingTransaction(L_ADDNODE, r, 0, 0);
        if (lseek(f, 0, L_SET) == -1) {
                setError(E_seek_dirfile, "NODEENTRY", 0);
                return 0;
        }
        if (write(f, &dir, sizeof(dir)) != sizeof(dir)) {
                setError(E_write_dirfile, "NODEENTRY", 0);
                return 0;
        }
        return r;
} removeNodeEntry(f, ni)
        int     f, ni;
/* removes an instance of nodeEntry in the hypertext nodeEntry
   file coresponding to 'f'. If success returns TRUE else returns FALSE.

Preconditions: 1) f is a file descriptor for an open hypertext
                     nodeEntry file as returned by
                     openDirectoryFile(NODEENTRIES).
                  2) ni is a node index for a valid instance of nodeEntry
   Postconditions: 1) result == TRUE implies that the storage space previously
                      occupied by instance of the nodeEntry, ni,
                      is marked empty adn is available for recycling.

*/
{
        int     v;
        struct  directoryHeader dir;
        struct  emptyEntry      ee;

/* get the next available node entry info */
        v = (ni - 1) * sizeof(NODE_ENTRY) + sizeof(dir);
        if (lseek(f, 0, L_SET) == -1) {
                setError(E_seek_dirfile, "NODEENTRY", 0); return 0; }
        if (read(f, &dir, sizeof(dir)) != sizeof(dir)) {
                setError(E_read_dirfile, "NODEENTRY", 0); return 0; }
    /* mark the entry as empty */
        if (lseek(f, v, L_SET) == -1) {
                setError(E_seek_dirfile, "NODEENTRY", 0); return 0; }
        ee.mark = EMPTY_MARK; ee.nextEmpty = dir.firstFreeNodeEntry;
        if (write(f, &ee, sizeof(ee)) != sizeof(ee)) {
                setError(E_write_dirfile, "NODEENTRY", 0); return 0; }
    /* update the next available node entries info */
        dir.firstFreeNodeEntry = ni;
```

```
                if (lseek(f, 0, L_SET) == -1) {
                        setError(E_seek_dirfile, "NODEENTRY", 0); return 0; }
                if (write(f, &dir, sizeof(dir)) != sizeof(dir)) {
                        setError(E_write_dirfile, "NODEENTRY", 0); return 0; }
                wasUpdated(f) = 1;
                return TRUE;
        } isValidNodeEntry(f, nodeIndex)
                int f, nodeIndex;
                /* checks to see if nodeIndex points to a valid node instance */
        {       struct    emptyEntry     ee;
                struct    directoryHeader dir;
                if (lseek(f, 0, L_SET) == -1) {
                        setError(E_seek_dirfile, "NODEENTRY", 0);
                        return -1;
                        }
                if (read(f, &dir, sizeof(dir)) != sizeof(dir)) {
                        setError(E_read_dirfile, "NODEENTRY", 0);
                        return -1;
                        }
                if (dir.numNodeEntries < nodeIndex) return FALSE;
                if (lseek(f, sizeof(dir) + (nodeIndex - 1) * sizeof(NODE_ENTRY), L_SET) == -1) {
                        setError(E_seek_dirfile, "NODEENTRY", 0);
                        return -1;
                        }
                if (read(f, &ee, sizeof(ee)) != sizeof(ee)) {
                        setError(E_read_dirfile, "NODEENTRY", 0);
                        return -1;
                        }
                if (ee.mark == EMPTY_MARK) return FALSE;
                else    return TRUE;
        }

/* f_strings.c implements the operations on the hypertext directory files
   that implement string management. */ include         <sys/file.h>
include         <setjmp.h>
include         <stdio.h> include         "directory.h"
include         "actions.h"
#include         "strings.h"
#include         "errors.h"
#include         "log.h"

extern int       hashTableSizes[];
static unsigned char    needsRehashing = 0;

clearRehashFlag()
{
        needsRehashing = 0;
} unsigned char testRehashFlag()
{
        return needsRehashing;
} initialize_strings()
{
        int     indices;
        int     hashTable;
        int     strings;
        int     result;
#if DEBUGTRACE > 0
        fprintf(trace,"initialize_strings()\n");
#endif
        result = FALSE;
        indices         = createDirectoryFile(STRINGINDEX0);
        hashTable       = createDirectoryFile(STRINGHASH0);
        strings         = createDirectoryFile(STRINGCHARS0);
        if (indices < 0 || hashTable < 0 || strings < 0)
                goto end_initialize;
        result = init_string_files(hashTable, indices, strings, 0);
end_initialize:
        closeDirectoryFile(indices);
        closeDirectoryFile(hashTable);
        closeDirectoryFile(strings);
        return(result);
}
```

```
init_string_files(hashTable, indices, strings, tableSizeIndex)
    int hashTable, indices, strings, tableSizeIndex;
{
    register int   i;
    int      j, result;
    HASH_ENTRY    str;  /* empty descriptor for string */
    HASH_HEADER   header;
    struct fileHeader    fh;

result = FALSE;

if (indices != -1) {
        fh.size = 0; fh.nextEmpty = -1;
        if (write(indices, &fh, sizeof(fh)) != sizeof(fh))
            goto end_initialize;
        wasUpdated[indices] = 1;
    }
    if (strings != -1) {
        j = -1;
        if (write(strings, &j, 4) != 4)
            goto end_initialize;
        wasUpdated[strings] = 1;
    } if (hashTable != -1) {
        header.size   = hashTableSizes[tableSizeIndex];
        header.number = 0;
        if (write(hashTable,&header,HASH_HEADER_SIZE) != HASH_HEADER_SIZE)
            goto end_initialize;
        str.start = str.length = str.index = 0;
        for (i=0; i<hashTableSizes[tableSizeIndex]; i++)
            if (write(hashTable,&str,HASH_ENTRY_SIZE) != HASH_ENTRY_SIZE)
                goto end_initialize;
        wasUpdated[hashTable] = 1;
    } result = TRUE;
end_initialize:
    return(result);
} getStringHashEntry(f, h, she)
    int    f, h;
    HASH_ENTRY   *she;
/* gets the instance of a HASH_ENTRY for hash, h, from the hypertext
   stringHash file coresponding to 'f'. If success returns 1 else returns 0.

Preconditions: 1) f is a file descriptor for an open hypertext stringHash file
                     as returned by openDirectoryFile(STRINGHASHx).
                  2) the HASH_ENTRY for h exists in f
   Postconditions: 1) she is the instance of a HASH_ENTRY for h from the
                     hypertext stringHash file coresponding to 'f'. */
{
    if (lseek(f,HASH_HEADER_SIZE + h*HASH_ENTRY_SIZE,0) == -1) {
        setError(E_seek_dirfile, "STRINGHASH", 0);
        return 0;
    }
    if (read(f,she,HASH_ENTRY_SIZE) != HASH_ENTRY_SIZE) {
        setError(E_read_dirfile, "STRINGHASH", 0);
        return 0;
    }
    return 1;
} getStringHashHeader(f, shh)
    int    f;
    HASH_HEADER   *shh;
/* gets the instance of a HASH_HEADER from the hypertext
   stringHash file coresponding to 'f'. If success returns 1 else returns 0.

Preconditions: 1) f is a file descriptor for an open hypertext stringHash file
                     as returned by openDirectoryFile(STRINGHASHx).
   Postconditions: 1) shh is the instance of a HASH_HEADER from the
                     hypertext stringHash file coresponding to 'f'. */
{
    if (lseek(f,0,0) == -1) {
        setError(E_seek_dirfile, "STRINGHASH", 0);
        return 0;
    }
    if (read(f,shh,HASH_HEADER_SIZE) != HASH_HEADER_SIZE) {
        setError(E_read_dirfile, "STRINGHASH", 0);
        return 0;
    }
```

```
        return 1;
} getStringIndicesCount(f)
        int     f;
/* gets the number fo valid instances of a INDEX_ENTRY in the hypertext
   stringIndex file coresponding to 'f'. If success returns 1 else returns 0.

Preconditions: 1) f is a file descriptor for an open hypertext stringIndex
                   file as returned by openDirectoryFile(STRINGINDEXx).
   Postconditions: 1) returns the number of valid instances of INDEX_ENTRY
                    in the hypertext stringIndex file coresponding to 'f'. */

{       struct fileHeader       fh;
        if (lseek(f,0,0) == -1) {
                setError(E_seek_dirfile, "STRINGINDEX", 0);
                return -1;
        }
        if (read(f, &fh, sizeof(fh)) != sizeof(fh)) {
                setError(E_read_dirfile, "STRINGINDEX", 0);
                return 0;
        }
        return fh.size;
} getStringIndexEntry(f, si, sie)
        int     f, si;
        INDEX_ENTRY     *sie;
/* gets the instance of a INDEX_ENTRY for stringIndex, si, from the hypertext
   stringIndex file coresponding to 'f'. If success returns 1 else returns 0.

Preconditions: 1) f is a file descriptor for an open hypertext stringIndex
                   file as returned by openDirectoryFile(STRINGINDEXx).
                 2) the INDEX_ENTRY for si exists in f
   Postconditions: 1) ie is the instance of a INDEX_ENTRY for si from the
                    hypertext stringIndex file coresponding to 'f'. */
{       int     v;
        v = (si - 1) * sizeof(*sie) + sizeof(FILE_HEADER);
        if (lseek(f,v,0) == -1) {
                setError(E_seek_dirfile, "STRINGINDEX", 0);
                return 0;
        }
        if (read(f,sie,INDEX_ENTRY_SIZE) != INDEX_ENTRY_SIZE) {
                setError(E_read_dirfile, "STRINGINDEX", 0);
                return 0;
        }
        return 1;
} getStringEntry(f, start, len, s)
        int     f, start, len;
        char    *s;
/* gets the instance of the string beginning at start with length len,
   from the hypertext stringChars file coresponding to 'f'.
   If success returns 1 else returns 0.

Preconditions: 1) f is a file descriptor for an open hypertext stringChars
                   file as returned by openDirectoryFile(STRINGCHARSx).
                 2) the string at start of len exists in f
   Postconditions: 1) s is the instance of a string at start of len from the
                    hypertext stringChars file coresponding to 'f'. */
{
        if (lseek(f,start,0) == -1) {
                setError(E_seek_dirfile, "STRINGCHARS", 0);
                return 0;
        }
        if (read(f,s,len) != len) {
                setError(E_read_dirfile, "STRINGCHARS", 0);
                return 0;
        }
        s[len] = 0;
        return 1;
} putStringHashHeader(f, shh)
        int     f;
        HASH_HEADER     *shh;
/* updates the instance of a HASH_HEADER in the hypertext
   stringHash file coresponding to 'f'. If success returns 1 else returns 0.
```

Preconditions: 1) f is a file descriptor for an open hypertext stringHash file
            as returned by openDirectoryFile(STRINGHASHx).
         2) shh is a valid instance of HASH_HEADER.
Postconditions: 1) the instance of a HASH_HEADER from the hypertext stringHash
            file coresponding to 'f' equals shh. */
{
        if (lseek(f,0,0) == -1) {
                setError(E_seek_dirfile, "STRINGHASH", 0);
                return 0;
                }
        if (write(f,shh,HASH_HEADER_SIZE) != HASH_HEADER_SIZE) {
                setError(E_write_dirfile, "STRINGHASH", 0);
                return 0;
                }
        wasUpdated[f] = 1;
        return 1;
} putStringHashEntry(f, h, she)
    int     f, h;
    HASH_ENTRY   *she;
/* updates the instance of a HASH_ENTRY for the hash, h, from the
   hypertext stringHash file coresponding to 'f'. If success returns 1,
   else returns 0.

Preconditions: 1) f is a file descriptor for an open hypertext stringHash file
            as returned by openDirectoryFile(STRINGHASHx).
         2) the HASH_ENTRY for h exists in f
   Postconditions: 1) the instance of a HASH_ENTRY for h from the
            hypertext stringHash file coresponding to 'f' is equal to she.

*/
{
        if (lseek(f,HASH_HEADER_SIZE+h*HASH_ENTRY_SIZE,L_SET) == -1) {
                setError(E_seek_dirfile, "STRINGHASH", 0);
                return 0;
                }
        if (write(f, she, HASH_ENTRY_SIZE) != HASH_ENTRY_SIZE) {
                setError(E_write_dirfile, "STRINGHASH", 0);
                return 0;
                }
        wasUpdated[f] = 1;
        return 1;
} putStringIndexEntry(f, si, sie)
    int     f, si;
    INDEX_ENTRY   *sie;
/* updates the instance of a INDEX_ENTRY for the index, si, from the
   hypertext stringIndex file coresponding to 'f'. If success returns 1,
   else returns 0.

Preconditions: 1) f is a file descriptor for an open hypertext stringIndex
            file as returned by openDirectoryFile(STRINGINDEXx).
         2) the HASH_ENTRY for h exists in f
   Postconditions: 1) the instance of a INDEX_ENTRY for si from the
            hypertext stringIndex file coresponding to 'f' is equal to sie.

*/
{       int  v;
        v = (si - 1) * sizeof(*sie) + sizeof(FILE_HEADER);
        if (lseek(f,v,L_SET) == -1) {
                setError(E_seek_dirfile, "STRINGINDEX", 0);
                return 0;
                }
        if (write(f, sie, INDEX_ENTRY_SIZE) != INDEX_ENTRY_SIZE) {
                setError(E_write_dirfile, "STRINGINDEX", 0);
                return 0;
                }
        wasUpdated[f] = 1;
        return 1;
} addStringHashEntry(f, h, she)
    int    f, h;
    HASH_ENTRY   *she;
/* adds an instance of HASH_ENTRY to the hypertext stringHash
   file coresponding to 'f'. If success returns h else returns -1.

```
Preconditions: 1) f is a file descriptor for an open hypertext
                  stringHash file as returned by openDirectoryFile(STRINGHASHx).
               2) she is a valid instance of HASH_ENTRY
Postconditions: 1) result > 0 implies the instance of a HASH_ENTRY
                   corresponding to h from the hypertext stringHash
                   file coresponding to 'f' is equal to she.
                2) the hash header.counter is incremented. */

{       HASH_HEADER     header;

logPendingTransaction(L_ADDSTRINGHASH, h, 0, 0);
        if (putStringHashEntry(f, h, she) == 0) return -1;
        if (lseek(f,0,0) == -1) {
                setError(E_seek_dirfile, "STRINGHASH", 0);
                return -1;
                }
        if (read(f,&header,HASH_HEADER_SIZE) != HASH_HEADER_SIZE) {
                setError(E_read_dirfile, "STRINGHASH", 0);
                return -1;
                }
        header.number   += 1;
        if (lseek(f,0,0) == -1) {
                setError(E_seek_dirfile, "STRINGHASH", 0);
                return -1;
                }
        if (write(f,&header,HASH_HEADER_SIZE) != HASH_HEADER_SIZE) {
                setError(E_write_dirfile, "STRINGHASH", 0);
                return -1;
                }
        wasUpdated[f] = 1;
        if (header.number > (header.size >> 1)) needsRehashing = 1;
        return h;
} addStringIndexEntry(f, sie)
        int     f;
        INDEX_ENTRY     *sie;
/* appends an instance of INDEX_ENTRY to the hypertext stringIndex
   file coresponding to 'f'. If success returns new entry index else returns -1.

Preconditions: 1) f is a file descriptor for an open hypertext
                     stringIndex file as returned by openDirectoryFile(STRINGINDEXx).
                  2) sie is a valid instance of INDEX_ENTRY
   Postconditions: 1) result > 0 implies the instance of a INDEX_ENTRY
                      corresponding to result from the hypertext stringIndex
                      file coresponding to 'f' is equal to sie. */

{       int     index;
    /* get the next available string index entry */
        if ((index = getNextEmptyEntry(f, sizeof(*sie), L_ADDSTRINGINDEX)) == FALSE)
                return -1;
    /* append the new string index entry */
        if (lseek(f, (index - 1) * sizeof(*sie) + sizeof(FILE_HEADER),L_SET) == -1) {
                setError(E_seek_dirfile, "STRINGINDEX", 0);
                return -1;
                }
        if (write(f,sie,INDEX_ENTRY_SIZE) != INDEX_ENTRY_SIZE) {
                setError(E_write_dirfile, "STRINGINDEX", 0);
                return -1;
                }
        wasUpdated[f] = 1;
        return index;
} addStringEntry(f, len, s)
        int     f, len;
        char    *s;
/* appends an instance of string to the hypertext stringChars
   file coresponding to 'f'. If success returns new entry start else returns -1.

Preconditions: 1) f is a file descriptor for an open hypertext
                     stringChars file as returned by openDirectoryFile(STRINGCHARSx).
                  2) s is a valid instance of a string
   Postconditions: 1) result > 0 implies the instance of a string
                      starting at result and of length len from the hypertext
                      stringChars file coresponding to 'f' is equal to s. */

{       int     start, header, end;

/* see if there is any empty space at end of file */
        if (lseek(f,0,0) == -1) {
```

```
                        setError(E_seek_dirfile, "STRINGCHARS", 0);
                        return -1;
                        }
                if (read(f,&header,4) != 4) {
                        setError(E_read_dirfile, "STRINGCHARS", 0);
                        return -1;
                        }
                if (header != -1) {
                        start = header;
                        if ((end = lseek(f,0,2)) == -1) {
                                setError(E_seek_dirfile, "STRINGCHARS", 0);
                                return -1;
                                }
                        header = ((header + len) >= end) ? -1 : (header + len);
                        if (lseek(f,0,0) == -1) {
                                setError(E_seek_dirfile, "STRINGCHARS", 0);
                                return -1;
                                }
                        if (write(f,&header,4) != 4) {
                                setError(E_read_dirfile, "STRINGCHARS", 0);
                                return -1;
                                }
                        if (lseek(f,start,0) == -1) {
                                setError(E_seek_dirfile, "STRINGCHARS", 0);
                                return -1;
                                }
                        }
                else    { /* append new one to end of file */
                        if ((start = lseek(f,0,2)) == -1) {
                                setError(E_seek_dirfile, "STRINGCHARS", 0);
                                return -1;
                                }
                        }
                logPendingTransaction(L_ADDSTRINGCHARS, start, 0, 0);
                /* ready to add new string */
                if (write(f,s,len) != len) {
                        setError(E_write_dirfile, "STRINGCHARS", 0);
                        return -1;
                        }
                wasUpdated[f] = 1;
                return start;
} removeStringHashEntry(f, h)
        int     f, h;
/* removes an instance of HASH_ENTRY in the hypertext stringHash
   file coresponding to 'f'. If success returns TRUE else returns FALSE.

Preconditions: 1) f is a file descriptor for an open hypertext
                     stringHash file as returned by openDirectoryFile(STRINGHASHx).
                  2) h is a hash index for a valid instance of HASH_ENTRY
   Postconditions: 1) result == TRUE implies that the storage space previously
                      occupied by instance of the HASH_ENTRY, h,
                      is marked empty and is available for recycling. */
{       HASH_HEADER     header;
        HASH_ENTRY      str; /* empty descriptor for string */ str.start = str.length = str.index = 0;
        if (putStringHashEntry(f, h, &str) == 0) return -1;
        if (lseek(f,0,0) == -1) {
                setError(E_seek_dirfile, "STRINGHASH", 0);
                return -1;
                }
        if (read(f,&header,HASH_HEADER_SIZE) != HASH_HEADER_SIZE) {
                setError(E_read_dirfile, "STRINGHASH", 0);
                return -1;
                }
        header.number -= 1;
        if (lseek(f,0,0) == -1) {
                setError(E_seek_dirfile, "STRINGHASH", 0);
                return -1;
                }
        if (write(f,&header,HASH_HEADER_SIZE) != HASH_HEADER_SIZE) {
                setError(E_write_dirfile, "STRINGHASH", 0);
                return -1;
                }
        wasUpdated[f] = 1;
        if (header.number < (header.size >> 1)) needsRehashing = 0;
        return 1;
}
```

```
removeStringIndexEntry(f, si)
        int     f, si;
/* removes an instance of INDEX_ENTRY in the hypertext stringIndex
    file coresponding to 'f'. If success returns TRUE else returns FALSE.

Preconditions: 1) f is a file descriptor for an open hypertext
                    stringIndex file as returned by openDirectoryFile(STRINGINDEXx).
                 2) si is a string index for a valid instance of INDEX_ENTRY
  Postconditions: 1) result == TRUE implies that the storage space previously
                    occupied by instance of the INDEX_ENTRY, ii,
                    is marked empty and is available for recycling. */
{
        wasUpdated[f] = 1;
        return removeDirFileEntry(f, si, sizeof(INDEX_ENTRY));
} removeStringEntry(f, start)
        int     f, start;
/* removes an instance of a string from the hypertext stringChars
    file coresponding to 'f'. If success returns TRUE else returns FALSE.

Preconditions: 1) f is a file descriptor for an open hypertext
                    stringChars file as returned by openDirectoryFile(STRINGCHARSx).
                 2) start is the seek offset for the beginning of a valid string
  Postconditions: 1) result == TRUE implies that the storage space previously
                    occupied by instance of the string at start,
                    is available for recycling. */
{       int     header;
        HASH_ENTRY      str; /* empty descriptor for string */ if (!seek(f,0,0) == -1) {
                setError(E_seek_dirfile, "STRINGCHARS", 0);
                return -1;
                }
        header = start;
        if (write(f,&header,4) != 4) {
                setError(E_read_dirfile, "STRINGCHARS", 0);
                return -1;
                }
        wasUpdated[f] = 1;
        return 1;
} isValidStringIndexEntry(f, si)
        int     f, si;
{
        return isValidEntry(f, si, sizeof(INDEX_ENTRY));
}

/* filter.c implements the operations that extract a subgraph of the
    hypertext graph accessing the nodes via their attribute definitions.
    It runs as part of the hypertext directory server, so the unix files
    that contain the hypertext directory are on the machine where it is running.
*/ include         <netdb.h>
include         <setjmp.h>
include         <stdio.h> include         "directory.h"
include         "actions.h"
#include         "strings.h"
#include         "log.h"

/******************************************************************/
/* operations that support the node map */
/******************************************************************/

/* the nodeMap is a data structure used to build a list of nodes that
    satisfy the visibility predicate. This data structure requires rapid
    access indexed by nodeIndex, is probably sparse, and could be very large.
    The internal representation chosen here for the nodeMap is an ordered binary
    tree of bitmaps. */ define MAPSIZE 124
static struct   nmap    {
        int     firstNode;
        int     checked[MAPSIZE];
        int     passed[MAPSIZE];
        struct nmap     *lesser;
        struct nmap     *greater;
        }       nMapSample;
```

```
static struct    nmap    *mapRoot;
static int       maskTable[32];

initializeMap()
{
        int      i;
        mapRoot = (struct nmap *) -1;
        maskTable[0] = 1;
        for (i = 1; i < 32; i++) maskTable[i] = maskTable[i - 1] * 2;
} static mask(i)
        int      i;
{
        return maskTable[i];
} addNodeToMap(nodeIndex, checked, passed)
        int      nodeIndex, checked, passed;
{
        int      r, i, index;
        struct nmap    *p, *m;

p = (struct nmap *) -1; m = mapRoot;
        while (m != (struct nmap *)-1) {
                r = m->firstNode;
                if ((r <= nodeIndex) && (nodeIndex <= r + MAPSIZE)) {
                        index = nodeIndex % MAPSIZE;
                        if (checked) m->checked[index / 32] |= mask(index % 32);
                        if (passed)  m->passed[index / 32]  |= mask(index % 32);
                        return;
                        }
                else    { p = m;
                        if (r < nodeIndex) m = m->greater;
                        else m = m->lesser;
                        }
                }
        /* need to make a new tree node */
        m = (struct nmap *)malloc(sizeof(nMapSample));
        for (i = 0; i < MAPSIZE; i++) m->passed[i] = 0;
        for (i = 0; i < MAPSIZE; i++) m->checked[i] = 0;
        m->firstNode = (nodeIndex / MAPSIZE) * MAPSIZE;
        index = nodeIndex % MAPSIZE;
        if (checked) m->checked[index / 32] = mask(index % 32);
        if (passed)  m->passed[index / 32]  = mask(index % 32);
        m->lesser  = (struct nmap *) -1;
        m->greater = (struct nmap *) -1;
        if (p != (struct nmap *)-1) {
                if (p->firstNode < nodeIndex) p->greater = m;
                else    p->lesser = m;
                }
        else    mapRoot = m;
} static struct    nmap *findNode(nodeIndex)
        int      nodeIndex;
{
        int      r;
        struct nmap    *m;

m = mapRoot;
        while (m != (struct nmap *)-1) {
                r = m->firstNode;
                if ((r <= nodeIndex) && (nodeIndex <= r + MAPSIZE))
                        return m;
                else if (r < nodeIndex) m = m->greater;
                else m = m->lesser;
                }
        return (struct nmap *)-1;
} isNodeChecked(nodeIndex)
        int      nodeIndex;
{       int      index;
        struct nmap    *m;
if ((m = findNode(nodeIndex)) == (struct nmap *)-1)
        return 0;
else    {
        index = nodeIndex % MAPSIZE;
        return (m->checked[index / 32] & mask(index % 32));
        }
}
```

```
} static isNodePassed(nodeIndex)
        int      nodeIndex;
{       int      index;
        struct nmap   *m;
if ((m = findNode(nodeIndex)) == (struct nmap *)-1)
        return 0;
else
        {
        index = nodeIndex % MAPSIZE;
        return (m->passed[index / 32] & mask(index % 32));
        }
} static printMap(root, lower)
        struct nmap *root;
        int     lower;
{
        int     b, i, j, r, index;

if (root != (struct nmap *)-1) {
                printMap(root->lesser, -1);
                r = root->firstNode;
                printf("\nfirst = %d; \npassed: ", r);
                for (i = 0; i < MAPSIZE; i++) {
                        b = root->passed[i];
                /*      printf("%x, ", b);  */
                        for (j = 0; j < 32; j++) {
                                if (b & 1) printf("%d,", r + i * 32 + j);
                                b = b >> 1;
                                }
                        }
                printf("\nchecked: ");
                for (i = 0; i < MAPSIZE; i++) {
                        b = root->checked[i];
                        for (j = 0; j < 32; j++) {
                                if (b & 1) printf("%d,", r + i * 32 + j);
                                b = b >> 1;
                                }
                        }
                printMap(root->greater, -1);
                }
} static disposeMapR(r)
        struct nmap    *r;
{
        if (r != (struct nmap   *)-1) {
                disposeMapR(r->lesser);
                disposeMapR(r->greater);
                free(r);
                }
} disposeMap()
{
        disposeMapR(mapRoot);
}

/**********************************************************************/
/* hypertext machine operation getGraphViaAttributes */
/**********************************************************************/ extern int      thisHostId;

static int      nextLinkIndex, linkEntries[1000];
static int      nodeCount, inVersionTime, mark;
static int      linkCount;
static versionTime, numNodeAttributes, *nodeAttributeIndices;
static numLinkAttributes, *linkAttributeIndices;
struct linkRec {
        int     linkIndex;
        int     fromCharPos;
        int     toNodeIndex;
        int     toNodeVersion;
        };
static int      nodeNumNeeded, *nodeAttributeList;
static int      linkNumNeeded, *linkAttributeList;
static int      dirFile;
static int      linkBuf, nodeBuf;
```

```
getGraphViaAttributes(pversionTime, nodePredicate, linkPredicate,
                pNumNodeAttributes, pNodeAttributeIndices,
                pNumLinkAttributes, pLinkAttributeIndices,
                numNodes, numLinks, buf1, buf2)
        int     pversionTime, *numNodes, *numLinks, buf1, buf2;
        int     pNumNodeAttributes, pNodeAttributeIndices[];
        int     pNumLinkAttributes, pLinkAttributeIndices[];
        char    *nodePredicate, *linkPredicate;
/* retrieves a subgraph of the hypertext graph based on a predicate expressed
    in terms of attribute values.
    Also returns a list of attribute values for attributeIndices for each node
        and link.

Preconditions: 1) project, an instance of projectContext is valid
                   2) predicate is syntactically correct
                   3a) there are pNumNodeAttributes valid entries in
                        pNodeAttributeIndices
                   3b) there are pNumLinkAttributes valid entries in
                        pLinkAttributeIndices
    Postconditions: 1) buf1 contains the designated list of nodes
                    and buf2 contains links with their associated attribute values.
*/
{
        struct   directoryHeader dir;
        int      i, linkCountHolder;

#if DEBUGTRACE >= 1
        fprintf(trace, "called getGraphViaAttributes(%d, %s, %s)\n",
                       pversionTime, nodePredicate, linkPredicate);
endif if (parse(nodePredicate, 0) != 1) {
                return 0;
        }
        nodeNumNeeded = attributesNeeded(&nodeAttributeList, 0);
        if (parse(linkPredicate, 1) != 1) {
                return 0;
        }
        linkNumNeeded = attributesNeeded(&linkAttributeList, 1);
        inVersionTime = pversionTime;
        if (pversionTime == CURRENTVERSION) pversionTime = now();
        versionTime = pversionTime;
        numNodeAttributes = pNumNodeAttributes;
        nodeAttributeIndices = pNodeAttributeIndices;
        numLinkAttributes = pNumLinkAttributes;
        linkAttributeIndices = pLinkAttributeIndices;
        nodeBuf = buf1;
        linkBuf = buf2;

nodeCount = 0;
        nextLinkIndex = 0;
        linkCount = 0;

if (startTransaction(T_ACCESS) == FALSE) return 0;
        initializeMap();
        if (nodeNumNeeded == 0) {
                if (buildNodeList() == 0) goto out;
        }
        else    {
                if (buildNodeListViaAttributes() == 0) goto out;
        }
        *numNodes = nodeCount;
        if (getLinkInfo() == 0) goto out;
        *numLinks = linkCount;

commitTransaction();
        disposeMap();
        return 1;

out:    abortTransaction();
        disposeMap();
        return 0;
} static buildNodeList()
{       int     f, nodeIndex;
        struct  nodeEntry       ne;
        struct  directoryHeader dir;

if ((f = openDirectoryFile(DIRECTORY)) < 0) return 0;
```

```
            if (getDirectoryHeader(f, &dir) == 0) return 0;
            for (nodeIndex = 1; nodeIndex <= dir.numNodeEntries; nodeIndex++) {
                    if (getNodeEntry(f, nodeIndex, &ne) == 0) goto out;
                    if ((ne.creationTime != EMPTY_MARK)
                            && (ne.deletionTime > versionTime)
                            && (ne.creationTime <= versionTime)) {
                        addNodeToMap(nodeIndex, 1, 1);
                        extractNodeInfo(nodeIndex,&ne);
                    }
            }
        closeDirectoryFile(f);
        return 1;

out:    closeDirectoryFile(f);
        return 0;
} static buildNodeListViaAttributes()
{
        int     upperBound, next, i, j, f1, f2, f3;
        int     passed;
        struct  attributeDef        ad;
        struct  nodeEntry           ne;
        struct  attributeValueBuffer   avb;
        struct  attributeValue     p[10];

if ((f1 = openDirectoryFile(DIRECTORY)) < 0) return 0;
        if ((f2 = openDirectoryFile(ATTRIBUTEDEFS)) < 0) goto out3;
        for (i = 0; i < nodeNumNeeded; i++) {
            if (getAttributeDef(f2,nodeAttributeList[i],&ad) == 0)
                    goto out2;
            next = ad.nodeValuesList;
            upperBound = ad.nextNodeIndex;
            while (next != -1) {
                if ((f3 = openDirectoryFile(ATTRIBUTEVALUES)) < 0)
                        goto out2;
                if (getAttributeValueBuffer(f3, next, &avb) == 0) goto out1;
                closeDirectoryFile(f3);
                for (j = 0; j < upperBound; j++) {
                   if (avb.values[j].entity != -1) {
                     if (isNodeChecked(avb.values[j].entity) == 0) {
                        if (getNodeEntry(f1, avb.values[j].entity, &ne) == 0)
                                goto out2;
                        if (extractAttributeValue(&p[i], &avb.values[j]) == 0)
                                goto out2;
                        passed = wantNode(p, i + 1, &ne);
                        addNodeToMap(avb.values[j].entity, 1, passed);
                        if (passed) extractNodeInfo(avb.values[j].entity,&ne);
                     }
                   }
                }
                upperBound = NUMATTVALUES; /* only first one is not full */
                next = avb.next;
            }
            p[i].valueType = 2;
        }
        closeDirectoryFile(f2);
        closeDirectoryFile(f1);
        return 1;

out1:   closeDirectoryFile(f3);
out2:   closeDirectoryFile(f2);
out3:   closeDirectoryFile(f1);
        return 0;
} static extractAttributeValue(p, av)
        struct  attributeValue *p;
        struct  entityAttributeValue   *av;

{
        struct  attributeHistory    ah;
        int     r, sl;
        char    *stringValue;

if ((r = findAttValueVersion(versionTime,
                &av->currentValue, av->previndex, av->previous, &ah)) == -1)
                return 0;
        if (r == 0) p->valueType = 2;
        else {
            if (ah.valueType == 1) {
                stringValue = get_string(ah.value);
```

```
                        sl = strlen(stringValue) + 1; /* include null */
                        if (sl > 255) { sl = 255; stringValue[255] = 0;}
                        p->valueType = 1; /* is a string */
                        p->stringValue = stringValue;
                        }
                else    {
                                p->valueType = 0; /* is not a string */
                                p->integerValue = an.value;
                                }
                return 1;
        } extractNodeInfo(nodeIndex, ne)
        int     nodeIndex;
        struct  nodeEntry       *ne;
{
        nodeCount = nodeCount + 1;
        appendInt(nodeIndex, nodeBuf);
        if (inVersionTime == CURRENTVERSION)
                appendInt(inVersionTime, nodeBuf);
        else    appendInt(ne->lastUpdateTime, nodeBuf);
        extractEntityAttributes(&ne->attributes,
                versionTime, numNodeAttributes, nodeAttributeIndices, nodeBuf);
        linkEntries[nextLinkIndex++] = ne->firstOutLink;
} wantNode(p, start, ne)
        int     start;
        struct  nodeEntry       *ne;
        struct  attributeValue  p[];
{       int     i, j, myBuf, placeHolder;
        char    *data;
if ((ne->deletionTime > versionTime) && (ne->creationTime <= versionTime)) {
        myBuf = makeBuffer();
        extractEntityAttributes(&ne->attributes, versionTime,
                nodeNumNeeded - start, &nodeAttributeList[start], myBuf);
        data = (char *) malloc(sizeOf(myBuf));
        copyBufDisposing(myBuf, data);
        placeHolder = 0;
        for (i = start; i < nodeNumNeeded; i++) {
                p[i].valueType = data[placeHolder++];
                if (p[i].valueType == 1) {
                        p[i].stringValue = &data[placeHolder];
                        for (;data[placeHolder] != 0; placeHolder++);
                        placeHolder += 1; /* skip over null */
                        }
                else if (p[i].valueType == 0)   {
                        bcopy(&data[placeHolder], &j, 4);
                        p[i].integerValue = ntohl(j);
                        placeHolder += 4;
                        }
                }
        free(data);
        return interp(p,0);
        }
return 0;
} getLinkInfo()
{       struct  linkEntry       le;
        struct  linkHistory     lh;
        int     f, i, j, next;
        int     vt;

if ((f = openDirectoryFile(LINKENTRIES)) < 0) return 0;
  for (i = 0; i < nextLinkIndex; i++) {
    next = linkEntries[i];
    while (next != -1) {
        if (getLinkEntry(f, next, &le) == 0) goto out;
        if ((isNodePassed(le.toNode)) && wantLink(&le)) {
            if (inVersionTime == CURRENTVERSION)
                  vt = inVersionTime;
            else if ((le.currentValue.versionTime >= le.fromVersionBound) &&
                    (le.fromVersionTime <= versionTime))
                    /* link attached with hindsight */
```

```
                              vt = le.currentValue.versionTime;
            else {
                    if (j = findLinkVersion(versionTime, &le.currentValue.
                            le.prevIndex, le.previous, &lh)) == -1)
                            goto out;
                    if (j == 0) /* link not yet defined at versionTime */
                            goto skip;
                    vt = lh.versionTime;
                    }
            linkCount += 1;
            appendInt(next, linkBuf);
            appendInt(vt, linkBuf);
            appendInt(le.fromNode, linkBuf);
            appendInt(le.fromVersionTime, linkBuf);
            appendInt(le.toNode, linkBuf);
            appendInt(le.toVersionTime, linkBuf);
            extractEntityAttributes(&le.attributes,
                    versionTime,
                    numLinkAttributes, linkAttributeIndices, linkBuf);
            }
    skip: next = le.nextOutLink;
            }
    }
    closeDirectoryFile(f);
    return 1;

out:    closeDirectoryFile(f);
        return 0;
} wantLink(le)
        struct  linkEntry       *le;
{       int     i, j, myBuf, placeHolder;
        char    *data;
        struct  attributeValue p[10];
if ((le->deletionTime > versionTime) &&
    ((le->fromVersionTime == CURRENTVERSION)
        || ((le->fromVersionTime <= versionTime)
            && (le->fromVersionBound > versionTime)))) {
        if (linkNumNeeded == 0) return TRUE;
        myBuf = makeBuffer();
        extractEntityAttributes(&le->attributes,
                versionTime, linkNumNeeded, linkAttributeList, myBuf);
        data = (char *) malloc(sizeOf(myBuf));
        copyBufDisposing(myBuf, data);
        placeHolder = 0;
        for (i = 0; i < linkNumNeeded; i++) {
                p[i].valueType = data[placeHolder++];
                if (p[i].valueType == 1) {
                        p[i].stringValue = &data[placeHolder];
                        for (;data[placeHolder] != 0; placeHolder++);
                        placeHolder += 1; /* skip over null */
                        }
                else if (p[i].valueType == 0) {
                        bcopy(&data[placeHolder], &j, 4);
                        p[i].integerValue = ntohl(j);
                        placeHolder += 4;
                        }
                }
        free(data);
        return interp(p,1);
        }
return 0;
}
#include <stdio.h>
#include "directory.h"
#define TRUE    1
define FALSE   0
#define NIL     0
#define INT_SIZE        sizeof(int)
#define SHORT_INT_SIZE  sizeof(short int)

typedef struct chunk {
        char    *loc;   /* address of first character in chunk */
        int     length; /* number of characaters in chunk */
        } CHUNK, *CHUNK_PTR;
#define CHUNK_SIZE      sizeof(CHUNK)

CHUNK_PTR       hash_table;
static int      hash_table_size;
```

```
/*      structure used in finding longest common subsequence */ typedef struct node {
        short int       i, j;
        struct node     *next;
        } NODE, *NODE_PTR;
#define NODE_SIZE               sizeof(NODE)
#define NODES_IN_BUFFER 256
typedef struct nodeBuffer {
        NODE    nodes[NODES_IN_BUFFER];
        struct nodeBuffer       *nextBuffer;
        } NODE_BUFFER, *NODE_BUFFER_PTR;
#define NODE_BUFFER_SIZE        sizeof(NODE_BUFFER)

static quick_sort(a, l, r)
        int     a[];    /* array to be sorted */
        int     l, r;   /* "left" and "right" indices */
{
        register int    i, j;   /* indices */
        register int    x, w;   /* saved array values */ i       = l;
        j       = r;
        x       = a[(l+r)>>1];
        do {
                while (a[i] < x) i++;
                while (x < a[j]) j--;
                if (i <= j) {
                        /* interchange a[i] and a[j] */
                        w = a[i]; a[i++] = a[j]; a[j--] = w;
                }
        }
        while (i <= j);
        if (l < j) quick_sort(a,l,j);
        if (i < r) quick_sort(a,i,r);
}

/*********************************************************************
*                                                                    *
*       Precondition:   thresh is sorted in ascending order          *
*       Return k such that thresh[k-1] < j <= thresh[k] using binary *
*       search.                                                      *
*                                                                    *
*********************************************************************/ static short int        find(thresh, j, size)
        short int       thresh[];
        short int       j;
        short int       size;
{
        register int    u, l, m;

l       = 0;
        u       = size - 1;
        while (l <= u) {
                m       = (l + u) >> 1;
                if (thresh[m] < j)
                        l       = m + 1;
                else if (thresh[m] > j)
                        u       = m - 1;
                else return(m);
        }
        return(l);
} lcs(a, b, size_a, size_b, ci, cj, max_lines)
        int     a[], b[];       /* arrays to match */
        int     size_a, size_b; /* size of arrays to match */
        short int       ci[];   /* array of a index matches */
        short int       cj[];   /* array of b index matches */
        int     max_lines;
{
        register int    i, j, k, m;
        int     b1, b2;
        register int    xj;
        NODE_PTR        p;
        int     sc;             /* start index of matches */
        int     result;
        short int       *matchlist;
        short int       *matchlength;
        short int       *thresh;
```

```
            NODE_PTR         *links;
            int              next_free_node_index;
            NODE_PTR         next_free_node_ptr;
            NODE_BUFFER_PTR  nodeBuffersListHead, currentBuffer, newBuffer;

#if DEBUGTRACE > 1
            fprintf(trace,"lcs(....%d,%d,...)\n",size_a,size_b);
#endif
            ci[max_lines]   = size_a;
            cj[max_lines]   = size_b;
            if (size_b == 0 || size_a == 0)
                    return(max_lines);
            for (i = 0; i < size_b; i++)
                    b[i] = (b[i]<<16) + i;

quick_sort(b,0,size_b-1);

if ((matchlist = (short int *) malloc((hash_table_size+1)*SHORT_INT_SIZE)) == 0)
            return(-1);
      if ((matchlength = (short int *) malloc((hash_table_size+1)*SHORT_INT_SIZE)) == 0) {
            free(matchlist);
            return(-1);
            }
      for (i = 0; i < hash_table_size+1; i++)
            matchlist[i] = matchlength[i] = -1;
      b1           = b[0] >> 16;
      matchlist[b1] = 0;
      for (i = 1; i < size_b; i++) {
            b2           = b[i] >> 16;
            if (b1 != b2) {
                    matchlist[b2]   = i;
                    matchlength[b1] = i - matchlist[b1];
                    b1              = b2;
                    }
            }
      matchlength[b1] = size_b - matchlist[b1];

if ((thresh = (short int *) malloc((size_a+2)*SHORT_INT_SIZE)) == 0) {
            free(matchlist);       free(matchlength);
            return(-1);
            }
      if ((links = (NODE_PTR *) malloc((size_a+2)*INT_SIZE)) == 0) {
            free(matchlist);       free(matchlength);
            free(thresh);
            return(-1);
            }
      for (i = 0; i <= size_a+1; i++) {
            thresh[i]    = size_b;
            links[i]     = NIL;
            } if ((nodeBuffersListHead = (NODE_BUFFER_PTR) malloc(NODE_BUFFER_SIZE)) == 0) {
            result = -1;
            goto end_lcs;
            }
      currentBuffer        = nodeBuffersListHead;
      currentBuffer->nextBuffer   = NIL;
      next_free_node_index        = NODES_IN_BUFFER-1;
      next_free_node_ptr          = (NODE_PTR) (((int) currentBuffer) +
                                   next_free_node_index * NODE_SIZE);

for (i = 0; i < size_a; i++) {
            m        = matchlist[a[i]];
            if (m != -1)
                    for (xj = m+matchlength[a[i]]-1; xj>=m; xj--) {
                            j        = b[xj] & 0xFFFF;
                            k        = find(thresh,j,size_a-1);
                            if (j < thresh[k]) {
                                    thresh[k]                  = j;
                                    next_free_node_ptr->i      = i;
                                    next_free_node_ptr->j      = j;
                                    next_free_node_ptr->next   = links[k];
                                    links[k+1]                 = next_free_node_ptr;
                                    next_free_node_index--;
                                    if (next_free_node_index < 0) {
                                            if ((newBuffer = (NODE_BUFFER_PTR) malloc(NODE_BUFFER_SIZE)) == 0
                                                    result = -1;
                                                    goto end_lcs;
                                                    }
                                            newBuffer->nextBuffer      = NIL;
                                            currentBuffer->nextBuffer  = newBuffer;
                                            currentBuffer              = newBuffer;
```

```
                        next_free_node_index    = NODES_IN_BUFFER-1;
                    }
                    next_free_node_ptr = (NODE_PTR) (((int) currentBuffer) +
                            next_free_node_index * NODE_SIZE);
                }
            }
        k           = 1;
        while (thresh[k] != size_b) k++;
        sc          = max_lines;
        p           = links[k];
        while (p != NIL) {
            sc--;
            ci[sc]  = p->i;
            cj[sc]  = p->j;
            p       = p->next;
        }
        result  = sc;
end_lcs:
        free(matchlist);
        free(matchlength);
        free(thresh);
        free(links);
        while (nodeBuffersListHead != NIL) {
            currentBuffer       = nodeBuffersListHead;
            nodeBuffersListHead = nodeBuffersListHead->nextBuffer;
            free(currentBuffer);
        }
        return(result);
} find_chunks(start_x, end_x, hx, sx, found_chunk)
        char    *start_x;       /* address of first char to find chunks */
        char    *end_x;         /* address of last char+1 for chunking */
        int     hx[];           /* hash values of chunks */
        char    *sx[];          /* starting addresses of chunks */
        int     (*found_chunk)();   /* boolean function for determining chunks */
{
        register int    ix;
        char            *i;
        register int    len;
        CHUNK           new_chunk;

#if DEBUGTRACE > 1
        fprintf(trace,"find_chunks\n");
#endif
        if (end_x == start_x) return(0);
        ix      = 0;
        len     = 0;
        new_chunk.loc   = sx[0] = start_x;
        for (i = start_x; i < end_x; i++) {
            len++;
            if ((*found_chunk)(i)) {
                new_chunk.length    = len;
                hx[ix]  = encode(new_chunk);
                new_chunk.loc   = sx[++ix] = i+1;
                len     = 0;
            }
        }
        if ((*found_chunk)(end_x-1)) ix--;
        else {
            new_chunk.length    = len;
            hx[ix]  = encode(new_chunk);
        }
        sx[++ix]    = end_x;
} int found_line(i)
        char    *i;
{
        return(*i == 10 || *i == 13);
} createTransactionLog()
{       int     f;
        inCompoundTransaction = FALSE; inTransaction = 0;
        if (transactionFD != -1) close(transactionFD);
#ifdef mag
        if ((f = open(project.dirNames[TRANSACTIONLOG], O_RDWR | O_CREAT | O_TRUNC, defaults.
mask)) < 0) {
#else
```

```
            if ((f = creat(project.dirNames[TRANSACTIONLOG], defaults.mask)) < 0) {
                    setError(E_create_dirfile, project.dirNames[TRANSACTIONLOG], 0);
                    return -1;
                    }
            close(f); /* close and open again to establish read/write access */
            if ((f = open(project.dirNames[TRANSACTIONLOG], 2)) < 0) {
#endif
                    setError(E_create_dirfile, project.dirNames[TRANSACTIONLOG], 0);
                    return -1;
                    }
            transactionFD = f;
            return 1;
} openTransactionLog()
{       int     f;
        inCompoundTransaction = FALSE; inTransaction = 0;
        if (transactionFD != -1) close(transactionFD);
#ifdef mag
        if ((f = open(project.dirNames[TRANSACTIONLOG], O_RDWR , 0)) < 0) {
#else
        if ((f = open(project.dirNames[TRANSACTIONLOG], 2)) < 0) {
#endif
                setError(E_open_dirfile, project.dirNames[TRANSACTIONLOG], 0);
                return -1;
                }
        transactionFD = f;
        return 1;
} closeTransactionLog()
{
        inCompoundTransaction = FALSE; inTransaction = 0;
        if (transactionFD != -1) { close(transactionFD); transactionFD = -1; }
} doReorganizeTransaction()
{       int     r;
        if ((inCompoundTransaction == TRUE) || (inTransaction != 0)) {
                setError(E_invalid_transaction, "", 0);
                return FALSE;
                }
        if (startTransaction(T_UPDATE) == FALSE) return FALSE;
        logPendingTransaction(L_REHASHSTRINGS, 0, 0, 0);
        logging = 0;
        r = rehash_strings();
        logging = 1;
        commitTransaction();
        return r;
} beginCompoundTransaction(type)
        char    type;
{
        if ((inCompoundTransaction == TRUE) || (inTransaction != 0)) {
                setError(E_invalid_transaction, "", 0);
                return FALSE;
                }
        setTransactionTime();
        inCompoundTransaction = TRUE;
        if (startTransaction(type)) return TRUE;
        else    {
                inCompoundTransaction = FALSE;
                return FALSE;
                }
} commitCompoundTransaction()
{
        if ((inCompoundTransaction == FALSE) || (inTransaction != 1)) {
                setError(E_invalid_transaction, "", 0);
                return FALSE;
                }
        inCompoundTransaction = FALSE;
        clearTransactionTime();
        commitTransaction();
        deleteTempFiles();
        return TRUE;
}
```

```
abortCompoundTransaction()
{
        if (inCompoundTransaction == FALSE) {
                setError(E_invalid_transaction, "", 0);
                return FALSE;
        }
        if (abortTransaction() == FALSE) return FALSE;
        clearTransactionTime();
        inCompoundTransaction = FALSE;
        return TRUE;
} recoverFromCrash()
{
        inTransaction = 1; inTransactionType = T_UPDATE;
        flock(transactionFD, LOCK_EX); /* wait for exclusive access */
        if (abortTransaction() == FALSE) return FALSE;
        inCompoundTransaction = FALSE;
        return TRUE;
} startTransaction(type)
        int     type;
{       struct stat     statBuf;
        int     author, time;
        char    *name, param[200];
    if (inTransaction == 0) {
        if (type == T_UPDATE) {
                if (readOnlyDirAccess) {
                        setError(E_update_denied, "", 0);
                        return FALSE;
                }
                flock(transactionFD, LOCK_EX); /* wait for exclusive access */
        }
        else
                flock(transactionFD, LOCK_SH); /* wait for shared access */ fstat(transactionFD, &statBuf);
        if (statBuf.st_size != 0) {
                /* someone crashed without finishing transaction */
                lseek(transactionFD, 0, L_SET);
                if (read(transactionFD, &author, 4) != 4) {
                        setError(E_read_dirfile, "transaction log", 0);
                        return FALSE;
                }
                if (read(transactionFD, &time, 4) != 4) {
                        setError(E_read_dirfile, "transaction log", 0);
                        return FALSE;
                }
                strcpy(param, ctime(&time));
                param[24] = 0; /* cut off lf */
                name = (char *) get_string(author);
                if (name != 0) {
                        strcat(param, ": ");
                        strncat(param, name, 220);
                }
                setError(E_incomplete_transaction, param, 0);
```

/* log.c implements the recovery mechanism for crashes and transactions.
Each hypertext abstract machine call is considered to be a transaction.
Additionally, calls are provided to bundle a group of hypertext abstract
machine calls into a single transaction. During the transaction all updates
to hypertext files are logged. If the transaction does not
proceed to completion (either because the machine crashes during the
transaction or some unpredicted error condition arises) then all updates
that had occurred during the transaction are undone.
To ensure that recovery is possible if the machine crashes during the
transaction, the update logging is done just prior to performing the
update and the transaction log is written onto the disk (overriding kernal
buffers via the fsync system call) before the update is actually performed.
When a transaction is committed, all files that were updated during
the transaction are written to the disk (again using the fsync call)
ensuring protection against machine crashes immediately following the
transaction.

The transaction log is also used to synchronize multi-person access to
a hypergraph. Update transactions require exclusive access to the
transaction log, and access-only transactions allow shared access.
The transaction log file has the invariant property that
whenever is it not empty, an update transaction has started but is not
yet completed.

Thus, anytime access (shared or exclusive) to the transaction log is obtained
and the transaction log is not empty, that means that a crash occurred
during the most recent update transaction.
Crash recovery consists of undoing all the updates in the log.

Programmers notes:
    1) undo actions must have no effect if the corresponding update did
        not actually occur.
    2) all abstract hypertext machine calls must start with a
        'startTransaction' and end with either a 'commitTransaction'
        or 'abortTransaction' call.
    3) a 'logPendingTransaction' call must precede all updates to
        hypertext files, unless the update is shadowed (not visible
        unless other updates occur). A stronger rule: shadowed
        updates that are not logged should also not waste disk space.
*/

```c
#include <stdio.h>
#include <sys/file.h>
#include <sys/types.h>
#include <sys/stat.h>
#include "log.h"
#include "directory.h"
#include "errors.h"
#include "machine.h"

static int     transactionFD, inTransaction, inCompoundTransaction;
static char    logging, inTransactionType;
typedef struct tempList {
        char    tempName[220];
        struct  tempList *next;
} TEMPFILE;
static struct tempList *tempListHead;
extern int     readOnlyDirAccess;

notInTransaction()
{
        return ((inTransaction == 0) && (inCompoundTransaction == FALSE));
} initTransactionLog()
{
        inCompoundTransaction = FALSE;
        transactionFD = -1;
        inTransaction = 0;
        logging = 1;
        tempListHead = (struct tempList *) -1;
} createTransactionLog()
{
        int     f;
        inCompoundTransaction = FALSE; inTransaction = 0;
        if (transactionFD != -1) close(transactionFD);
#ifdef mag
        if ((f = open(project.dirNames[TRANSACTIONLOG], O_RDWR | O_CREAT | O_TRUNC, defaults.
mask)) < 0) {
#else
        if ((f = creat(project.dirNames[TRANSACTIONLOG], defaults.mask)) < 0) {
                setError(E_create_dirfile, project.dirNames[TRANSACTIONLOG], 0);
                return -1;
        }
        close(f); /* close and open again to establish read/write access */
        if ((f = open(project.dirNames[TRANSACTIONLOG], 2)) < 0) {
#endif
                setError(E_create_dirfile, project.dirNames[TRANSACTIONLOG], 0);
                return -1;
        }
        transactionFD = f;
        return 1;
} openTransactionLog()
{
        int     f;
        inCompoundTransaction = FALSE; inTransaction = 0;
        if (transactionFD != -1) close(transactionFD);
#ifdef mag
        if ((f = open(project.dirNames[TRANSACTIONLOG], O_RDWR , 0)) < 0) {
#else
        if ((f = open(project.dirNames[TRANSACTIONLOG], 2)) < 0) {
#endif
```

```
                setError(E_open_dirfile, project.dirNames[TRANSACTIONLOG], 0);
                return -1;
                }
        transactionFD = f;
        return 1;
} closeTransactionLog()
{
        inCompoundTransaction = FALSE; inTransaction = 0;
        if (transactionFD != -1) { close(transactionFD); transactionFD = -1; }
} doReorganizeTransaction()
{       int     r;
        if ((inCompoundTransaction == TRUE) || (inTransaction != 0)) {
                setError(E_invalid_transaction, "", 0);
                return FALSE;
                }
        if (startTransaction(T_UPDATE) == FALSE) return FALSE;
        logPendingTransaction(L_REHASHSTRINGS, 0, 0, 0);
        logging = 0;
        r = rehash_strings();
        logging = 1;
        commitTransaction();
        return r;
} beginCompoundTransaction(type)
        char    type;
{
        if ((inCompoundTransaction == TRUE) || (inTransaction != 0)) {
                setError(E_invalid_transaction, "", 0);
                return FALSE;
                }
        setTransactionTime();
        inCompoundTransaction = TRUE;
        if (startTransaction(type)) return TRUE;
        else    {
                inCompoundTransaction = FALSE;
                return FALSE;
                }

} commitCompoundTransaction()
{
        if ((inCompoundTransaction == FALSE) || (inTransaction != 1)) {
                setError(E_invalid_transaction, "", 0);
                return FALSE;
                }
        inCompoundTransaction = FALSE;
        clearTransactionTime();
        commitTransaction();
        deleteTempFiles();
        return TRUE;
} abortCompoundTransaction()
{
        if (inCompoundTransaction == FALSE) {
                setError(E_invalid_transaction, "", 0);
                return FALSE;
                }
        if (abortTransaction() == FALSE) return FALSE;
        clearTransactionTime();
        inCompoundTransaction = FALSE;
        return TRUE;
} recoverFromCrash()
{
        inTransaction = 1; inTransactionType = T_UPDATE;
        flock(transactionFD, LOCK_EX); /* wait for exclusive access */
        if (abortTransaction() == FALSE) return FALSE;
        inCompoundTransaction = FALSE;
        return TRUE;
}
```

```c
startTransaction(type)
        int     type;
{       struct stat     statBuf;
        int     author, time;
        char    *name, param[200];
    if (inTransaction == 0) {
        if (type == T_UPDATE) {
            if (readOnlyDirAccess) {
                setError(E_update_denied, "", 0);
                return FALSE;
            }
            flock(transactionFD, LOCK_EX); /* wait for exclusive access */
        }
        else
            flock(transactionFD, LOCK_SH); /* wait for shared access */ fstat(transactionFD, &statBuf);
        if (statBuf.st_size != 0) {
            /* someone crashed without finishing transaction */
            lseek(transactionFD, 0, L_SET);
            if (read(transactionFD, &author, 4) != 4) {
                setError(E_read_dirfile, "transaction log", 0);
                return FALSE;
            }
            if (read(transactionFD, &time, 4) != 4) {
                setError(E_read_dirfile, "transaction log", 0);
                return FALSE;
            }
            strcpy(param, ctime(&time));
            param[24] = 0; /* cut off lf */
            name = (char *) get_string(author);
            if (name != 0) {
                strcat(param, ": ");
                strncat(param, name, 200);
            }
            setError(E_incomplete_transaction, param, 0);

flock(transactionFD, LOCK_UN);
            return FALSE;
        }
        if (type == T_UPDATE) {
            lseek(transactionFD, 0, L_SET);
            if (write(transactionFD, &defaults.author, 4) != 4) {
                setError(E_write_dirfile, "transaction log", 0);
                return FALSE;
            }
            time = now();
            if (write(transactionFD, &time, 4) != 4) {
                setError(E_write_dirfile, "transaction log", 0);
                return FALSE;
            }
        }
        inTransactionType = type;
    }
    else if ((type == T_UPDATE) && (inTransactionType == T_ACCESS)) {
        setError(E_invalid_transaction, "", 0);
        return FALSE;
    }
    inTransaction += 1;
    tempListHead = (struct tempList *) -1;
    return TRUE;
} truncateTransactionLog()
{       struct stat     statBuf;
        int     f;

fstat(transactionFD, &statBuf);
        if (statBuf.st_size != 0) {
#ifdef mag
            if ((f = open(project.dirNames[TRANSACTIONLOG], O_RDWR | O_CREAT | O_TRUNC, defaults.mask)) < 0) {
#else
            if ((f = creat(project.dirNames[TRANSACTIONLOG], defaults.mask)) < 0) {
                setError(E_create_dirfile, project.dirNames[TRANSACTIONLOG], 0);
                return -1;
            }
            close(f); /* close and open again to establish read/write access */
            if ((f = open(project.dirNames[TRANSACTIONLOG], 2)) < 0) {
#endif
```

```
                    setError(E_create_dirfile, project.dirNames[TRANSACTIONLOG], 0);
                    return -1;
                    }
            /* give up lock */
                flock(transactionFD, LOCK_UN);
                close(transactionFD);
                transactionFD = f;
                }
        else /* give up lock */
                flock(transactionFD, LOCK_UN);
    } commitTransaction()
{
    inTransaction -= 1;
    if ((inCompoundTransaction == FALSE) && (inTransaction == 0)) {
            syncUpdatedFiles();
            truncateTransactionLog();
            }
} abortTransaction()
{       int     size, index;
        char    params[200], opCode;
        unsigned short  paramsSize;
        struct stat     statBuf;

if (inTransaction > 0) { logging = 0;
        setAbortingErrorMode();
        fstat(transactionFD, &statBuf);
        size = statBuf.st_size;
        if (size > 0) lseek(transactionFD, 0, L_XTND);
        lseek(transactionFD, -2, L_INCR);
        while (size > 0) {
                read(transactionFD, &paramsSize, 2);
                lseek(transactionFD, -7 - paramsSize, L_INCR);
                read(transactionFD, &opCode, 1);
                read(transactionFD, &index, 4);
                read(transactionFD, params, paramsSize);
                if (dispatchBackout(opCode,index,params,paramsSize) == FALSE) {
                        clearAbortingErrorMode();
                        return FALSE;
                        }
                lseek(transactionFD, -7 - paramsSize, L_INCR);
                size = size - paramsSize - 7;
                }
        inTransaction = 0;
        syncUpdatedFiles();
        truncateTransactionLog();
        clearAbortingErrorMode();
        logging = 1;
        return TRUE;
        }
} logPendingTransaction(opCode, index, params, paramsSize)
        char    opCode, *params;
        int     index;
        unsigned short paramsSize;
{       int     f;
    if (logging) {
        lseek(transactionFD, 0, L_XTND);
        if (write(transactionFD, &opCode, 1) != 1) perror("writeOpcode");
        if (write(transactionFD, &index, 4) != 4) perror("writeIndex");
        if (paramsSize != 0)
            if (write(transactionFD, params, paramsSize) != paramsSize) perror("writeParams");
        if (write(transactionFD, &paramsSize, 2) != 2) perror("writeSize");
        fsync(transactionFD); /* make sure it gets to the disk */
        }
    if ((opCode == L_CREATETEMP) || (opCode == L_UPDATENODEFILE) ||
            (opCode == L_DESTROYNODEFILE))
        newTempFile(params);
} dispatchBackout(opCode, index, params, paramsSize)
        char    opCode, *params;
        unsigned short  paramsSize;
        int     index;
```

```c
{       int     f, len, offset;
        char    name[200];

switch (opCode) {
        case    L_ADDNODE: /* -> newNodeIndex */
#if DEBUGTRACE > 0
                fprintf(trace, "L_ADDNODE(%d)\n", index);
#endif
                if ((f = openDirectoryFile(DIRECTORY)) < 0) goto out2;
                if (isValidNodeEntry(f, index))
                        if (removeNodeEntry(f, index) == FALSE) goto out1;
                closeDirectoryFile(f);
                break;
        case    L_ADDLINK: /* -> newLinkIndex */
#if DEBUGTRACE > 0
                fprintf(trace, "L_ADDLINK(%d)\n", index);
#endif
                if ((f = openDirectoryFile(LINKENTRIES)) < 0) goto out2;
                if (isValidLinkEntry(f, index))
                        if (removeLinkEntry(f, index) == FALSE) goto out1;
                closeDirectoryFile(f);

break;
        case    L_ADDLINKHIST: /* -> newLinkHistPtr */
#if DEBUGTRACE > 0
                fprintf(trace, "L_ADDLINKHIST(%d)\n", index);
#endif
                if ((f = openDirectoryFile(LINKHISTORY)) < 0) goto out2;
                if (isValidLinkHistory(f, index))
                        if (removeLinkHistory(f, index) == FALSE) goto out1;
                closeDirectoryFile(f);
                break;
        case    L_ADDENTATT: /* -> newEntAttPtr */
#if DEBUGTRACE > 0
                fprintf(trace, "L_ADDENTATT(%d)\n", index);
#endif
                if ((f = openDirectoryFile(ENTITYATTRIBUTES)) < 0) goto out2;
                if (isValidEntityAttribute(f, index))
                        if (removeEntityAttribute(f, index) == FALSE) goto out1;
                closeDirectoryFile(f);
                break;
        case    L_ADDATTVALUE: /* -> newAttValuePtr */
#if DEBUGTRACE > 0
                fprintf(trace, "L_ADDATTVALUE(%d)\n", index);
#endif
                if ((f = openDirectoryFile(ATTRIBUTEVALUES)) < 0) goto out2;
                if (isValidAttributeValueBuffer(f, index))
                        if (removeAttributeValueBuffer(f, index) == FALSE) goto out1;
                closeDirectoryFile(f);
                break;
        case    L_ADDATTDEF: /* -> newAttributeIndex */
#if DEBUGTRACE > 0
                fprintf(trace, "L_ADDATTDEF(%d)\n", index);
#endif
                if ((f = openDirectoryFile(ATTRIBUTEDEFS)) < 0) goto out2;
                if (isValidAttributeDef(f, index))
                        if (removeAttributeDef(f, index) == FALSE) goto out1;
                closeDirectoryFile(f);
                break;
        case    L_ADDATTHIST: /* -> newAttHistPtr */
#if DEBUGTRACE > 0
                fprintf(trace, "L_ADDATTHIST(%d)\n", index);
#endif
                if ((f = openDirectoryFile(ATTRIBUTEHISTORY)) < 0) goto out2;
                if (isValidAttributeHistory(f, index))
                        if (removeAttributeHistory(f, index) == FALSE) goto out1;
                closeDirectoryFile(f);
                break;
        case    L_ADDEVENTACTHIST: /* -> newEventAtcHistPtr */
#if DEBUGTRACE > 0
                fprintf(trace, "L_ADDEVENTACTHIST(%d)\n", index);
#endif
                if ((f = openDirectoryFile(EVENTACTIONHISTORY)) < 0) goto out2;
                if (isValidEventActionHistory(f, index))
                        if (removeEventActionHistory(f, index) == FALSE) goto out1;
                closeDirectoryFile(f);
                break;
        case    L_ADDSTRINGINDEX: /* -> newStringIndex */
#if DEBUGTRACE > 0
                fprintf(trace, "L_ADDSTRINGINDEX(%d)\n", index);
#endif
```

```
                        if ((f = openDirectoryFile(STRINGINDEX2)) < 0) goto out2;
                        if (isValidStringIndexEntry(f, index))
                            if (removeStringIndexEntry(f, index) == FALSE) goto out1;
                        closeDirectoryFile(f);
                        break;
            case        L_ADDSTRINGHASH: /* -> newHashIndex */
#if DEBUGTRACE > 0
                        fprintf(trace, "L_ADDSTRINGHASH(%d)\n", index);
#endif
                        if ((f = openDirectoryFile(STRINGHASH0)) < 0) goto out2;
                        if (removeStringHashEntry(f, index) == FALSE) goto out1;
                        closeDirectoryFile(f);
                        break;
            case        L_ADDSTRINGCHARS: /* -> newStringStart */
#if DEBUGTRACE > 0
                        fprintf(trace, "L_ADDSTRINGCHARS(%d)\n", index);
#endif
                        if ((f = openDirectoryFile(STRINGCHARS0)) < 0) goto out2;
                        if (removeStringEntry(f, index) == FALSE) goto out1;
                        closeDirectoryFile(f);
                        break;
            case        L_PUTNODE: /* -> nodeIndex, oldNodeEntry */
#if DEBUGTRACE > 0
                        fprintf(trace, "L_PUTNODE(%d)\n", index);
#endif
                        if ((f = openDirectoryFile(DIRECTORY)) < 0) goto out2;
                        if (putNodeEntry(f, index, params) == FALSE) goto out1;
                        closeDirectoryFile(f);
                        break;
            case        L_PUTLINK: /* -> linkIndex, oldLinkEntry */
#if DEBUGTRACE > 0
                        fprintf(trace, "L_PUTLINK(%d)\n", index);
#endif
                        if ((f = openDirectoryFile(LINKENTRIES)) < 0) goto out2;
                        if (putLinkEntry(f, index, params) == FALSE) goto out1;
                        closeDirectoryFile(f);
                        break;
            case        L_PUTENTATT: /* -> entryPtr, oldEntAttEntry */
#if DEBUGTRACE > 0
                        fprintf(trace, "L_PUTENTATT(%d)\n", index);
#endif
                        if ((f = openDirectoryFile(ENTITYATTRIBUTES)) < 0) goto out2;
                        if (putEntityAttribute(f, index, params) == FALSE) goto out1;
                        closeDirectoryFile(f);
                        break;
            case        L_PUTATTVALUE: /* -> entryPtr, oldAttValueEntry */
#if DEBUGTRACE > 0
                        fprintf(trace, "L_PUTATTVALUE(%d)\n", index);
#endif
                        if ((f = openDirectoryFile(ATTRIBUTEVALUES)) < 0) goto out2;
                        if (putAttributeValue(f, index, params) == FALSE) goto out1;
                        closeDirectoryFile(f);
                        break;
            case        L_PUTATTDEF: /* -> attIndex, oldAttDefEntry */
#if DEBUGTRACE > 0
                        fprintf(trace, "L_PUTATTDEF(%d)\n", index);
#endif
                        if ((f = openDirectoryFile(ATTRIBUTEDEFS)) < 0) goto out2;
                        if (putAttributeDef(f, index, params) == FALSE) goto out1;
                        closeDirectoryFile(f);
                        break;
            case        L_PUTDIRHEAD: /* -> oldDirHeading */
#if DEBUGTRACE > 0
                        fprintf(trace, "L_PUTDIRHEAD()\n");
#endif
                        if ((f = openDirectoryFile(DIRECTORY)) < 0) goto out2;
                        if (putDirectoryHeader(f, params) == FALSE) goto out1;
                        closeDirectoryFile(f);
                        break;
            case        L_PUTSTRINGINDEX: /* -> stringIndex, oldStringIndexEntry */
#if DEBUGTRACE > 0
                        fprintf(trace, "L_PUTSTRINGINDEX(%d)\n", index);
#endif
                        if ((f = openDirectoryFile(STRINGINDEX2)) < 0) goto out2;
                        if (putStringIndexEntry(f, index, params) == FALSE) goto out1;
                        closeDirectoryFile(f);
                        break;
            case L_UPDATENODEARCHIVE: /* -> updateTime, fileName */
#if DEBUGTRACE > 0
                        fprintf(trace, "L_UPDATENODEARCHIVE(%d, %s)\n", index, params);
```

```
#endif
                if (roll_back_archive(index, params) != 0) goto out2;
                break;
        case L_UPDATENODEFILE: /* -> savedFileName */
#if DEBUGTRACE > 0
                fprintf(trace, "L_UPDATENODEFILE(%s)\n", params);
#endif
                if (access(params, F_OK) == 0) {
                        /* saved name is desired name + 6 extra chars */
                        len = strlen(params);
                        strcpy(name, params);
                        name[len - 6] = (char ) 0; /* get rid of extra chars */
#ifdef mag
                        rename(params, name);
#else
                        unlink(name);
                        link(params, name);
#endif
                        unlink(params);
                }
                break;
        case L_CREATENODE: /* -> newFileName */
#if DEBUGTRACE > 0
                fprintf(trace, "L_CREATENODE(%s)\n", params);
#endif
                if (access(params, F_OK) == 0)
                        unlink(params);
                break;
        case L_DESTROYNODEFILE: /* -> savedFileName */
#if DEBUGTRACE > 0
                fprintf(trace, "L_DESTROYNODEFILE(%s)\n", params);
#endif
                if (access(params, F_OK) == 0) {
                        /* saved name is desired name + 6 extra chars */
                        len = strlen(params);
                        strcpy(name, params);
                        name[len - 6] = (char ) 0; /* get rid of extra chars */
                        link(params, name);
                        unlink(params);
                }
                break;
        case   L_DESTROYNODE: /* -> oldNodeIndex, oldNodeEntry */
#if DEBUGTRACE > 0
                fprintf(trace, "L_DESTROYNODE(%d)\n", index);
#endif
                if ((f = openDirectoryFile(DIRECTORY)) < 0) goto out2;
                if (isValidNodeEntry(f, index) != TRUE)
                        if (addNodeEntry(f, params) != index) goto out1;
                closeDirectoryFile(f);
                break;
        case   L_DESTROYLINK: /* oldLinkIndex, oldLinkEntry */
#if DEBUGTRACE > 0
                fprintf(trace, "L_DESTROYLINK(%d)\n", index);
#endif
                if ((f = openDirectoryFile(LINKENTRIES)) < 0) goto out2;
                if (isValidLinkEntry(f, index) != TRUE)
                        if (addLinkEntry(f, params) != index) goto out1;
                closeDirectoryFile(f);
                break;
        case   L_DESTROYENTATT: /* oldEntAttPtr, oldEntAtt */
#if DEBUGTRACE > 0
                fprintf(trace, "L_DESTROYENTATT(%d)\n", index);
#endif
                if ((f = openDirectoryFile(ENTITYATTRIBUTES)) < 0) goto out2;
                if (isValidEntityAttribute(f, index) != TRUE)
                        if (addEntityAttribute(f, params) != index) goto out1;
                closeDirectoryFile(f);
                break;
        case   L_DESTROYATTVALUE: /* oldAttValuePtr, oldAttValue */
#if DEBUGTRACE > 0
                fprintf(trace, "L_DESTROYATTVALUE(%d)\n", index);
#endif
                if ((f = openDirectoryFile(ATTRIBUTEVALUES)) < 0) goto out2;
                if (isValidAttributeValueBuffer(f, index) != TRUE)
                        if (addAttributeValueBuffer(f, params) != index) goto out1;
                closeDirectoryFile(f);
                break;
        case   L_DESTROYATTDEF: /* oldAttIndex, oldAttDef */
#if DEBUGTRACE > 0
                fprintf(trace, "L_DESTROYATTDEF(%d)\n", index);
```

```
#endif
                if ((f = openDirectoryFile(ATTRIBUTEDEFS)) < 0) goto out2;
                if (isValidAttributeDef(f, index) != TRUE)
                        if (addAttributeDef(f, params) != index) goto out1;
                closeDirectoryFile(f);
                break;
        case    L_DESTROYATTHIST: /* oldAttHistPtr, oldAttHist */
#if DEBUGTRACE > 0
                fprintf(trace, "L_DESTROYATTHIST(%d)\n", index);
#endif
                if ((f = openDirectoryFile(ATTRIBUTEHISTORY)) < 0) goto out2;
                if (isValidAttributeHistory(f, index) != TRUE)
                        if (addAttributeHistory(f, params) != index) goto out1;
                closeDirectoryFile(f);
                break;
        case    L_DESTROYEVENTACTHIST: /* oldEventActHistPtr, oldEventActHist */
#if DEBUGTRACE > 0
                fprintf(trace, "L_DESTROYEVENTACTHIST(%d)\n", index);
#endif
                if ((f = openDirectoryFile(L_DESTROYEVENTACTHIST))<0) goto out2;
                if (isValidEventActionHistory(f, index) != TRUE)
                        if (addEventActionHistory(f,params) != index) goto out1;
                closeDirectoryFile(f);
                break;
        case L_CREATETEMP: /* -> tempFileName */
#if DEBUGTRACE > 0
                fprintf(trace, "L_CREATETEMP()\n");
#endif
                if (access(params, F_OK) == 0) {
                        unlink(params);
                }
                break;
        case L_REHASHSTRINGS: /* -> tempFileName */
#if DEBUGTRACE > 0
                fprintf(trace, "L_REHASHSTRINGS(%s)\n", params);
#endif
                { struct    stat    sH0, sH1, sI0, sI1;
                  int       rH0, rH1, rI0, rI1;
                    rH0 = stat(project.dirNames[STRINGHASH0], &sH0);
                    rH1 = stat(project.dirNames[STRINGHASH1], &sH1);
                    rI0 = stat(project.dirNames[STRINGINDEX0], &sI0);
                    rI1 = stat(project.dirNames[STRINGINDEX1], &sI1);

if (((rH0 == -1) || (rI0 == -1))
                       || ((sH0.st_mtime == sH1.st_mtime) !=
                           (sI0.st_mtime == sI1.st_mtime))) {
                        /* if hash or index file does not exist
                           -or- if hash == newHash and index != newIndex
                           -or- if index == newIndex and hash != newHash
                                then crash occurred while newHash and newIndex
                                     were being installed, so let's try to
                                     install them again. */
#ifdef mag
                        rename(project.dirNames[STRINGHASH1],
                                    project.dirNames[STRINGHASH0]);
                        rename(project.dirNames[STRINGINDEX1],
                                    project.dirNames[STRINGINDEX0]);
#else
                        unlink(project.dirNames[STRINGHASH0]);
                        link(project.dirNames[STRINGHASH1],
                                    project.dirNames[STRINGHASH0]);
                        unlink(project.dirNames[STRINGINDEX0]);
                        link(project.dirNames[STRINGINDEX1],
                                    project.dirNames[STRINGINDEX0]);
#endif
                    }
                }
                break;
        default:
#if DEBUGTRACE > 0
                fprintf(trace, "unknown transaction op code: %d\n", opCode);
#endif
                goto out2;
        }
        return TRUE;

out1:   closeDirectoryFile(f);
out2:   return FALSE;
}
```

```
newTempFile(n)
        char    *n;
{
        struct tempList *p;
        p = (struct tempList *) malloc(sizeof(TEMPFILE));
        p->next = tempListHead;
        strcpy(p->tempName, n);
        tempListHead = p;
} deleteTempFiles()
{
        struct tempList *p, *n;
        p = tempListHead;
        while (p != (struct tempList *) -1) {
                if (access(p->tempName, F_OK) == 0)
                        unlink(p->tempName);
                n = p; p = p->next;
                free(n);
        }
        tempListHead = (struct tempList *) -1;
}

/* transaction types */
#define T_UPDATE 1
#define T_ACCESS 0

/* opcodes for transaction log actions */
#define L_ADDNODE               1
#define L_ADDLINK               2
#define L_ADDLINKHIST           3
#define L_ADDENTATT             4
#define L_ADDATTVALUE           5
#define L_ADDATTDEF             6
#define L_ADDATTHIST            7
#define L_ADDEVENTACTHIST       8
#define L_ADDSTRINGINDEX        9
#define L_ADDSTRINGHASH         10
define L_ADDSTRINGCHARS        11 define L_PUTNODE               20
define L_PUTLINK               21
#define L_PUTENTATT             23
#define L_PUTATTVALUE           24
#define L_PUTATTDEF             25
#define L_PUTDIRHEAD            26
define L_PUTSTRINGINDEX        27 define L_UPDATENODEARCHIVE     40
define L_UPDATENODEFILE        41
#define L_CREATENODE            42
define L_DESTROYNODEFILE       43 define L_DESTROYNODE           50
define L_DESTROYLINK           51
#define L_DESTROYENTATT         52
#define L_DESTROYATTVALUE       53
#define L_DESTROYATTDEF         54
#define L_DESTROYATTHIST        55
define L_DESTROYEVENTACTHIST   56 define L_REHASHSTRINGS         70
define L_CREATETEMP            71

/* ns_node.c provides operations on nodes of the hypertext graph.
        this routine runs as part of the node server, so it cannot
        access directory info */ include         <sys/file.h>
include         <sys/types.h>
include         <sys/stat.h>
#include         <sys/file.h>
include         <stdio.h> include         "directory.h"
include         "machine.h"
#include         "errors.h"
#include         "log.h"

newNode(n, b, m, t)
        char    *n, b;
        int     m, t;
```

```
/* creates a new node with name n, where m is the protection mask,
     b == 1 means node is an archive, t is the creation time */
{       int     f;
#if DEBUGTRACE >= 2
        fprintf(trace, "called newNode(%s, %x, %d, %d)\n", n, b, m, t);
#endif
logPendingTransaction(L_CREATENODE, 0, n, strlen(n) + 1);
if (b == 1) /* we have a new archive */
        return (create_archive(t, defaults.author, n) == 0);
else    { /* this one is just a file */
        f = open(n, O_CREAT | O_WRONLY, m);
        if (f >= 0) {close(f); return 1;}
        else    return 0;
        }
} getNode(name, a, vt, data, dataSize)
        char    *name, a, **data;
        int     vt, *dataSize;
  /* gets the contents of a specific version of a node and puts it in data array */
{       int     f;
        char    c;
        int     vi;
        struct stat     s;
#if DEBUGTRACE >= 2
        fprintf(trace, "called getNode(%s, %x, %d, %d)\n", name, a, vt, vi);
#endif
        if (access(name, R_OK) != 0) {
                setError(E_cannot_access_node, "", 0);
                return 0;
                }
if (a == 1) {
        vi = (vt == CURRENTVERSION) ? 1: 0;
        if (check_out_archive(vt, vi, name, data, dataSize) < 0)
                return 0;
        return 1;
        }
else    { /* this one is a file */
#ifdef mag
        if ((f = open(name, O_RDONLY, 0)) < 0) {
#else
        if ((f = open(name, 0)) < 0) {
#endif
                setError(E_get_open, "", 0);
                return 0;
                }
        stat(name, &s);
        *dataSize = s.st_size;
        *data = (char *) malloc(*dataSize);
        if (read(f, *data, *dataSize) != *dataSize) {
                setError(E_get_read, "", 0);
                close(f);
                return 0;
                }
        close(f);
        return 1;
        }
} putNode(name, a, versionTime, data, dataSize)
        char    *name, a, *data;
        int     versionTime, dataSize;
  /* updates the contents of a node checking its time stamp */
{       int     f;
        char    c, savedName[200];
        int     i;
#if DEBUGTRACE >= 2
        fprintf(trace, "called putNode(%s, %x, %d)\n",
                                        name, a, versionTime);
#endif
        if (access(name, R_OK | W_OK) != 0) {
                setError(E_cannot_access_node, "", 0);
                return 0;
                }
if (a == 1) {
        logPendingTransaction(L_UPDATENODEARCHIVE, versionTime,
                                        name, strlen(name) + 1);
        if (check_in_archive(versionTime, defaults.author, name, data, dataSize) < 0) return 0;
        return 1;
        }
```

```
else    { /* this one is a file */
        strcpy(savedName, name); strcat(savedName, "XXXXXX");
        mktemp(savedName);
        logPendingTransaction(L_UPDATENODEFILE,0,savedName,strlen(savedName)+1);
        link(name, savedName);
        unlink(name);
#ifdef mag
        if ((f = open(name, O_RDWR | O_CREAT | O_TRUNC, defaults.mask)) < 0) {
#else
        if ((f = creat(name, defaults.mask)) < 0) {
#endif
                setError(E_create_open, "", 0);
                return 0;
                }
        if (write(f, data, dataSize) != dataSize) {
                setError(E_check_in_write, "", 0);
                return 0;
                }
        fsync(f); close(f);
        return 1;
        }
} destroyNode(name)
        char    *name;
   /* destroys the file used to store the contents of a node */
{       char    savedName[200];
#if DEBUGTRACE >= 2
        fprintf(trace, "called destroyNode(%s)\n", name);
#endif
        strcpy(savedName, name); strcat(savedName, "XXXXXX");
        mktemp(savedName);
        logPendingTransaction(L_DESTROYNODEFILE,0,savedName,strlen(savedName)+1);
        link(name, savedName);
        unlink(name);
        return 1;
} getContentVersions(ne, name, numVersions, bufId)
        struct  nodeEntry       *ne;
        char    *name;
        int     *numVersions, bufId;
   /* retrieves the version times of updates to node contents */
{       int     times[1024], count, i;
        char    *s;
        if (access(name, R_OK) != 0) {
                setError(E_cannot_access_node, "", 0);
                return 0;
                }
        if ((char ) ne->status & ARCHIVE) {
                count = 1024;
                if (get_versions(name, times, &count) < 0) return 0;
                *numVersions = count / 2;
                if (ne->deletionTime != MAXINT) {
                        *numVersions += 1;
                        appendInt(ne->deletionTime, bufId);
                        appendBytes(" (deleted: ", bufId, 11);
                        s = (char *) get_string(ne->deletor);
                        appendBytes(s, bufId, strlen(s));
                        appendByte(')', bufId);
                        appendByte(0, bufId); /* null terminate */
                        }
                }
        else    { /* node is a file */
                times[0] = ne->lastUpdateTime;
                times[1] = ne->deletor;
                times[2] = ne->creationTime;
                times[3] = ne->creator;
                *numVersions = 2; count = 4;
                }
        for (i = 0; i < count; i += 2) {
                appendInt(times[i], bufId);
                appendBytes(" (", bufId, 2);
                s = (char *) get_string(times[i+1]);
                appendBytes(s, bufId, strlen(s));
                appendByte(')', bufId);
                appendByte(0, bufId); /* null terminate */
                }
        return 1;
}
```

```c
#include <ctype.h>
#include <stdio.h>
#include "directory.h"
#include "strings.h"
#include "errors.h"

#define TRUE    1
define FALSE   0

/* cp codes for interpreter */
#define HALT    0
#define LT      1
#define GT      2
#define LE      3
#define GE      4
#define EQ      5
#define NE      6
#define EQANY   7
#define NEANY   8
#define AND     20
#define OR      30
#define NOT     40
#define S_CONST 50
#define I_CONST 55
#define LOAD    60
#define EVAL    70

/* terminal symbols */
#define T_not           0
#define T_lparen        1
#define T_rparen        2
#define T_and           3
#define T_or            4
#define T_lt            7
#define T_gt            8
#define T_le            9
#define T_ge            10
#define T_eq            11
#define T_ne            12
#define T_string        13
#define T_integer       14
#define T_any           15
#define T_endMarker     16

/* number of different predicates simultaneously valid */
#define MAX_PREDICATES 2

/* code array */
#define MAX_CODE        256
static int      code[MAX_PREDICATES][MAX_CODE];

/* attribute array */
#define MAX_ATTRIBUTES 128
static int      attributes[MAX_PREDICATES][MAX_ATTRIBUTES];
/*      attributes[i,j] is the attribute index for the j'th attribute  */
/* used in interp for the i'th predicate.                              */
static int      numAttributes[MAX_PREDICATES];

/* scanner variables */
static char     *cp;    /* pointer to next character to scan */
static int      value;  /* integer */
static char     *stringStart;
static int      stringLength;

/* parser variables */
static int      token;
static int      nc;     /* index into code array for next entry */

/* error code */
static int      error;
static scan()
/***********************************************************************
*                                                                      *
*       Returns the next token. If it is an integer, its value is      *
* placed in the static global value; if it is a string, its starting   *
* address is placed in the static global startString and its length    *
* in stringLength. If any errors are encountered then returns -1.      *
*                                                                      *
***********************************************************************/
{
```

```
        char    c;      /* current character being scanned */
        register int    i;

while (isspace(*cp)) cp++;
        c       = *cp++;
        if (c == '\0') return(T_endMarker);
        else if (c == '.' || isalpha(c)) {
                stringStart     = cp - 1;
                while (isalnum(*cp)) cp++;
                stringLength    = cp - stringStart;
                return(T_string);
                }
        else if (c == '*') return(T_any);
        else if (c == '(') return(T_lparen);
        else if (c == ')') return(T_rparen);
        else if (c == '&') return(T_and);
        else if (c == '|') return(T_or);
        else if (c == '=') return(T_eq);
        else if (c == '!' || c == '~') {
                c       = *cp;
                if (c == '=') {cp++; return(T_ne); }
                else return(T_not);
                }
        else if (c == '>') {
                c       = *cp;
                if (c == '=') {cp++; return(T_ge); }
                else return(T_gt);
                }
        else if (c == '<') {
                c       = *cp;
                if (c == '=') {cp++; return(T_le); }
                else return(T_lt);
                }
        else if (c == '"') { /* beginning of a string */
                i       = 0;
                stringStart     = cp;
                while ((c = *cp++) != '"') i++;
                stringLength    = i;
                return(T_string);
                }
        else if (isdigit(c)) {
                value   = c - '0';
                while (isdigit(c = *cp)) {
                        cp++;
                        value   = value*10 + c - '0';
                        }
                return(T_integer);
                }
        else { /* error */
                error   = E_scan_error;
                return(-1);
                }
} static addAttributeIndex(inx,i)
        int     inx, i;
/************************************************************************
*                                                                       *
*       If attribute index inx is in the attributes array i then        *
*       returns its index in the array; otherwise adds it to the array and *
*       returns its index in the array.                                 *
*                                                                       *
************************************************************************/
{
        int     j;

for (j=0; j<numAttributes[i]; j++)
                if (attributes[i][j] == inx) return(j);
        attributes[i][j]        = inx;
        numAttributes[i]++;
        return(j);
}
attributesNeeded(a,i)
        int     **a;
        int     i;
/*      Note that 0 means no attributes needed, predicate was          */
{
        *a      = &attributes[i][0];
        return(numAttributes[i]);
}
```

```c
static char    *newString()
/*************************************************************************
 *                                                                       *
 *      Returns a pointer to a null terminated string which is equiva-   *
 *  lent to the string represented by stringStart and stringLength.      *
 *                                                                       *
 *************************************************************************/
{
        char    *cp, *fp, *sp;
        int     i;

cp      = (char *) malloc(stringLength+1);
        sp      = cp;
        fp      = stringStart;
        for (i=0; i<stringLength; i++) *cp++ = *fp++;
        *fp     = '\0';
        return(sp);
}
static char *term(pi)
        int     pi;
{
        char    *r;
        int     relop;
        char    buf[128];
        int     i;
        int     attributeIndex;
        int     stringIndex;

if (token == T_string) { /* token is attribute name */ code[pi][nc++] = LOAD;
                r       = stringStart;
                for (i=0; i<stringLength; i++) buf[i] = *r++;
                buf[i]  = '\0';
                stringIndex     = find_string(buf);
                if (stringIndex < 0) {
                        error   = E_parse_undefined_string;
                        return(cp);
                        }
                attributeIndex = get_attribute_index(stringIndex);
                if (attributeIndex <= 0) {
                        error   = E_parse_undefined_attribute;
                        return(cp);
                        }
                code[pi][nc++]  = addAttributeIndex(attributeIndex,pi);
                if ((relop = token = scan()) < 0) return(cp);
                if ((token = scan()) < 0) return(cp);
                if ((token==T_string) || (token==T_integer)) {
                    if (token == T_string) {
                        code[pi][nc++]  = S_CONST;
                        code[pi][nc++]  = (int) newString();
                        }
                    else if (token == T_integer) {
                        code[pi][nc++]  = I_CONST;
                        code[pi][nc++]  = value;
                        }
                    switch (relop) {
                        case T_lt:
                                code[pi][nc++]  = LT;
                                break;
                        case T_gt:
                                code[pi][nc++]  = GT;
                                break;
                        case T_le:
                                code[pi][nc++]  = LE;
                                break;
                        case T_ge:
                                code[pi][nc++]  = GE;
                                break;
                        case T_eq:
                                code[pi][nc++]  = EQ;
                                break;
                        case T_ne:
                                code[pi][nc++]  = NE;
                                break;
                        default:
                                error   = E_parse_illegal_operator;
                                return(cp);
                        }
                    if ((token = scan()) < 0) return(cp);
                    }
```

```
                        else if (token == T_any) {
                                if (relop == T_eq)
                                        code[pi][nc++]  = EQANY;
                                else if (relop == T_ne)
                                        code[pi][nc++]  = NEANY;
                                else {
                                        error   = E_parse_illegal_operator;
                                        return(cp);
                                }
                                if ((token = scan()) < 0) return(cp);
                        }
                        else {
                                error   = E_parse_term_expected;
                                return(cp);
                        }
                        return(0);
                }
                else {
                        error   = E_parse_attribute_name_expected;
                        return(cp);
                }
} static char *expression(pi)
        int     pi;
{
        char    *r;
        if (token == T_lparen) {
                if ((token = scan()) < 0) return(cp);
                if (r = expression(pi) /* != 0 */) {
                        if (error == 0) error = E_parse_expression_expected;
                        return(r);
                }
                if (token != T_rparen) {
                        error   = E_parse_right_parenthesis_expected;
                        return(cp);
                }
                else if ((token = scan()) < 0) return(cp);
        }
        else if (token == T_not) {
                if ((token = scan()) < 0) return(cp);
                if (r = expression(pi) /* != 0 */) {
                        if (error == 0) error = E_parse_expression_expected;
                        return(r);
                }
                code[pi][nc++]  = NOT;
        }
        else if (token == T_string) {
                if (r = term(pi) /* != 0 */) {
                        if (error == 0) error = E_parse_term_expected;
                        return(r);
                }
        }
        else {
                if (error == 0) error = E_parse_expression_expected;
                return(cp);
        }
        while ((token == T_and) || (token == T_or)) {
                if (token == T_and) {
                        if ((token = scan()) < 0) return(cp);
                        if (r = expression(pi) /* != 0 */) {
                                if (error == 0) error = E_parse_expression_expected;
                                return(r);
                        }
                        code[pi][nc++]  = AND;
                }
                else if ( token == T_or) {
                        if ((token = scan()) < 0) return(cp);
                        if (r = expression(pi) /* != 0 */) {
                                if (error == 0) error = E_parse_expression_expected;
                                return(r);
                        }
                        code[pi][nc++]  = OR;
                }
        }
        return(0);
} static char *predicate(pi)
        int     pi;
{
        char    *r;
```

```
            if (token == T_any) {
                    if ((token = scan()) < 0) return(cp); }
            else if (r = expression(pi) /* != 0 */) {
                    if (error == 0) error = E_parse_expression_expected;
                    return(r);
                    }
            if (token != T_endMarker) {
                    error   = E_parse_nothing_more_expected;
                    return(cp);
                    }
            code[pi][nc++] = HALT;
            return(0);
    }
parse(s,pi)
        char    *s;
        int     pi;
/*******************************************************************
 *                                                                  *
 *      Parses s according to the following predicate expression    *
 * grammar:                                                         *
 *              predicate       -> expression                       *
 *                              -> '*'                              *
 *              expression      -> '!' expression                   *
 *                              -> '(' expression ')'               *
 *                              -> term                             *
 *                              -> expression '&' expression        *
 *                              -> expression '|' expression        *
 *              term            -> attribute relop value            *
 *              relop           -> '<'                              *
 *                              -> '>'                              *
 *                              -> '<='                             *
 *                              -> '>='                             *
 *                              -> '!='                             *
 *                              -> '='                              *
 *              attribute       -> "string"                         *
 *              value           -> integer | "string" | '*'         *
 *                                                                  *
 *      Puts code for the simple expression interpreter, defined in *
 * function interp, into the global static array code.              *
 *      Returns TRUE if successful, else FALSE and a pointer to the *
 * error message is passed in emsg and the character position in loc.*
 *                                                                  *
 *******************************************************************/
{
        char    *result;
        int     i;

#if DEBUGTRACE > 0
        fprintf(trace,"parse(%s)\n",s);
#endif
        cp      = s;
        nc      = 0;
        error   = 0;
        numAttributes[pi]       = 0;
        if ((token = scan()) < 0) result         = (char *) token;
        else result     = predicate(pi);
        if (result != 0) {
                setError(error, "", 1, ((int) (result-s))+1);
                return(FALSE);
                }
        return(TRUE);
}
interp(a,i)
        struct attributeValue a[];
        int     i;
/*******************************************************************
 *                                                                  *
 *      Interprets the code in global static array, code, for the   *
 * attribute values given in array a corresponding to the attribute *
 * numbers given by arrray attributes. If j = attributes[i], then   *
 * a[i] is the value for attribute with index j. Returns true iff the*
 * predicate is satisfied by the attribute value array a.           *
 *      The interpretor is stack based; the values on the stack are *
 * integers, which may be string indices, plain integers or represent*
 * boolean values. The instructions for the interpreter are given   *
 * below.       Strings are represented by a pointer to them.       *
 * Attributes are represented by their index into the array attributes.*
 * Typing is dynamic with the type of a stack element represented by*
 * the corresponding type array.                                    *
 *                                                                  *
```

```
*       instruction     [op]
*       HALT
*               Stop interpreting, the stack should contain either
*               true or false which will be the returned result.
*
*       LT
*       GT
*       LE
*       GE
*       EQ
*       NE
*               If the two top stack items are both strings, then:
*               s1 <- pop       s1 must be a string pointer
*               s2 <- pop       s2 must be a string pointer
*               push(s1 c s2)   c is either <, >, etc. representing
*                                lexigraphic ordering
*               If the two top stack items are both integers, then:
*               i1 <- pop       i1 must be an integer
*               i2 <- pop       i2 must be an integer
*               push(i1 r i2)   r is either <, >, etc.
*               Otherwise:
*               pop;    pop;    push(FALSE)
*
*       EQANY
*               v <- pop
*               if v is defined then push(TRUE) else push FALSE
*
*       NEANY
*               v <- pop
*               if v is undefined then push(TRUE) else push FALSE
*
*       AND
*               b1 <- pop       b1 must be a boolean value
*               b2 <- pop       b2 must be a boolean value
*               push(b1 and b2)
*
*       OR
*               b1 <- pop       b1 must be a boolean value
*               b2 <- pop       b2 must be a boolean value
*               push(b1 or b2)
*
*       NOT
*               b <- pop        b must be a boolean value
*               push(not b)
*
*       I_CONST Value           Value must be an integer
*               push(Value)
*
*       S_CONST Value           Value must be a string pointer
*               push(Value)
*
*       LOAD    I
*               v <- value of attribute with index attributes[I]
*               push(v)
*
*       EVAL
*               s <- pop        s must be a string index; execute
*                               the shell command represented by s
*               push(result)    result is the exit status of the shell
*
***************************************************************/
{
        int     p;      /* program counter into code array */
        int     c;      /* current instruction */
        int     stack[MAX_CODE];        /* value stack */
        int     type[MAX_CODE]; /* type stack,  0 => an integer */
                                /*              1 => a string */
                                /*              2 => undefined */
        int     sp;     /* stack pointer */
        struct attributeValue *v;
        short int       r;

p       = 0;
        sp      = -1;
        while ((c = code[i][p++]) != HALT)
                switch (c) {
                case I_CONST:
                        type[++sp]      = 0;
                        stack[sp]       = code[i][p++];
                        break;
```

```
case S_CONST:
        type[++sp]      = 1;
        stack[sp]       = code[i][p++];
        break;
case LOAD:
        v               = &a[code[i][p++]];
        type[++sp]      = v->valueType;
        if (v->valueType == 0)
                stack[sp]       = v->integerValue;
        else if (v->valueType == 1)
                stack[sp]       = (int) v->stringValue;
        else    stack[sp]       = 0;
        break;
case NOT:
        stack[sp]       = ! stack[sp];
        break;
case AND:
        stack[sp-1]     = stack[sp-1] && stack[sp];
        sp--;
        break;
case OR:
        stack[sp-1]     = stack[sp-1] || stack[sp];
        sp--;
        break;
case EQANY:
        stack[sp]       = type[sp] != 2;
        break;
case NEANY:
        stack[sp]       = type[sp] == 2;
        break;
case LT:
case GT:
case LE:
case GE:
case EQ:
case NE:
        if ((type[sp] !=1) && (type[sp-1] != 1)) {
                switch (c) {
                case LT:
                        stack[sp-1] = stack[sp-1] < stack[sp];
                        break;
                case GT:
                        stack[sp-1] = stack[sp-1] > stack[sp];
                        break;
                case LE:
                        stack[sp-1] = stack[sp-1] <= stack[sp];
                        break;
                case GE:
                        stack[sp-1] = stack[sp-1] >= stack[sp];
                        break;
                case EQ:
                        stack[sp-1] = stack[sp-1] == stack[sp];
                        break;
                case NE:
                        stack[sp-1] = stack[sp-1] != stack[sp];
                        break;
                }
                sp--;
        }
        else if ((type[sp] == 1) && (type[sp-1] == 1)) {
                r       = strcmp((char *)stack[sp-1],
                                 (char *)stack[sp]);
                switch (c) {
                case LT:
                        stack[--sp] = r < 0;
                        break;
                case GT:
                        stack[--sp] = r > 0;
                        break;
                case LE:
                        stack[--sp] = r <= 0;
                        break;
                case GE:
                        stack[--sp] = r >= 0;
                        break;
                case EQ:
                        stack[--sp] = r == 0;
                        break;
                case NE:
                        stack[--sp] = r != 0;
                        break;
                }
```

```
                        else stack[--sp]        = FALSE;
                        break;
                }
        return(stack[0]);
}
#include <sys/file.h>
#include <stdio.h>
#include "strings.h"
#include "directory.h"
#include "machine.h"
#include "log.h"

define NIL     0 int     hashTableSizes[] = {/* 193,389,773,1559, */ 3121,6247,12497,24989,49999,99999};

char    stringBuf[256]; /* buffer for string value returned */ define CACHE_TABLE_SIZE        1024
define MASK    01777
/* MASK = CACHE_TABLE_SIZE-1 */
static  int     indexCache[CACHE_TABLE_SIZE];
static  char    *stringCache[CACHE_TABLE_SIZE];

put_string(s,ai)
        char    *s;
        int     ai;
/****************************************************************
 *                                                              *
 *      Returns the string index for string s. If s is not in string  *
 *  storage, then add it including its entries in the hash table and  *
 *  index table; ai is the attribute index for s, -1 indicates no entry.*
 *      If any problems are encountered, returns -1.            *
 *                                                              *
 ****************************************************************/
{
        int     indices;        /* file descriptor for table of hash indices */
        int     hashTable;      /* file descriptor for hash table file */
        int     strings;        /* file descriptor for string storage */
        int     result;
        unsigned long   key;
        register int    j;
        int     len,strt;
        int     h1;     /* initial hash value */
        int     h2;     /* rehash constant */
        HASH_HEADER     header;
        HASH_ENTRY      str;    /* descriptor for string */
        INDEX_ENTRY     inx;

#if DEBUGTRACE > 0
        fprintf(trace,"put_string(%s)\n",s);
#endif
        result = -1;

indices         = openDirectoryFile(STRINGINDEX0);
        hashTable       = openDirectoryFile(STRINGHASH0);
        strings         = openDirectoryFile(STRINGCHARS0);
        if (indices < 0 || hashTable < 0 || strings < 0) goto end_put_string;

if (getStringHashHeader(hashTable,&header) == 0)
                goto end_put_string;
        key     = 0;
        j       = 1;
        len     = 0;
        while (s[len] != '\0') {
                if (j /* != 0 */)
                        {key += s[len++];               j = 0; }
                else    {key += (s[len++] << 8);        j = 1; }
                }
        h1      = key % header.size;
        h2      = (h1 == 0) ? 1 : header.size - h1;

hash:
        if (getStringHashEntry(hashTable,h1,&str) == 0)
                goto end_put_string;
        if (str.length /* != 0 */) {
                if (getStringEntry(strings,str.start,str.length,stringBuf) == 0)
                        goto end_put_string;
                if (strcmp(s,stringBuf) != 0) /* rehash */ {
                        h1 = (h2 >= h1) ? h1 + header.size - h2 : h1 - h2;
                        goto hash;
```

```
                }
        else /* in table */ {
                result = str.index;
                }
        } else /* string s not in hash table, so add it */ {
        if ((strt = addStringEntry(strings,len,s)) == -1)
                goto end_put_string;

inx.hashIndex         = h1;
        inx.attributeIndex    = ai;
        if ((str.index = addStringIndexEntry(indices,&inx)) < 0)
                goto end_put_string;
        str.start = strt;         str.length = len;

if (addStringHashEntry(hashTable,h1, &str) == -1)
                    goto end_put_string;
            result = str.index;
            }
end_put_string:
        closeDirectoryFile(indices);
        closeDirectoryFile(hashTable);
        closeDirectoryFile(strings);
        return(result);
} rehash_strings()
/***********************************************************************
 *                                                                     *
 *   Makes a new hashTable file, larger than the previous one; then    *
 *   reads through the indices file rehashing all entries.             *
 *   Returns true if successful else returns false.                    *
 *                                                                     *
 ***********************************************************************/
{
        int     i,j;
        int     r;
        int     result;
        INDEX_ENTRY     inx;
        HASH_ENTRY      str,h;
        HASH_HEADER     header;
        int     indices,newIndices;    /* file descriptor for hash indices */
        int     hashTable,newHashTable;/* file descriptor for hash table */
        int     strings;               /* file descriptor for string storage */
        int     key,h1,h2;
        int     r0, r1;
        struct  fileHeader      fh;
        int     index, lastIndex;

#if DEBUGTRACE > 0
        fprintf(trace,"rehash_strings()\n");
#endif

/***********************************************************************
 *                      Open all needed files                          *
 ***********************************************************************/
        result = FALSE;
        indices       = openDirectoryFile(STRINGINDEX0);
        hashTable     = openDirectoryFile(STRINGHASH0);
        strings       = openDirectoryFile(STRINGCHARS0);
        r0 = unlink(project.dirNames(STRINGHASH1));
        r1 = unlink(project.dirNames(STRINGINDEX1));
        newHashTable  = createDirectoryFile(STRINGHASH1);
        newIndices    = createDirectoryFile(STRINGINDEX1);
        if (indices < 0 || hashTable < 0 || strings < 0 || newIndices < 0 ||
                newHashTable < 0)
                goto end_rehash_strings;

/***********************************************************************
 *   Adjust for new hash table size and initialize file.               *
 ***********************************************************************/ if (getStringHashHeader(hashTable,&header) == 0)
                goto end_rehash_strings;
        if (header.number < (header.size >> 1)) {
                result = TRUE; /* don't really need it yet */
                goto end_rehash_strings;
                }
        j       = 1;
        while (hashTableSizes[j] <= header.size) j++;
        header.size = hashTableSizes[j];
```

```
              if (init_string_files(newHashTable, newIndices, -1, j) == 0)
                      goto end_rehash_strings;

/**************************************************************************
*                 Main loop through string indices                        *
**************************************************************************/
        if ((lastIndex = getStringIndicesCount(indices)) == -1)
                goto end_rehash_strings;
        for (index = 1; index <= lastIndex; index++) {
                if (getStringIndexEntry(indices, index, &inx) != 1)
                        goto end_rehash_strings;
                if (inx.hashIndex != EMPTY_MARK) {
                        if (getStringHashEntry(hashTable, inx.hashIndex, &str) == 0)
                                goto end_rehash_strings;
                        if (getStringEntry(strings, str.start, str.length, stringBuf) == 0)
                                goto end_rehash_strings;
                        stringBuf[str.length] = 0;

/**************************************************************************
*                 Hash a string                                           *
**************************************************************************/
                        key     = 0;
                        j       = 1;
                        for (i=0; i<str.length; i++)
                                if (j /* != 0 */)
                                        {key += stringBuf[i];        j = 0; }
                                else    {key += (stringBuf[i] << 8); j = 1; }
                        h1      = key % header.size;
                        h2      = (h1 == 0) ? 1 : header.size - h1;

hash:
                        if (getStringHashEntry(newHashTable, h1, &h) == 0)
                                goto end_rehash_strings;
                        if (h.length /* != 0 */) { /* hash conflict, so rehash */
                                h1 = (h2 >= h1) ? h1 + header.size - h2 : h1 - h2;
                                goto hash;
                        }
                        /* string s not in hash table, so add it */
                        inx.hashIndex = h1;     /* set new hash index */
                        if ((str.index = addStringIndexEntry(newIndices, &inx)) == -1)
                                goto end_rehash_strings;
                        if (addStringHashEntry(newHashTable, h1, &str) == -1)
                                goto end_rehash_strings;
                }
        }
        result = TRUE;

/**************************************************************************
*                 Close files and return.                                 *
**************************************************************************/
end_rehash_strings:
        closeDirectoryFile(strings);
        exitDirectoryFile(indices);
        exitDirectoryFile(newIndices);
        exitDirectoryFile(hashTable);
        exitDirectoryFile(newHashTable);
        if (!result) /* not successful */ {
                unlink(project.dirNames[STRINGHASH1]);
                unlink(project.dirNames[STRINGINDEX1]);
                return(result);
        }
#ifdef mag
        rename(project.dirNames[STRINGHASH1],project.dirNames[STRINGHASH0]);
        rename(project.dirNames[STRINGINDEX1],project.dirNames[STRINGINDEX0]);
#else
        unlink(project.dirNames[STRINGHASH0]);
        link(project.dirNames[STRINGHASH1],project.dirNames[STRINGHASH0]);
        unlink(project.dirNames[STRINGINDEX0]);
        link(project.dirNames[STRINGINDEX1],project.dirNames[STRINGINDEX0]);
#endif
        clearRehashFlag();
        return(result);
}
initialize_string_cache_table()
/**************************************************************************
*                                                                         *
*       Initializes cache table for string indices.                       *
*                                                                         *
**************************************************************************/
{
        int     i;
        for (i=0; i<CACHE_TABLE_SIZE; i++) {
```

UNITED STATES PATENT OFFICE
PTO – BOYERS, PA DUTY STATION

---

MISSING PAGE TEMPORARY NOTICE

PATENT NUMBER  5047918  FOR THE ISSUE DATE OF  9/10/1991  HAS BEEN SCANNED/LOADED, BUT CONTAINS A MISSING PAGE TEMPORARY NOTICE. UPON RECEIPT OF THE MISSING PAGE(S), THE ENTIRE DOCUMENT WILL BE RESCANNED. IF YOU HAVE ANY QUESTIONS, PLEASE CONTACT THE DATA MAINTENANCE BRANCH/OFFICE OF SYSTEMS NETWORK MANAGEMENT ON (703) 306-3116 OR BY E-MAIL AT DMB_Group@uspto.gov  THIS NOTICE IS FOR THE MISSING PAGE CONTAINING:

Text Col 289/290

(CO Corrects)

DATA CONVERSION OPERATION
BOYERS, PA

```
              register int    j;
              int     len,strt;
              int     h1;     /* initial hash value */
              int     h2;     /* rehash constant */
              HASH_HEADER     header;
              HASH_ENTRY      str; /* descriptor for string */ if DEBUGTRACE > 0
        fprintf(trace,"find_string(%s)\n",s);
#endif
        result    = -1;
        hashTable = openDirectoryFile(STRINGHASH2);
        strings   = openDirectoryFile(STRINGCHARS2);
        if (hashTable < 0 || strings < 0)
                goto end_find_string;

if (getStringHashHeader(hashTable,&header) == 0)
                goto end_find_string;

key     = 0;
        j       = 1;
        len     = 0;
        while (s[len] != '\0') {
                if (j /* != 0 */)
                        {key += s[len++];                j = 0; }
                else    {key += (s[len++] << 8);         j = 1; }
        }
        h1      = key % header.size;
        h2      = (h1 == 0) ? 1 : header.size - h1;

hash:
        if (getStringHashEntry(hashTable,h1,&str) == 0)
                goto end_find_string;
        if (str.length /* != 0 */) {
                if (getStringEntry(strings,str.start,str.length,stringBuf) == 0)
                        goto end_find_string;
                if (strcmp(s,stringBuf) != 0) /* rehash */ {
                        h1 = (h2 >= h1) ? h1 + header.size - h2 : h1 - h2;
                        goto hash;
                }
                else /* in table */ {
                        result = str.index;
                }
        }
        else /* string s not in hash table */
                result = -1;
        end_find_string:
                closeDirectoryFile(hashTable);
                closeDirectoryFile(strings);
                return(result);
} get_attribute_index(i)
        int     i;
/****************************************************************
*                                                                *
*       Returns the attribute index for string with index i.     *
*       If any problems encountered returns -1.                  *
*                                                                *
****************************************************************/
{
        INDEX_ENTRY     inx;
        int             indices;
        int     result;

#if DEBUGTRACE > 1
        fprintf(trace,"get_attribute_index(%d)\n",i);
#endif
        result = -1;
        indices = openDirectoryFile(STRINGINDEX2);
        if (indices <0)
                goto end_get_attribute_index;
        if (getStringIndexEntry(indices,i,&inx) == 0)
                goto end_get_attribute_index;
        result = inx.attributeIndex;

end_get_attribute_index:
        closeDirectoryFile(indices);
        return(result);
}
```

```
set_attribute_index(i,ai)
        int     i;
        int     ai;
/*****************************************************************
 *                                                               *
 *      Sets the attribute index for string with index i to ai.  *
 *      Returns true if successful else returns false.           *
 *                                                               *
 *****************************************************************/
{
        INDEX_ENTRY     inx;
        int     indices;
        int     result;

#if DEBUGTRACE > 1
        fprintf(trace,"set_attribute_index(%d,%d)\n",i,ai);
#endif
        result = FALSE;
        indices = openDirectoryFile(STRINGINDEX2);
        if (indices <0)
                goto end_set_attribute_index;
        if (getStringIndexEntry(indices,i,&inx) == 0)
                goto end_set_attribute_index;
        logPendingTransaction(L_PUTSTRINGINDEX, i, &inx, sizeof(inx));
        inx.attributeIndex      = ai;
        if (putStringIndexEntry(indices,i,&inx) == -1)
                goto end_set_attribute_index;
        result = TRUE;

end_set_attribute_index:
        closeDirectoryFile(indices);
        return(result);
}
find_string_indices(ai,data,dataSize)
        int     ai;
        int     data[];
        int     *dataSize;
/*****************************************************************
 *                                                               *
 *      For a given attribute index in ai, returns in data the set of *
 *      string indices which have ai as an attribute index. dataSize has *
 *      the number so found.                                     *
 *      Returns true if successful else returns false.           *
 *                                                               *
 *****************************************************************/
{
#define BUFSIZE 256
        int     indices;
        INDEX_ENTRY     inx[BUFSIZE];
        int     i,n,r;
        int     result;
        int     indexStart;
        struct  fileHeader      fh;

#if DEBUGTRACE > 1
        fprintf(trace,"find_string_indices(%d)\n",i);
#endif
        result = FALSE;
        indices = openDirectoryFile(STRINGINDEX2);
        if (indices <0)
                goto end_find_string_indices;
        if (read(indices,&fh,sizeof(fh)) != sizeof(fh))
                goto end_find_string_indices;
        r       = read(indices,inx,INDEX_ENTRY_SIZE*BUFSIZE);
        if (r < 0)
                goto end_find_string_indices;
        indexStart      = 0;
        while (r > 0) {
                for (i=0; i<r; i++)
                        if (inx[i].attributeIndex == ai) {
                                data[*dataSize] = indexStart + i;
                                *dataSize       += 1;
                        }
                r       = read(indices,inx,INDEX_ENTRY_SIZE*BUFSIZE);
                if (r < 0)
                        goto end_find_string_indices;
                indexStart      += BUFSIZE;
        }
        result = TRUE;

end_find_string_indices:
        closeDirectoryFile(indices);
}
```

We claim:

1. A method for a computer for storing successive versions of successively changed data files stored in a computer accessed data storage device and for searching for a group of said versions, the method comprising the steps of:

creating and storing a version history record when the content of one of said data files undergoes a change, the version history record comprising a set of instructions for recreating a version of the content of said one data file existing immediately prior to the change by inserting data into and deleting data from said one data file existing immediately following the change, one such version history record being created and stored each time a data file is changed such that a version history record is associated with each successive version of the data file;

assigning to each version history record and storing a time parameter value established according to the time the version associated with the version history record was first stored as the content of a data file;

storing node records, each of said node records being associated with a corresponding one of said version history records and comprising first data indicating at least one file attribute parameter and second data indicating a value for said at least one file attribute parameter, said file attribute parameter value representing an attribute of a content of a data file recreated by the set of instructions comprising the associated version history record; and searching for a group of said version history records in response to an input command identifying a particular file attribute parameter value and a first particular time, wherein each version history record of said group comprises the set of instructions recreating a data file as it existed as of said first particular time and is associated with a node record and wherein the step of searching comprises the substeps of:

reading data comprising the stored node records;

identifying from the node record data read a first subset of version history records associated with node records indicating said particular file attribute parameter value, reading stored time parameter values assigned to version history records to determine a second subset of version history records comprising instructions recreating a data file as it existed as of said first particular time, and identifying said group of version history records as all version history records included in both said first and second subsets.

2. A method for a computer for storing successive versions of successively changed data files stored in a computer accessed data storage device and for searching for a group of said versions, the method comprising the steps of:

creating and storing a version history record when the content of one of said data files undergoes a change, the version history record comprising a set of instructions for recreating a version of the content of said one data file existing immediately prior to the change by inserting data into and deleting data from said one data file existing immediately following the change, one such version history record being created and stored each time a data file is changed such that a version history record is associated with each successive version of the data file;

assigning to each version history record and storing a time parameter value established according to the time the version associated with the version history record was first stored as the content of a data file;

storing link records, each link record comprising third data version history records, fourth data indicating at least one link attribute parameter, and fifth data indicating at least one link attribute parameter value for said at least one link attribute parameter, said at least one link attribute parameter value representing an attribute of a relationship between a pair of data file versions;

assigning to each link record and storing a second time parameter value established according to a time the link record was stored;

storing node records, each of said node records being associated with a corresponding one of said version history records and comprising first data indicating at least one file attribute parameter and second data indicating a value for said at least one file attribute parameter, said file attribute parameter value representing an attribute of a content of a data file recreated by the set of instructions comprising the associated version history record; and searching for a group of version history records in response to an input command identifying a particular data file, a particular file attribute parameter value, a particular link attribute parameter value, and a particular time, wherein each version history record of said group comprises instructions recreating a data file having a relationship with said particular data file represented by said particular link attribute parameter value as of said particular time and is associated with a node record indicating said particular file attribute parameter value;

wherein the step of searching comprises the substeps of:

reading data comprising the stored link records;

reading stored time parameter values associated with said link records; and determining from the link record data and time parameter values read said group of version history records.

3. An apparatus for storing and identifying successive versions of successively changed content of data files stored in a computer accessed data storage device, the apparatus comprising:

first means for creating and storing a version history record when the content of one of said data files undergoes a change, the version history record comprising a set of instructions for recreating a version of the content of said one data file existing immediately prior to the change by inserting data into and deleting data from the content of said one data file existing immediately following the change, one such version history record being created and stored each time the data file is changed such that a version history record is associated with each successive version of the content of a file, and for creating and storing node records, each data file and each version history being associated with one of said node records, each said node record comprising first data indicating at least one file attribute parameter and second data indicating a value for said at least one file attribute parameter, the value of said file attribute parameter representing a file content attribute, each node record being assigned a time parameter value established according to the time the file content version associated with the node record was first sored as the content of a data file; and second means for identifying a first group of said node records wherein each node record of said first group comprises data indicating a user-selected file attribute parameter value and having an assigned time parameter value indicating the file content version associated with the node record was stored in a file as of a user-selected time.

4. An apparatus for storing an identifying successive versions of successively changed content of data files stored in a computer accessed data storage device, the apparatus comprising:

means for creating and storing a version history record when the content of one of said data files undergoes a change, the version history record comprising a set of instructions for recreating a version of the content of said one data file existing immediately prior to the change by inserting data into and deleting data from the content of said one data file existing immediately after the change, one such version history record being created and stored each time the data file is changed such that a version history record is associated with each successive version of the content of a file;

means for creating and storing node records, each data file and each version history being associated with one of said node records, each said node record comprising first data indicating at least one file attribute parameter and second data indicating a value for said at least one file attribute parameter, the value of said file attribute parameter representing a file content attribute;

means for creating a storing link records, each link record comprising third data identifying a pair of node records, fourth data indicating at least one link attribute parameter, and fifth data indicating a value for said at least one link attribute parameter, said link attribute parameter value representing an attribute of a relationship between a pair of data file content versions associated with said pair of data files;

each of said node records being assigned a time parameter value established according to the time the file content version associated with the node record was first stored as the content of a data file. and each said link record being assigned a time parameter value established according to the time the link record was stored; and search means responsive to an input command for reading said node and link records and for identifying a group of said data files from data comprising the node and link records read, wherein the content of each one of said group of data files as of a particular time is related to the content of a particular data file as of said particular time according to a particular link attribute parameter value. said command reference said particular time. said particular data file and said particular link attribute parameter value.

* * * * *

UNITED STATES PATENT AND TRADEMARK OFFICE
CERTIFICATE OF CORRECTION

PATENT NO. : 5,047,918

DATED : September 10, 1991

INVENTOR(S) : Mayer D. Schwartz and Norman M. Delisle

It is certified that error appears in the above-identified patent and that said Letters Patent is hereby corrected as shown below:

Add missing columns 19 and 20, as per attached.

Add columns 289 and 290 of the Appendix. As per attached sheets.

Signed and Sealed this

Fifth Day of December, 1995

Attest:

BRUCE LEHMAN

Attesting Officer

Commissioner of Patents and Trademarks returns the NodeIndex and Time parameters for the new node. Once an empty node is created, a user may invoke another operation "modifyNode" (described hereinbelow) to fill it with data.

DeleteNode:

$$Context \times NodeIndex \rightarrow -$$

The DeleteNode operation removes a node identified by NodeIndex from a graph (identified by Context) along with all links into or out of the deleted node. In the case of a file node, the node contents file 22 of FIG. 2 is removed from storage while in the case of an archive file, the node is marked "deleted" and the current contents portion of the node contents file and the node history portion of the node contents file are retained so that previous versions of the node may be reconstructed.

AddLink:

$$Context \times LinkPt_1 \times LinkPt_2 \rightarrow LinkIndex \times Time$$

Figure 5:
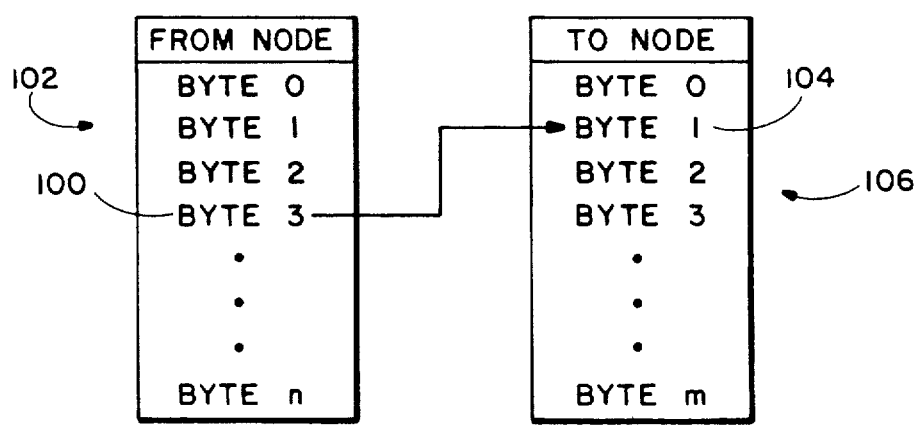
FIG. 5 is a diagram illustrating a link between two data files.

The AddLink operation creates a new link between two nodes. Referring to FIG. 5, illustrating a link between two node contents files, the data is stored in each node contents file as a sequence of bytes. A link connects one selected byte 100 in a "from" node 102 to another selected byte 104 in a "to" node 106. A link point (LinkPt), comprising the particular byte of the sequence of bytes in a node contents file where a link is attached, is specified according to the following:

$$LinkPt = NodeIndex \times Position \times Time$$

where NodeIndex identifies the node and Position identifies the byte sequence position in the node to which the link points. A version history of the link is maintained if either link point (LinkPT$_1$ or LinkPT$_2$) refers to an archive node. Time references the version time of the node and the machine assumes that the node is the current version unless the user declares a nonzero Time. LinkPt$_1$ identifies the byte in the "from" node where the link begins and LinkPt$_2$ identifies the byte in the "to" node where the link ends. The AddLink operation returns LinkIndex, the unique identifier for the new link, and the creation time (Time) for the link.

CopyLink:

$$Context \times LinkIndex \times Time_1$$
$$\times Boolean \times LinkPt \rightarrow LinkIndex \times Time$$

The CopyLink operation creates a new link between two nodes where one end of the link is identical to that of an existing link identified by LinkIndex and Time$_1$. Thus, this end of the existing link is taken to be one end of the new link while the other end of the new link is identified by LinkPt. If Boolean is true then the source of the new link point is identified by LinkIndex and the destination is identified by LinkPt. If Boolean is false the LinkIndex identifies the destination of the new link and LinkPt identifies the source. The copyLink operation returns a LinkIndex identifier for the new link and its creation time (Time).

DeleteLink:

$$Context \times LinkIndex \rightarrow -$$

The DeleteLink operation removes the link identified by LinkIndex of the graph given by Context but does not delete link version histories.

The graph program 72 of FIG. 2 implements the above described operations utilizing the direct and the directory programs 45 to control the contents of the node dictionary file 24. The graph program 72 provides information regarding the operations it performs to the log program 70 and is adapted to acquire transaction data from the log program during a recovery operation after an improper user termination.

Referring again to FIG. 2, a linear program 74, also listed in Appendix I, implements the following operation:

LinearizeGraph:

$$Context \times NodeIndex \times Time \times Predicate_1$$
$$\times Predicate2 \times AttributeIndex_1{}^m \times AttributeIndex_2{}^n \rightarrow (NodeIndex \times Value^n)^*$$
$$\times (LinkIndex \times Value^n)^*$$

This operation performs the previously discussed "traversal" search. The LinearizeGraph operation returns a linked sub-graph of a version of a graph identified by Context and Time. The sub-graph contains every node of the graph which satisfies Predicate$_1$ and which can be reached from a starting node (identified by NodeIndex) by traversing only links satisfying Predicate$_2$ and passing through other nodes satisfying Predicate$_1$. A "predicate" is an expression which indicates a selected set of node or link attributes along with one or more values associated with each attribute. To "satisfy" a predicate a node or a link must possess the attribute values indicated by the predicate. Node and link predicates are expressed according to the following grammar:

```
predicate  → expression
expression → -expression
           → (expression)
           → term
           → expression & expression
           → expression | expression
term       → attribute relop value
           → 'true'
           → 'false'
relop      → '<'
           → '≤'
           → '>'
           → '≥'
           → '='
           → '≠'
attribute  → "string"
value      → integer|"string"|'*'
```

In the above grammar the character "*" represents any value. Assuming, for instance, that nodes have an attribute named "type" with a value "text" and an attribute named "year", a typical Predicate$_1$ expression according to the above grammar reads as follows:

$$type = text \ \& \ year > 1960.$$

This predicate indicates that only text nodes written after 1960 are to be included in the subgraph. The subgraph is returned by the Linearize-Graph operation as a set of NodeIndex and LinkIndex values identifying the nodes and links of the subgraph. The LinearizeGraph operation also returns the values (Value*) of selected attributes associated with the nodes and links of the sub-graph, the node attributes being selected according

```
                    indexCache[i]   = 0;
                    stringCache[i]  = NIL;
                }
} char *get_string(i)
        int     i;
/***********************************************************************
 *                                                                     *
 *      Returns the string with index i.                               *
 *      If any problems are encountered, returns the empty string.     *
 *                                                                     *
 ***********************************************************************/
{
        INDEX_ENTRY     inx;
        HASH_ENTRY      str;    /* descriptor for string */
        char    *result;
        int     indices;
        int     hashTable;
        int     strings;
        int     cacheIndex, cacheValue;

#if DEBUGTRACE > 0
        fprintf(trace,"get_string(%d)\n",i);
#endif
        cacheIndex      = i & MASK;
        cacheValue      = indexCache[cacheIndex];
        if (cacheValue == i)
                return(stringCache[cacheIndex]);
        else if (cacheValue != 0)
                free(stringCache[cacheIndex]);

result  = "";
        indices         = openDirectoryFile(STRINGINDEX0);
        hashTable       = openDirectoryFile(STRINGHASH0);
        strings         = openDirectoryFile(STRINGCHARS0);
        if (indices <0 || hashTable < 0 || strings < 0)
                goto end_get_string;

if (getStringIndexEntry(indices,i,&inx) == 0)
                goto end_get_string;

if (getStringHashEntry(hashTable,inx.hashIndex,&str)== 0)
                goto end_get_string;

if ((result = (char *) malloc(str.length+1)) == 0)
                goto end_get_string;
        if (getStringEntry(strings,str.start,str.length, result) == 0)
                goto end_get_string;
        indexCache[cacheIndex]  = i;
        stringCache[cacheIndex] = result;

end_get_string:
        closeDirectoryFile(indices);
        closeDirectoryFile(hashTable);
        closeDirectoryFile(strings);
        return(result);
get_string_index(s)
        char    *s;
        /* get_string_index is a transaction interface to find_string */
        int     r;
        if (startTransaction(T_ACCESS) == FALSE) return -1;
        r = find_string(s);
        commitTransaction();
        return r;
}
```